(12) United States Patent
Preston et al.

(10) Patent No.: US 12,393,315 B2
(45) Date of Patent: Aug. 19, 2025

(54) INTERACTING WITH NOTES USER INTERFACES

(71) Applicant: Apple Inc., Cupertino, CA (US)

(72) Inventors: Daniel T. Preston, San Jose, CA (US); Christopher D. Soli, Mountain View, CA (US); Aram D. Kudurshian, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/663,000

(22) Filed: May 11, 2022

(65) Prior Publication Data
US 2022/0365632 A1 Nov. 17, 2022

Related U.S. Application Data

(60) Provisional application No. 63/189,592, filed on May 17, 2021.

(51) Int. Cl.
| | | |
|---|---|---|
| G06F 3/0481 | (2022.01) | |
| G06F 3/04886 | (2022.01) | |
| G06F 3/0483 | (2013.01) | |
| G06F 3/04883 | (2022.01) | |

(52) U.S. Cl.
CPC ........ G06F 3/0481 (2013.01); G06F 3/04886 (2013.01); *G06F 3/0483* (2013.01); *G06F 3/04883* (2013.01)

(58) Field of Classification Search
CPC .. G06F 3/0481; G06F 3/04886; G06F 3/0483; G06F 3/04883
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,677,932 | B1 | 1/2004 | Westerman |
| 6,888,536 | B2* | 5/2005 | Westerman ........... G06F 3/0488 345/184 |
| 7,218,226 | B2* | 5/2007 | Wehrenberg ....... G08B 13/1409 340/568.1 |
| 7,614,008 | B2* | 11/2009 | Ording .................. G06F 3/0482 345/173 |
| 7,633,076 | B2* | 12/2009 | Huppi .................. G06F 3/0488 345/169 |
| 7,653,883 | B2* | 1/2010 | Hotelling .............. G06F 3/0485 715/863 |
| 7,657,849 | B2* | 2/2010 | Chaudhri .............. H04M 1/663 345/173 |
| 7,663,607 | B2* | 2/2010 | Hotelling ............ G06F 3/04166 345/173 |

(Continued)

FOREIGN PATENT DOCUMENTS

| | | |
|---|---|---|
| WO | 2013/169849 A2 | 11/2013 |
| WO | 2014/105276 A1 | 7/2014 |

OTHER PUBLICATIONS

International Search Report received for PCT Patent Application No. PCT/US2022/072266, mailed on Nov. 25, 2022, 7 pages.

*Primary Examiner* — Michael J Jansen, II
(74) *Attorney, Agent, or Firm* — Kubota & Basol LLP

(57) ABSTRACT

In some embodiments, an electronic device provides for efficient display and/or interaction with notes user interfaces. In some embodiments, an electronic device facilitates the addition of content displayed with a note to the note.

63 Claims, 76 Drawing Sheets

(56) References Cited

U.S. PATENT DOCUMENTS

| | | | |
|---|---|---|---|
| 7,688,306 B2* | 3/2010 | Wehrenberg | G06F 3/165 345/157 |
| 7,844,914 B2* | 11/2010 | Andre | G06F 3/04883 715/773 |
| 7,957,762 B2* | 6/2011 | Herz | G06F 1/3231 455/66.1 |
| 8,006,002 B2* | 8/2011 | Kalayjian | H04M 1/605 710/36 |
| 8,112,716 B2* | 2/2012 | Kobayashi | G06F 3/0481 715/788 |
| 8,239,784 B2* | 8/2012 | Hotelling | G06F 3/0488 345/177 |
| 8,279,180 B2* | 10/2012 | Hotelling | G06F 3/04182 345/173 |
| 8,381,135 B2* | 2/2013 | Hotelling | G06F 3/04883 715/863 |
| 8,479,122 B2 | 7/2013 | Hotelling et al. | |
| 8,799,827 B2* | 8/2014 | Hinckley | G06F 3/0483 715/863 |
| 8,836,648 B2* | 9/2014 | Wilairat | G06F 3/04883 715/810 |
| 8,994,674 B2* | 3/2015 | Eguchi | G06F 3/04883 345/173 |
| 9,348,458 B2 | 5/2016 | Hotelling et al. | |
| 9,372,622 B2* | 6/2016 | Huang | G06F 3/04883 |
| 9,933,937 B2* | 4/2018 | Lemay | G06F 3/04886 |
| 10,852,936 B2* | 12/2020 | Graham | G06F 3/0488 |
| 11,079,929 B2* | 8/2021 | Walkin | G06F 3/0481 |
| 11,221,698 B2* | 1/2022 | Dellinger | G06F 9/542 |
| 11,275,405 B2* | 3/2022 | Hotelling | G06F 1/1637 |
| 11,797,150 B2* | 10/2023 | Walkin | G06F 3/0482 |
| 2002/0015024 A1* | 2/2002 | Westerman | G06F 3/0446 345/173 |
| 2005/0190059 A1* | 9/2005 | Wehrenberg | G08B 25/008 340/686.1 |
| 2006/0017692 A1* | 1/2006 | Wehrenberg | G06F 1/1694 700/302 |
| 2006/0026535 A1* | 2/2006 | Hotelling | G06F 3/0488 715/863 |
| 2006/0033724 A1 | 2/2006 | Chaudhri et al. | |
| 2006/0053387 A1* | 3/2006 | Ording | G06F 3/0482 345/173 |
| 2006/0085757 A1* | 4/2006 | Andre | G06F 3/04186 715/771 |
| 2006/0097991 A1* | 5/2006 | Hotelling | G06F 3/04166 345/173 |
| 2006/0161870 A1* | 7/2006 | Hotelling | G06F 3/0412 715/863 |
| 2006/0161871 A1* | 7/2006 | Hotelling | G06F 3/0485 715/862 |
| 2006/0197753 A1* | 9/2006 | Hotelling | G06F 3/016 345/173 |
| 2007/0075965 A1* | 4/2007 | Huppi | H04M 1/72454 345/156 |
| 2007/0150842 A1* | 6/2007 | Chaudhri | H04M 1/67 715/863 |
| 2007/0257890 A1* | 11/2007 | Hotelling | G06F 3/04182 345/173 |
| 2008/0140868 A1* | 6/2008 | Kalayjian | H04W 4/029 709/217 |
| 2008/0167834 A1* | 7/2008 | Herz | G06F 3/3231 250/221 |
| 2008/0320391 A1* | 12/2008 | Lemay | G06F 3/04886 715/702 |
| 2009/0024956 A1* | 1/2009 | Kobayashi | G06F 3/0481 715/784 |
| 2010/0302172 A1* | 12/2010 | Wilairat | G06F 3/04883 345/173 |
| 2010/0306705 A1* | 12/2010 | Nilsson | H04M 1/67 345/173 |
| 2011/0209099 A1* | 8/2011 | Hinckley | G06F 3/04883 715/863 |
| 2012/0319971 A1* | 12/2012 | Eguchi | G06F 3/04883 345/173 |
| 2014/0223386 A1* | 8/2014 | Huang | G06F 3/04845 715/863 |
| 2014/0298244 A1* | 10/2014 | Kim | G06F 3/04855 715/780 |
| 2017/0208241 A1* | 7/2017 | Choi | G06F 3/04883 |
| 2018/0088794 A1* | 3/2018 | Graham | G06F 40/169 |
| 2018/0329550 A1* | 11/2018 | Dellinger | G06F 3/016 |
| 2020/0057555 A1* | 2/2020 | Walkin | G06F 3/0483 |
| 2021/0084216 A1* | 3/2021 | Choi | G06F 3/0486 |
| 2021/0165564 A9* | 6/2021 | Walkin | G06F 3/04883 |
| 2022/0350463 A1* | 11/2022 | Walkin | G06F 3/04842 |
| 2022/0365632 A1* | 11/2022 | Preston | G06F 3/0481 |

\* cited by examiner

INTERACTING WITH NOTES USER INTERFACES

CROSS-REFERENCE TO RELATED APPLICATIONS

This application claims the benefit of U.S. Provisional Application No. 63/189,592, filed May 17, 2021, the content of which is incorporated herein by reference in its entirety for all purposes.

FIELD OF THE DISCLOSURE

This relates generally to electronic devices that display notes user interfaces, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to access notes efficiently. In some circumstances, users wish to add content to notes efficiently. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to one or more electronic devices that provide for efficient display and/or interaction with notes user interfaces. Some embodiments described in this disclosure are directed to one or more electronic devices that facilitate the addition of content displayed with a note to the note. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
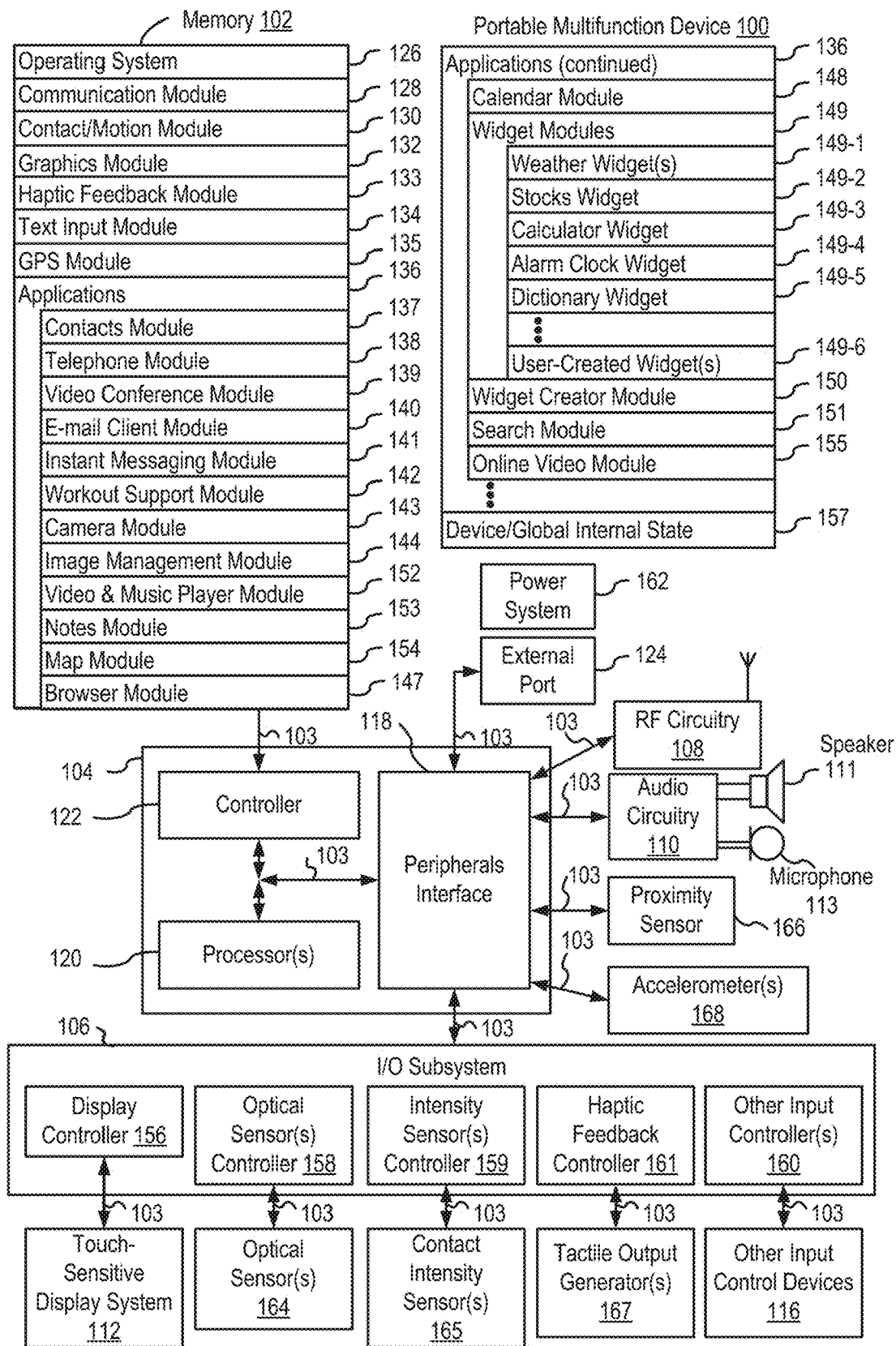
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for accessing and/or adding content to notes and/or notes user interfaces. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, device 100 is a portable computing system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., an integrated display, touch screen 112, etc.). In some embodiments, the display generation component is separate from the computer system (e.g., an external monitor, a projection system, etc.). As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
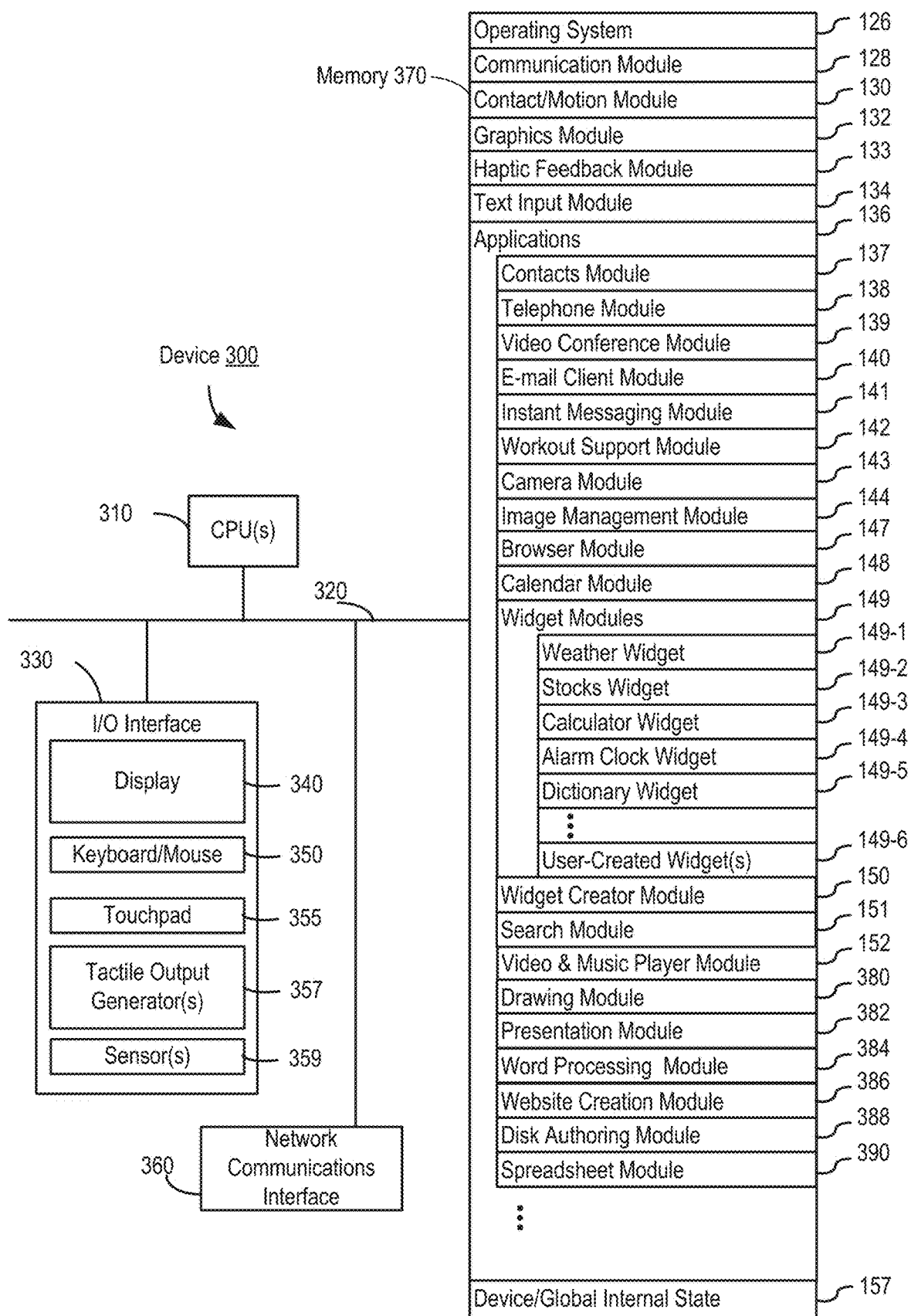
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
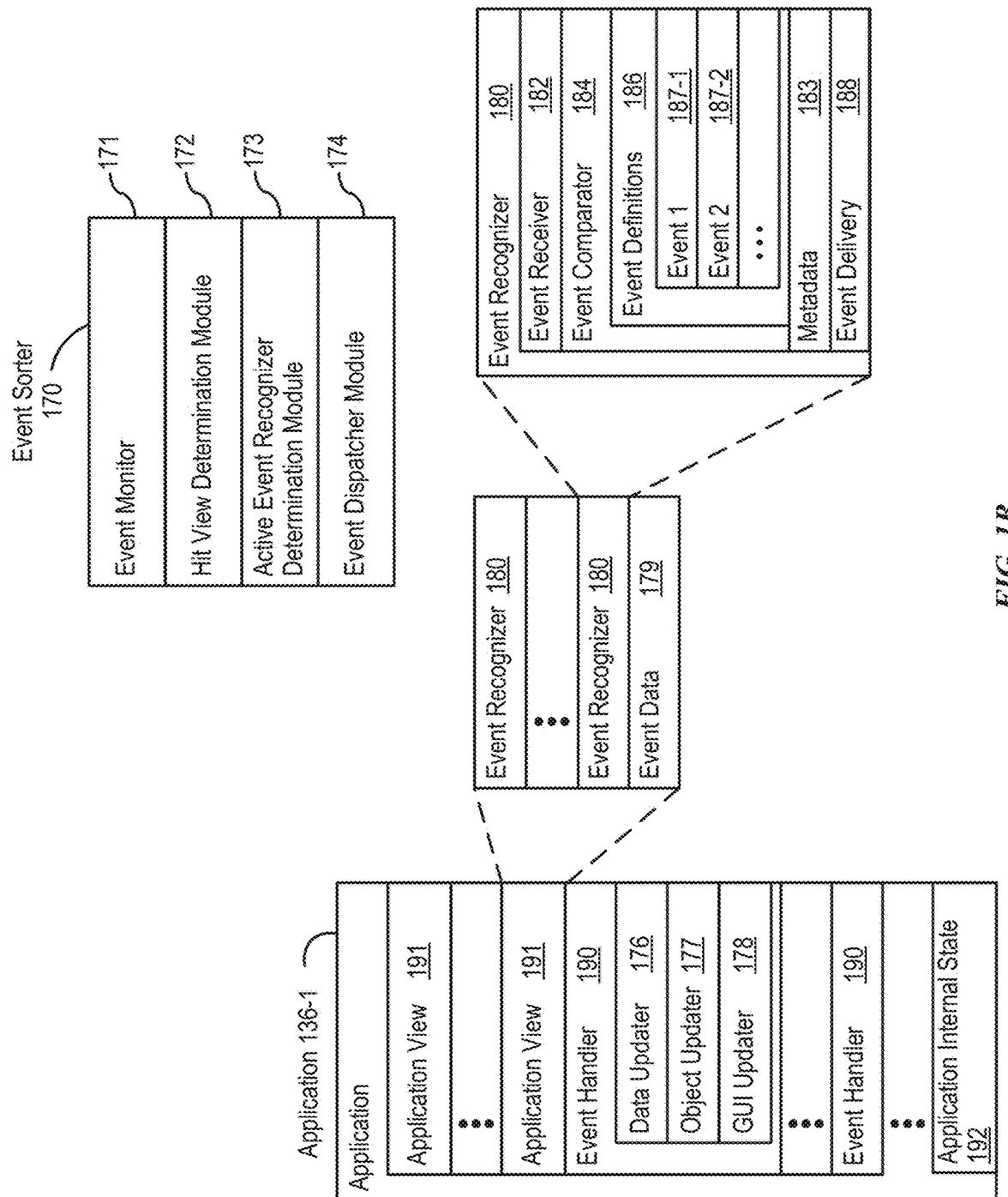
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
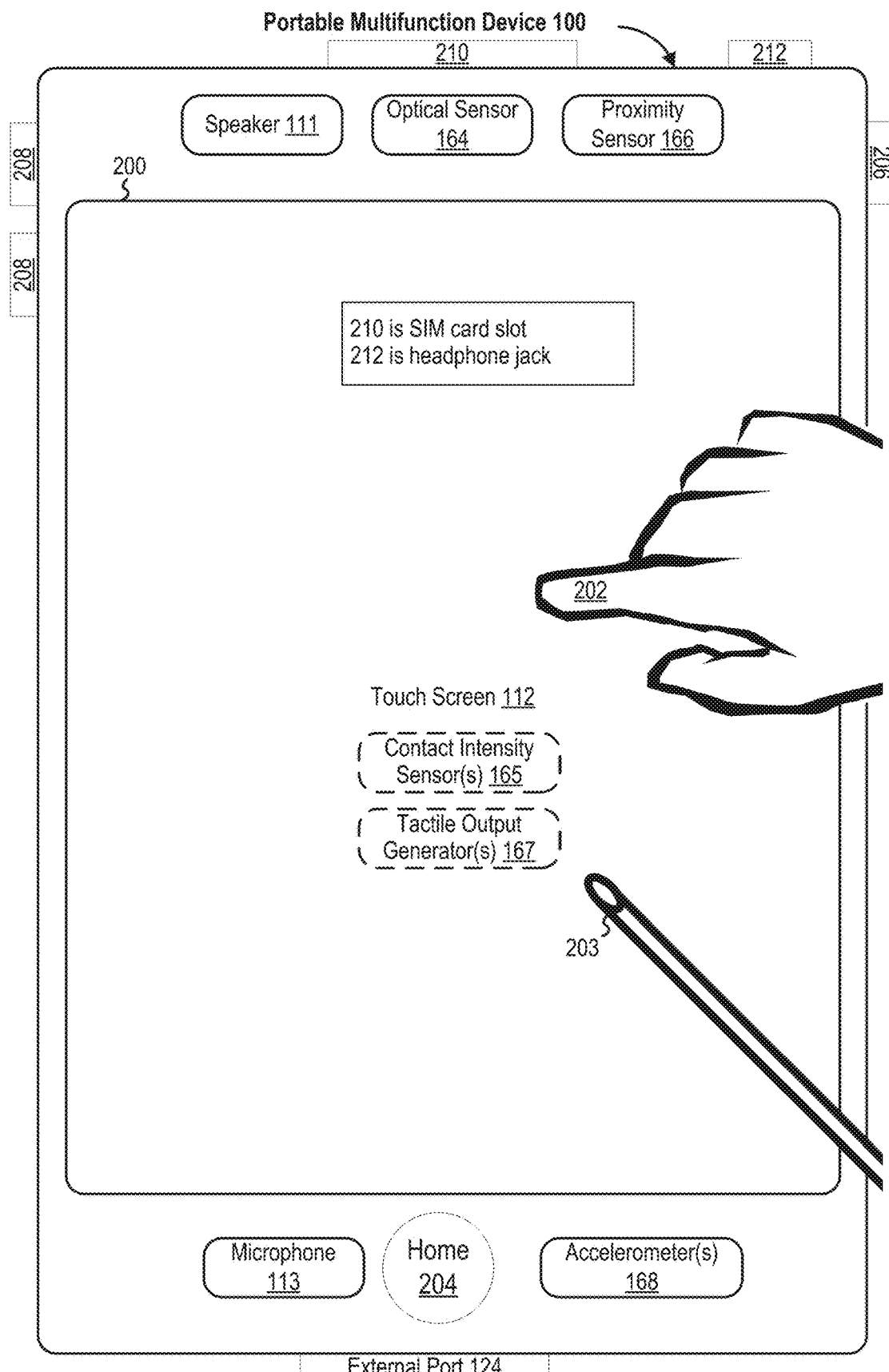
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
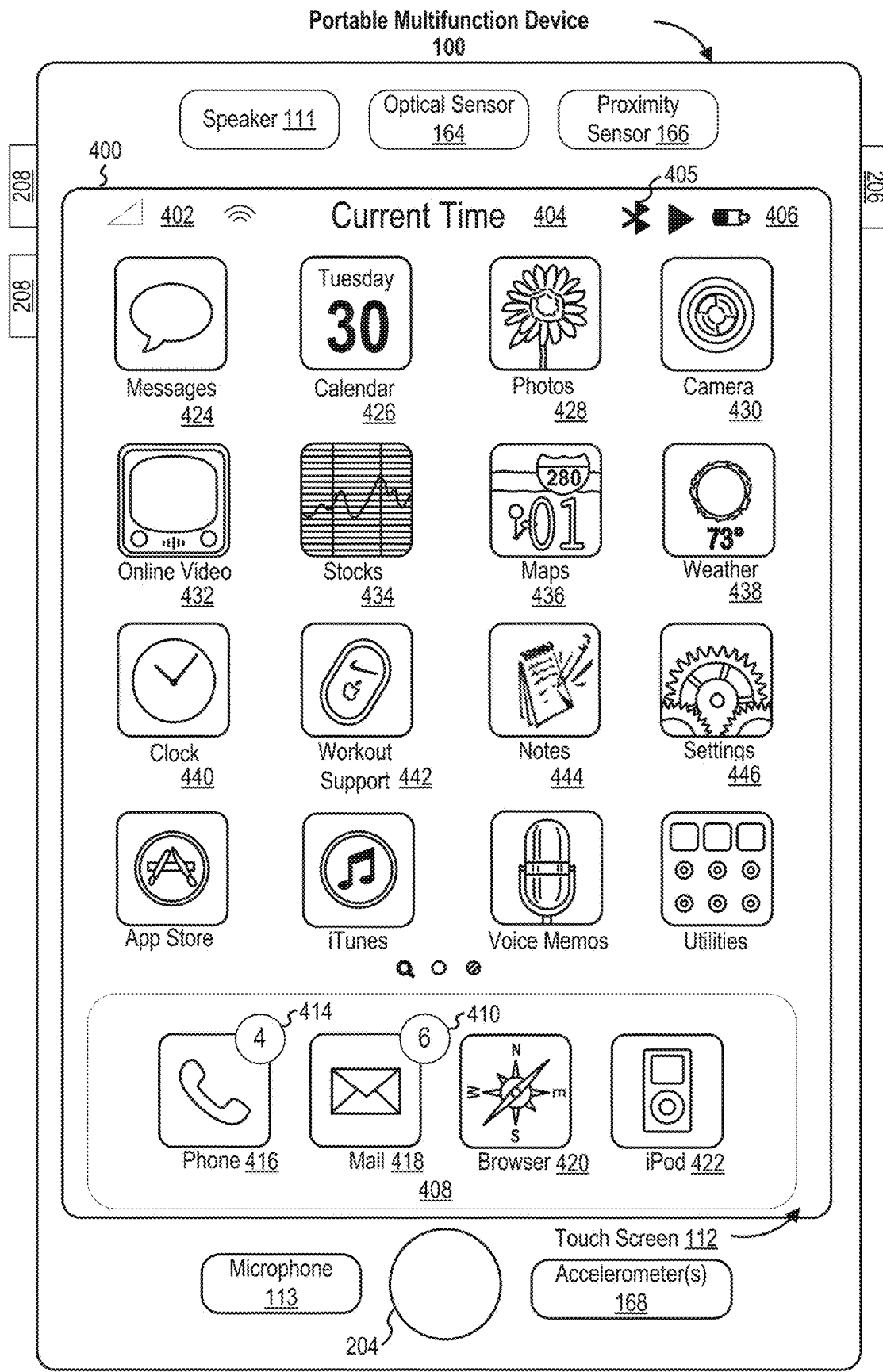
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
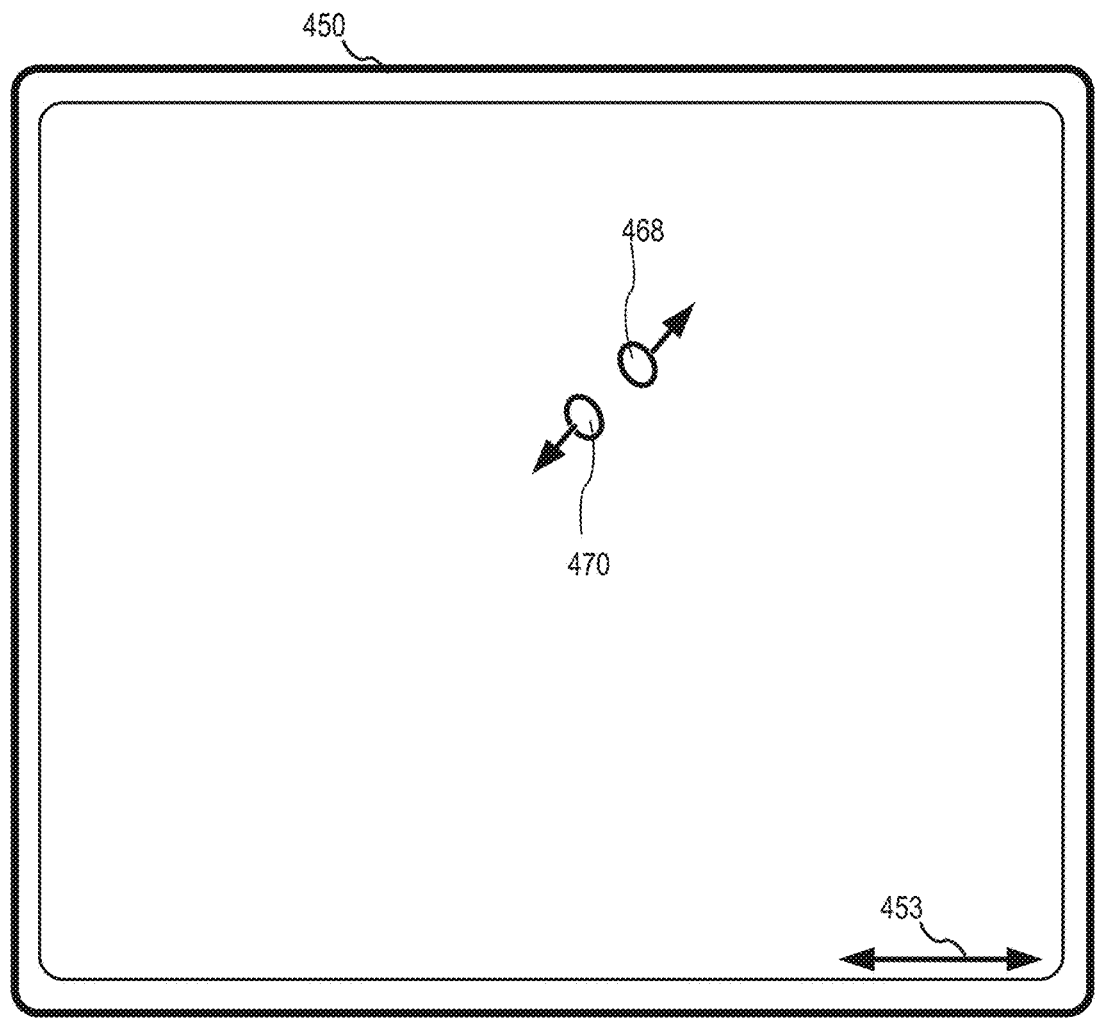
FIG. 4B illustrates an exemplary user interface for a multifunction device with a touch-sensitive surface that is separate from the display in accordance with some embodiments.
Figure 4B:
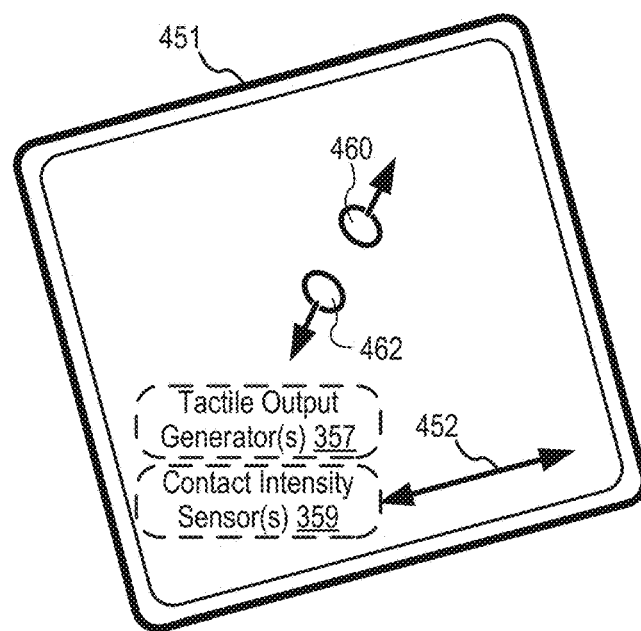

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
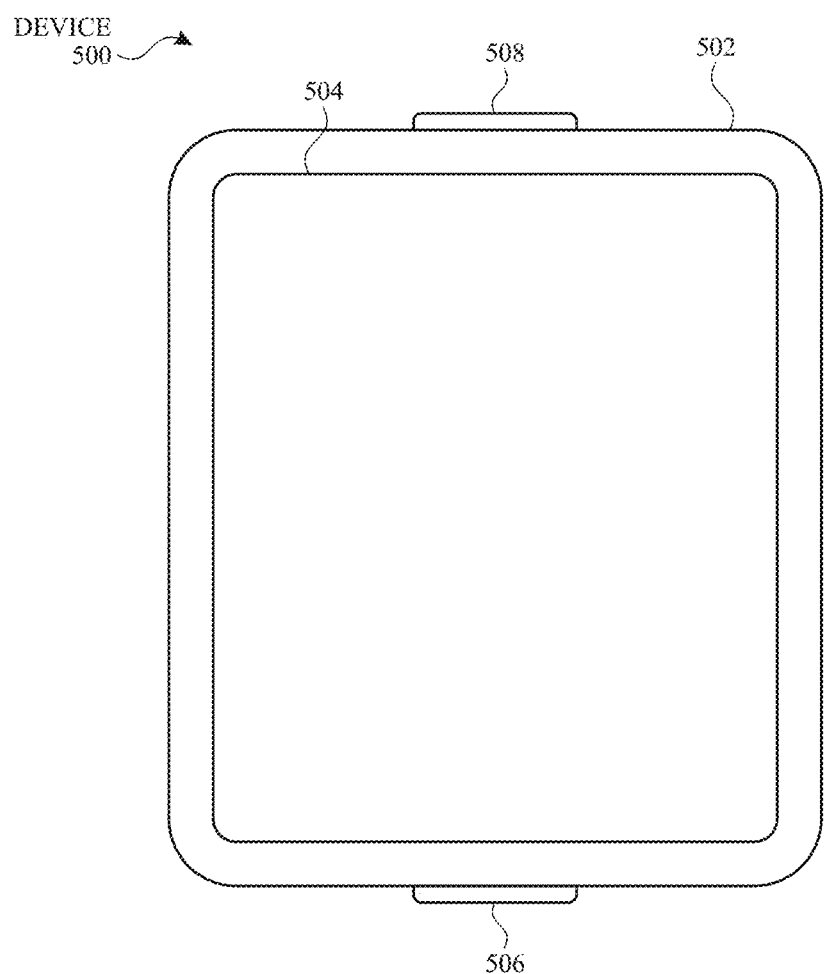
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
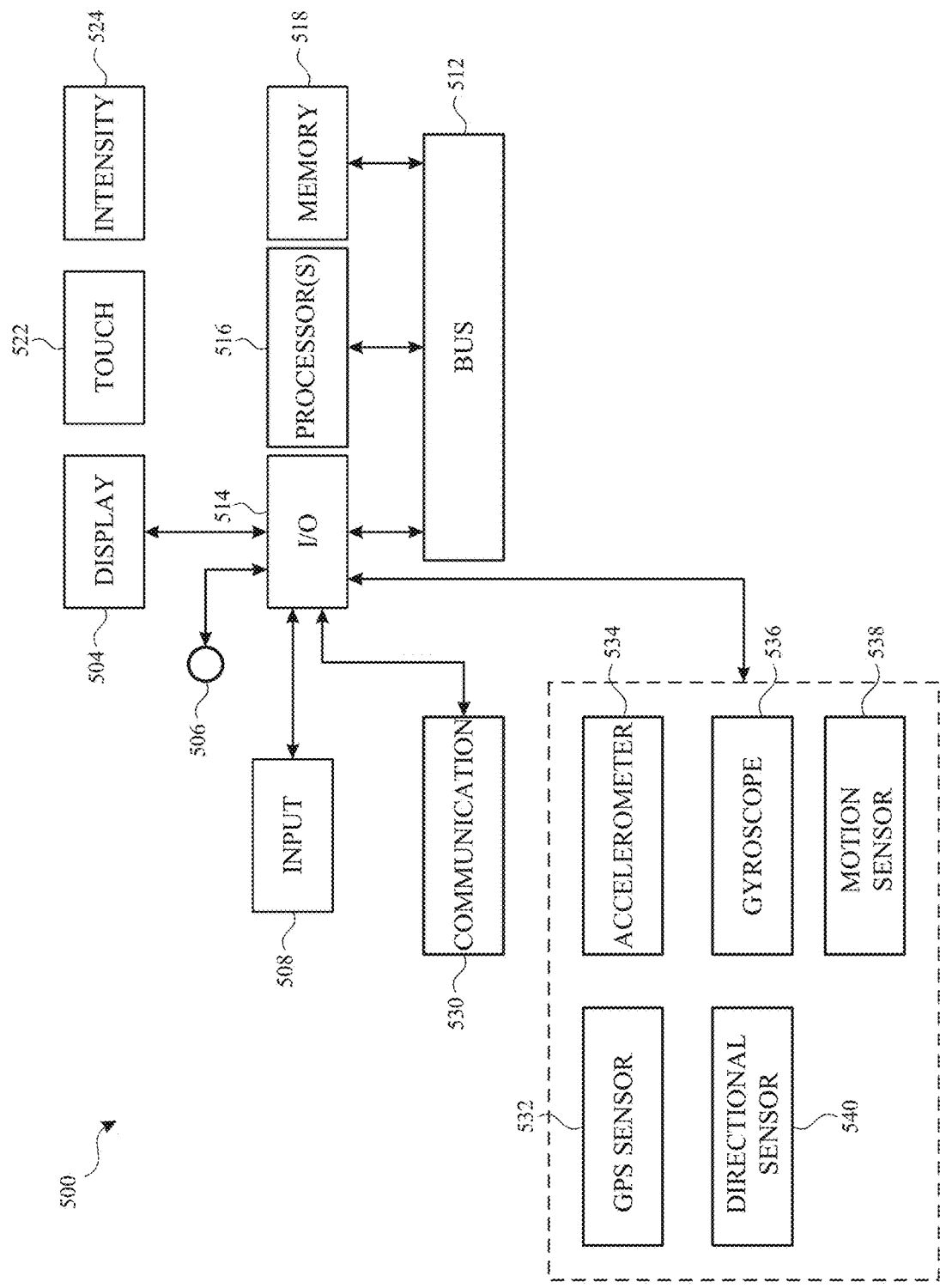
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
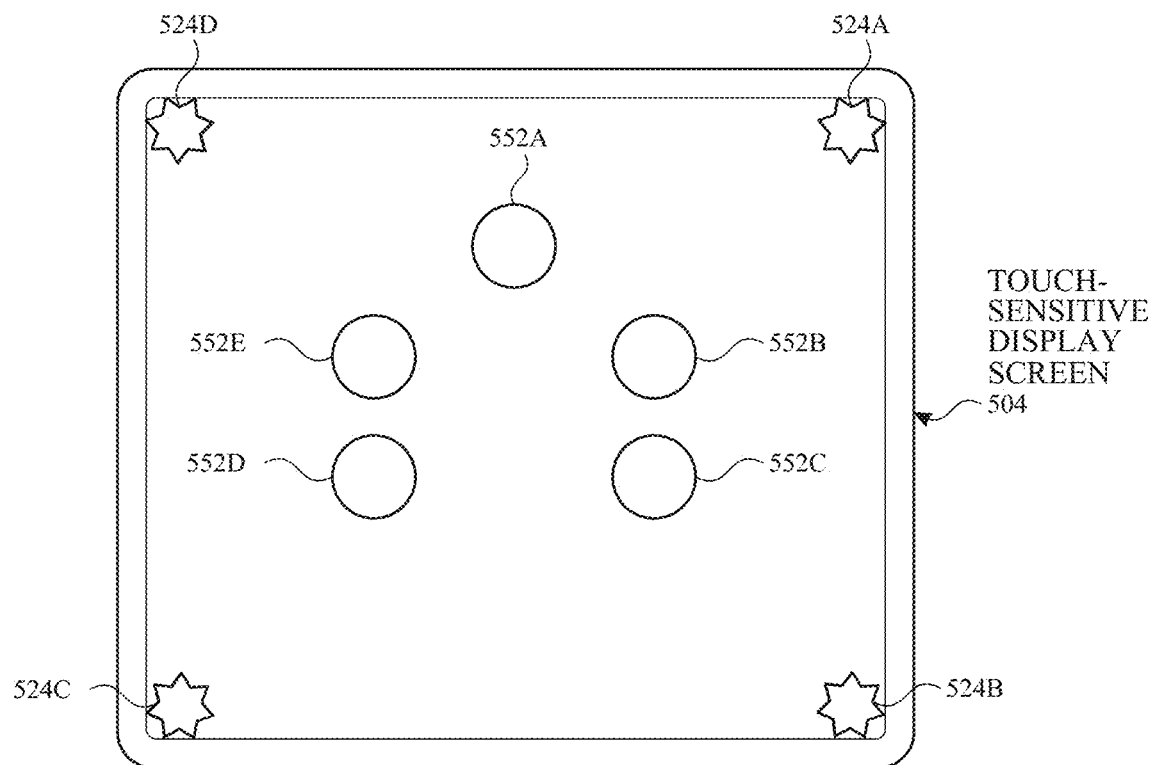
FIGS. 5C-5D illustrate exemplary components of a personal electronic device having a touch-sensitive display and intensity sensors in accordance with some embodiments.
Figure 5C:
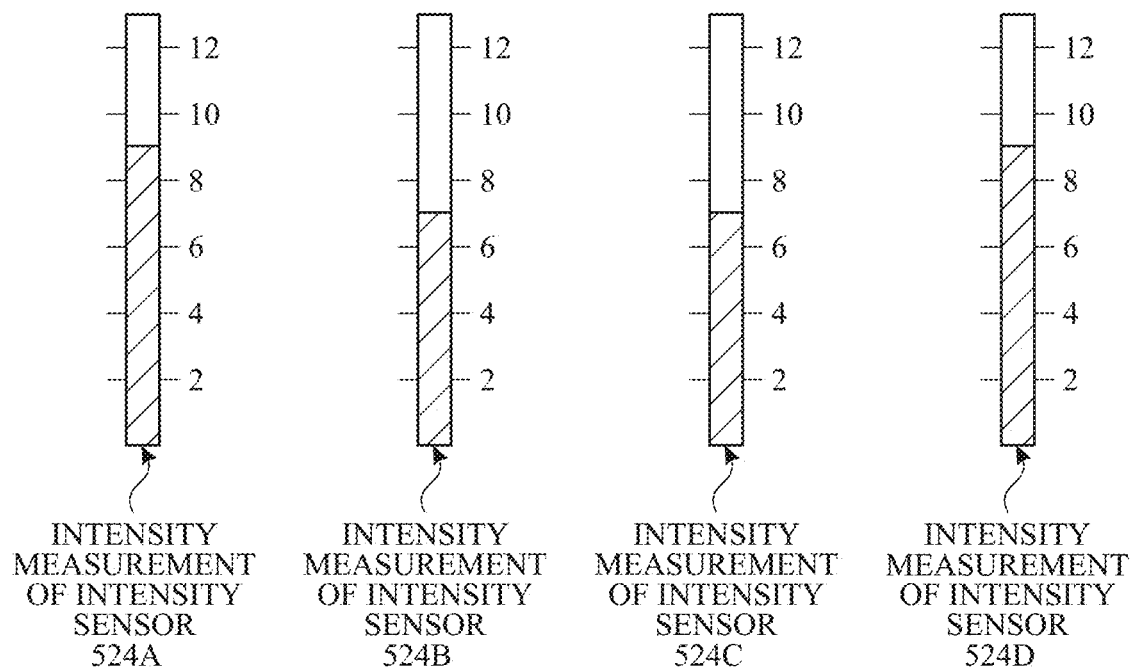
Figure 5D:
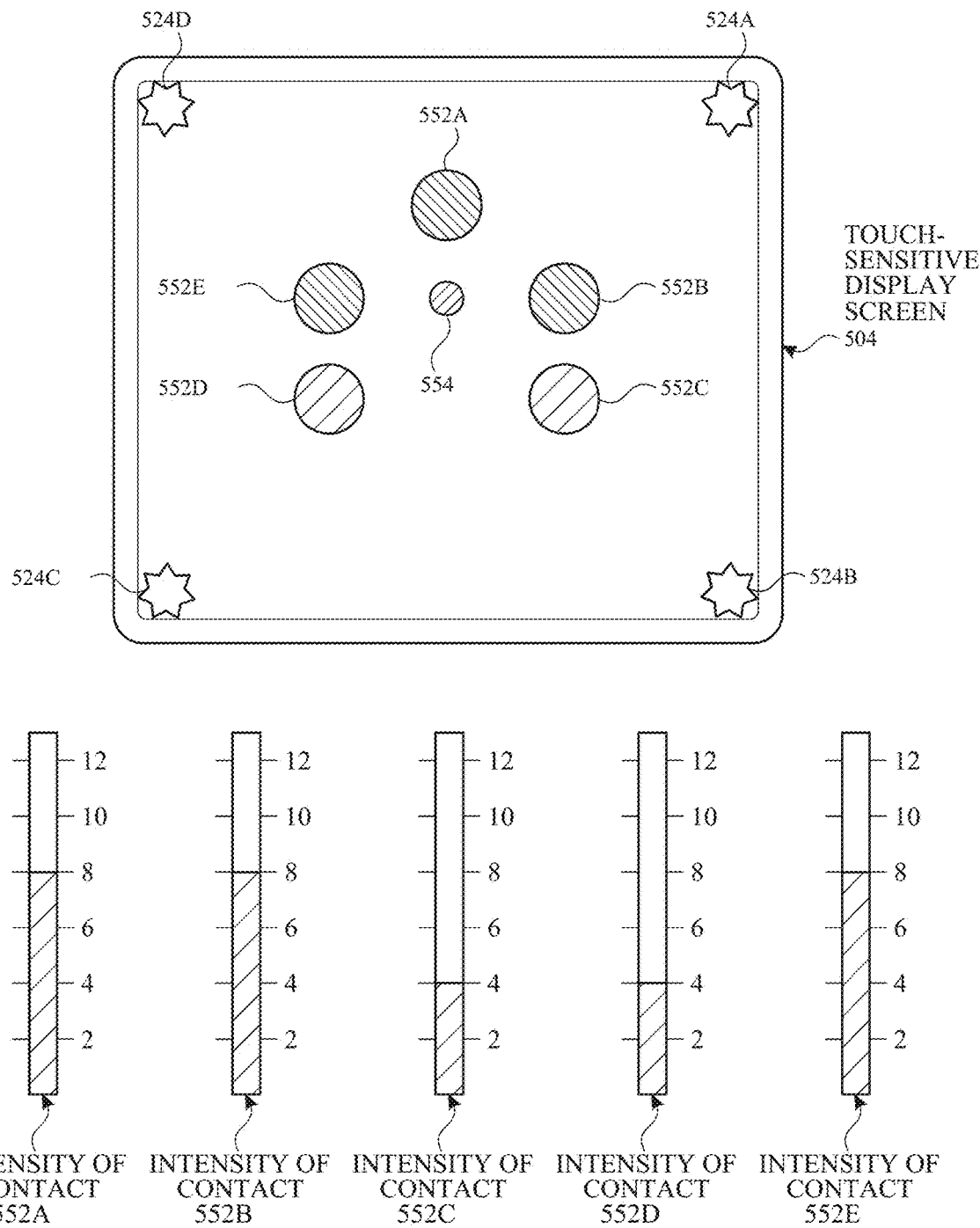

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
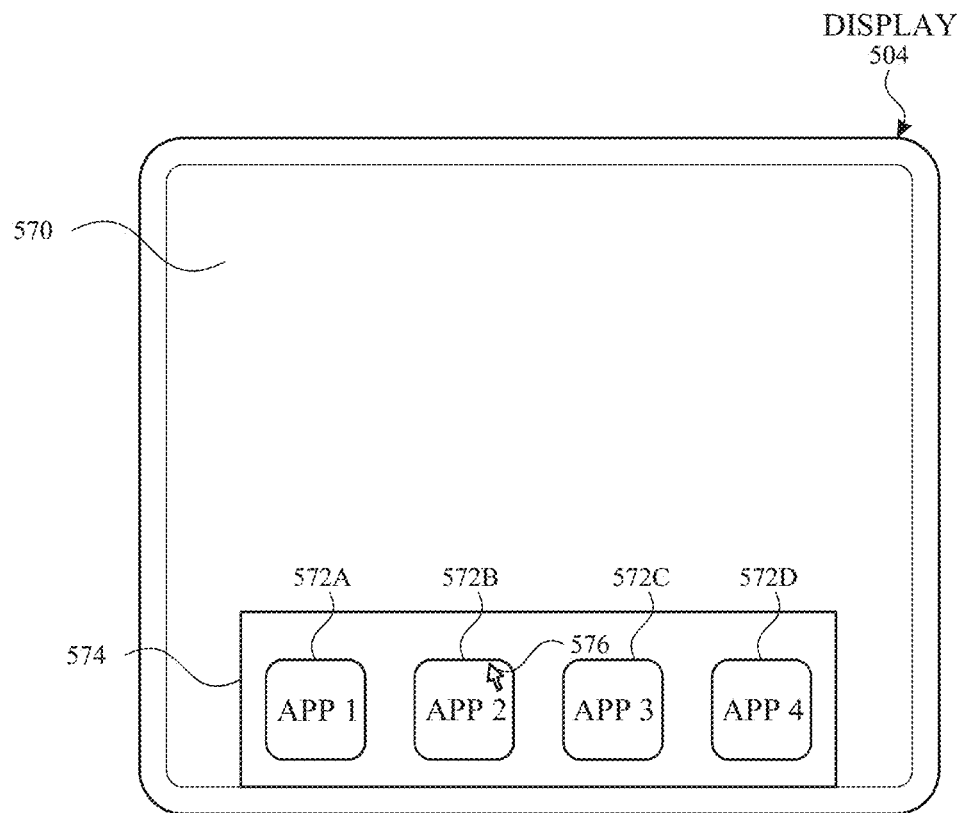
FIGS. 5E-5H illustrate exemplary components and user interfaces of a personal electronic device in accordance with some embodiments.
Figure 5E:
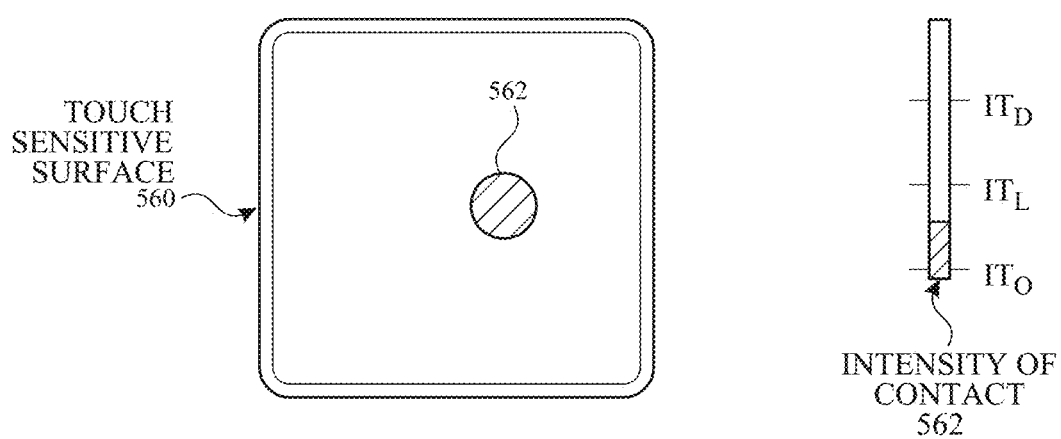
Figure 5F:
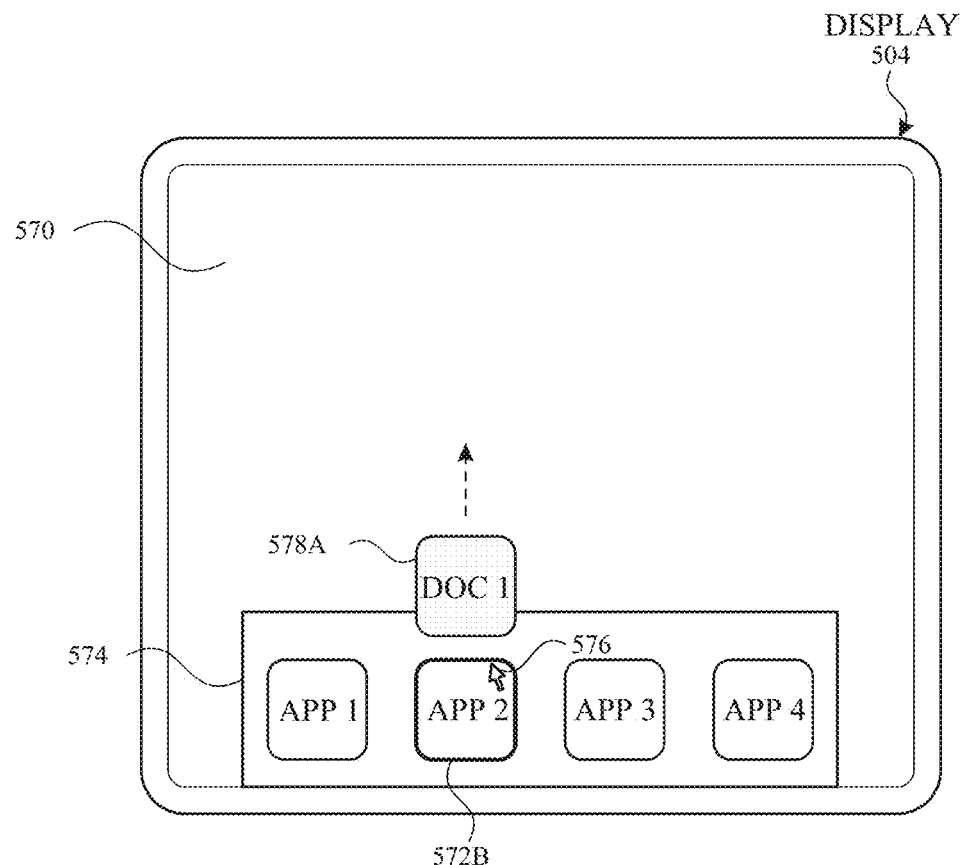
Figure 5F:
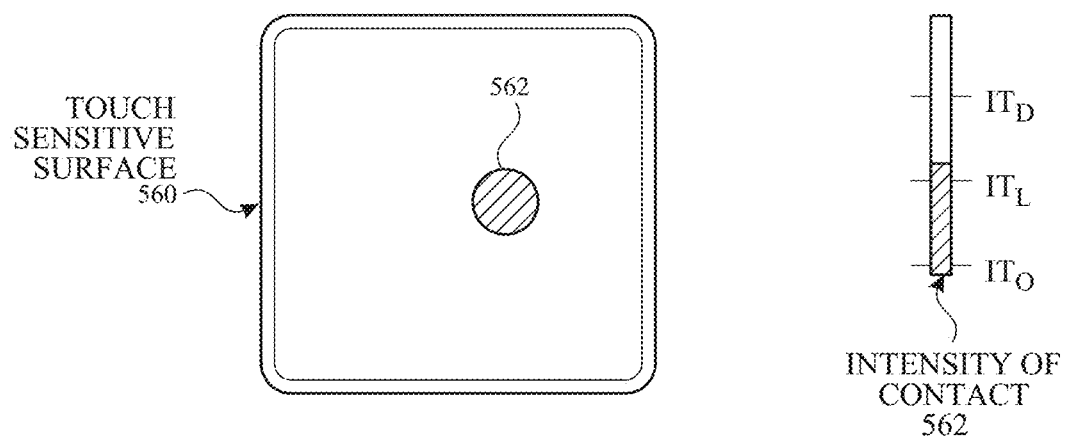
Figure 5G:
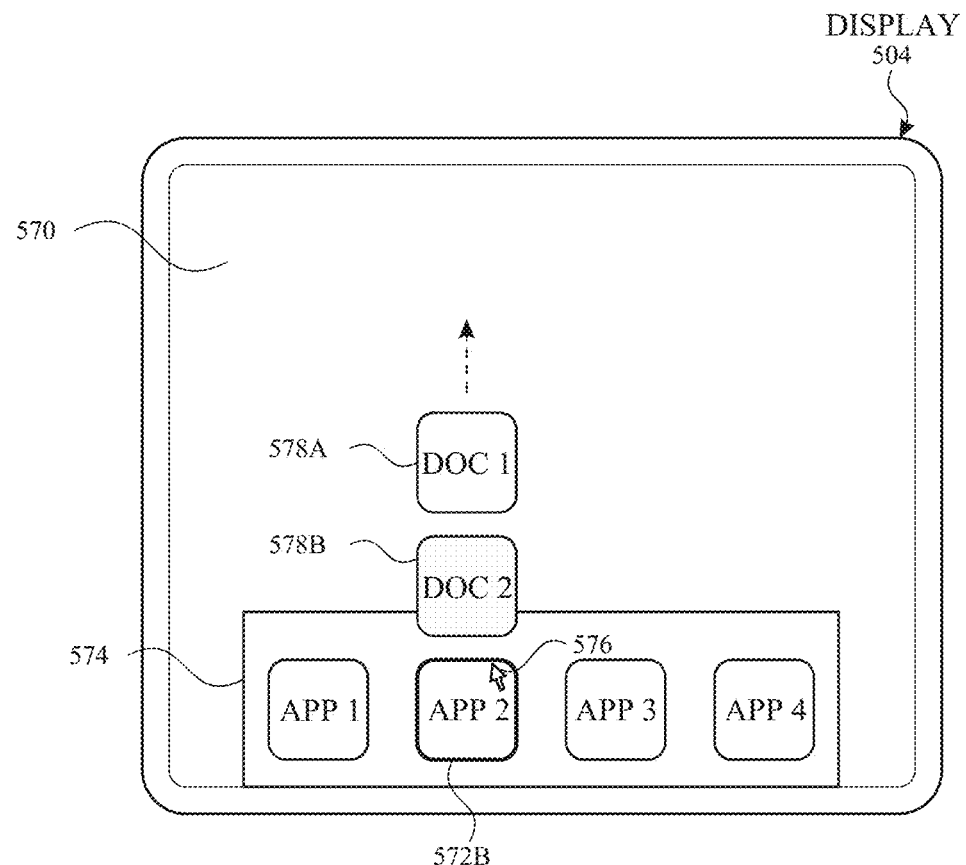
Figure 5G:
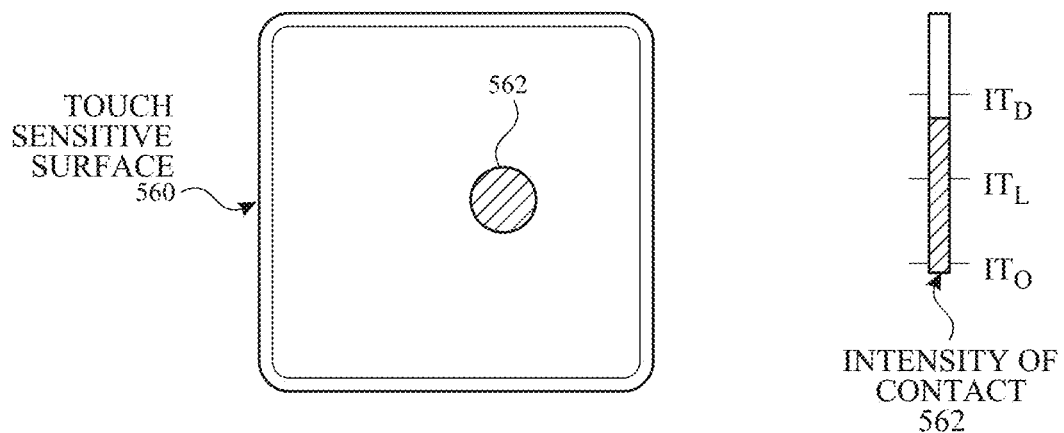
Figure 5H:
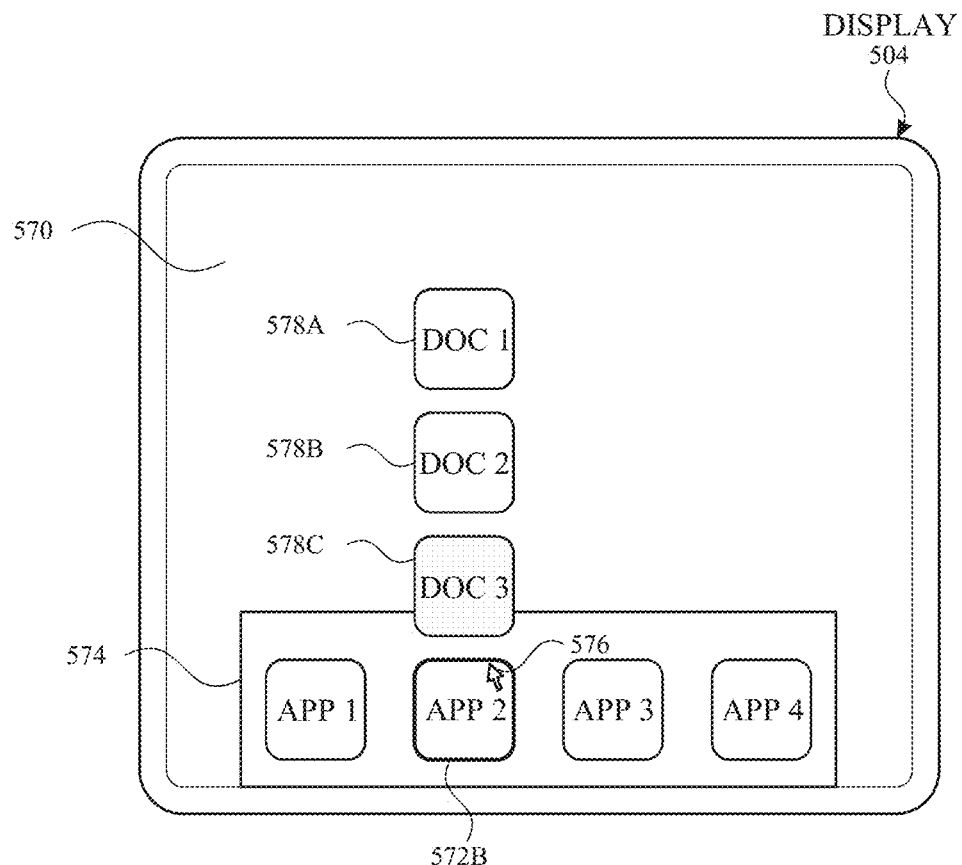
Figure 5H:
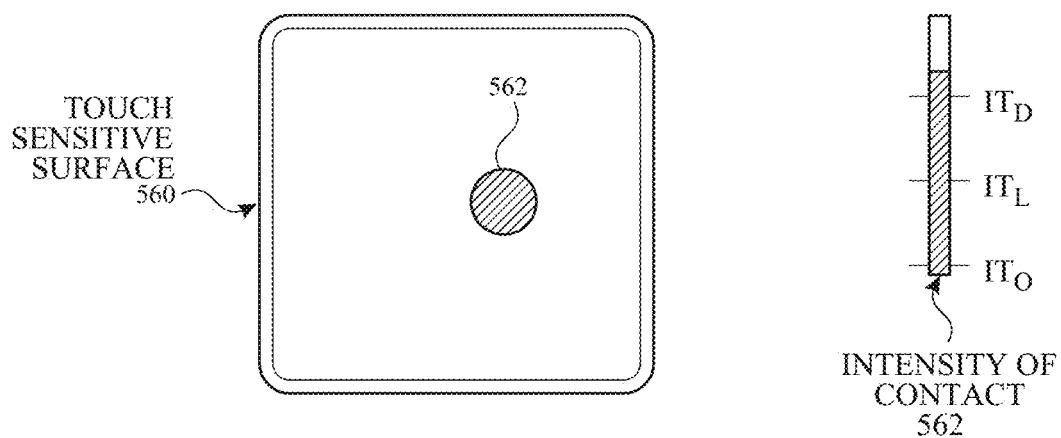

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Notes User Interfaces

Users interact with electronic devices in many different manners, including entering content (e.g., text, graphics, handwritten text, handwritten drawings, etc.) into notes and notes user interfaces. In some circumstances, it can be desirable to access and interact with such notes efficiently. The embodiments described below provide ways in which an electronic device provides for efficient display and/or interaction with notes user interfaces, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
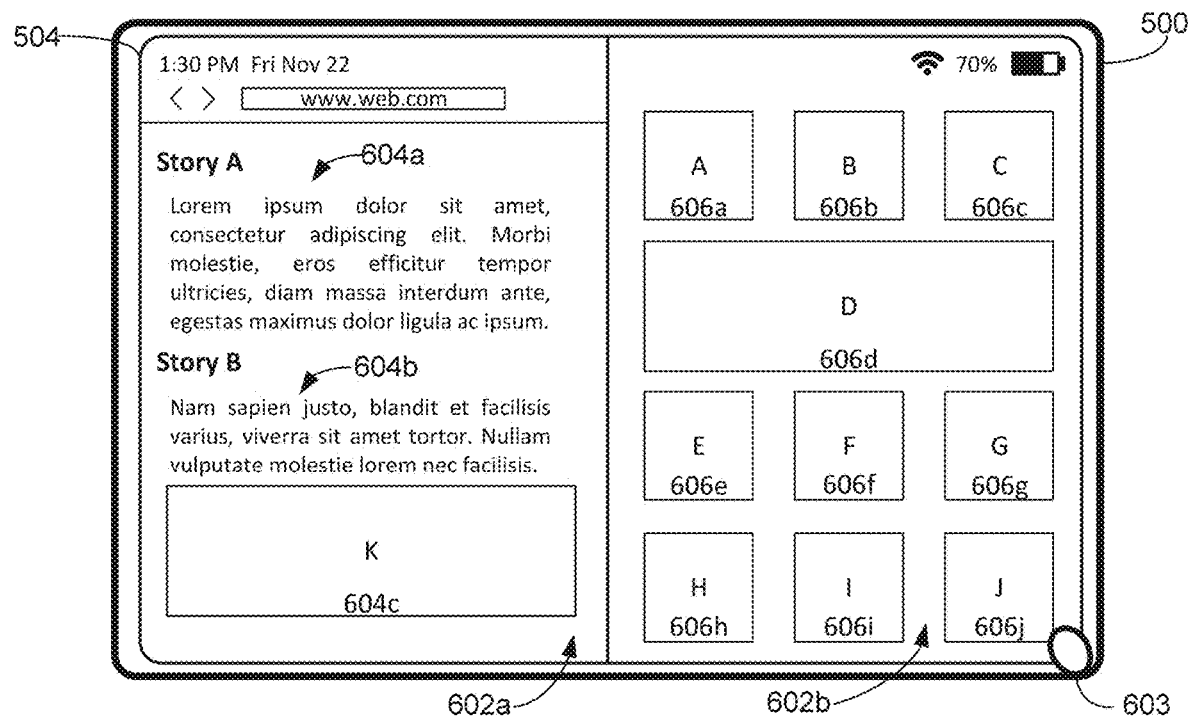
FIGS. 6A-6AD illustrate exemplary ways in which an electronic device provides for efficient display and/or interaction with notes user interfaces in accordance with some embodiments.

FIGS. 6A-6AD illustrate exemplary ways in which an electronic device provides for efficient display and/or interaction with notes user interfaces in accordance with some embodiments. The embodiments in these figures are used to illustrate the processes described below, including the processes described with reference to FIGS. 7A-7K.

FIG. 6A illustrates electronic device 500 concurrently displaying user interfaces 602*a* and 602*b* (e.g., via a display device, via a display generation component, etc.). In some embodiments, user interfaces 602*a* and 602*b* are displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 602*a* is a user interface of a web browser application, and user interface 602*b* is a user interface of a content (e.g., photo or video) browsing application. In some embodiments, the web browser application and/or the content browsing application are applications that are installed on device 500. In FIG. 6A, user interface 602a includes a first portion of content 604a (e.g., text corresponding to Story A) and a second portion of content 604b (e.g., text and image/video 604c corresponding to Story B). In FIG. 6A, user interface 602b includes content (e.g., image, video, etc.) items 606a to 606j that are selectable to cause device 500 to display the selected content item at a larger size and/or in a way that fills user interface 602b (e.g., and ceases display of the unselected content items).

Figure 6B:
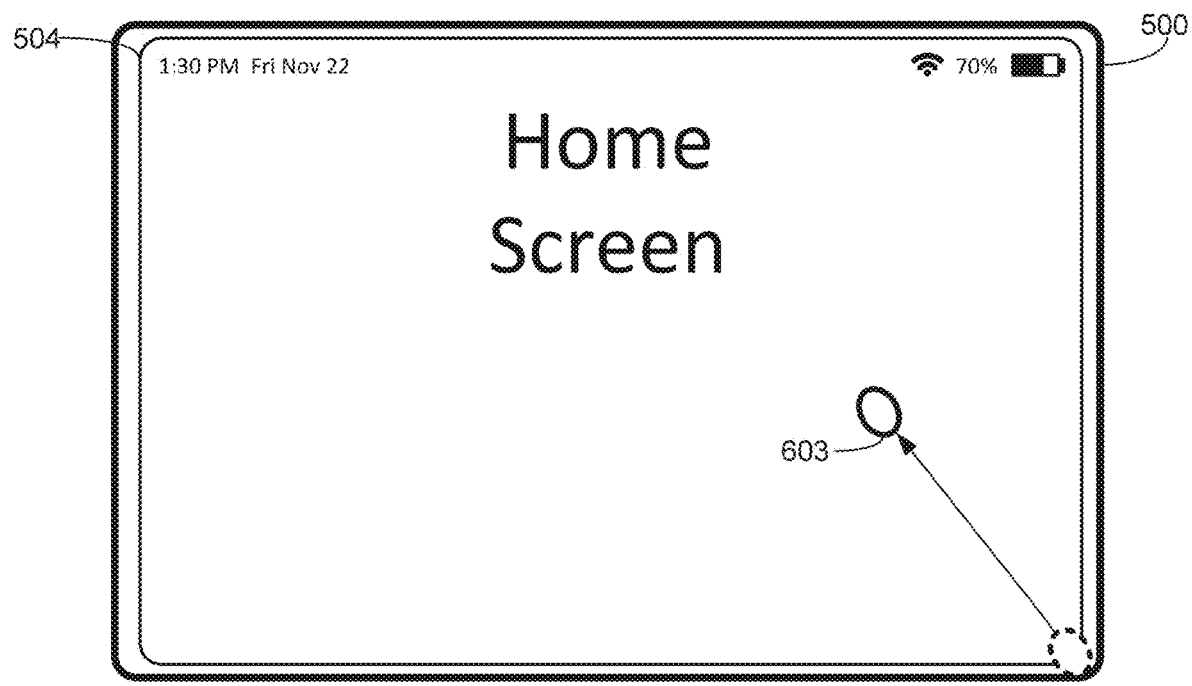

As mentioned previously, in some embodiments, device 500 provides functionality for accessing a notes user interface into which a user is able to provide content. In some embodiments, the notes user interface is displayed by device 500 in response to an inward swipe gesture from a corner of touch screen 504 (e.g., the bottom-right corner of touch screen 504) performed by a stylus in communication with device 500 or by a finger of a user. In some embodiments, the notes user interface is displayed by device 500 in response to an inward swipe gesture from a corner of touch screen 504 (e.g., the bottom-right corner of touch screen 504) performed by a stylus in communication with device 500, but not in response to such an inward swipe gesture performed by another object, such as a finger of a user. For example, in FIG. 6A, device 500 detects touchdown of contact 603 at or near the bottom-right corner of touch screen 504. In FIG. 6B, device detects movement of contact inward from the bottom-right corner of touch screen 504, performing a "corner swipe" gesture. In response, because the corner swipe gesture from the bottom-right corner was performed by contact 603 (e.g., from a finger of the user of device 500), and not by a stylus, device 500 performs an action different from displaying a notes user interface. For example, in the embodiments of FIGS. 6A-6B, device ceases display of user interfaces 602a and 602b, and displays a home screen user interface of device 500 (e.g., such as described with reference to FIG. 4A) in response to detecting the corner swipe gesture from the bottom-right corner of touch screen 504 performed by contact 603.

Figure 6C:
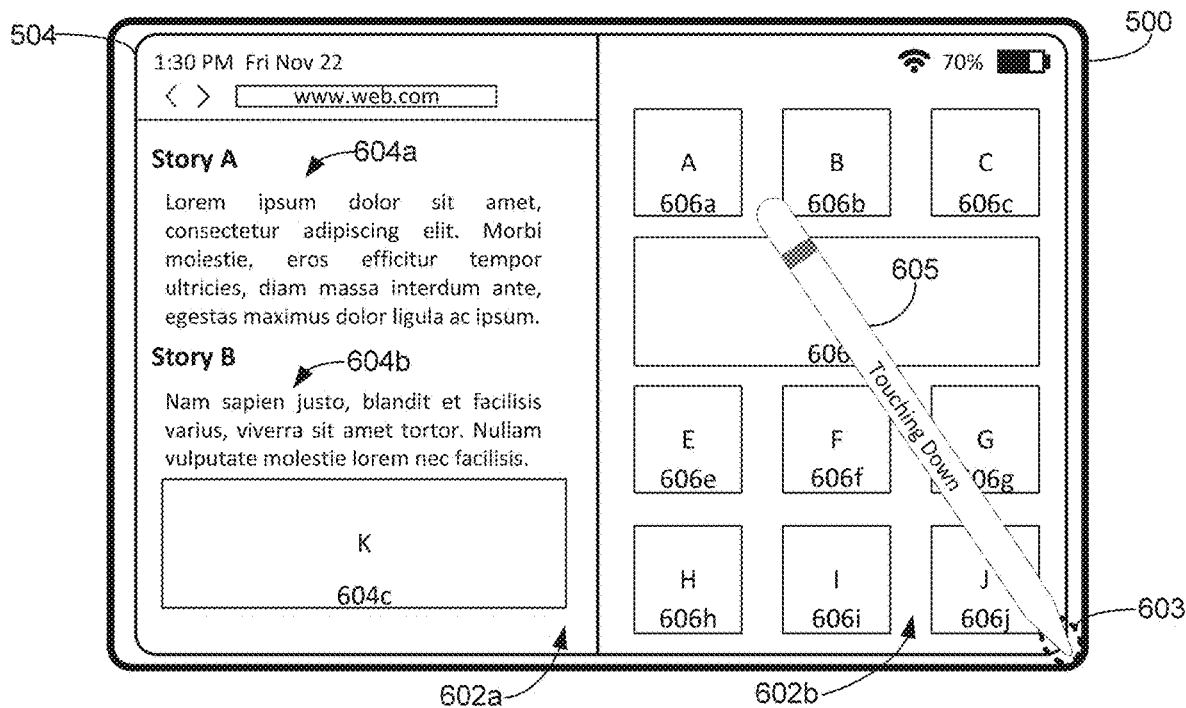
Figure 6D:
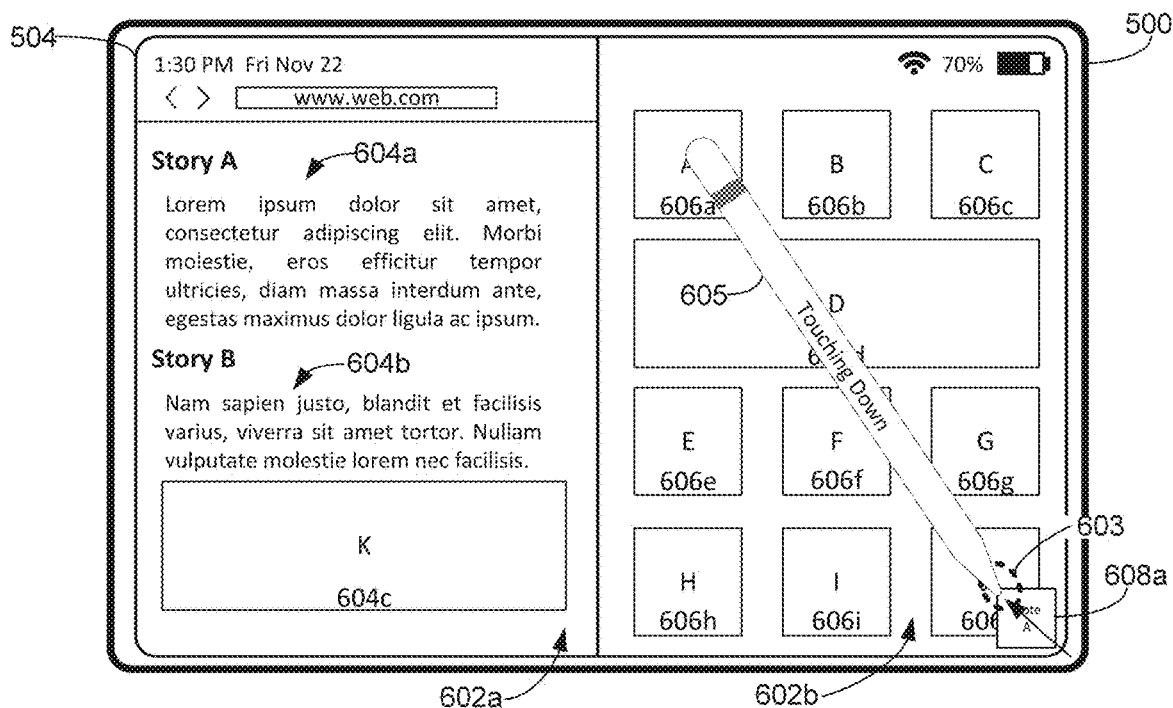

In contrast, in the embodiment of FIG. 6C, while device 500 is displaying user interface 602a and 602b, device 500 detects touchdown of stylus 605 (or contact 603) at or near the bottom-right corner of touch screen 504. In FIG. 6D, device detects some movement of stylus 605 (or contact 603) inward from the bottom-right corner of touch screen 504, performing a corner swipe gesture. In response, because the corner swipe gesture from the bottom-right corner is being performed by stylus 605 (or contact 603), device 500 begins to display notes user interface 608a (e.g., overlaid on user interfaces 602a and/or 602b). For example, in FIG. 6D, while maintaining display of user interfaces 602a and 602b, device begins to display notes user interface 608a overlaid on the bottom-right portion of user interface 602b. In some embodiments, as shown in FIG. 6D, the size at which device 500 displays notes user interface 608a is controlled by the magnitude of the movement of stylus 605 (or contact 603) away from the bottom-right corner of touch screen 504. The more stylus 605 (or contact 603) moves away from the bottom-right corner of touch screen 504, the larger device 500 optionally displays notes user interface 608a (e.g., in some embodiments, limited by a maximum size at which notes user interface 608a will be displayed when first displayed, as will be described below). Further, in some embodiments, notes user interface 608a includes the content of Note A (e.g., a preview of the content of Note A, at a size corresponding to the current display size of notes user interface 608a), which is optionally the last-displayed note/content that was displayed in notes user interface 608a when notes user interface 608a was last displayed by device 500 (e.g., before being dismissed or closed in response to user input).

Figure 6E:
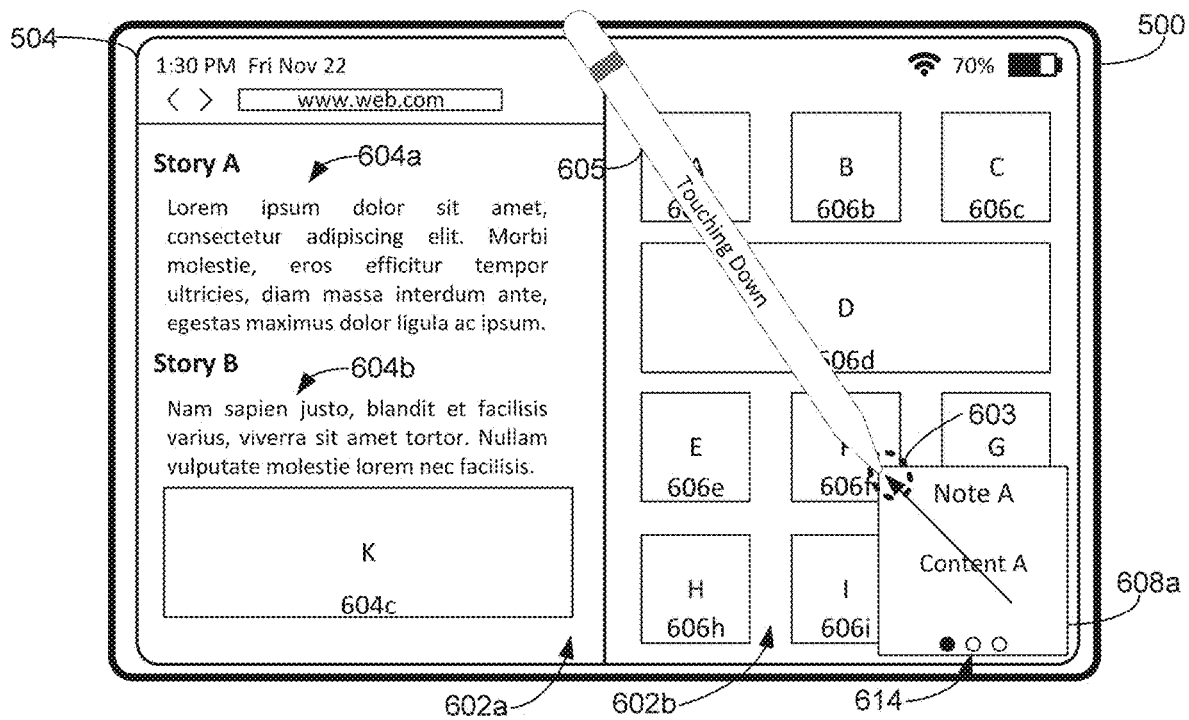

In FIG. 6E, device 500 detects further movement of stylus 605 (or contact 603) away from the bottom-right corner of touch screen 504, and in response, device 500 continues to increase the size of notes user interface 608a in accordance with the movement of stylus 605 (or contact 603). The preview/content of Note A in notes user interface 608a optionally continues to be enlarged in accordance with the enlargement of notes user interface 608a. Further, in some embodiments, if multiple notes have previously been created (e.g., by the user of device 500), those notes are accessible from notes user interface 608a. For example, in FIG. 6E, notes user interface 608a includes indicator 614 that indicates that Note A is one note of three notes that are available to be accessed from notes user interface 608a. Accessing different notes from notes user interface 608a will be described in more detail later.

Figure 6F:
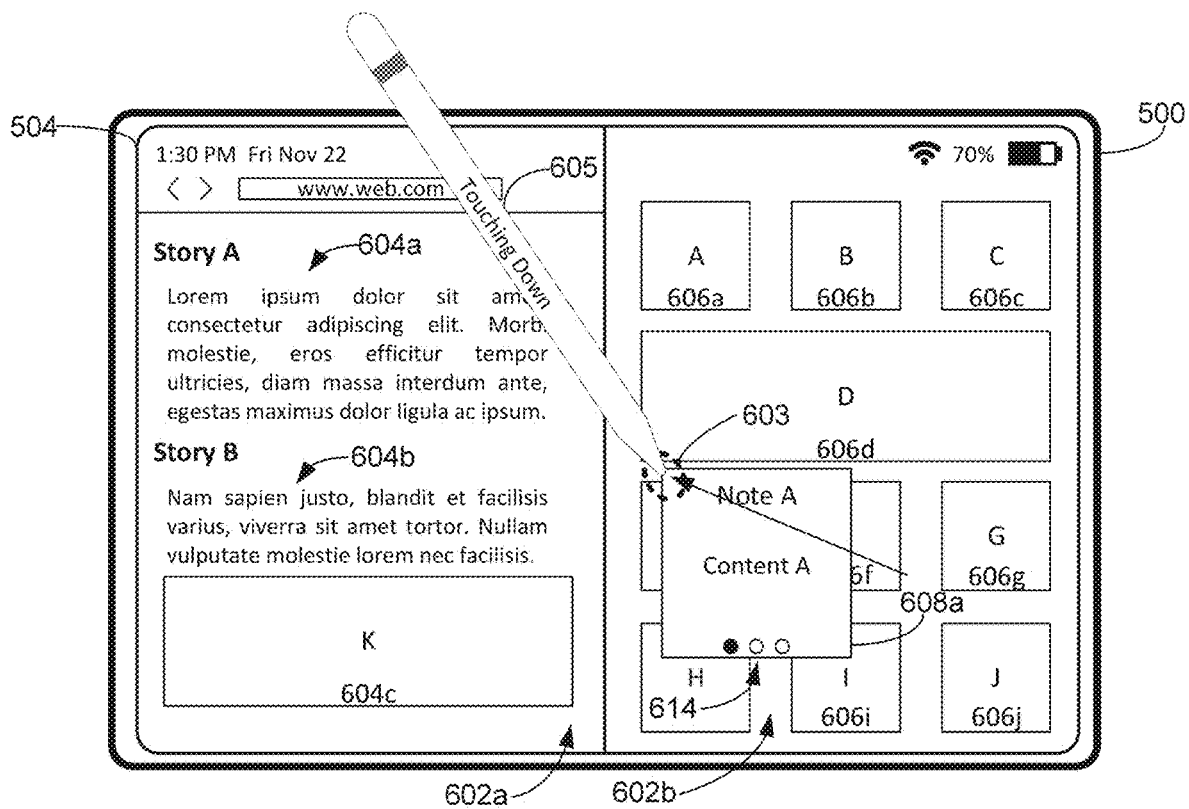
Figure 6G:
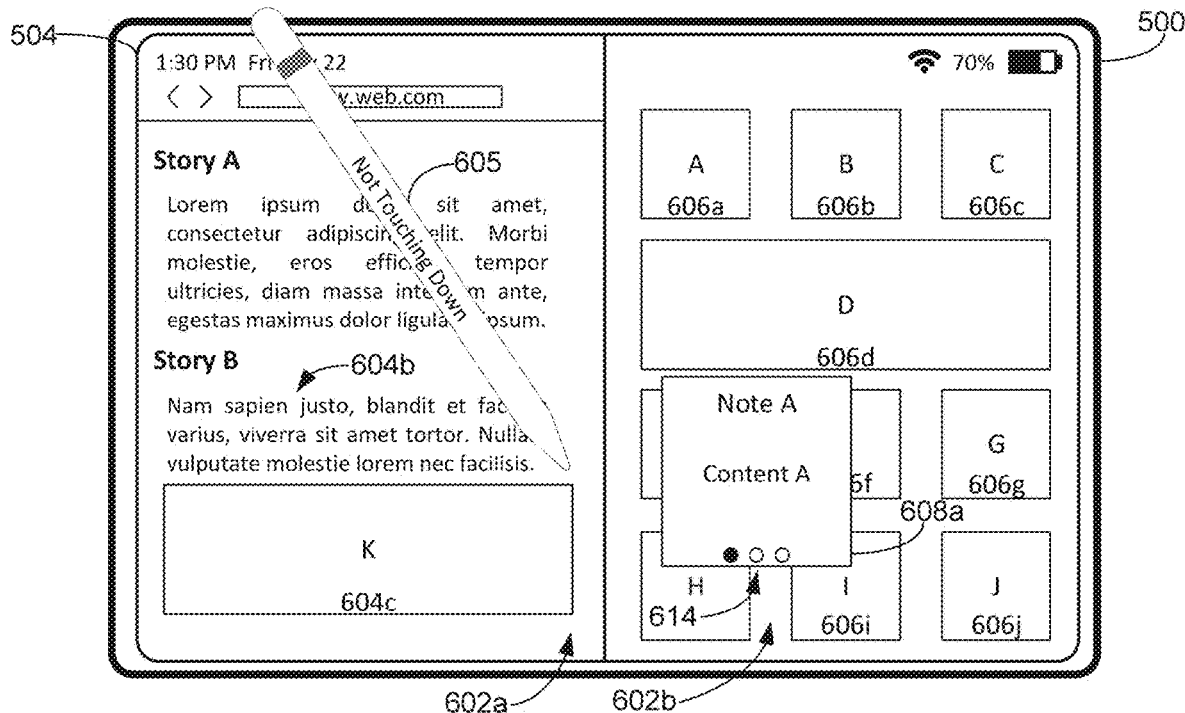

In FIG. 6F, device 500 detects further movement of stylus 605 (or contact 603) away from the bottom-right corner of touch screen 504. The size of notes user interface 608a had optionally reached its maximum initial-display size in FIG. 6E in accordance with the movement of stylus 605 (or contact 603)—therefore, in FIG. 6F, in response to the further movement of stylus 605 (or contact 603), instead of further increasing the size of notes user interface 608a, device 500 begins moving notes user interface 608a on touch screen (e.g., overlaid on user interfaces 602a and/or 602b) in accordance with the movement of stylus 605 (or contact 603). In some embodiments, the maximum initial-display size of notes user interface 608a is the size at which notes user interface 608a was last displayed by device 500 when it was dismissed (e.g., in response to user input). In some embodiments, the maximum initial-display size of notes user interface 608a is reset to a predefined size (or a user-defined size), independent of the size at which notes user interface 608a was last displayed, each time notes user interface 608a is dismissed. In FIG. 6G, device 500 detects liftoff of stylus 605 (or contact 603), and in response, maintains display of notes user interface 608a at the last location on touch screen 504 (e.g., overlaid on user interface 602b) to which stylus 605 (or contact 603) moved notes user interface 608a.

In some embodiments, notes user interface 608a can be resized using a pinch gesture (e.g., provided by a combination of one or more fingers and/or a stylus). For example, in FIG. 6H, device 500 detects touchdown of two contacts 603a and 603b within notes user interface 608a. In FIG. 6I, device 500 detects movement of one or both of contacts 603a and 603b away from the other of contacts 603a and 603b, and in response, increases the size of notes user interface 608a in accordance with the movement of one or both of contacts 603a and 603b (e.g., while maintaining the display characteristics, such as size, zoom level, etc. of user interfaces 602a and/or 602b over which notes user interface 608a is displayed).

Figure 6H:
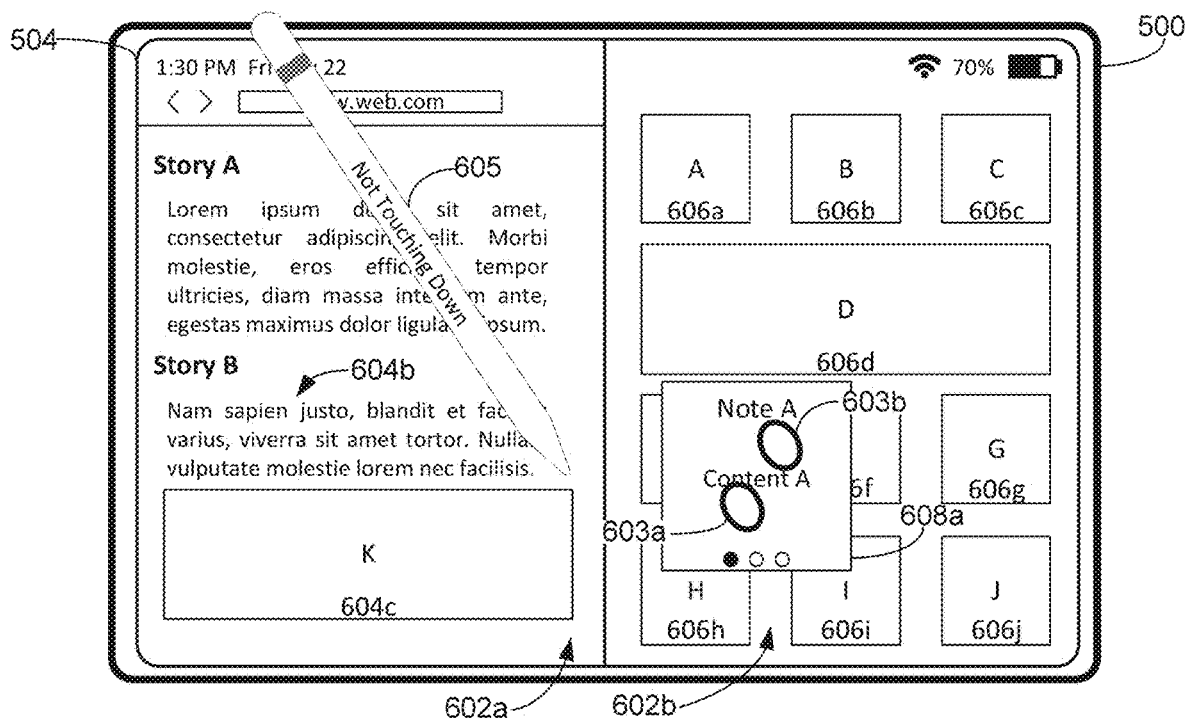
Figure 6I:
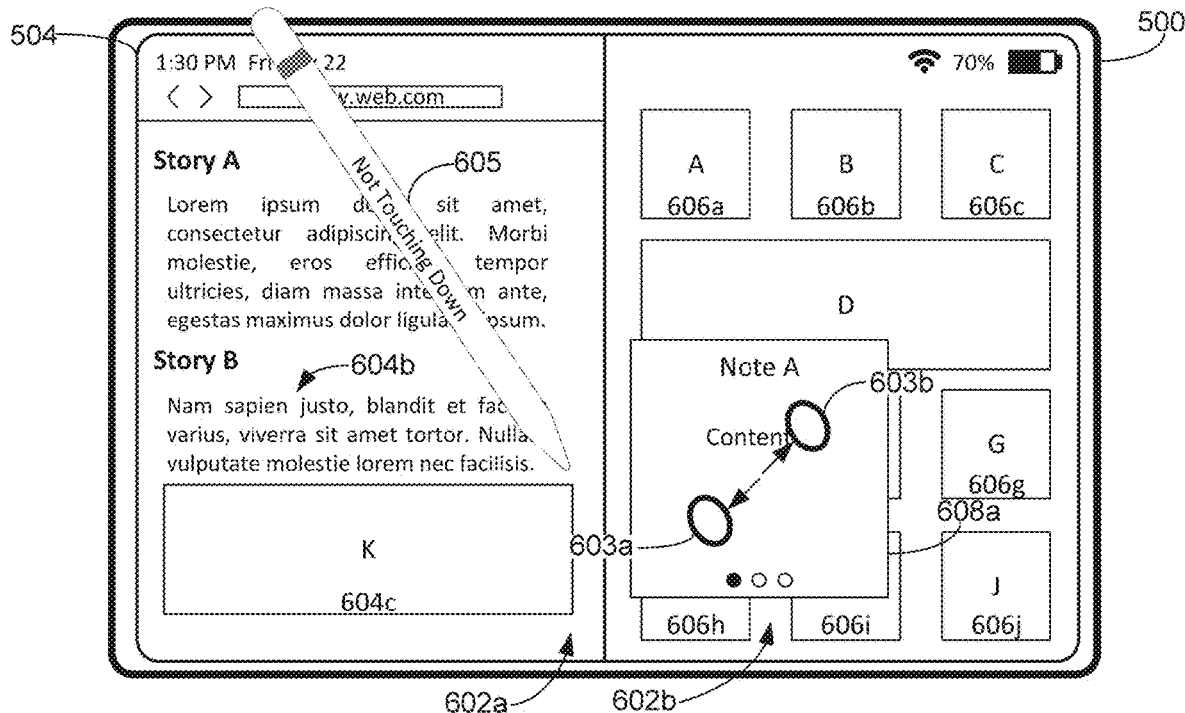

In some embodiments, a horizontal swipe detected within notes user interface 608a (e.g., provided by a contact from a finger, provided by a stylus, provided by another object) causes device 500 to switch from displaying the currently displayed note in notes user interface 608a to displaying another previously-generated note in notes user interface 608a. For example, in FIG. 6J, device 500 detects touchdown of stylus 605 within notes user interface 608a (e.g., within the content of Note A). In FIG. 6K, device 500 detects a leftward, horizontal swipe of stylus 605 while remaining touched down within notes user interface 608a, and in response, device 500 switches from displaying Note A to displaying Note B in notes user interface 608a. Indicator 614 is optionally updated to indicate that the currently displayed Note (Note B) is the second of three notes that are available to be accessed and/or displayed via notes user interface 608a.

In some embodiments, a corner swipe gesture from the lower-right corner of touch screen 504 performed by stylus 605 while notes user interface 608a is already displayed causes device 500 to create a new note and display the new note in notes user interface 608a (e.g., rather than display a previously-created note, as was described with reference to FIGS. 6C-6F). For example, in FIGS. 6L-6M, while notes user interface 608a is already displayed, device 500 detects a corner swipe gesture performed by stylus 605 from the lower-right corner of touch screen 504. In response, while maintaining the display position of notes user interface 608a on touch screen 504, device 500 initiates display of a new note (Note D) in notes user interface 608a, as shown in FIG. 6M. In particular, in some embodiments, as stylus 605 proceeds with the corner swipe gesture, the previously-displayed note (e.g., the note that was displayed in notes user interface 608a when the corner swipe gesture was initially detected—Note B, in FIG. 6L) slides out of display off one edge of notes user interface 608a (e.g., the left edge of notes user interface 608a), while the newly created note (Note D) slides into display from another edge of notes user interface 608a (e.g., the right edge of notes user interface 608a). In some embodiments, the progress of the sliding off and the sliding on of the above notes is controlled in accordance with the movement of stylus 605 away from the bottom-right corner of touch screen 504 (e.g., if stylus 605 stopped moving, the sliding off and on of the above notes would pause, etc.). In FIG. 6N, device 500 has detected stylus 605 move sufficiently far away from the lower-right corner of touch screen 504, and the new Note D is fully displayed in notes user interface 608a, and previously displayed Note B is no longer displayed in notes user interface 608a. Further, as shown in FIG. 6N, indicator 614 is updated to indicate that now four notes are accessible from notes user interface 608a, and that Note D (the currently displayed, new note) is one of those four notes.

Figure 6J:
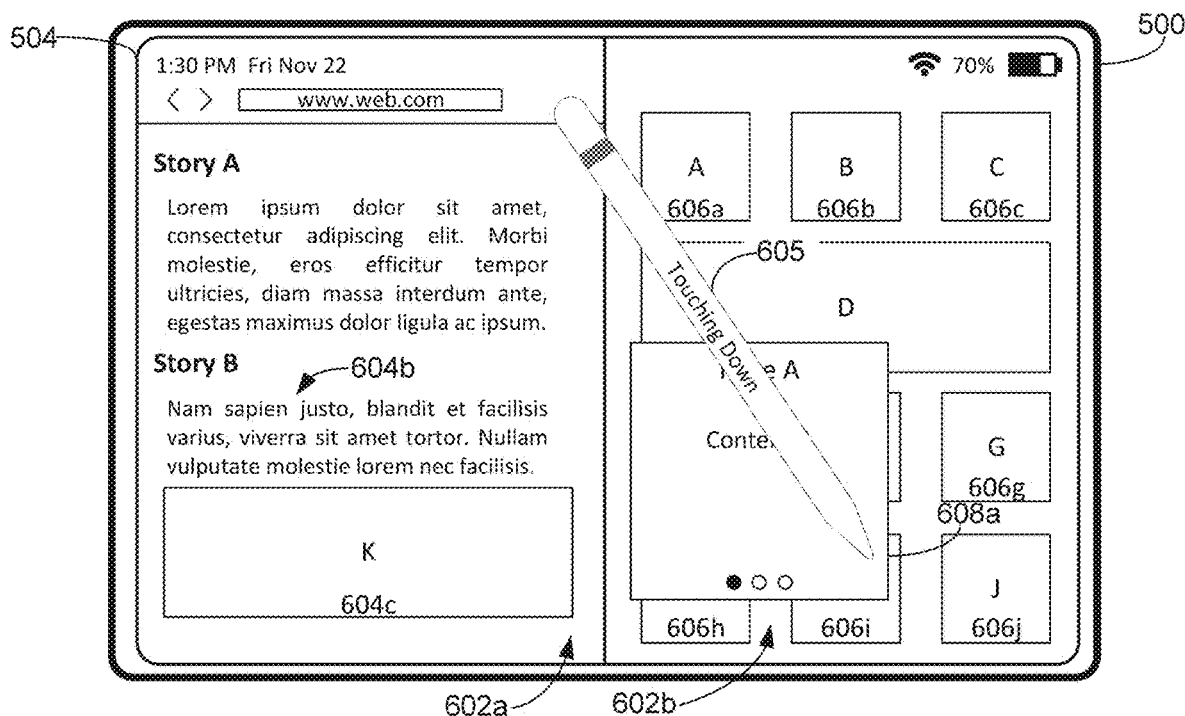
Figure 6K:
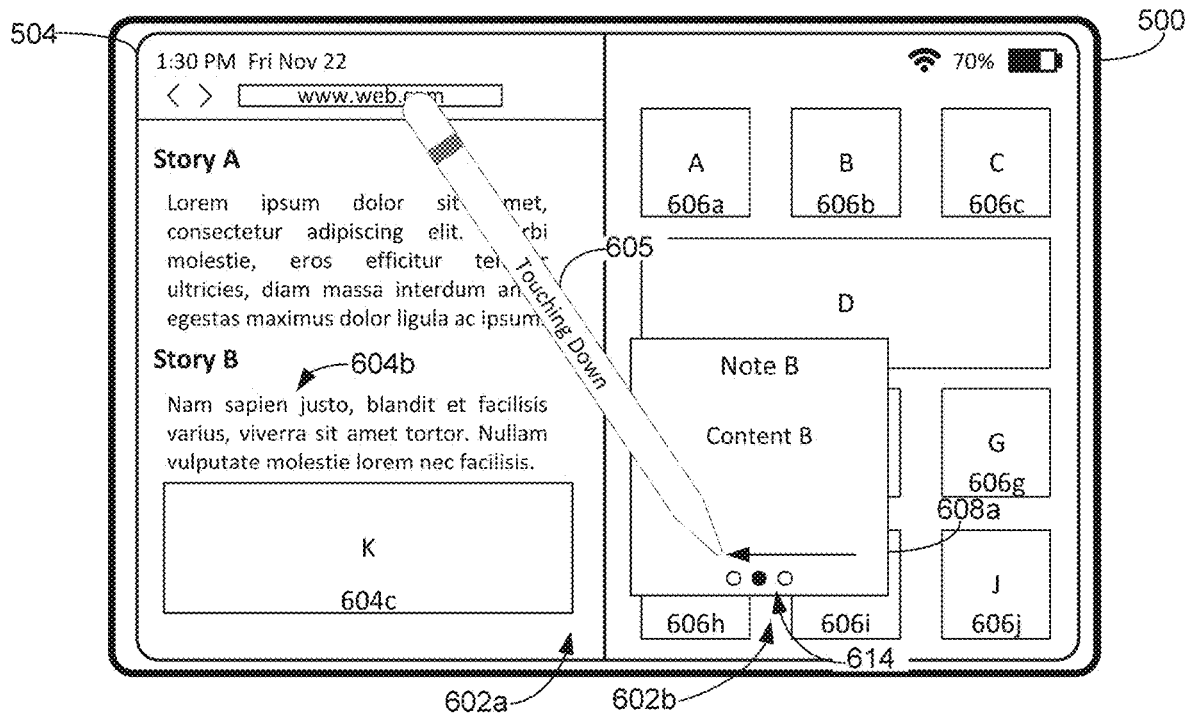
Figure 6L:
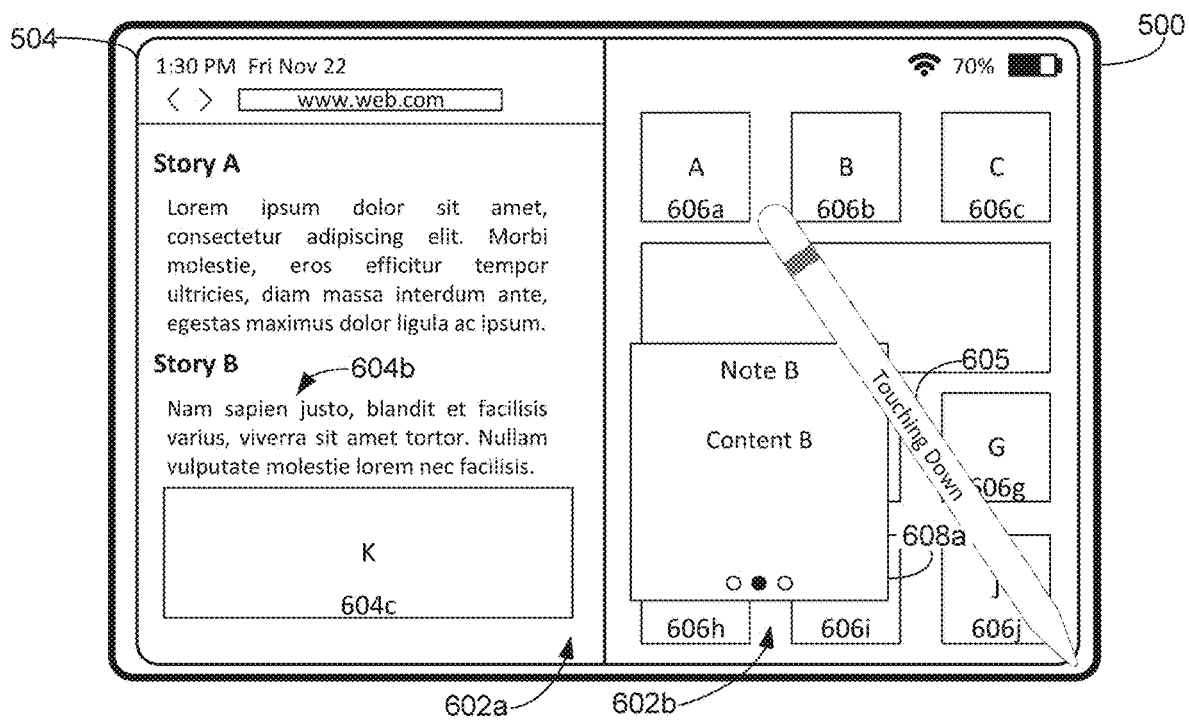
Figure 6M:
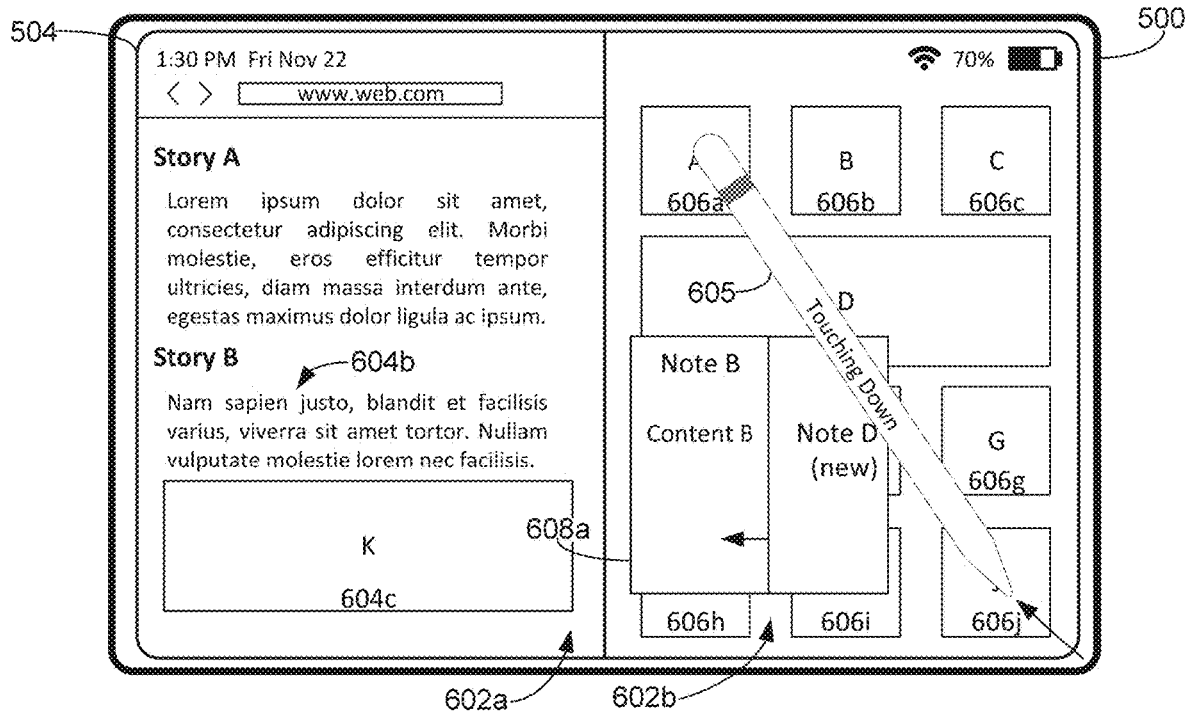
Figure 6N:
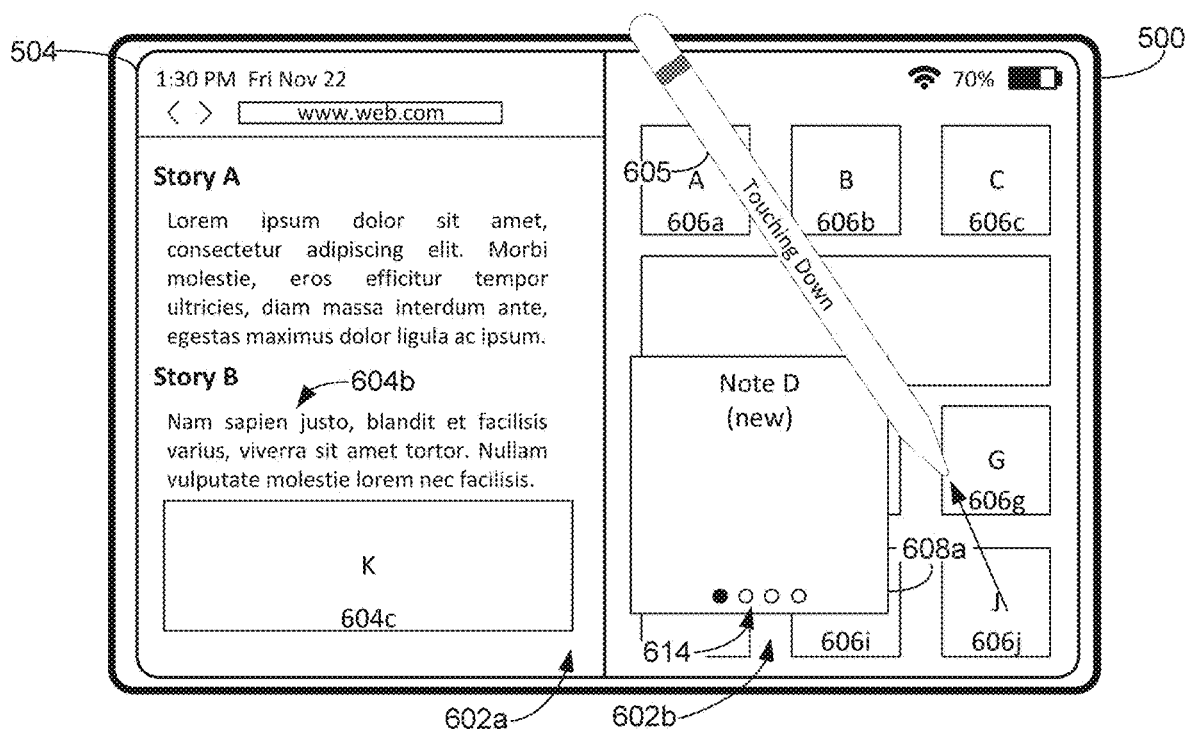

As mentioned previously, in some embodiments, a user is able to provide input to enter content into a note displayed in notes user interface 608a. For example, in FIGS. 6O-6P, device 500 detects stylus 605 touch down in Note D in notes user interface 608a, and handwrite "Hello world," which is entered into Note D while notes user interface 608a remains at its position on touch screen 504, as shown in FIG. 6P. Notes displayed in notes user interface 608a are optionally able to accept input of many types of content, such as typed content (e.g., using a physical or soft keyboard), copy/pasted content (e.g., images, text, etc.), finger or stylus-drawn drawings, etc.

In some embodiments, notes user interface 608a can be dismissed (e.g., ceased to be displayed) by device 500 detecting an input, provided by a finger or a stylus, dragging notes user interface 608a back to the lower-right corner of touch screen 504 (e.g., the corner from which notes user interface 608a was displayed). In some embodiments, dragging notes user interface 608a to a corner other than the corner from which notes user interface 608a was displayed does not cause device 500 to cease displaying notes user interface 608a. For example, in FIG. 6Q, device 500 detects stylus 605 touch down within notes user interface 608a, and while remaining touched-down, move towards the lower-right corner of touch screen 504, as shown in FIG. 6R. In response, device 500 moves notes user interface 608a towards the lower-right corner of touch screen 504 as shown in FIG. 6R. In some embodiments, when notes user interface 608a and/or stylus comes within a threshold distance (e.g., 0.1, 0.5, 1, 2, 3, 5 cm) of the lower-right corner of touch screen 504, device 500 begins to reduce the size of notes user interface 608a—and optionally the content of Note D currently displayed within notes user interface 608a—in accordance with the continued movement of stylus 605 towards the lower-right corner of touch screen 504. For example, device 500 begins to reduce the size of notes user interface 608a when a portion (e.g., lower-right corner) of notes user interface 608a reaches the threshold distance of the lower-right corner of touch screen 504. In some embodiments, further movement of stylus 605 towards the lower-right corner of touch screen 504 after that point causes device 500 to further reduce the size of notes user interface 608a and/or the content of Note D displayed within notes user interface 608a in accordance with that further movement of stylus. In response to stylus 605 reaching (e.g., within a threshold distance (e.g., 0.1, 0.5, 1, 2, 3, 5 cm) of) the lower-right corner of touch screen 504, device 500 ceases display of notes user interface 608a, as shown in FIG. 6S.

In some embodiments, a corner swipe gesture using a stylus only causes device 500 to display notes user interface 608a when that corner swipe gesture is performed at particular corners of touch screen 504 (e.g., the lower-right corner of touch screen 504), and not at other corners of touch screen 504. For example, in FIGS. 6T-6U, device 500 detects a corner swipe gesture performed by stylus 605 from the lower-left corner of touch screen 504. In response, instead of displaying notes user interface 608a, device 500 performs a different function. For example, in FIG. 6U, device 500 takes a screenshot of the currently-displayed user interface(s), displays a representation of that screenshot on touch screen 504, and displays a content editing toolkit 620 that includes one or more controls for editing the screenshot of user interfaces 602a and 602b that is displayed on touch screen 504. For example, content editing toolkit 620 includes one or more tools 670 that are selectable to cause a corresponding handwriting entry tool (e.g., handwriting-to-font-based text tool, pen tool, highlighter tool, pencil tool, etc.) to become active and control the content entered into/onto the screen displayed by device 500 using stylus 605.

In some embodiments, when notes exist that can be accessed via notes user interface 608a (e.g., and notes user interface 608a is not currently displayed), device 500 displays an option for displaying notes user interface 608a on touch screen 504. In some embodiments, if no notes exist that can be accessed via notes user interface 608a, device 500 does not display such an option; in some embodiments, if no notes exist that can be accessed via notes user interface 608a, device 500 does display such an option, and selection of the option causes device 500 to display notes user interface 608a and create a new note—displayed in notes user interface 608a—that is ready for content input. For example, as shown in FIG. 6T, in some embodiments, device 500 displays a selectable option 672 in a toolbar or other control portion of the user interface of an application (e.g., web browser) that is being displayed by device 500. Selectable option 672 is optionally selectable to display notes user interface 608a overlaid on user interfaces 602a and/or 602b. Similarly with reference to FIG. 6U, in some embodiments, content editing toolkit 620 includes a selectable option 671 that is selectable to cause device 500 to display notes user interface 608a overlaid on the screenshot displayed in FIG. 6U. As another example, device 500 optionally includes an option in a control center user interface that is selectable to display notes user interface 608a. For example, in FIGS. 6V-6W, device 500 detects contact 603 performing a downward edge swipe gesture from the top-right portion of touch screen 504, which causes device 500 to display a control center user interface overlaid on user interfaces 602a and/or 602b, as shown in FIG. 6W. The control center user interface includes one or more controls for controlling various operations or functionalities of device 500, such as a selectable option for toggling on/off a Wi-Fi radio of device 500, a control for controlling the brightness of touch screen 504, a control for controlling the volume of device 500, etc. In FIG. 6W, the control center user interface also includes option 622 that is selectable to cause device 500 to display notes user interface 608a. For example, in FIG. 6X, device 500 detects selection of option 622 (e.g., via tap of contact 603), and in response, device 500 ceases display of the control center user interface and displays notes user interface 608a overlaid on user interfaces 602a and/or 602b, as shown in FIG. 6Y. As shown in FIG. 6Y, device 500 displays notes user interface 608a with the last-displayed note shown in notes user interface 608a (e.g., Note D).

In some embodiments, notes created and/or edited in notes user interface 608a are accessible from a user interface of a more general note taking application on device 500. For example, in FIG. 6Z, device 500 is displaying a user interface of a note taking application installed on device 500. The user interface of the note taking application includes a first region 650a (e.g., a navigation region), and a second region 650b (e.g., a note-content display region). In some embodiments, selection of an element in the first region 650a causes device 500 to display content corresponding to the selected element in second region 650b. First region 650a includes a "Scrap Paper" section and a separate "Notes" section. Notes created and/or edited in notes user interface 608a are optionally accessible via the "Scrap Paper" section of first region 650a, and notes created and/or edited from within the note taking application (e.g., and which are not creatable and/or editable via notes user interface 608a) are optionally accessible via the "Notes" section of first region 650a.

Figure 6O:
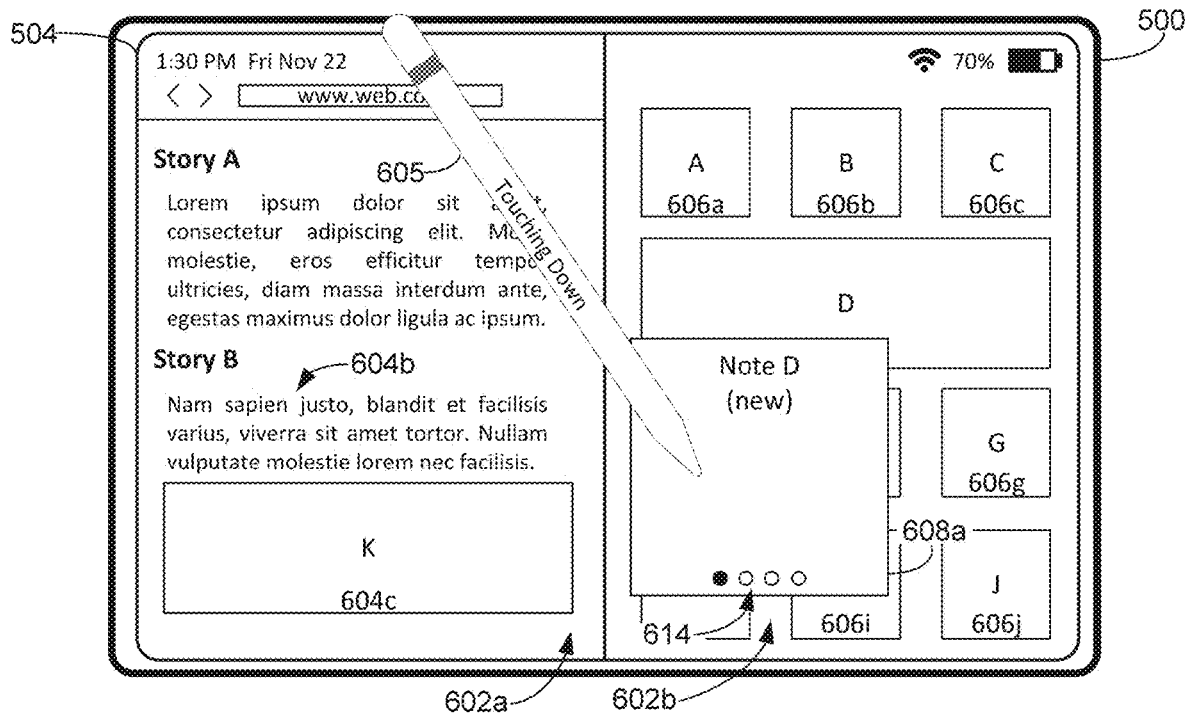
Figure 6P:
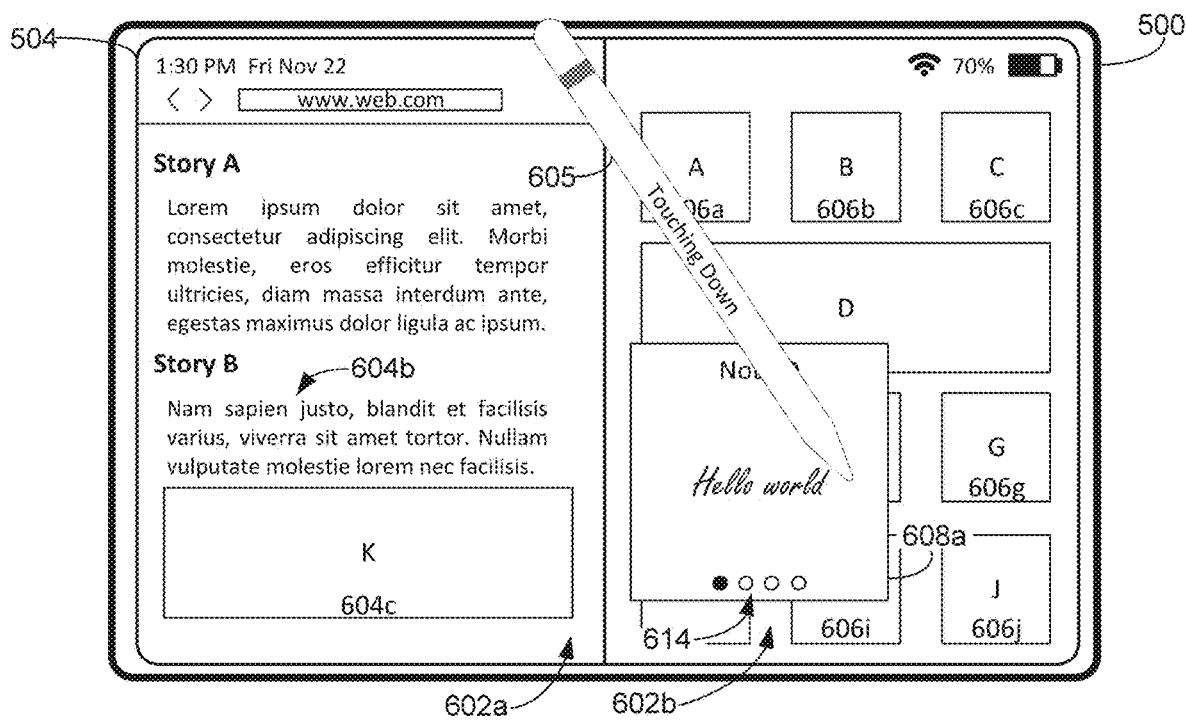
Figure 6Q:
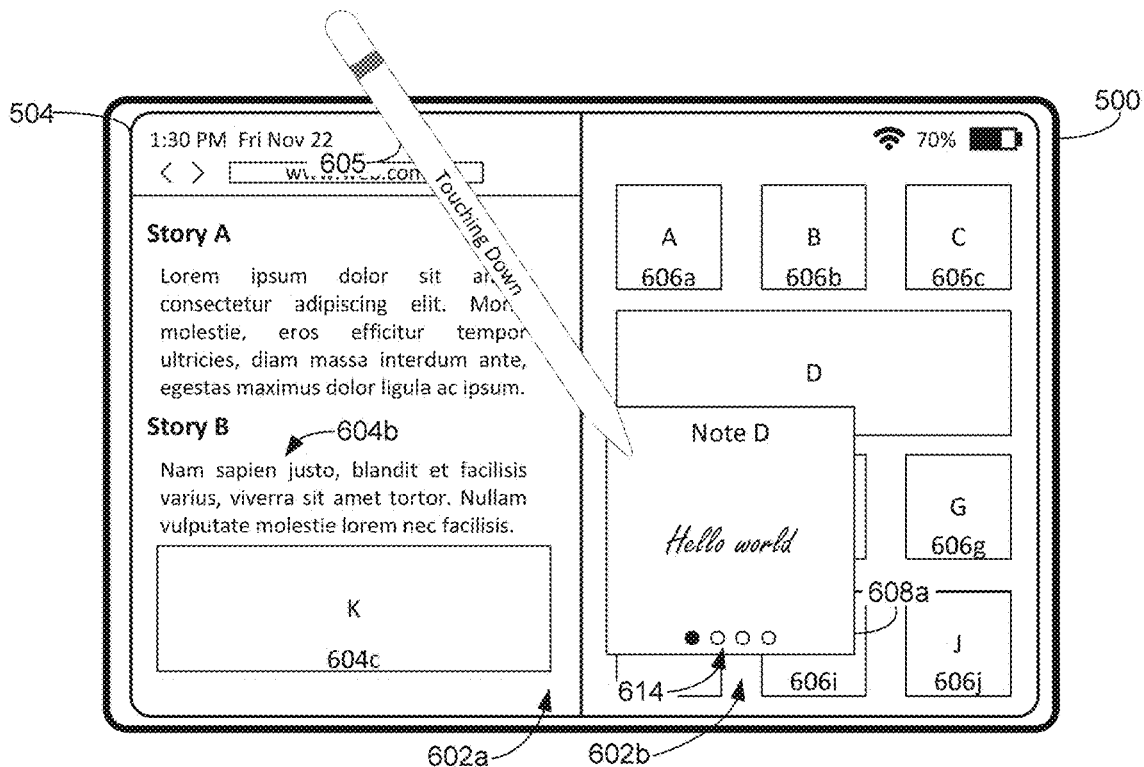
Figure 6R:
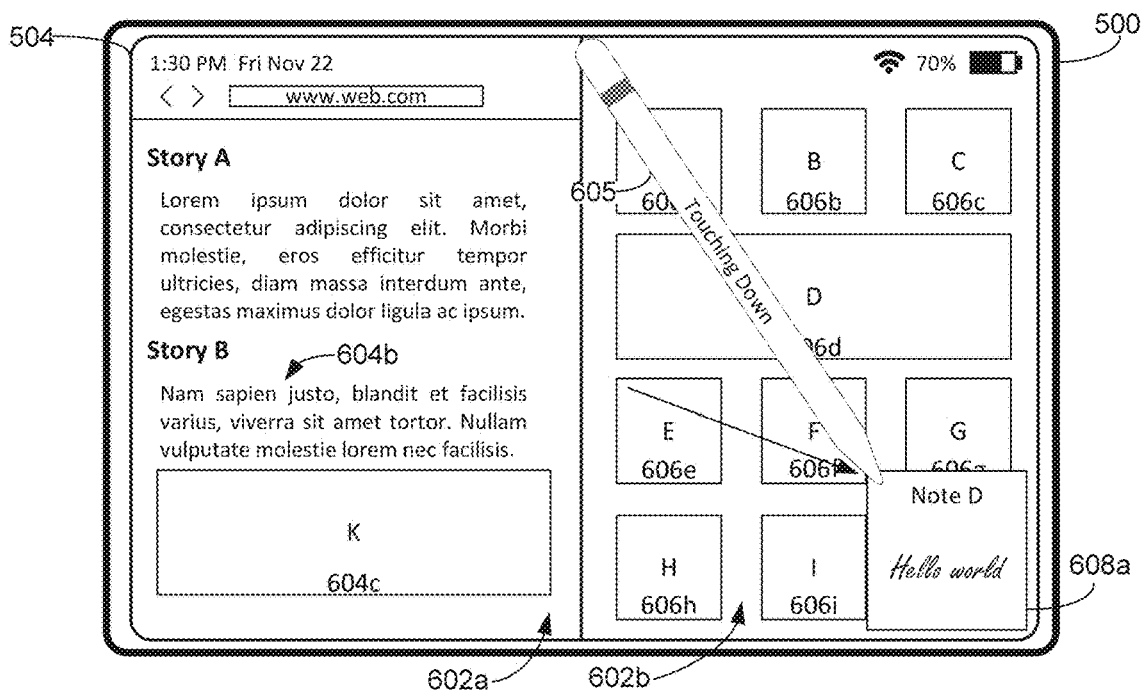
Figure 6S:
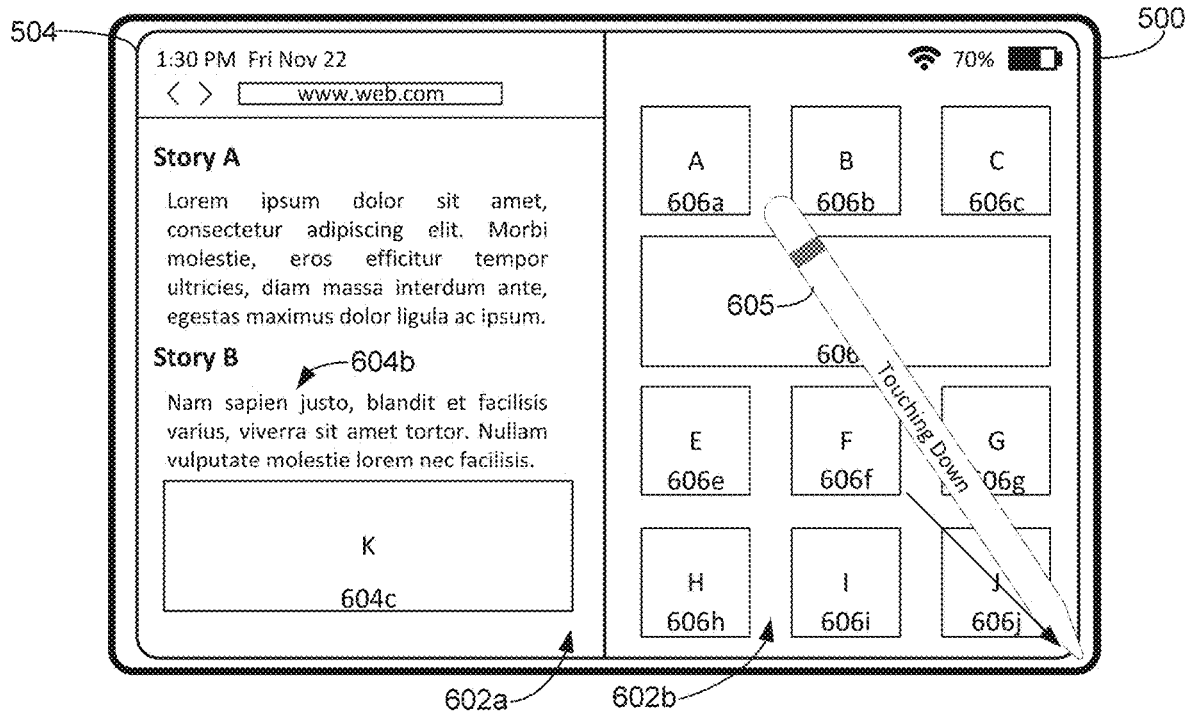
Figure 6T:
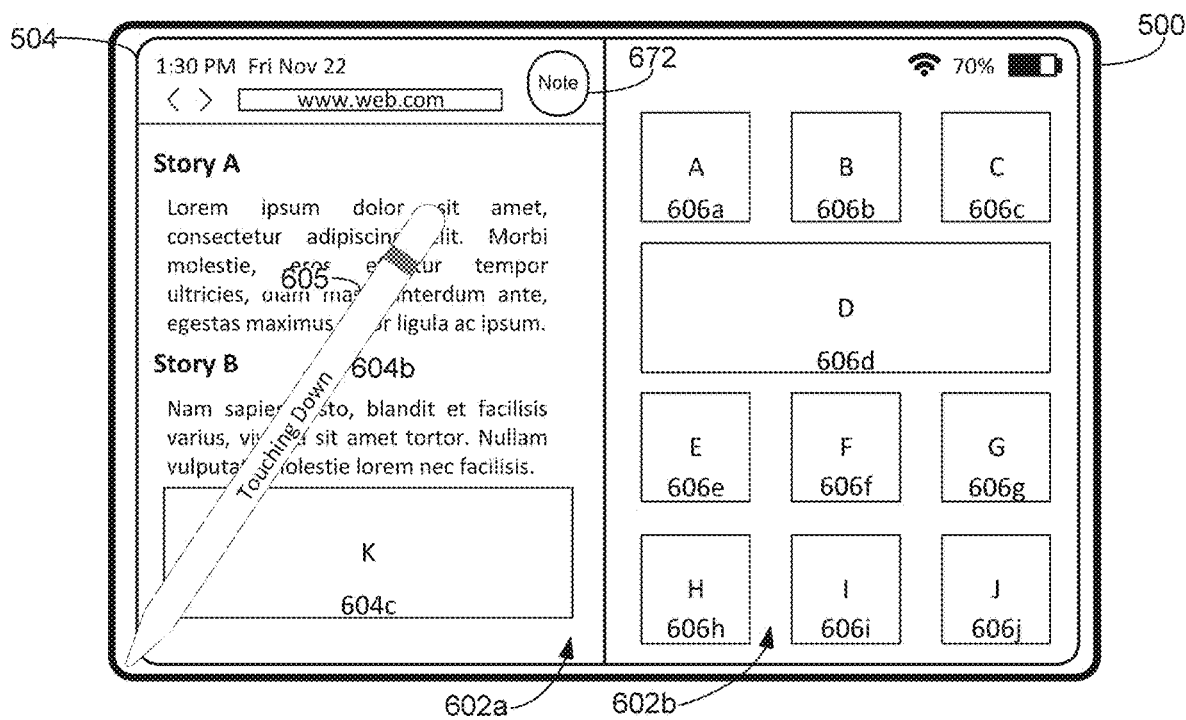
Figure 6U:
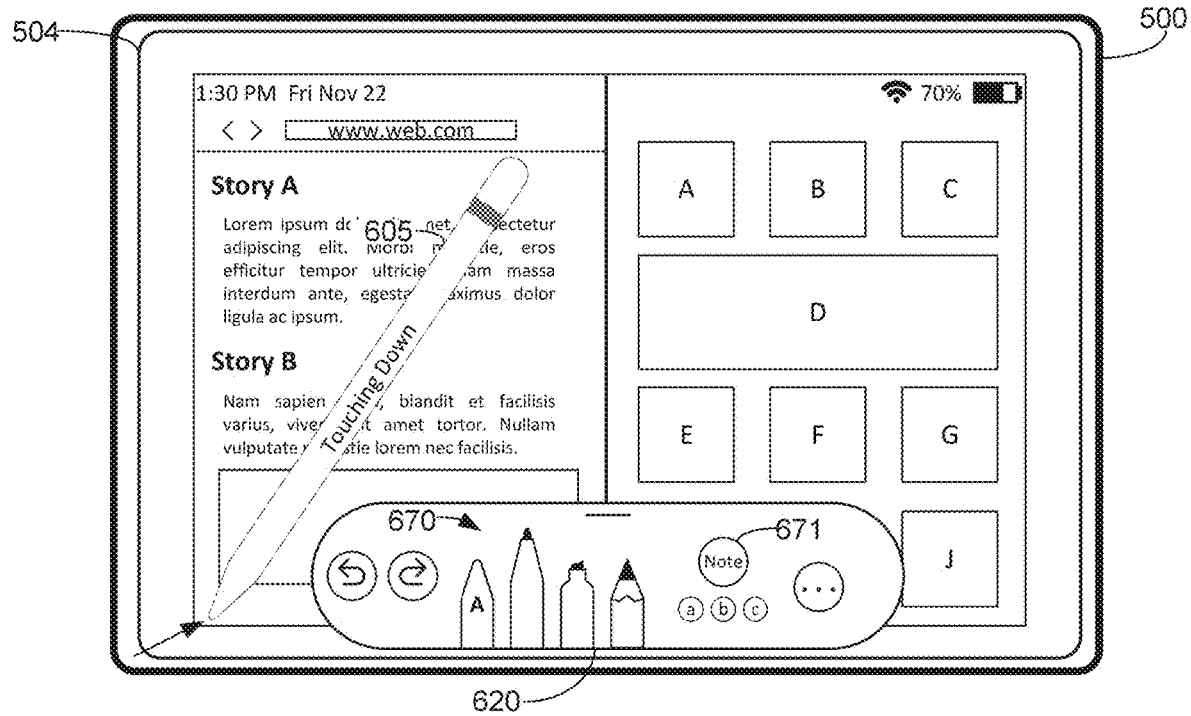
Figure 6V:
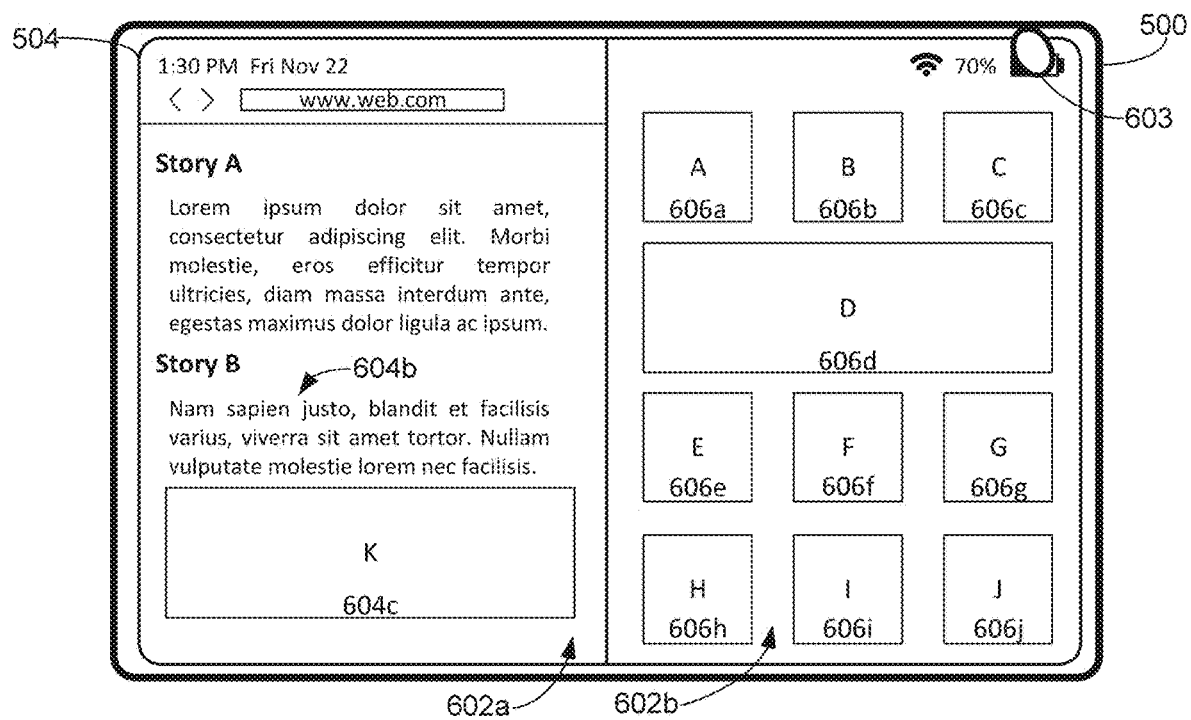
Figure 6W:
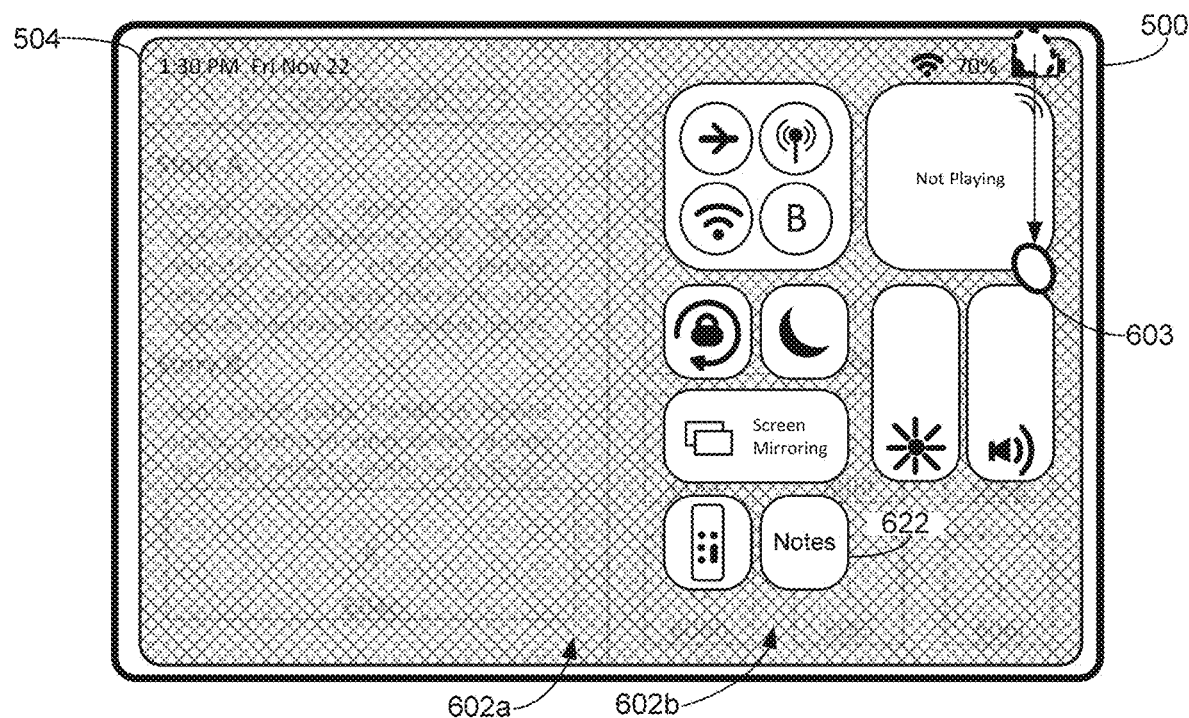
Figure 6X:
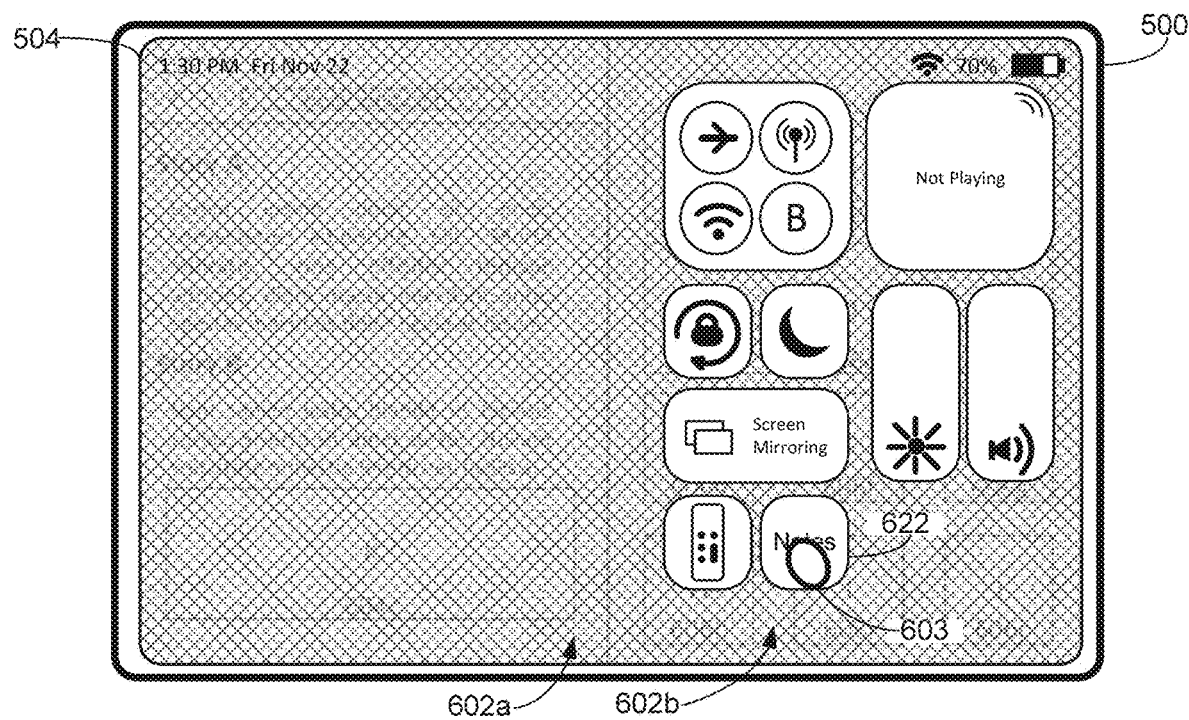
Figure 6Y:
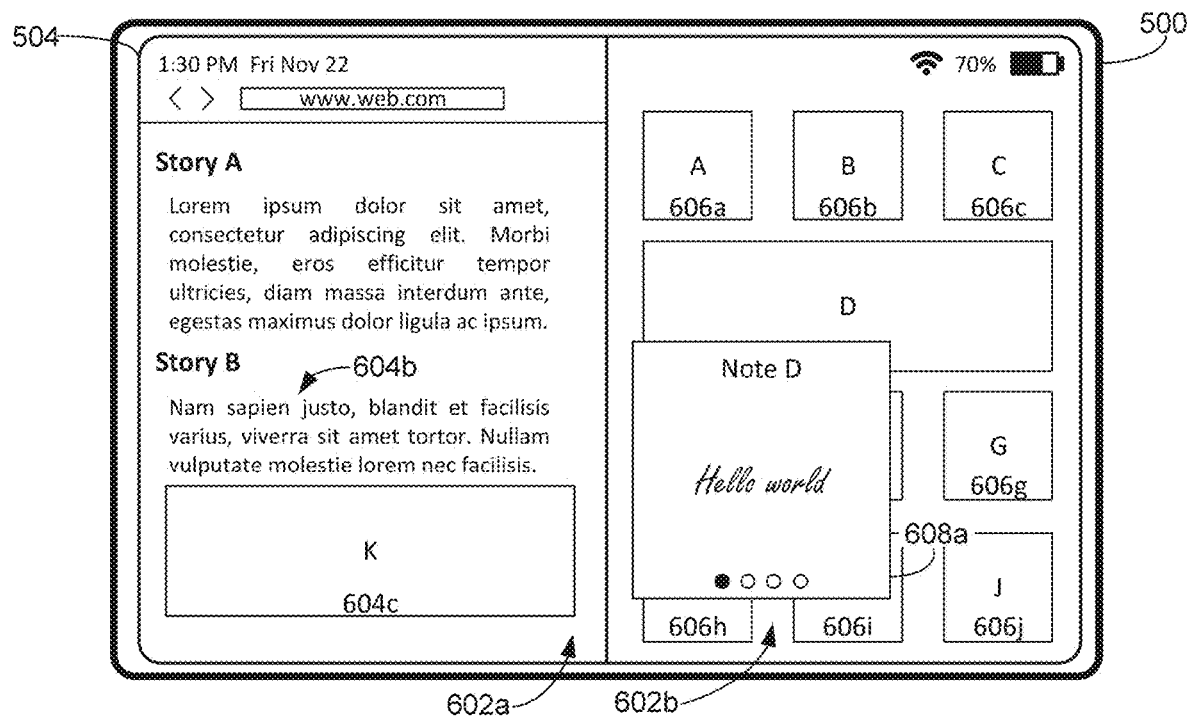
Figure 6Z:
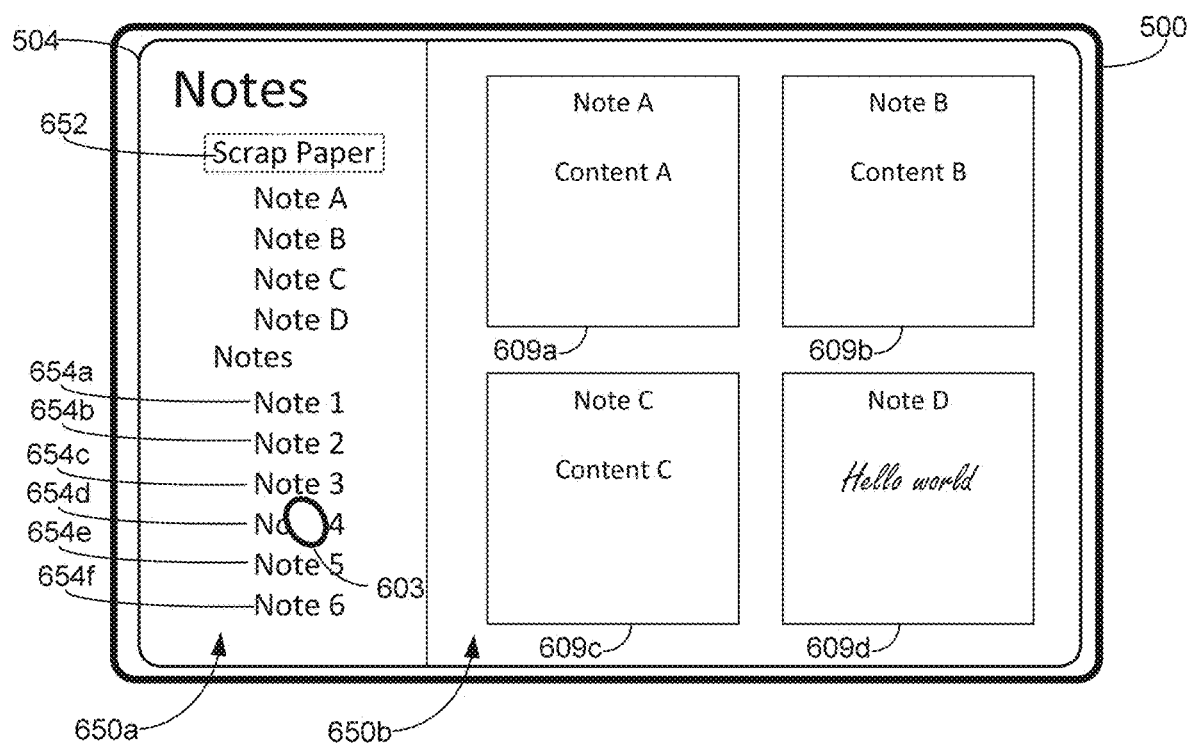
Figure 6A:
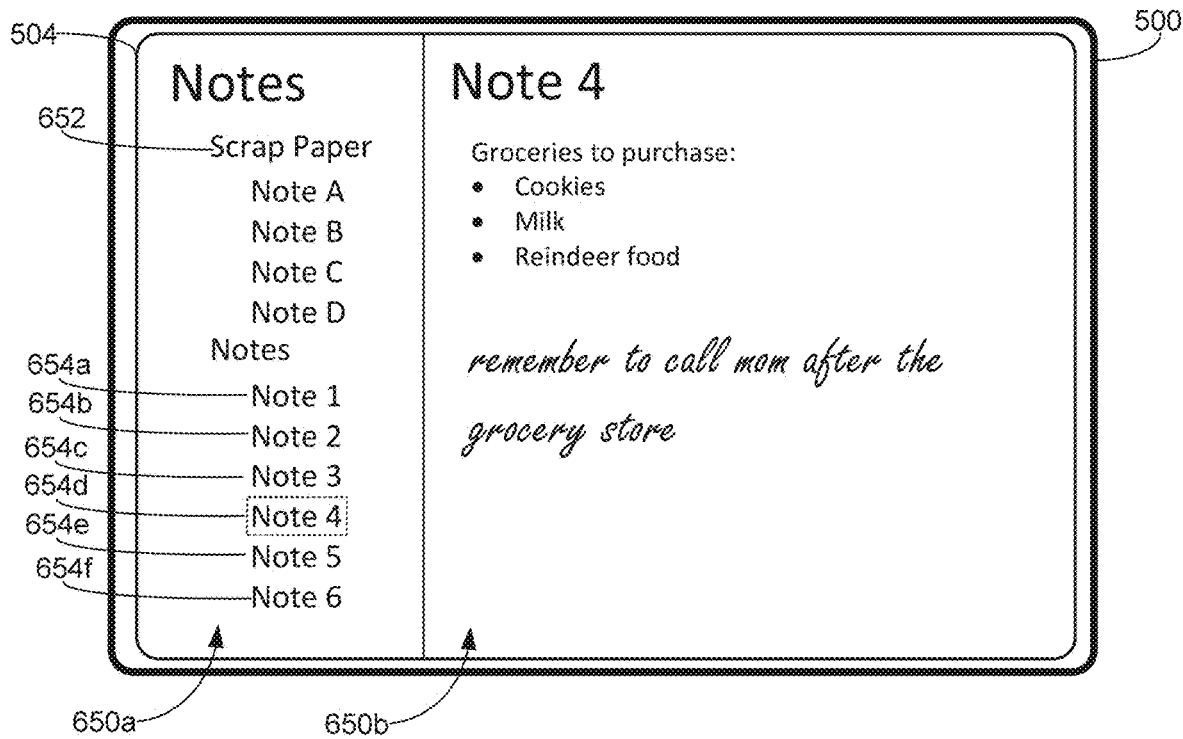
Figure 6A:
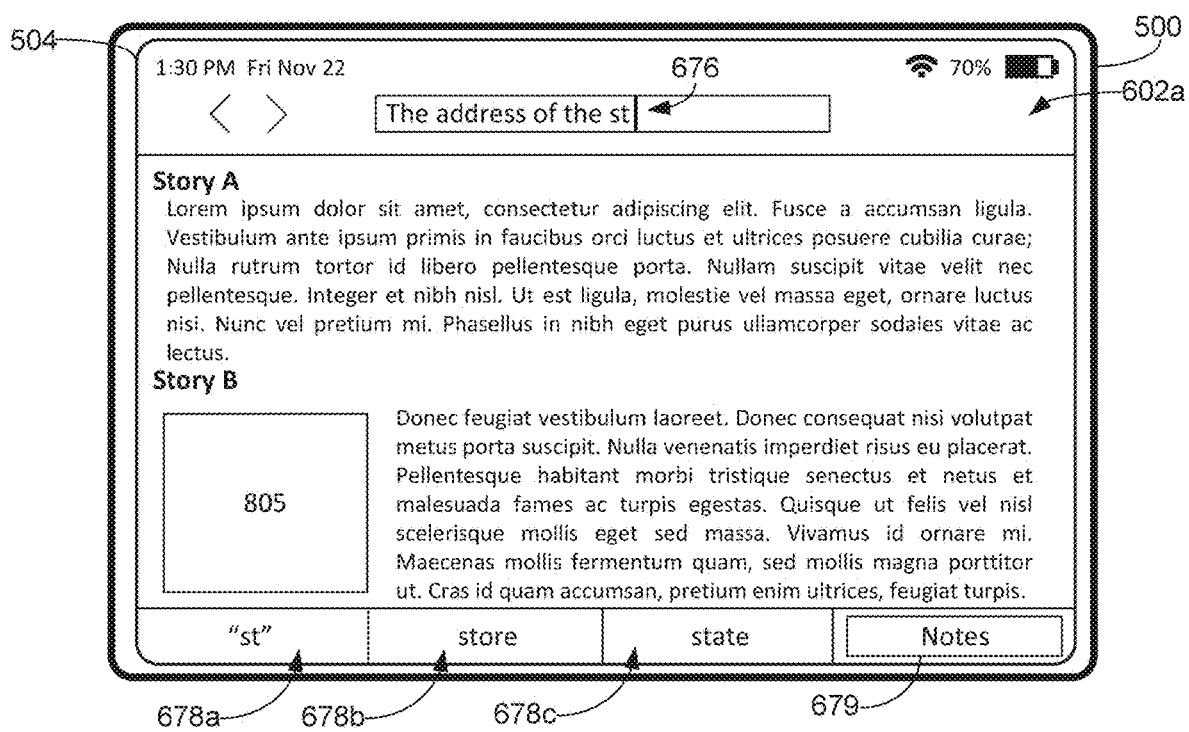
Figure 6A:
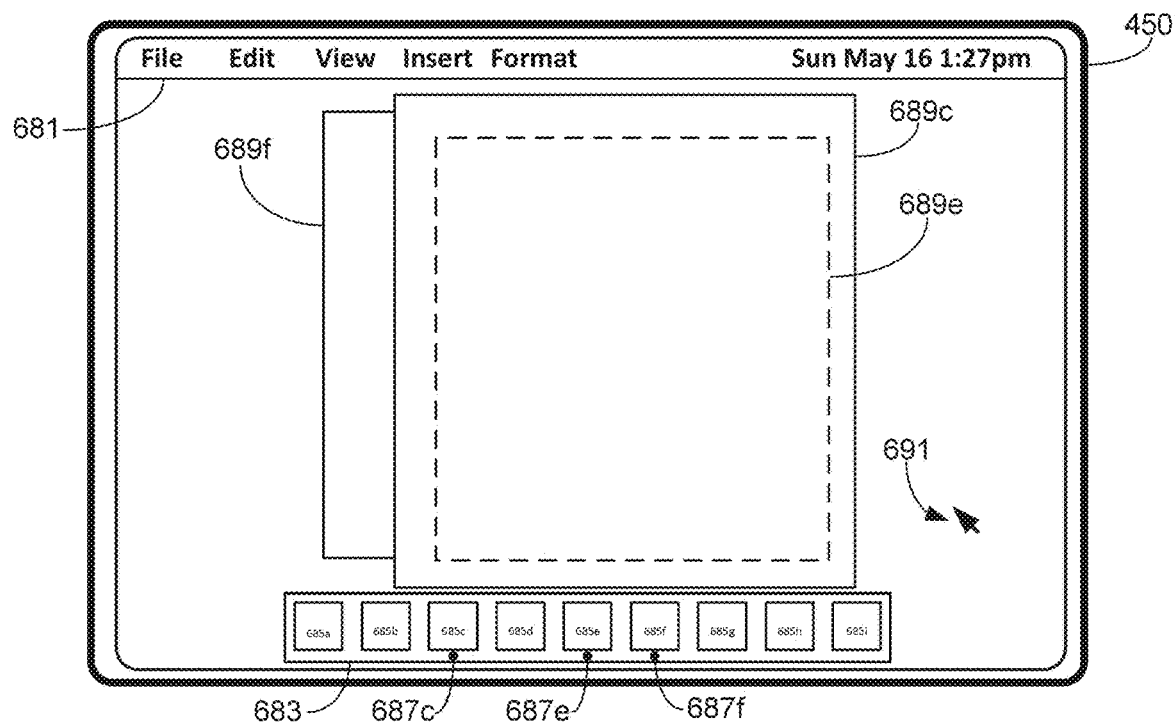
Figure 6A:
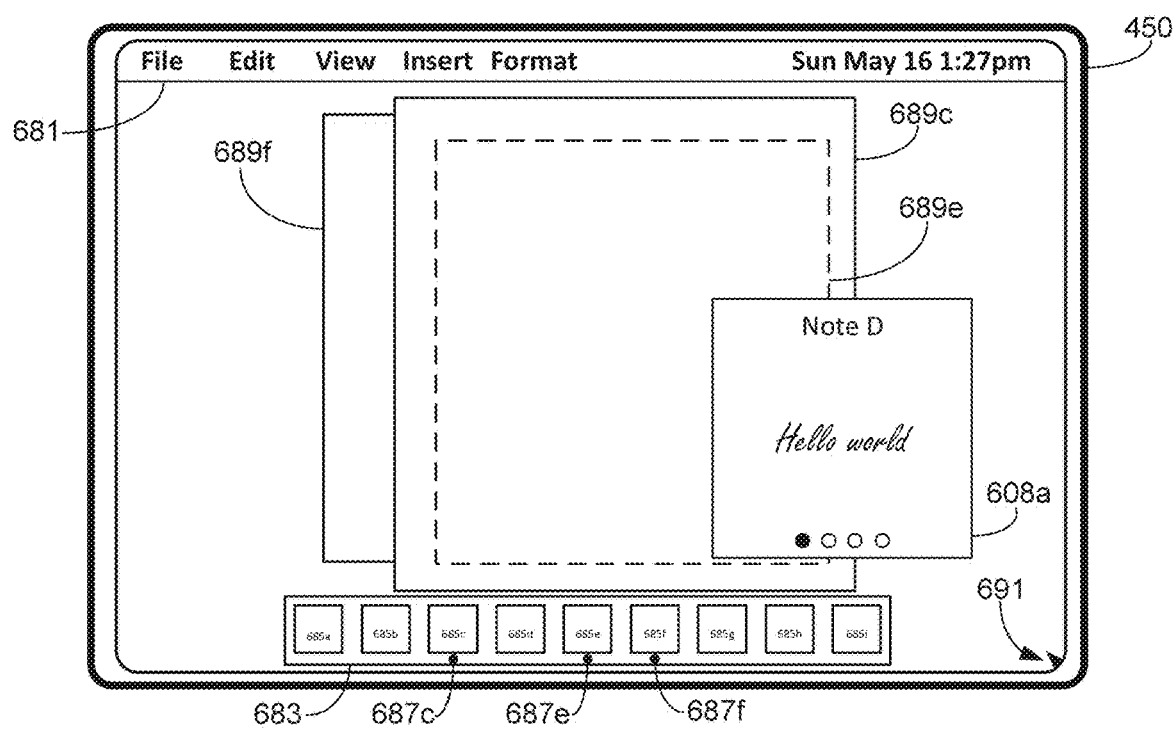
Figure 7A:
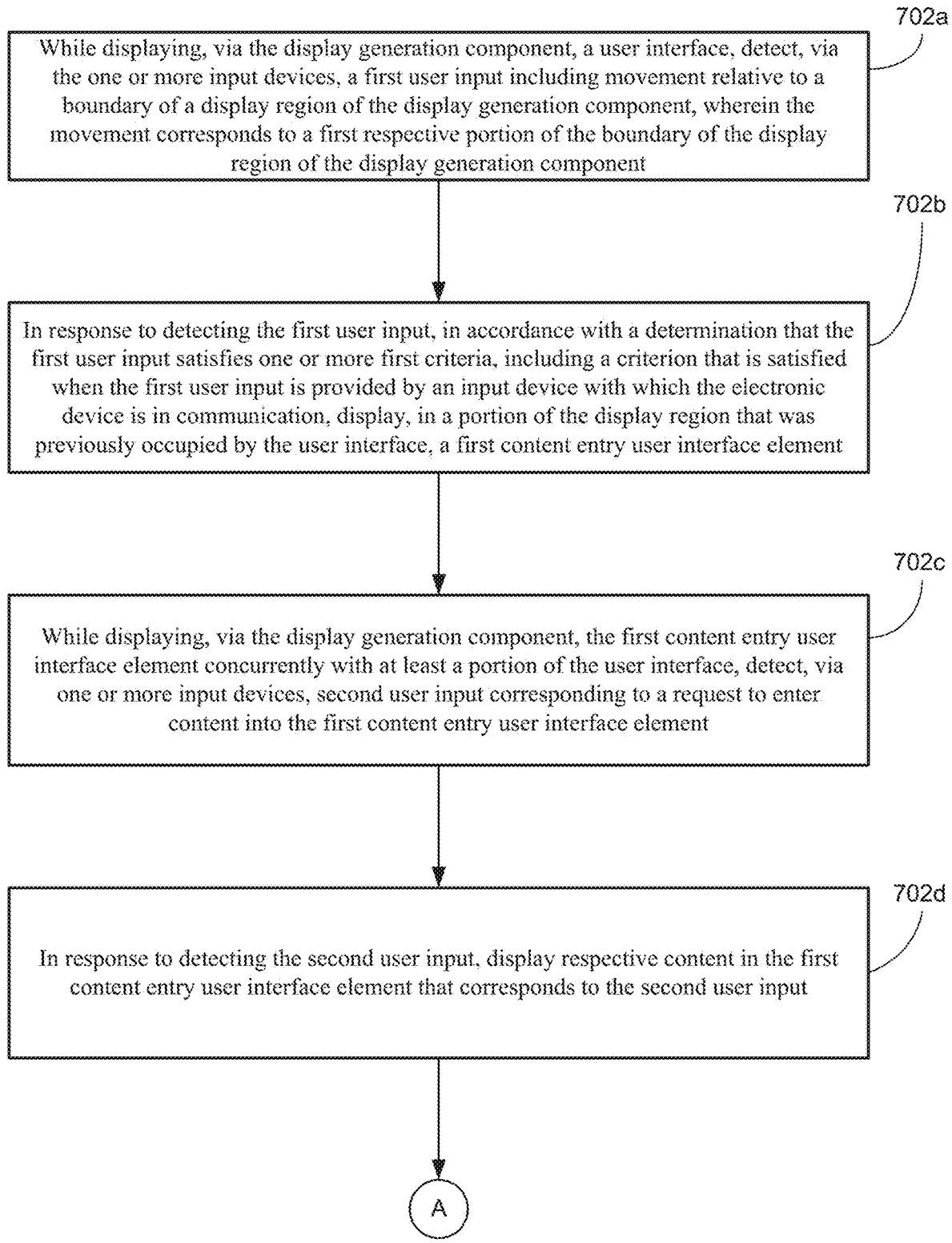
FIGS. 7A-7K are flow diagrams illustrating a method of efficiently displaying and/or interacting with notes user interfaces in accordance with some embodiments.
Figure 7B:
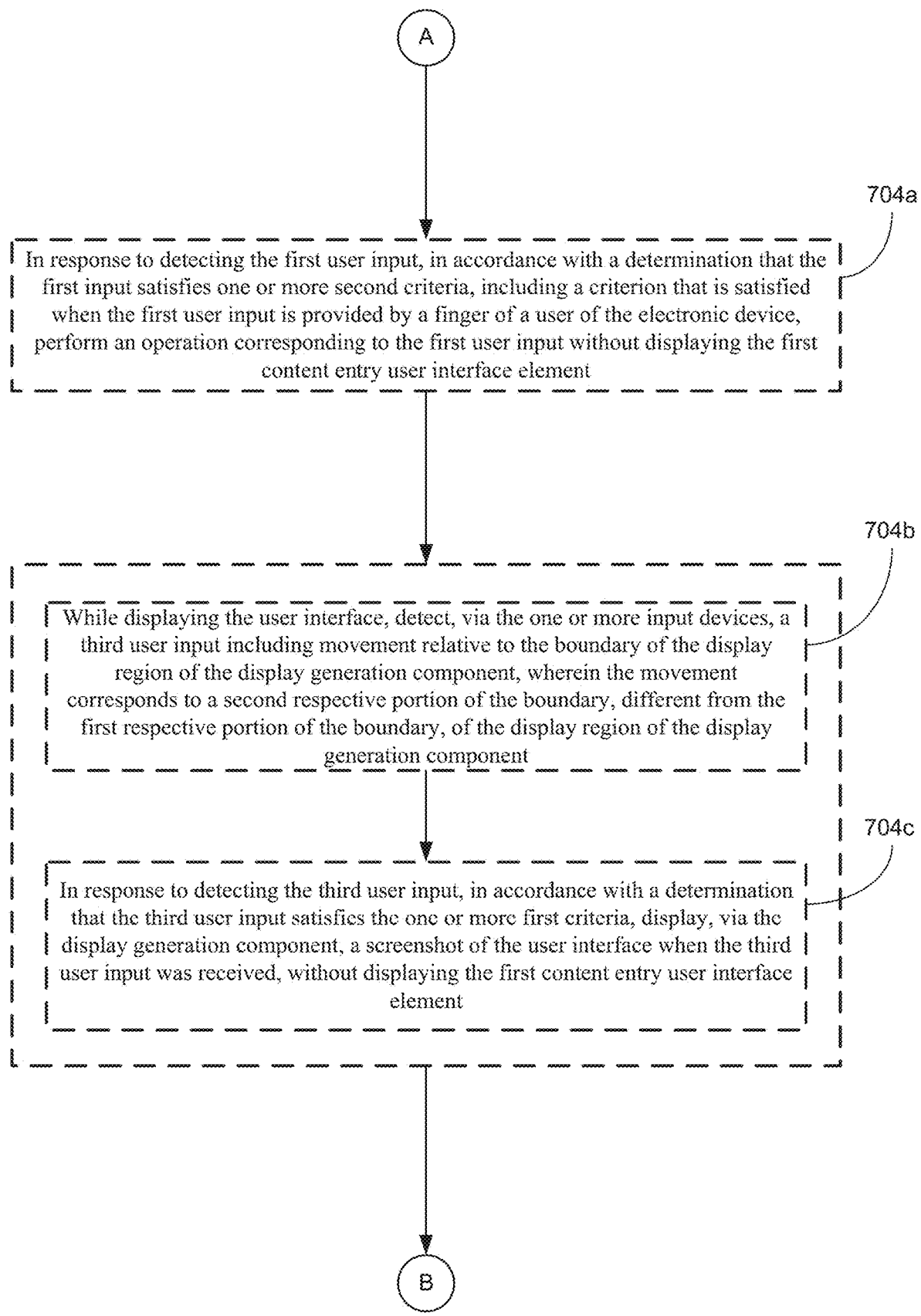
Figure 7C:
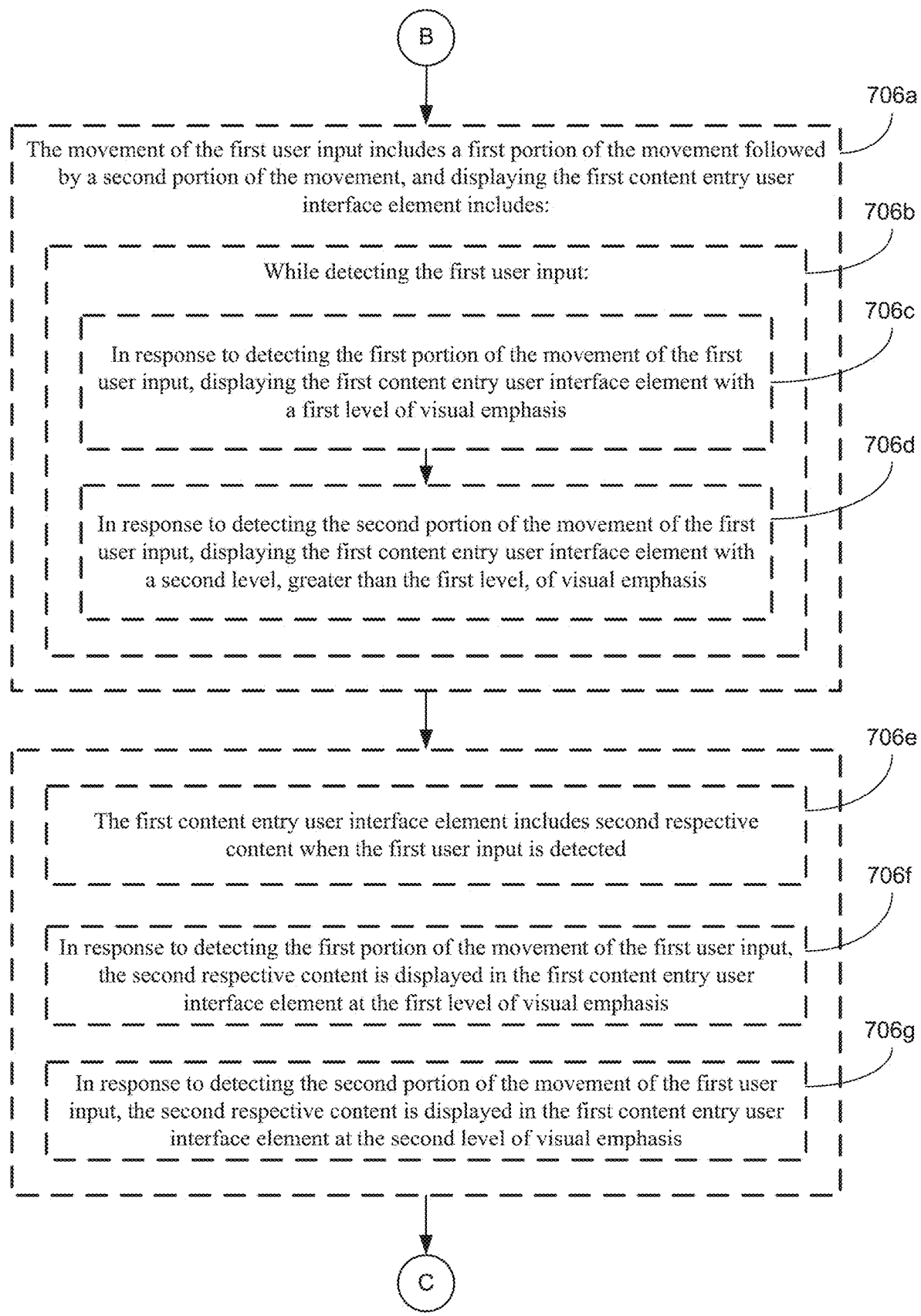
Figure 7D:
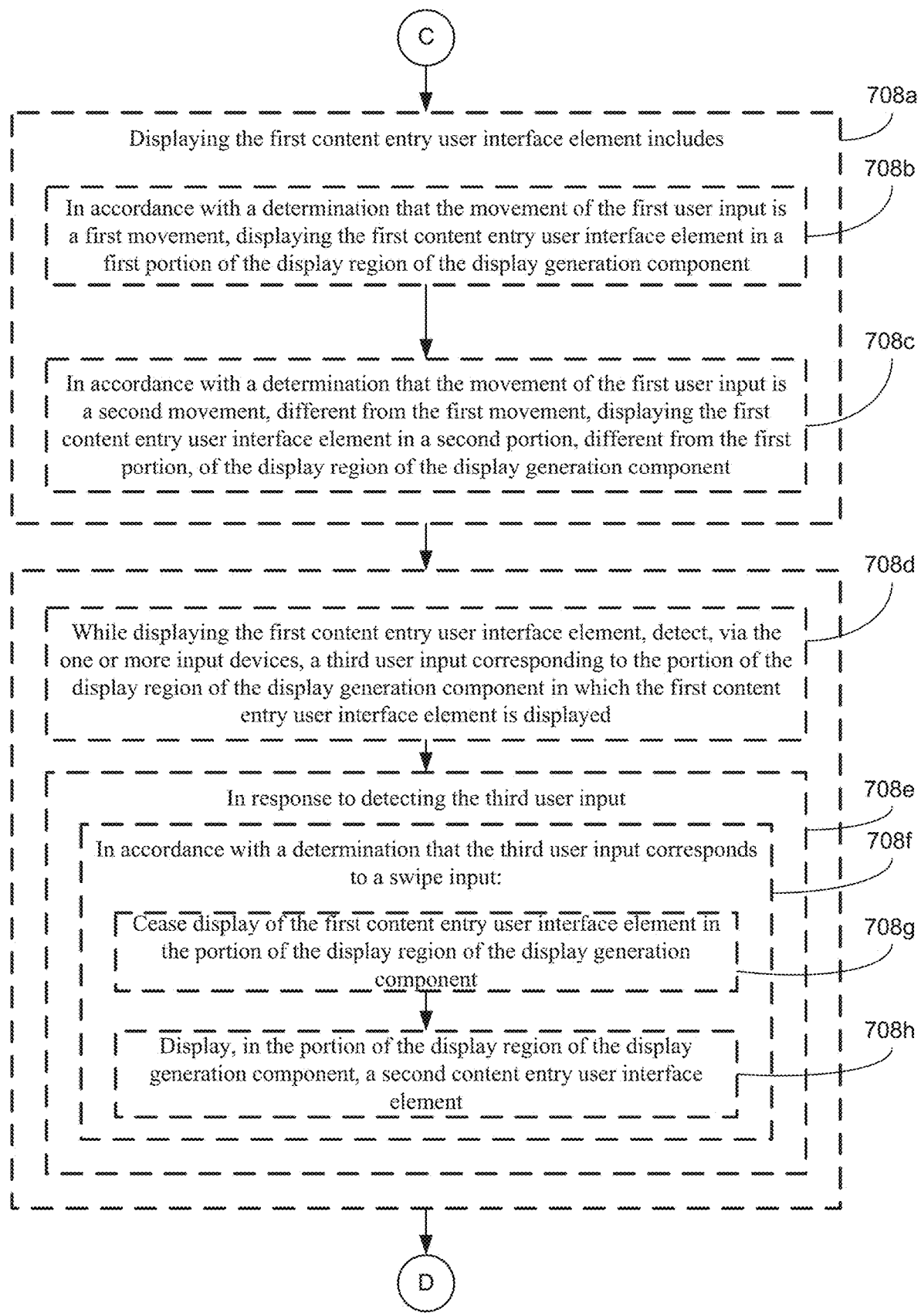
Figure 7E:
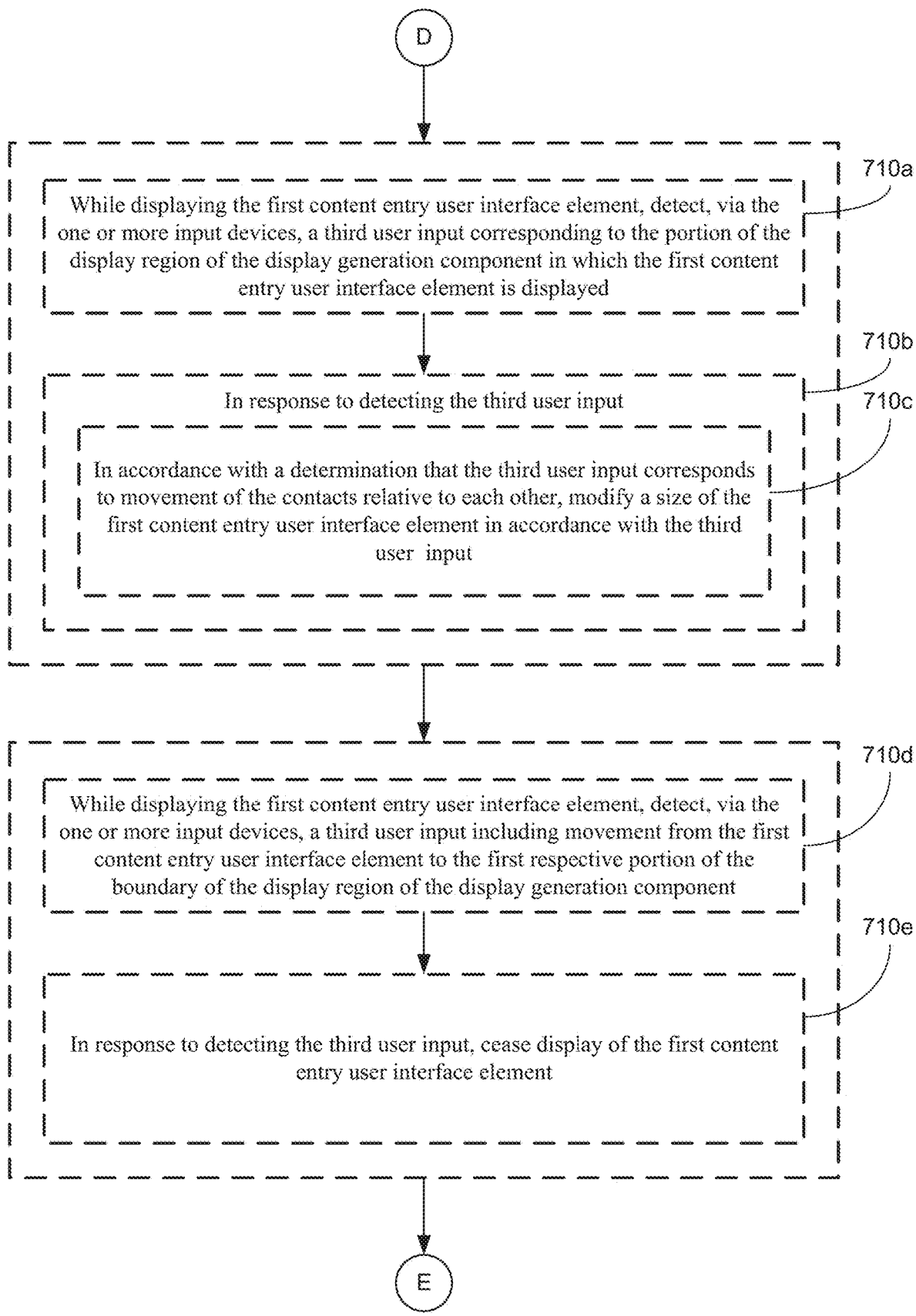
Figure 7F:
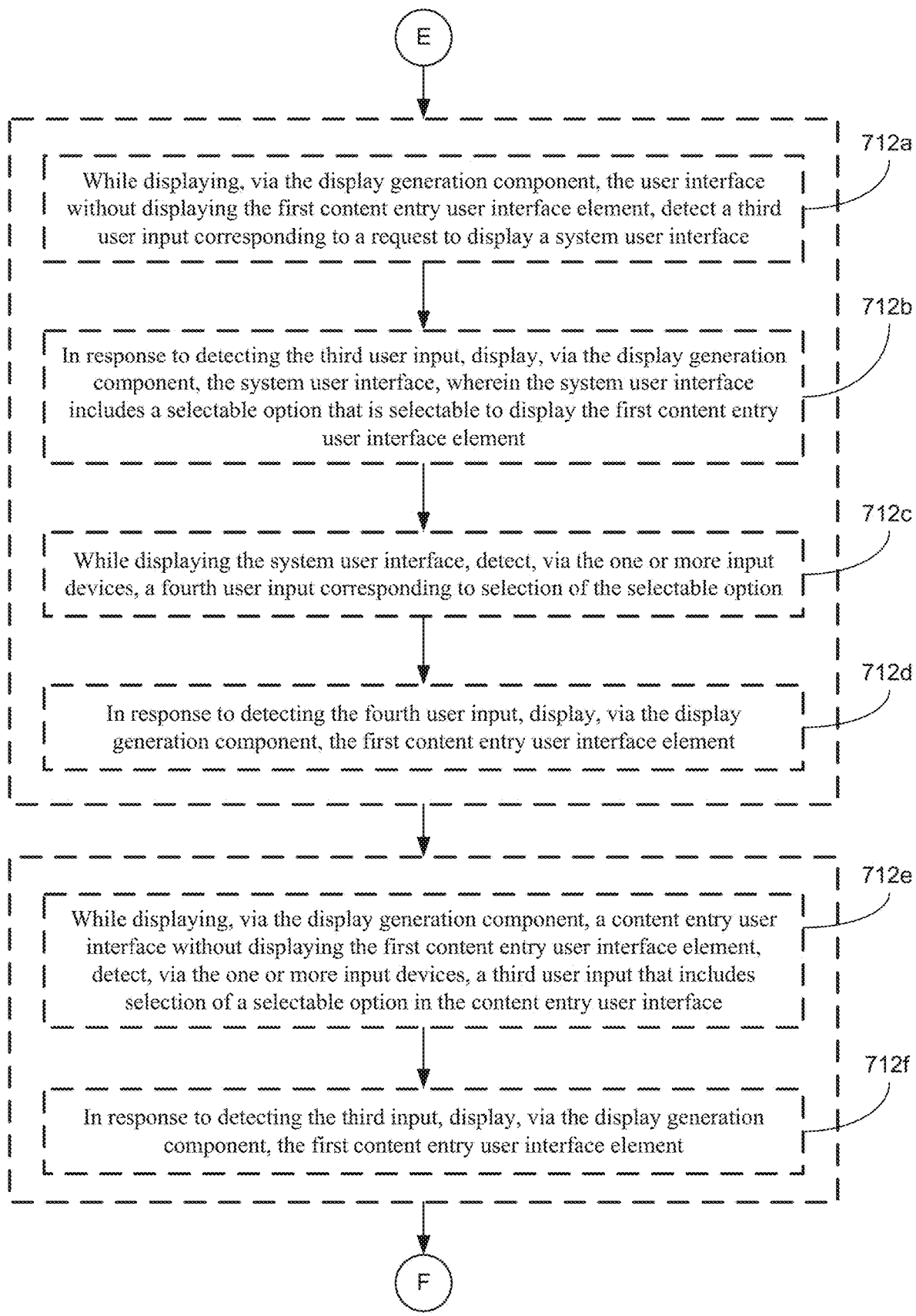
Figure 7G:
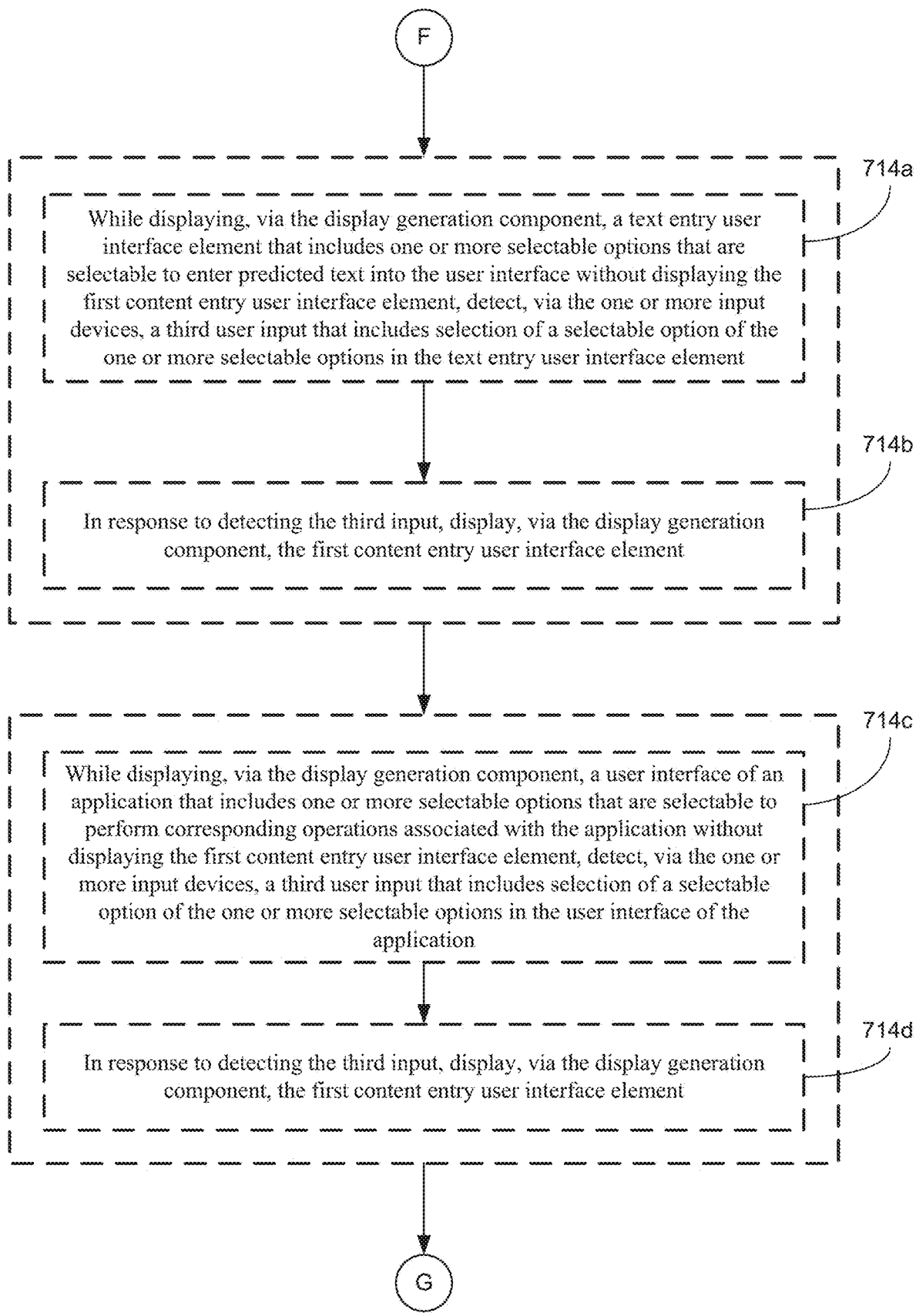
Figure 7H:
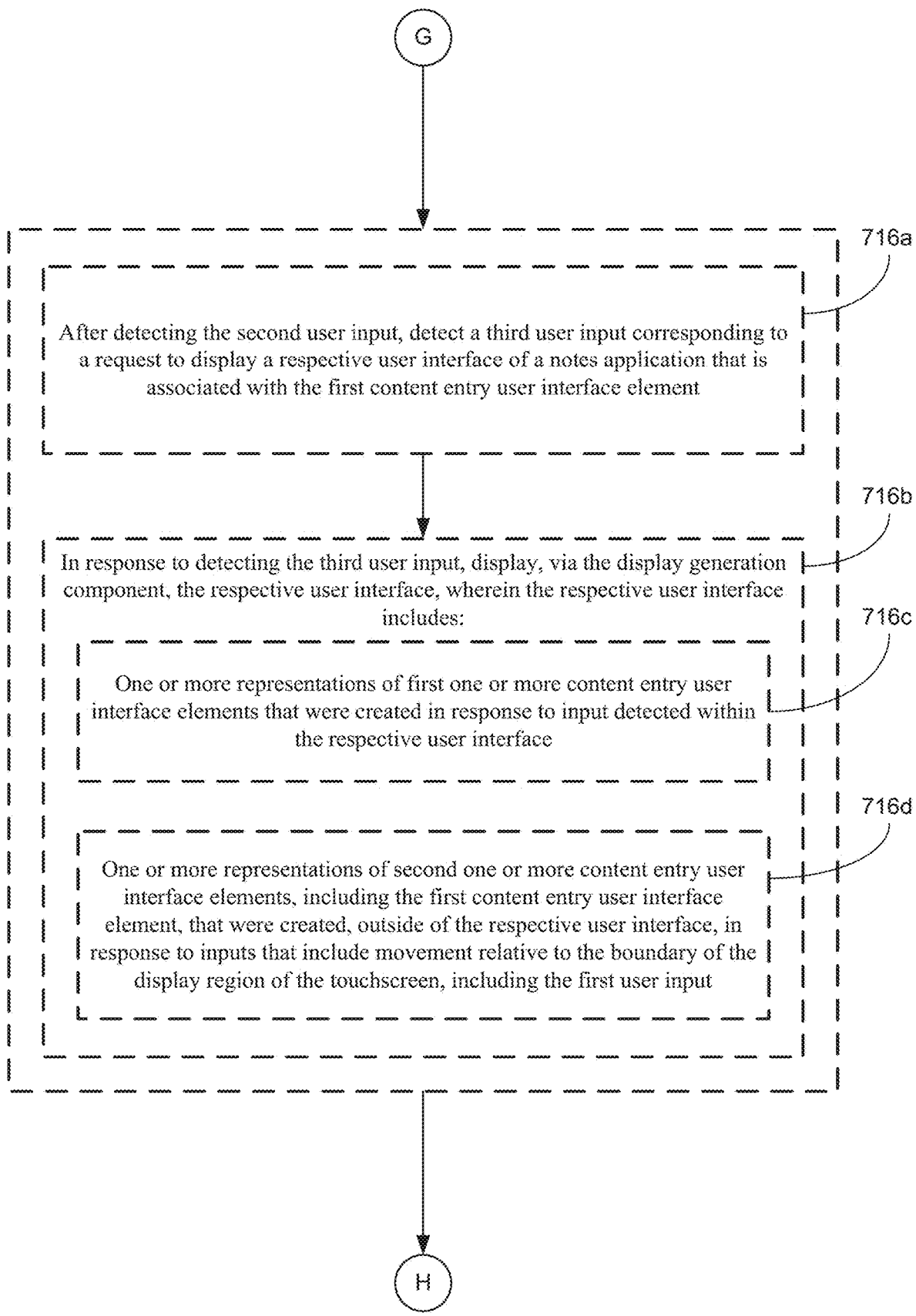
Figure 7I:
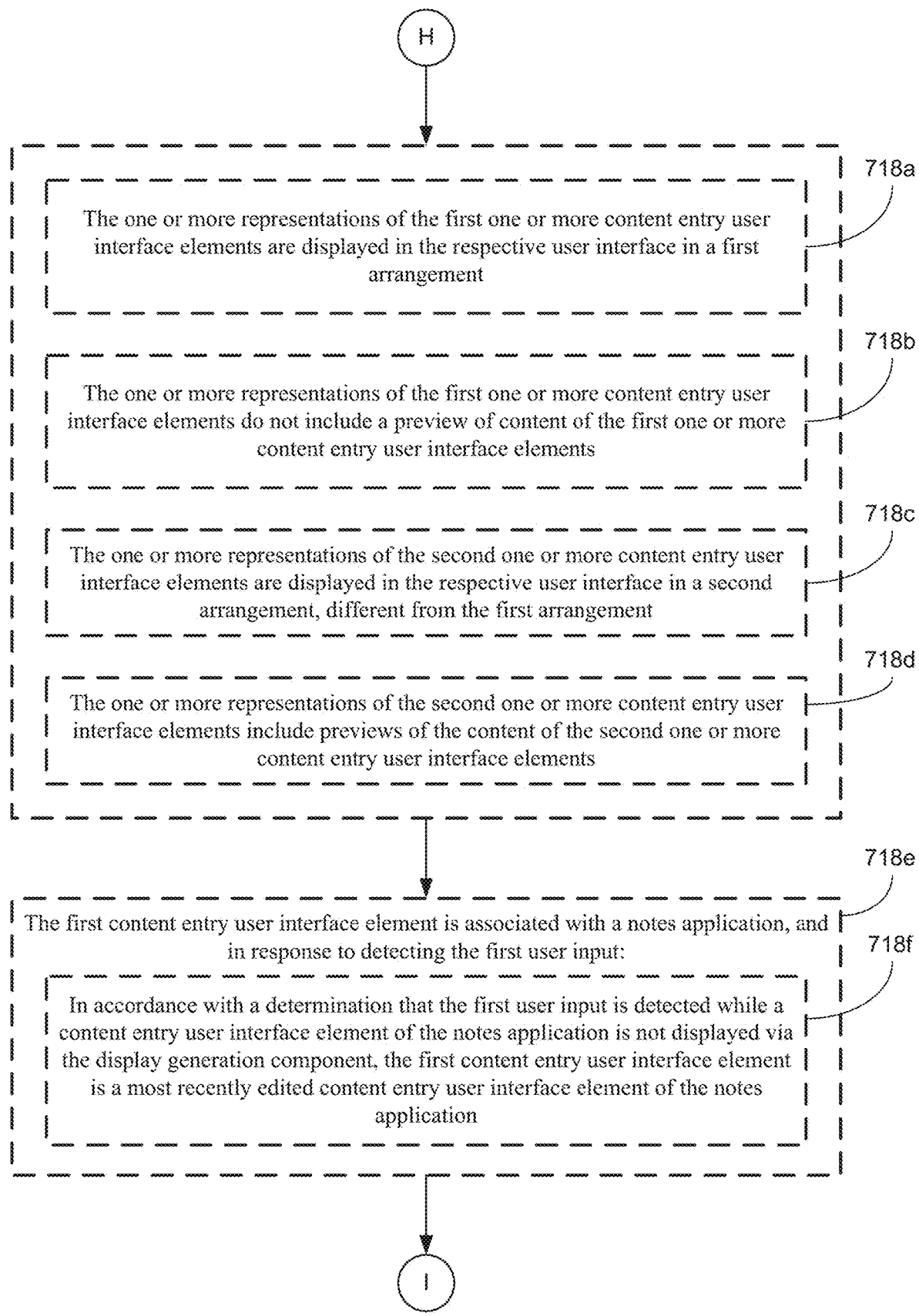
Figure 7J:
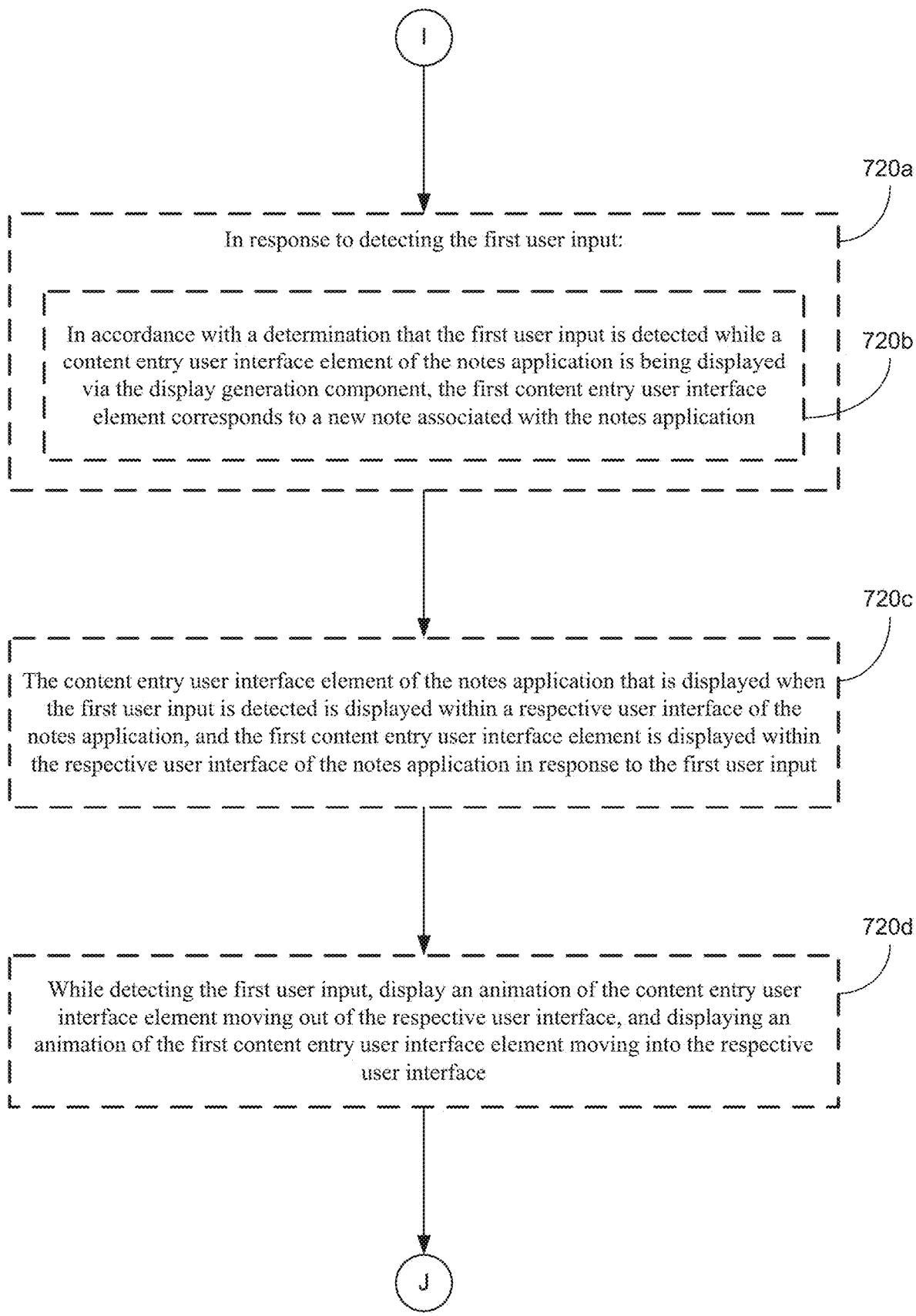
Figure 7K:
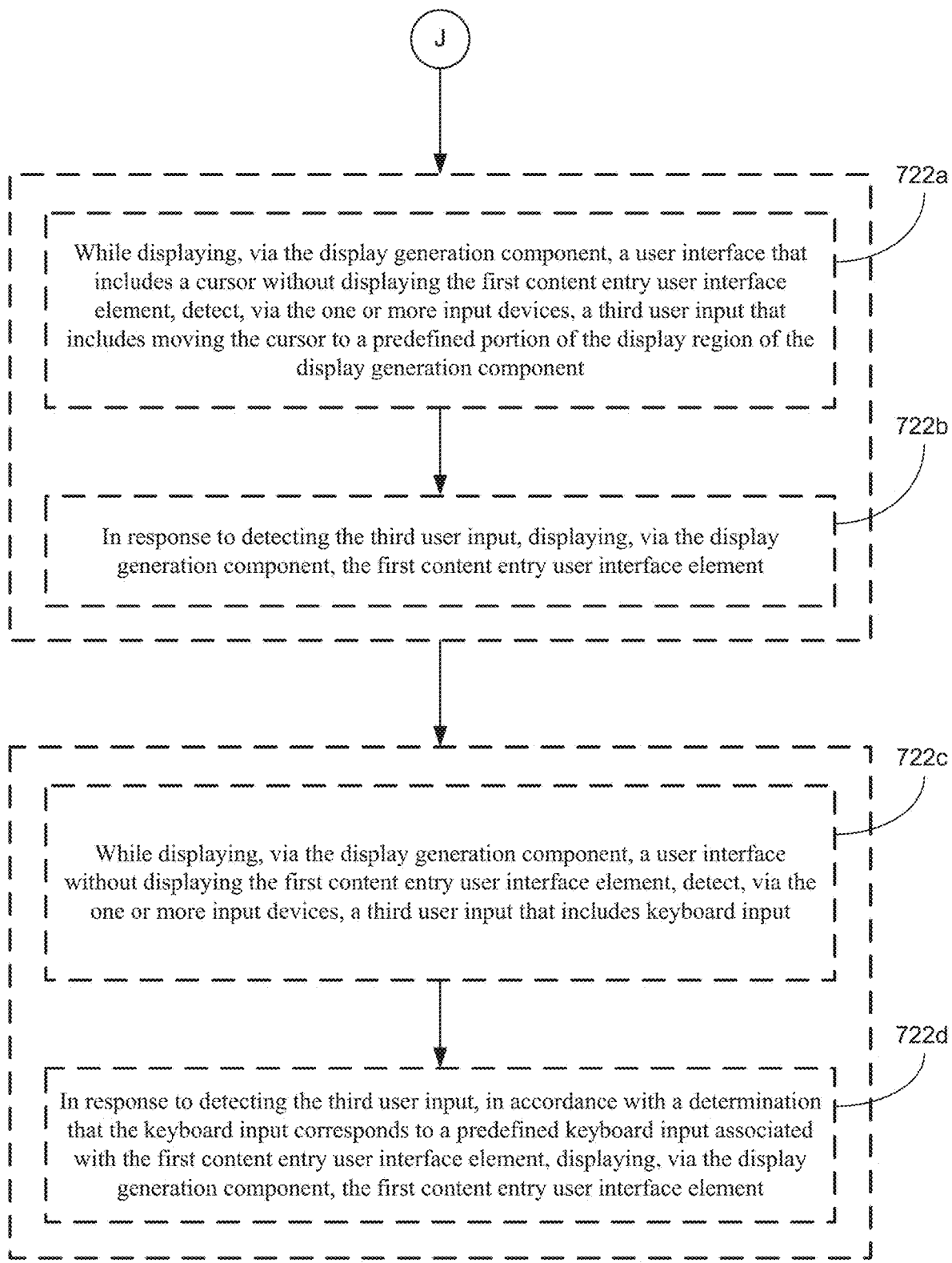

For example, in FIG. 6Z, the "Scrap Paper" element 652 has been selected, as indicated by the dashed box around the "Scrap Paper" element (though it is understood that the dashed box may or may not be displayed by device 500). In some embodiments, the various notes that have been created and/or edited in notes user interface 608a are listed below the "Scrap Paper" element 652 (e.g., Notes A through D, as previously described in this disclosure). Because the "Scrap Paper" element 652 is currently selected, device 500 displays a plurality (e.g., all of) the notes that have been created and/or edited in notes user interface 608a in second region 650b, as shown in FIG. 6Z. For example, second region 650b includes a representation 609a of Note A including the content of Note A (Content A), a representation 609b of Note B including the content of Note B (Content B), a representation 609c of Note C including the content of Note C (Content C) and a representation 609d of Note D including the content of Note D ("Hello world" in handwriting). Thus, in some embodiments, selecting the "Scrap Paper" element 652 in first region 650a of the note taking application causes device 500 to display the various "Scrap Paper" notes in a grid view in region 650b.

In contrast, device 500 optionally does not display notes from the "Notes" section of first region 650a in a grid view; rather, device 500 optionally displays such notes separately and individually in response to input selecting a given note (e.g., Note 1 element 654a, Note 2 element 654b, Note 3 element 654c, Note 4 element 654d, Note 5 element 654e and Note 6 element 654f). For example, in FIG. 6Z, device 500 detects selection of Note 4 element 654d (e.g., via a tap of contact 603). In response, device 500 ceases displaying the grid view of the "Scrap Paper" notes in second region 650b, and displays the content of Note 4 in second region 650b, as shown in FIG. 6AA (e.g., without displaying the content of other notes within the "Notes" section of first region 650a, such as Note 1, Note 2 or Note 3). As shown in FIG. 6AA, the content of Note 4 is optionally any type of content, including but not limited to keyboard (e.g., font-based) text, handwritten text, images, videos, handwritten drawings, etc.

In some embodiments, in addition to displaying options in toolbar user interfaces, control center user interfaces, etc. for displaying notes user interface 608a, device 500 displays an option to display notes user interface 608a in a user interface element that also includes suggested text/words for entry to device 500 based on (e.g., keyboard) text already provided by the user. For example, in FIG. 6AB, device 500 is displaying a web browser user interface 602a. The user has provided text entry (e.g., using a soft or hardware keyboard) into the address/search bar of the user interface (e.g., "The address of the st"), and the text insertion cursor 676 is currently immediately following the "t" in the last-entered text block of "st". In response to the entry of "st" by the user, device displays a number of suggested text entry options 678 that correspond to "st". For example, concurrently with displaying user interface 602a, device 500 displays option 678a that is selectable to cause device to leave the entry of text at text insertion cursor 676 as "st", option 678b that is selectable to cause device to replace/complete the text at text insertion 676 to "store", and option 678c that is selectable to cause device to replace/complete the text at text insertion 676 to "state". In some embodiments, when notes exist that can be accessed via notes user interface 608a (e.g., and notes user interface 608a is not currently displayed), device 500 also displays, along with options 678a, 678b and 678c in the text suggestion user interface element, option 679 that is selectable to display notes user interface 608a on touch screen 504 (e.g., overlaid on user interface 602a). In some embodiments, if no notes exist that can be accessed via notes user interface 608a, device 500 does not display option 679 in the text suggestion user interface element; in some embodiments, if no notes exist that can be accessed via notes user interface 608a, device 500 does display option 679, and selection of option 679 causes device 500 to display notes user interface 608a and create a new note—displayed in notes user interface 608a—that is ready for content input.

In embodiments in which cursor input is being provided to device 500 to interact with the user interface displayed by device 500, the notes user interface is optionally displayed by device 500 in response to movement of the cursor to a particular corner of the display (e.g., display 450 or touch screen 504), such as the bottom-right corner of the display (e.g., the same corner from which the notes user interface can be accessed using a swipe gesture). In some embodiments, movement of the cursor to a different corner of the display does not cause device 500 to display the notes user interface.

For example, in FIG. 6AC, device 500 is displaying, via display 450, a user interface to which input is provided by cursor 691. The user interface in FIG. 6AC includes a menu bar 681 that includes various selectable options (e.g., File, Edit, View, Insert, Format, etc.) that are selectable to access corresponding functionalities for controlling operation or interacting with the application user interface (e.g., application window) that is currently in focus (e.g., the application user interface that is currently at the top of the stack of application user interfaces). The user interface in FIG. 6AC also includes a dock 683 that includes application icons 685a-685i that are selectable to cause device 500 to display a user interface corresponding to the selected application/application icon via display 450.

In the user interface of FIG. 6AC, application user interfaces 689c, 689e and 689f— corresponding to application icons 685c, 685e and 685f—are currently included in the user interface displayed via display 450. User interface 689c (e.g., corresponding to the application associated with application icon 685c) is currently the application user interface at the top of the application user interface stack, user interface 689e (e.g., corresponding to the application associated with application icon 685e) is currently the next-highest application user interface in the application user interface stack, and user interface 689f (e.g., corresponding to the application associated with application icon 685o is currently the next-highest application user interface in the application user interface stack. Further, user interface 689e is completely obscured by user interface 689c and is currently not visible via display 450, though it is illustrated with dashed lines in FIG. 6AC to convey its presence and/or location on display 450. Indicators 687c, 687e and 687f displayed in association with application icons 685c, 685e and 685f indicate that user interfaces 689c, 689e and 689f are currently included in the user interface displayed via display 450.

While displaying the user interface of FIG. 6AC, device 500 detects input moving cursor 691 to the lower-right corner of display 450, as shown in FIG. 6AD, and in response, device 500 displays notes user interface 608a via display 450 as shown in FIG. 6AD. In some embodiments, notes user interface 608a is displayed above the application user interfaces in the application user interface stack (e.g., higher in the z-hierarchy than all of the application windows displayed in the user interface). Notes user interface 608a optionally includes the last-displayed note/content that was displayed in notes user interface 608a when notes user interface 608a was last displayed by device 500 (e.g., before being dismissed or closed in response to user input). Characteristics of and/or interactions with notes user interface 608a described with reference to FIGS. 6A-6AB optionally apply analogously to notes user interface 608a in FIGS. 6AC-6AD in the context of cursor interaction.

FIGS. 7A-7K are flow diagrams illustrating a method 700 of efficiently displaying and/or interacting with notes user interfaces in accordance with some embodiments. The method 700 is optionally performed at an electronic device such as device 100, device 300, or device 500 as described above with reference to FIGS. 1A-1B, 2-3, 4A-4B and 5A-5H. Some operations in method 700 are, optionally, combined and/or order of some operations is, optionally, changed.

As described below, the method 700 provides ways to efficiently display and/or interact with notes user interfaces. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device (e.g., device 500) in communication with a display generation component and one or more input devices. For example, a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users (e.g., such as in a head-mounted device), etc.

In some embodiments, while displaying, via the display generation component, a user interface, such as user interface(s) 602a and/or 602b in FIG. 6A (e.g., a user interface of an application installed and/or running on the electronic device, a user interface of the operating system of the electronic device, etc. In some embodiments, the user interface is home screen user interface of the electronic device, such as described with reference to FIG. 4A. In some embodiments, the user interface is a user interface of a web browsing application, and includes content from a website that is being displayed by the web browsing application. In some embodiments, the user interface concurrently includes multiple user interfaces of one or more applications and/or the operating system of the electronic device), the electronic device detects (702a), via the one or more input devices, a first user input including movement relative to a boundary of a display region of the display generation component, such as the movement of contact 603 or stylus 605 in FIGS. 6A-6D (e.g., movement of a finger or stylus from outside of the edge of the touch screen towards the center/display area of the touch screen (e.g., an edge or corner swipe gesture)). In some embodiments, the first user input includes detection of a contact at or within (e.g., inside or outside) a threshold distance (e.g., 0.1, 0.2, 0.5, 1, 2, 5, 10 cm) of the edge or boundary of the touch screen (e.g., the boundary of the area of the display generation component that includes a displayed image), followed by movement of the contact towards the center of the touch screen (e.g., including a component of movement towards the center of the touch screen). In some embodiments, the contact is provided by a finger of a user. In some embodiments, the contact is provided by a stylus that is in (e.g., wireless) communication with the electronic device. In some embodiments, the movement corresponds to a first respective portion of the boundary of the display region of the display generation component, such as the lower-right portion of the edge of touch screen 504 (e.g., the touch screen includes multiple portions of the boundary of the touch screen, and the first user input includes movement that starts at and/or crosses the first respective portion of the boundary of the touch screen). For example, the first respective portion of the boundary of the display generation component is the lower-right corner of the display generation component, and is not the upper-right corner of the display generation component.

In some embodiments, in response to detecting the first user input, in accordance with a determination that the first user input satisfies one or more first criteria, including a criterion that is satisfied when the first user input is provided by an input device with which the electronic device is in communication, such as stylus 605 in FIGS. 6C-6E (e.g., if the corner swipe gesture is provided by a stylus that is in communication with the electronic device or a finger of a user), the electronic device displays (702*b*), in a portion of the display region that was previously occupied by the user interface (e.g., overlaid on the user interface or next to a resized version of the user interface), a first content entry user interface element, such as displaying notes user interface 608*a* in FIGS. 6D-6E (e.g., a new or blank note user interface element of a note taking application that is installed on the electronic device). In some embodiments, the first content entry user interface element can additionally or alternatively be displayed in response to detecting that a cursor has been moved to a predefined portion of the display region of the touch screen (e.g., a lower-right corner of the display region, and not a lower or right edge of the display region). In some embodiments, the first content entry user interface element can additionally or alternatively be displayed in response to detecting a keyboard input (e.g., keyboard shortcut) for displaying the first content entry user interface element (e.g., selection of the shift key concurrently with selection of a letter key). In some embodiments, the note taking application optionally allows for content to be added to a note user interface element, while the note user interface element is displayed, in response to user input (e.g., handwritten notes, content copied and pasted from other user interfaces into the note user interface element, etc.), and stored in the note taking application. The note and its content are able to be displayed later in response to user input for doing so. In some embodiments, the first content entry user interface element is a blank note user interface element of the note taking application. In some embodiments, the first content entry user interface element is the last-created note user interface element of the note taking application, including the content of that note when that note was last displayed and/or edited. In some embodiments, no user interface or note user interface element of the note taking application is displayed in the user interface when the first user input is received. In some embodiments, while the note user interface element is displayed in response to the first user input, no other user interface of the note taking application is displayed in the user interface. In some embodiments, the first content entry user interface element is displayed overlaid on the user interface that was displayed when the first input was received such that both the first content entry user interface element and the portion(s) of the user interface that are not obscured by the first content entry user interface element are displayed via the display generation component. In some embodiments, the first content entry user interface element is movable in response to user input to be overlaid on different portions of the underlying user interface. In some embodiments, portion(s) of the underlying user interface (e.g., that are not overlaid by the first content entry user interface element) continue to be interactable via user input while the first content entry user interface element is displayed concurrently with the user interface. In some embodiments, the electronic device displays the first content entry user interface element as described in response to detecting the first user input irrespective of whether one or multiple user interfaces of one or multiple different applications are displayed when the first user input is detected (e.g., the note taking interface can be invoked with the same gesture while any of multiple different applications are displayed via the display generation component).

In some embodiments, while displaying, via the display generation component, the first content entry user interface element concurrently with at least a portion of the user interface (e.g., overlaid on the user interface or next to a resized version of the user interface), the electronic device detects (702*c*), via one or more input devices, second user input corresponding to a request to enter content into the first content entry user interface element, such as handwritten content provided by stylus 605 in FIGS. 6O-6P (e.g., typed character input provided by a soft keyboard or a physical keyboard in communication with the electronic device, handwritten input provided with a finger or stylus via the touch screen, or copied content from the underlying user interface that is pasted into the first content entry user interface element). In some embodiments, in response to detecting the second user input, the electronic device displays (702*d*) respective content in the first content entry user interface element that corresponds to the second user input, such as displaying "Hello world" in FIG. 6P in notes user interface 608*a* (e.g., adding the typed character input, the handwritten input, or the copied content from the underlying user interface to the first content entry user interface element). The above-described manner of displaying a content entry user interface element provides a quick and efficient way of generating a user interface element into which content can be entered, while maintaining display of the underlying user interface, which simplifies the interaction between the user and the electronic device and enhances the operability of the electronic device and makes the user-device interface more efficient (e.g., by allowing for the display of the content entry user interface element without the need for dedicated displayed buttons for doing so, and by avoiding the loss of context and ability to continue interacting with the underlying user interface that would result from ceasing display of the underlying user interface), which additionally reduces power usage and improves battery life of the electronic device by enabling the user to use the electronic device more quickly and efficiently while reducing errors in the usage of the device.

In some embodiments, in response to detecting the first user input, in accordance with a determination that the first input satisfies one or more second criteria, including a criterion that is satisfied when the first user input is provided by a finger of a user of the electronic device, such as the input provided by contact 603 in FIGS. 6A-6B (e.g., if the corner swipe gesture is not provided by a stylus that is in communication with the electronic device, but rather is provided by something else, such as a finger of the user of the electronic device), the electronic device performs (704*a*) an operation corresponding to the first user input without displaying the first content entry user interface element, such as displaying the home screen user interface in FIG. 6B without displaying notes user interface 608*a*. For example, if the same corner swipe movement (e.g., from the same corner of the boundary of the touch screen) is provided by a finger rather than a stylus, the electronic device optionally does not display the first content entry user interface element (e.g., as it would have had the corner swipe movement been performed by a stylus). Instead, the electronic device optionally performs a different operation in response to such an input. For example, the electronic device optionally ceases display of the user interface and displays a home screen user interface, such as described with reference to FIG. 4A, via the display generation component in response to the corner swipe input provided by the finger. In some embodiments, in response to the corner swipe input provided by the finger, the electronic device displays a multitasking user interface that includes representations of a plurality of representations of user interfaces of different applications (e.g., including the user interface that was displayed when the corner swipe input was detected) that are selected to display the selected user interface (e.g., at full size) via the display generation component. The above-described manner of avoiding display of the content entry user interface element when the input is not provided by a stylus allows for multiple different responses to occur in response to the same input provided by different means, and also prevents unintentional display of the content entry user interface element (e.g., when a stylus is not being used to provide input to the device), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently while reducing errors in the usage of the device.

In some embodiments, while displaying the user interface, the electronic device detects (704b), via the one or more input devices, a third user input including movement relative to the boundary of the display region of the display generation component, such as the input provided by stylus 605 in FIGS. 6T-6U (e.g., movement of a finger or stylus from outside of the edge of the touch screen towards the center/display area of the touch screen (e.g., an edge or corner swipe gesture)). In some embodiments, the first user input includes detection of a contact at or within (e.g., inside or outside) a threshold distance (e.g., 0.1, 0.2, 0.5, 1, 2, 5, 10 cm) of the edge or boundary of the touch screen (e.g., the boundary of the area of the touch screen that includes a displayed image), followed by movement of the contact towards the center of the touch screen (e.g., including a component of movement towards the center of the touch screen). In some embodiments, the contact is provided by a finger of a user. In some embodiments, the contact is provided by a stylus that is in (e.g., wireless) communication with the electronic device. In some embodiments, the movement corresponds to a second respective portion of the boundary, different from the first respective portion of the boundary, of the display region of the display generation component, such as the lower-left portion of the edge of touch screen 504 in FIG. 6T (e.g., the touch screen includes multiple portions of the boundary of the touch screen, and the third user input includes movement that starts at and/or crosses the second respective portion of the boundary of the touch screen). For example, the second respective portion of the boundary of the display generation component is the lower-left corner of the display generation component, and is not the lower-right corner of the display generation component.

In some embodiments, in response to detecting the third user input, in accordance with a determination that the third user input satisfies the one or more first criteria (e.g., the corner swipe gesture is provided by a stylus that is in communication with the electronic device), the electronic device displays (704c), via the display generation component, a screenshot of the user interface when the third user input was received, without displaying the first content entry user interface element, such as displaying the screenshot of user interfaces 602a and 602b in FIG. 6U without displaying notes user interface 608a. For example, a corner swipe input provided by a stylus in the lower-left corner of the touch screen optionally causes the electronic device to take a screenshot of the user interface (e.g., that is editable by the user in response to stylus inputs directed to the displayed screenshot), and a corner swipe input provided by a stylus in the lower-right corner of the touch screen optionally causes the electronic device to display the first content entry user interface element (e.g., without taking or displaying the screenshot of the user interface). The above-described manner of providing different responses in response to inputs corresponding to different portions of the boundary of the display generation component provides a quick and efficient way of providing for multiple different responses to the same type of input, without the need for separate inputs to be provided to the device or for additional/any selectable options for accessing those responses to be displayed and occupy space in the user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently while reducing errors in the usage of the device.

In some embodiments, the movement of the first user input includes a first portion of the movement followed by a second portion of the movement (706a), such as the movement of stylus 605 from FIG. 6C to 6D, and subsequent movement of stylus 605 from FIG. 6D to 6E (e.g., the stylus (e.g., while in contact with the touch screen) starts the first user input while close to the first respective portion of the boundary of the touch screen, and it moves closer to the center of the touch screen and/or away from the first respective portion of the boundary of the touch screen as the first input progresses), and displaying the first content entry user interface element includes, while detecting the first user input (706b) (e.g., before detecting liftoff of the stylus from the touch screen after the stylus has moved away from the first respective portion of the boundary of the touch screen and/or towards the center of the touch screen), in response to detecting the first portion of the movement of the first user input, displaying the first content entry user interface element with a first level of visual emphasis (706c), such as displaying notes user interface 608a at a relatively small size and/or with relatively high translucency in FIG. 6D, and in response to detecting the second portion of the movement of the first user input, displaying the first content entry user interface element with a second level, greater than the first level, of visual emphasis (706d), such as displaying notes user interface 608a at a relatively large size and/or with relatively low translucency in FIG. 6E. For example, when the first input just starts and/or the stylus is close to the first respective portion of the boundary of the touch screen, the electronic device displays a small and/or faded representation of the first content entry user interface element. As the first input progresses and/or the stylus moves further away from the first respective portion of the boundary of the touch screen (e.g., towards the center of the touch screen), the electronic device displays a larger and larger (e.g., and/or less and less faded) representation of the first content entry user interface element. In some embodiments, as the stylus moves further and further away from the first respective portion of the boundary of the touch screen and/or moves closer and closer to the center of the touch screen, the electronic device continues to increase the size and/or decreases the translucency of the first content entry user interface element. Thus, in some embodiments, the movement of the stylus controls the size and/or translucency of the first content entry user interface element. In some embodiments, there is a maximum size and/or minimum translucency at which the electronic device displays the first content entry user interface element, and further movement of the stylus after that size and/or translucency is reached optionally no longer changes the size and/or translucency of the first content entry user interface element. In some embodiments, such further movement of the stylus moves the first content entry user interface element (e.g., at the maximum size and/or minimum translucency) to different portions of the display region of the touch screen in accordance with such movement. The above-described manner of initially displaying the content entry user interface element with low visual emphasis, and increasing that visual emphasis based on movement of the input, provides a quick and efficient way of gradually introducing display of the content entry user interface element while reducing interference with what was displayed previously in the user interface, which simplifies the interaction between the user and the electronic device and enhances the operability of the electronic device and makes the user-device interface more efficient (e.g., by avoiding visual conflict between displayed elements that is not controlled by user input), which additionally reduces power usage and improves battery life of the electronic device by enabling the user to use the electronic device more quickly and efficiently while reducing errors in the usage of the device.

In some embodiments, the first content entry user interface element includes second respective content when the first user input is detected (706e), such as the content of Note A displayed in notes user interface 608a in FIGS. 6D-6E (e.g., the first content entry user interface element is not a new/blank content entry user interface element). For example, the first content entry user interface element was previously created in response to user input, and was populated with content (e.g., the second respective content) in response to user input, prior to the electronic device detecting the first user input. In some embodiments, the first content entry user interface element was ceased to be displayed after being populated with the content, and prior to the electronic device detecting the first user input. In some embodiments, in response to detecting the first portion of the movement of the first user input, the second respective content is displayed in the first content entry user interface element at the first level of visual emphasis (706f), such as displaying the content of Note A in notes user interface 608a in FIG. 6D. In some embodiments, in response to detecting the second portion of the movement of the first user input, the second respective content is displayed in the first content entry user interface element at the second level of visual emphasis (706g), such as displaying the content of Note A in notes user interface 608a in FIG. 6E. For example, while the electronic device increases the size and/or reduces the translucency of the first content entry user interface element while the first input progresses, the electronic device displays the content of the first content entry user interface element. In some embodiments, the size and/or translucency of the content of the first content entry user interface element is controlled corresponding to the size and/or translucency of the first content entry user interface element as the first user input progresses. The above-described manner of displaying a preview of the content of the first content entry user interface element while the first user input is progressing (e.g., and before completion of the first user input to fully display the first content entry user interface element) provides a quick and efficient way of indicating the content of the first content entry user interface element, which simplifies the interaction between the user and the electronic device and enhances the operability of the electronic device and makes the user-device interface more efficient (e.g., by allowing for display of the content of the content entry user interface element sooner than full display of the content entry user interface element is achieved), which additionally reduces power usage and improves battery life of the electronic device by enabling the user to use the electronic device more quickly and efficiently while reducing errors in the usage of the device.

In some embodiments, displaying the first content entry user interface element includes (708a), in accordance with a determination that the movement of the first user input is a first movement, displaying the first content entry user interface element in a first portion of the display region of the display generation component (708b), such as displaying notes user interface 608a in the lower-right portion of touch screen 504 in FIG. 6E, and in accordance with a determination that the movement of the first user input is a second movement, different from the first movement, displaying the first content entry user interface element in a second portion, different from the first portion, of the display region of the display generation component (708c), such as displaying notes user interface 608a more towards the center of touch screen 504 in FIG. 6F in response to additional/different movement of stylus 605. In some embodiments, the movement included in the first input controls the location of the display region in which the first content entry user interface element is displayed. For example, if the stylus provides a movement input from the lower-right corner of the touch screen to the upper left region of the touch screen, the electronic device ultimately displays the first content entry user interface element in the upper-left region of the display region of the touch screen (e.g., after displaying movement of the first content entry user interface element from the lower-right corner to the upper-left region of the display region of the touch screen in accordance with the movement of the stylus). Alternatively, if the stylus provides a movement input from the lower-right corner of the touch screen to the lower-right region of the display region of the touch screen, the electronic device ultimately displays the first content entry user interface element in the lower-right region of the display region of the touch screen (e.g., after displaying movement of the first content entry user interface element from the lower-right corner to the lower-right region of the display region of the touch screen in accordance with the movement of the stylus). In some embodiments, the location at which the first content entry user interface element is displayed is different for a given direction of movement depending on the type of movement provided. For example, a dragging movement moves the first content entry user interface element in accordance with the drag input (e.g., one-to-one movement), whereas a flick gesture (e.g., higher velocity, shorter duration, and/or higher acceleration) cause the electronic device to display the first content entry region at a different location in the direction of the flick (e.g., same as the direction of the drag) based on an inertial effect, as if the first content entry region were being flicked in the direction of the flick gesture (e.g., rather than being dragged). The above-described manner of displaying a content entry user interface element at different locations in the display region of the display generation component provides a quick and efficient way of allowing for user control of the display location of the first content entry user interface element, which simplifies the interaction between the user and the electronic device and enhances the operability of the electronic device and makes the user-device interface more efficient (e.g., by avoiding visual conflict/obstruction caused by placement of the first content entry user interface, as the movement of the input is able to control the display location of the first content entry user interface element), which additionally reduces power usage and improves battery life of the electronic device by enabling the user to use the electronic device more quickly and efficiently while reducing errors in the usage of the device.

In some embodiments, while displaying the first content entry user interface element, the electronic device detects (708d), via the one or more input devices, a third user input corresponding to the portion of the display region of the display generation component in which the first content entry user interface element is displayed, such as the input provided by stylus in FIGS. 6J-6K (e.g., a swipe input detected on/within the first content entry user interface element (e.g., provided by a stylus or a finger)). In some embodiments, the swipe input is horizontal swipe input that starts (e.g., with touchdown of the finger or stylus) and/or ends (e.g., with liftoff of the finger or stylus) within the first content entry user interface element. In some embodiments, this swipe input is different from a swipe input that starts within the first content entry user interface element and that ends outside of the first content entry user interface element, which optionally causes the first content entry user interface element to be dragged to different locations in the display region of the touch screen in accordance with the swipe, rather than swiping between different content entry user interface elements without changing the location in the display region of the touch screen in which the content entry user interface elements are displayed, as will be described below. In some embodiments, a vertical swipe within the first content entry user interface element causes the electronic device to scroll the content of the first content entry user interface element in accordance with the vertical swipe input rather than swipe between content entry user interface elements, as will be described below.

In some embodiments, in response to detecting the third user input (708e), in accordance with a determination that the third user input corresponds to a swipe input (7080 (e.g., and not a drag input to move the first content entry user interface element, or a content entry input to add content to the first content entry user interface element), the electronic device ceases (708g) display of the first content entry user interface element in the portion of the display region of the display generation component, such as ceasing display of Note A from FIGS. 6J-6K (e.g., sliding the first content entry user interface element off an edge of the portion of the display region of the touch screen in accordance with the swipe input), and the electronic device displays (708h), in the portion of the display region of the display generation component, a second content entry user interface element, such as revealing display of Note B from FIGS. 6J-6K (e.g., sliding the second content entry user interface element on from an edge of the portion of the display region of the touch screen in accordance with the swipe input). In some embodiments, the first and second content entry user interface elements are displayed within a window (e.g., of a note taking application) that occupies the portion of the display region of the touch screen, and the swipe input causes the first content entry user interface element to be swiped off/away from that window, and causes the second content entry user interface element to be swiped into that window. In some embodiments, the second content entry user interface element is a previously created and/or populated content entry user interface element (e.g., is not a new/blank content entry user interface element). In some embodiments, a swipe in one direction (e.g., leftward) causes the second content entry user interface element to be displayed, and swipe in a different direction (e.g., rightward) causes a third content entry user interface element to be displayed. In some embodiments, the third content entry user interface element is a previously created and/or populated content entry user interface element (e.g., is not a new/blank content entry user interface element). The above-described manner of displaying another content entry user interface element provides a quick and efficient way of cycling between different content entry user interface elements, which simplifies the interaction between the user and the electronic device and enhances the operability of the electronic device and makes the user-device interface more efficient (e.g., by avoiding the need for dedicated user interface buttons or other kinds of inputs (e.g., other than finger and/or stylus movement inputs) to be used for viewing different content entry user interface elements), which additionally reduces power usage and improves battery life of the electronic device by enabling the user to use the electronic device more quickly and efficiently while reducing errors in the usage of the device.

In some embodiments, while displaying the first content entry user interface element, the electronic device detects (710a), via the one or more input devices, a third user input corresponding to the portion of the display region of the display generation component in which the first content entry user interface element is displayed, such as input provided by contacts 603a and 603b in FIGS. 6H to 6I (e.g., a finger and/or stylus input that starts (e.g., with touchdown of the finger or stylus) and/or ends (e.g., with liftoff of the finger or stylus) within the first content entry user interface element). In some embodiments, in response to detecting the third user input (710b), in accordance with a determination that the third user input corresponds to movement of the contacts relative to each other, such as input provided by contacts 603a and 603b in FIGS. 6H to 6I (e.g., a pinch input (e.g., touchdown of two contacts within the first content entry user interface element, followed by movement of one or both of the contacts such that the distance between the two contacts decreases) or a depinch input (e.g., touchdown of two contacts within the first content entry user interface element, followed by movement of one or both of the contacts such that the distance between the two contacts increases)), the electronic device modifies (710c) a size of (e.g., scaling) the first content entry user interface element in accordance with the third user input, such as scaling notes user interface 608a in FIG. 6I. For example, movement of one or both of the contacts such that the distance between the two contacts decreases causes the electronic device to decrease the size of the first content entry user interface element in the display region of the touch screen in accordance with the distance between the two contacts. In some embodiments, movement of one or both of the contacts such that the distance between the two contacts increases causes the electronic device to increase the size of the first content entry user interface element in the display region of the touch screen in accordance with the distance between the two contacts. The above-described manner of resizing the first content entry user interface element provides a quick and efficient way of allowing for resizing of content entry user interface elements, which simplifies the interaction between the user and the electronic device and enhances the operability of the electronic device and makes the user-device interface more efficient (e.g., by avoiding the need for dedicated user interface buttons or other kinds of inputs (e.g., other than finger and/or stylus movement inputs) to be used for resizing content entry user interface elements), which additionally reduces power usage and improves battery life of the electronic device by enabling the user to use the electronic device more quickly and efficiently while reducing errors in the usage of the device.

In some embodiments, while displaying the first content entry user interface element, the electronic device detects (710d), via the one or more input devices, a third user input including movement from the first content entry user interface element to the first respective portion of the boundary of the display region of the display generation component, such as the input of stylus 605 in FIGS. 6Q to 6S (e.g., touchdown of a stylus or finger within the first content entry user interface element, followed by movement of the stylus or finger (while remaining touched down on the touch screen) to the portion of the boundary of the display region via which the first content entry user interface element was displayed). In some embodiments, in response to detecting the third user input, the electronic device ceases (710e) display of the first content entry user interface element, such as shown in FIG. 6S. For example, the movement of the stylus or finger to the same portion of the boundary of the display region from which the first content entry user interface element was displayed (e.g., via the first user input) optionally causes the device to cease display of the first content entry user interface element. In some embodiments, movement to a different portion of the boundary of the display region of the display generation component does not cease display of the first content entry user interface element (e.g., the device maintains display of the first content entry user interface element). In some embodiments, movement of the stylus or finger to within a threshold distance (e.g., 0.1, 0.2, 0.5, 1, 3, 5, 10 cm) of the portion of the boundary of the display region of the display generation component (e.g., followed by liftoff of the finger or stylus) is sufficient to cease display of the first content entry user interface element. In some embodiments, if the third user input is detected after liftoff of the stylus in the first user input, the device does not cease display of the first content entry user interface element in response to the third user input (e.g., the third user input must occur before liftoff/the end of the first user input that caused the first content entry user interface element to be displayed). In some embodiments, the device ceases display of the first content entry user interface element in response to the third user input regardless of whether the third user input is detected after liftoff of the stylus in the third user input. In some embodiments, if the third user input is provided by a finger, the device maintains display of the first content entry user interface element, but if the third user input is provided by a stylus, the device ceases display of the first content entry user interface element. The above-described manner of ceasing display of the first content entry user interface element provides a quick and efficient way of removing display of the content entry user interface element without the need for different kinds of inputs or dedicated user interface elements, which simplifies the interaction between the user and the electronic device and enhances the operability of the electronic device and makes the user-device interface more efficient (e.g., by allowing the first content entry user interface element to be displayed or removed from display using the same type of input (e.g., movement inputs)), which additionally reduces power usage and improves battery life of the electronic device by enabling the user to use the electronic device more quickly and efficiently while reducing errors in the usage of the device.

In some embodiments, while displaying, via the display generation component, the user interface without displaying the first content entry user interface element, such as shown in FIG. 6V (e.g., before detecting the first user input, or after detecting the second user input and after the first content entry user interface element has been removed from display, such as described above. In some embodiments, no content entry user interface element (e.g., no notes from the note taking application) is displayed when the third and fourth user inputs, described below, are detected), the electronic device detects (712a) a third user input corresponding to a request to display a system user interface, such as the input from contact 603 in FIGS. 6V-6W (e.g., a corner and/or downward swipe gesture from a different portion of the boundary of the display region of the touch screen than in which the first user input was detected, such as the top-right corner of the display region of the touch screen. In some embodiments, the third user input is provided via a finger of the user. In some embodiments, the third user input is provided via a stylus). In some embodiments, in response to detecting the third user input, the electronic device displays (712b), via the display generation component, the system user interface, such as shown in FIG. 6W, wherein the system user interface includes a selectable option that is selectable to display the first content entry user interface element, such as selectable option 622 in FIG. 6W (e.g., the system user interface is optionally a control center user interface of the device via which a plurality of functionalities of the device is controllable). In some embodiments, the control center user interface is overlaid on the user interface. In some embodiments, the control center user interface includes selectable options to toggle on or off one or more of the following functionalities of the device: Wi-Fi, Bluetooth, cellular radio, etc. In some embodiments, the control center user interface includes selectable options to access one or more of the following functionalities of the device: camera, calculator, media playback, etc. In some embodiments, the control center user interface also includes a selectable option that is selectable to display content entry user interface elements, such as the first content entry user interface element.

In some embodiments, while displaying the system user interface, the electronic device detects (712c), via the one or more input devices, a fourth user input corresponding to selection of the selectable option, such as by contact 603 in FIG. 6X (e.g., a tap on the selectable option for displaying content entry user interface elements using a stylus or finger). In some embodiments, in response to detecting the fourth user input, the electronic device displays (712d), via the display generation component, the first content entry user interface element, such as display of notes user interface 608a in FIG. 6Y (e.g., and ceasing display of the control center user interface). In some embodiments, the first content entry user interface element is displayed overlaid on the user interface or next to a resized version of the user interface. In some embodiments, the content entry user interface element that is displayed in response to the fourth user input is the last-displayed and/or last-edited/populated content entry user interface element (e.g., the last time a content entry user interface element was displayed by the device). The above-described manner of displaying a content entry user interface element provides a quick and efficient way of accessing the content entry user interface element, which simplifies the interaction between the user and the electronic device and enhances the operability of the electronic device and makes the user-device interface more efficient (e.g., by allowing for multiple ways to access the content entry user interface element, even without the use of a stylus), which additionally reduces power usage and improves battery life of the electronic device by enabling the user to use the electronic device more quickly and efficiently while reducing errors in the usage of the device.

In some embodiments, while displaying, via the display generation component, a content entry user interface without displaying the first content entry user interface element, such as content editing toolkit 620 of FIG. 6U (e.g., while displaying a content entry user interface that includes one or more options for controlling content to be entered into a user interface, such as including one or more selectable options for selecting a currently active content entry tool (e.g., a highlighter tool, a pen tool, a pencil tool, etc.) that controls the characteristics of content drawn into the user interface using a stylus. The content entry user interface additionally or alternatively includes one or more selectable options for selecting the color for the currently active content entry tool, selecting font characteristics (e.g., font style, font color, font size, etc.) for text in (or to be entered into) the user interface, etc. The content entry user interface is optionally overlaid on the user interface into which content has been or can be entered, such as the user interface of a notetaking application or a drawing application. In some embodiments, the content entry user interface is automatically displayed by the electronic device when displaying a user interface into which content can be entered (e.g., using a stylus)), the electronic device detects (712 e), via the one or more input devices, a third user input that includes selection of a selectable option in the content entry user interface, such as selection of option 671 in FIG. 6U by a contact (e.g., the content entry user interface includes a selectable option that is selectable to display the first content entry user interface element). In some embodiments, in response to detecting the third input, the electronic device displays (7120, via the display generation component, the first content entry user interface element, such as displaying notes user interface 608 a in response to selection of option 671 in FIG. 6U (e.g., overlaid on the user interface or next to a resized version of the user interface, as described earlier). Thus, in some embodiments, additionally or alternatively to being accessible via an edge swipe gesture, the first content entry user interface element is accessible in response to selection of a corresponding selectable option in a content entry user interface element. The above-described manner of displaying a content entry user interface element provides a quick and efficient way of accessing the content entry user interface element in situations where content entry is occurring and access to the content entry user interface element is likely, which simplifies the interaction between the user and the electronic device and enhances the operability of the electronic device and makes the user-device interface more efficient (e.g., by allowing for multiple ways to access the content entry user interface element, even without the use of a stylus), which additionally reduces power usage and improves battery life of the electronic device by enabling the user to use the electronic device more quickly and efficiently while reducing errors in the usage of the device.

In some embodiments, while displaying, via the display generation component, a text entry user interface element that includes one or more selectable options that are selectable to enter predicted text into the user interface, such as options 678*a*-678*c* in FIG. 6AB (e.g., a quick-type bar that is populated with one or more selectable options corresponding to predicted text while a user is providing text (e.g., keyboard, software or hardware) input to a user interface that can accept text input (e.g., a note taking user interface, an email user interface, a messaging user interface, etc.). In some embodiments, the provided predicted text options are based on the text that the user has entered so far, which optionally corresponds to a portion (but not the entirety of) the predicted text options (e.g., corresponding to full words). In some embodiments, selection of one of the predicted text options causes the device to enter the corresponding predicted text into the user interface. In some embodiments, the text entry user interface element is displayed concurrently with the user interface into which text is being entered) without displaying the first content entry user interface element, the electronic device detects (714*a*), via the one or more input devices, a third user input that includes selection of a selectable option of the one or more selectable options in the text entry user interface element, such as selection of option 679 in FIG. 6AB (e.g., one of the selectable options in the text entry user interface element is a selectable option that is selectable to display the first content entry user interface element). In some embodiments, in response to detecting the third input, the electronic device displays (714*b*), via the display generation component, the first content entry user interface element, such as displaying notes user interface 608*a* in response to detecting selection of option 679 in FIG. 6AB (e.g., overlaid on the user interface or next to a resized version of the user interface, as described earlier). Thus, in some embodiments, additionally or alternatively to being accessible via an edge swipe gesture, the first content entry user interface element is accessible in response to selection of a corresponding selectable option in a text entry user interface element. The above-described manner of displaying a content entry user interface element provides a quick and efficient way of accessing the content entry user interface element in situations where content entry is occurring and access to the content entry user interface element is likely, which simplifies the interaction between the user and the electronic device and enhances the operability of the electronic device and makes the user-device interface more efficient (e.g., by allowing for multiple ways to access the content entry user interface element, even without the use of a stylus), which additionally reduces power usage and improves battery life of the electronic device by enabling the user to use the electronic device more quickly and efficiently while reducing errors in the usage of the device.

In some embodiments, while displaying, via the display generation component, a user interface of an application that includes one or more selectable options that are selectable to perform corresponding operations associated with the application, such as web browser navigation option of user interface 602*a* in FIG. 6T (e.g., while displaying a user interface of a web browser application that includes one or more selectable options to, for example, bookmark the currently displayed web page, navigate backward to a previously displayed web page, navigate forward to another web page, share (e.g., via a messages application, via email, etc.) the web page with another electronic device, etc. In some embodiments, the one or more selectable options are displayed in a toolbar portion of the user interface of the application (e.g., separate from a portion of the user interface that displays content)) without displaying the first content entry user interface element, the electronic device detects (714*c*), via the one or more input devices, a third user input that includes selection of a selectable option of the one or more selectable options in the user interface of the application, such as selection of option 672 in user interface 602*a* of FIG. 6T (e.g., one of the selectable options in the toolbar of the user interface of the application is a selectable option that is selectable to display the first content entry user interface element. In some embodiments, the selectable option that is selectable to display the first content entry user interface element is displayed in response to selecting a selectable option in the toolbar (e.g., the sharing selectable option) of the user interface of the application). In some embodiments, in response to detecting the third input, the electronic device displays (714d), via the display generation component, the first content entry user interface element, such as displaying notes user interface 608a in response to selection of option 672 in FIG. 6T (e.g., overlaid on the user interface of the application or next to a resized version of the user interface of the application, as described earlier). Thus, in some embodiments, additionally or alternatively to being accessible via an edge swipe gesture, the first content entry user interface element is accessible in response to selection of a corresponding selectable option in a user interface of an application. The above-described manner of displaying a content entry user interface element provides a quick and efficient way of accessing the content entry user interface element in situations where content is displayed (e.g., in the user interface of the application, such as web page content) and access to the content entry user interface element is likely, which simplifies the interaction between the user and the electronic device and enhances the operability of the electronic device and makes the user-device interface more efficient (e.g., by allowing for multiple ways to access the content entry user interface element, even without the use of a stylus), which additionally reduces power usage and improves battery life of the electronic device by enabling the user to use the electronic device more quickly and efficiently while reducing errors in the usage of the device.

In some embodiments, after detecting the second user input, the electronic device detects (716a) a third user input corresponding to a request to display a respective user interface of a note taking application that is associated with the first content entry user interface element, such as an input to display the user interface of FIG. 6Z (e.g., an input selecting an application icon for the note taking application that is selectable to launch and/or display a user interface of the note taking application). In some embodiments, the respective user interface of the note taking application is a user interface from which various (e.g., all) notes that have been saved on the device (e.g., including the first content entry user interface element) are accessible. In some embodiments, the user interface that was displayed when the first user input was detected is not a user interface of the note taking application. In some embodiments, the application icon for the note taking application is displayed in the user interface that was displayed when the first user input was detected. In some embodiments, the user interface that was displayed when the first user input was detected does not include the application icon for the note taking application (e.g., further input to navigate from the user interface to the application icon of the note taking application is required). In some embodiments, the first content entry user interface element is not displayed when the third user input is detected. In some embodiments, the first content entry user interface element is displayed when the third user input is detected.

In some embodiments, in response to detecting the third user input, the electronic device displays (716b), via the display generation component, the respective user interface, such as the user interface of FIG. 6Z, wherein the respective user interface includes one or more representations of first one or more content entry user interface elements that were created in response to input detected within the respective user interface (716c), such as representations 654a-654f in FIG. 6Z corresponding to notes created within the note taking application (e.g., representations of notes that are note created and/or displayed in response to inputs such as the first user input). In some embodiments, the first one or more content entry user interface elements are notes that can be created and edited only from/within the respective user interface of the note taking application. In some embodiments, the first one or more content entry user interface elements cannot be displayed outside of the note taking application. In some embodiments, the representations of the first one or more content entry user interface elements are selectable to display, within the note taking application and/or respective user interface, the content of the content entry user interface element corresponding to the selected representation. In some embodiments, the respective user interface includes one or more representations of second one or more content entry user interface elements, including the first content entry user interface element, that were created outside of the respective user interface in response to inputs that include movement relative to the boundary of the display region of the touchscreen, including the first user input (716d), such as representations 609a-609d in FIG. 6Z. For example, the second one or more content entry user interface elements are creatable and/or editable outside of the user interface of the note taking application (e.g., while a user interface of the note taking application is not being displayed), such as described in this disclosure. In some embodiments, even though these content entry user interface elements are creatable/editable/viewable outside of the note taking application as described in this disclosure, these content entry user interface elements are also accessible from within the note taking application (e.g., via the respective user interface). In some embodiments, the representations of the second one or more content entry user interface elements are selectable to display, within the note taking application and/or respective user interface, the content of the content entry user interface element corresponding to the selected representation. The above-described manner of displaying different content entry user interface elements provides a quick and efficient way of accessing different content entry user interface elements (e.g., from the same user interface) even if those content entry user interface elements are creatable/viewable/editable in different manners and from different user interfaces, which simplifies the interaction between the user and the electronic device and enhances the operability of the electronic device and makes the user-device interface more efficient (e.g., by not requiring different inputs to access different user interfaces from which to access the different content entry user interface elements), which additionally reduces power usage and improves battery life of the electronic device by enabling the user to use the electronic device more quickly and efficiently while reducing errors in the usage of the device.

In some embodiments, the one or more representations of the first one or more content entry user interface elements are displayed in the respective user interface in a first arrangement (718a), such as the list of representations 654a-654f in FIG. 6Z (e.g., the representations of the first content entry user interface elements are displayed as a (e.g., vertical and/or one-dimensional) list in a first region of the respective user interface). In some embodiments, the list of representations is a list of titles for the first one or more content entry user interface elements, selection of one of which causes display of the content of the selected one of the first content entry user interface elements (e.g., but not others of the first content entry user interface elements) to be displayed in a second region, different from the first region, of the respective user interface. In some embodiments, the one or more representations of the first one or more content entry user interface elements do not include a preview of content of the first one or more content entry user interface elements (718b), such as representations 654a-654f in FIG. 6Z not including the content of those respective notes (e.g., the representations of the first content entry user interface elements include only the titles of the content entry user interface elements, but do not include representations of other content of those content entry user interface elements). In some embodiments, the one or more representations of the second one or more content entry user interface elements are displayed in the respective user interface in a second arrangement, different from the first arrangement (718c), such as representations 609a-609d being arranged in a grid arrangement in FIG. 6Z (e.g., the representations of the second content entry user interface elements are displayed in a (e.g., two-dimensional) grid in the second region of the respective user interface). In some embodiments, the grid of representations is displayed in response to detecting selection of a selectable option that is in the first region of the respective user interface that is selectable to display the representations of the second content entry user interface elements in the second region of the respective user interface. In some embodiments, the one or more representations of the second one or more content entry user interface elements include previews of the content of the second one or more content entry user interface elements (718d), such representation 609a including at least a portion of Content A for Note A, representation 609b including at least a portion of Content B for Note B, etc., in FIG. 6Z (e.g., the representations of the second content entry user interface elements include snapshots of the content of the second content entry user interface elements). In some embodiments, the content displayed in the representations of the second content entry user interface elements is the same content that would be displayed in those content entry user interface elements if they were to be displayed in response to the first user input (e.g., overlaid on, or concurrently with, the user interface that was displayed when the first user input was detected). The above-described manner of displaying previews of the content of the second content entry user interface elements provides a quick and efficient way for a user to access/view the content of those content entry user interface elements, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently while reducing errors in the usage of the device.

In some embodiments, the first content entry user interface element is associated with a notes application (718e) (e.g., the note taking application described above), and in response to detecting the first user input, in accordance with a determination that the first user input is detected while a content entry user interface element of the notes application is not displayed via the display generation component (e.g., the first user input is detected when no content entry user interface element of the note taking application is being displayed. For example, a home screen user interface of a web browser user interface is being displayed by the device when the first user input is detected, without the display of any notes (e.g., displayed in response to an earlier corner swipe input) via the display generation component), the first content entry user interface element is a most recently edited content entry user interface element of the notes application (7180, such as Note A already including Content A when notes user interface 608a is displayed in FIG. 6F in response to the input from stylus 605. For example, the content entry user interface element that is displayed when another content entry user interface element is not being displayed when the first user input is detected is a last-displayed, last-edited, last-created and/or last-populated (or, in some embodiments, simply a prior-displayed, prior-edited, prior-created and/or prior-populated) content entry user interface element when a content entry user interface element was last displayed by the device. For example, prior to detecting the first user input, the device optionally detected a sequence of inputs that created and/or populated the first content entry user interface element, and subsequently ceased display of the first content entry user interface element (e.g., as described previously). Subsequently, the device optionally detected the first user input (e.g., without any intervening inputs that would have caused another content entry user interface element to be the content entry user interface element that was last-displayed prior to detection of the first user input), and in response, displayed the first content entry user interface element (e.g., including the content that was previously entered into the first content entry user interface element. In some embodiments, if another content entry user interface element was the last-displayed, last-edited, last-created and/or last-populated content entry user interface element, that content entry user interface element would have been displayed by the electronic device in response to the first user input (e.g., instead of displaying the first content entry user interface element). The above-described manner of displaying a last-displayed content entry user interface element provides a quick and efficient way of resuming interaction with a content entry user interface element, which simplifies the interaction between the user and the electronic device and enhances the operability of the electronic device and makes the user-device interface more efficient (e.g., by avoiding the need for further inputs, other than the input for displaying the content entry user interface element, to navigate to the last-displayed content entry user interface element), which additionally reduces power usage and improves battery life of the electronic device by enabling the user to use the electronic device more quickly and efficiently while reducing errors in the usage of the device.

In some embodiments, in response to detecting the first user input (720a), in accordance with a determination that the first user input is detected while a content entry user interface element of the notes application is being displayed via the display generation component, such as the input from stylus 605 in FIGS. 6L-6N while Note B was already displayed in notes user interface 608a (e.g., a prior user input caused display of a note from the note taking application concurrently with (e.g., overlaid on or displayed next to a resized version of) the user interface, and the first user input is detected while that note is being displayed. In some embodiments, the note that is displayed when the first user input is detected is a different note than the first content entry user interface element. In some embodiments, the prior user input for displaying that note is a corner swipe gesture that is similar and/or the same as the first user input. In some embodiments, the prior user input for displaying that note is selection of a selectable option for displaying the note that is displayed in a control center user interface of the device, as previously described), the first content entry user interface element corresponds to a new note associated with the notes application (720*b*), such as the display of Note D in notes user interface 608*a* in FIG. 6N. For example, when the first user input is detected while a content entry user interface element is already being displayed, the first user input causes the device to create and/or display a new/blank content entry user interface element (e.g., rather than displaying a previously-created and/or displayed content entry user interface element). The above-described manner of displaying a new content entry user interface element provides a quick and efficient way of generating new notes, which simplifies the interaction between the user and the electronic device and enhances the operability of the electronic device and makes the user-device interface more efficient (e.g., by allowing for the same type of input to be used to generate new notes as is used to display new notes in the first instance, without the need for different types of inputs or dedicated buttons for doing so), which additionally reduces power usage and improves battery life of the electronic device by enabling the user to use the electronic device more quickly and efficiently while reducing errors in the usage of the device.

In some embodiments, the content entry user interface element of the notes application that is displayed when the first user input is detected is displayed within a respective user interface of the notes application, such as notes user interface 608*a* (e.g., a window or container of the note taking application contains the note that is displayed when the first user input is detected. In some embodiments, the window or container displays (e.g., the content of) a single note of the note taking application at any moment in time), and the first content entry user interface element is displayed within the respective user interface of the notes application in response to the first user input (720*c*), such as Note B being displayed within notes user interface 608*a* in FIG. 6L. For example, the newly created first content entry user interface element is displayed in place of the prior-displayed content entry user interface element within the window or container of the note taking application in response to detecting the first user input. In some embodiments, the location and/or size in the display region of the touch screen at which the window/container of the note taking application is displayed is not changed in response to the first user input. Thus, in some embodiments, the first content entry user interface element is displayed at the same location and/or size in the display region of the touch screen as was the prior-displayed content entry user interface element in response to the first user input. The above-described manner of displaying the first content entry user interface element ensures continuity of the arrangement of what is displayed on the touch screen during/in response to the first user input, which simplifies the interaction between the user and the electronic device and enhances the operability of the electronic device and makes the user-device interface more efficient (e.g., by avoiding changes to the arrangement of what is displayed by the touch screen in response to the first user input), which additionally reduces power usage and improves battery life of the electronic device by enabling the user to use the electronic device more quickly and efficiently while reducing errors in the usage of the device.

In some embodiments, while detecting the first user input, the electronic device displays (720*d*) an animation of the content entry user interface element moving out of the respective user interface, and displaying an animation of the first content entry user interface element moving into the respective user interface, such as the sliding off of Note B and the sliding on of Note D in FIGS. 6M-6N. In some embodiments, the progress through the animation is controlled by the movement of the first user input such that if the movement of the first user input stops, the animation stops (e.g., without proceeding to conclusion), if the movement of the first user input reverses (e.g., back towards the portion of the boundary of the display region of the touch screen from which the first user input started), the animation reverses, etc. In some embodiments, the animation is the content entry user interface element sliding out (e.g., leftward, from the left side) out of the window/container of the note taking application while the first content entry user interface element slides into (e.g., leftward, from the right side) the window/container of the note taking application. Thus, in some embodiments, the device displays that the prior-displayed note (and its content) is being removed from display as the first user input progresses, and the new note (e.g., without any content) is being added to the display as the first user input progresses. The above-described manner of displaying the transition from the prior-displayed note to the newly-displayed note provides a quick and efficient indication of the upcoming results of the user's input, which simplifies the interaction between the user and the electronic device and enhances the operability of the electronic device and makes the user-device interface more efficient (e.g., by providing for opportunity for the user to change their input if the upcoming results of the user's input are incorrect), which additionally reduces power usage and improves battery life of the electronic device by enabling the user to use the electronic device more quickly and efficiently while reducing errors in the usage of the device.

In some embodiments, while displaying, via the display generation component, a user interface that includes a cursor without displaying the first content entry user interface element (e.g., while displaying any user interface of the electronic device, whether a user interface of an operating system of the electronic device or a user interface of an application installed on the electronic device), the electronic device detects (722*a*), via the one or more input devices, a third user input that includes moving the cursor to a predefined portion of the display region of the display generation component, such as movement of a cursor to a lower-right corner of the touch screen 504 (e.g., a lower-right corner of the display region, and not a lower or right edge of the display region). In some embodiments, in response to detecting the third user input, the electronic device displays (722*b*), via the display generation component, the first content entry user interface element, such as in a similar manner to the display of notes user interface 608*a* in FIG. 6F (e.g., overlaid on the user interface or next to a resized version of the user interface, as described earlier). Thus, in some embodiments, additionally or alternatively to being accessible via an edge swipe gesture, the first content entry user interface element is accessible in response to movement of a cursor to a predefined portion of the (e.g., edge of the) display region of the display generation component. In some embodiments, the electronic device does not display the first content entry user interface element if the third user input is movement of the cursor to a different portion of the (e.g., edge of the) display region of the display generation component, such as the lower-left corner of the display generation component. The above-described manner of displaying a content entry user interface element provides a quick and efficient way of accessing the content entry user interface element in situations where cursor input is being provided to the electronic device, which simplifies the interaction between the user and the electronic device and enhances the operability of the electronic device and makes the user-device interface more efficient (e.g., by allowing for multiple ways to access the content entry user interface element, even without the use of a stylus), which additionally reduces power usage and improves battery life of the electronic device by enabling the user to use the electronic device more quickly and efficiently while reducing errors in the usage of the device.

In some embodiments, while displaying, via the display generation component, a user interface without displaying the first content entry user interface element (e.g., while displaying any user interface of the electronic device, whether a user interface of an operating system of the electronic device or a user interface of an application installed on the electronic device), the electronic device detects (722c), via the one or more input devices, a third user input that includes keyboard input (e.g., from a physical keyboard in communication with the electronic device or from a soft keyboard displayed by the electronic device). In some embodiments, in response to detecting the third user input, in accordance with a determination that the keyboard input corresponds to a predefined keyboard input associated with the first content entry user interface element (e.g., a keyboard shortcut for displaying the first content entry user interface element, such as selection of the shift key concurrently with selection of a particular letter key), the electronic device displays (722d), via the display generation component, the first content entry user interface element, such as in a similar manner to the display of notes user interface 608a in FIG. 6F (e.g., overlaid on the user interface or next to a resized version of the user interface, as described earlier). Thus, in some embodiments, additionally or alternatively to being accessible via an edge swipe gesture, the first content entry user interface element is accessible in response to keyboard input for displaying the first content entry user interface element. In some embodiments, the electronic device does not display the first content entry user interface element if the third user input is a keyboard input that does not correspond to displaying the first content entry user interface element (e.g., a different keyboard shortcut, an incorrect keyboard shortcut, or simply input for entering text into the user interface). The above-described manner of displaying a content entry user interface element provides a quick and efficient way of accessing the content entry user interface element in situations where keyboard input is being provided to the electronic device, which simplifies the interaction between the user and the electronic device and enhances the operability of the electronic device and makes the user-device interface more efficient (e.g., by allowing for multiple ways to access the content entry user interface element, even without the use of a stylus), which additionally reduces power usage and improves battery life of the electronic device by enabling the user to use the electronic device more quickly and efficiently while reducing errors in the usage of the device.

It should be understood that the particular order in which the operations in FIGS. 7A-7K have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIGS. 7A-7K. For example, the content entry user interface elements and/or methods for displaying or interacting with the content entry user interface elements described above with reference to method 700 optionally have one or more of the characteristics of the content entry user interface elements and/or methods for displaying or interacting with the content entry user interface elements, etc., described herein with reference to other methods described herein (e.g., method 900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 7A-7K are, optionally, implemented by components depicted in FIGS. 1A-1B. For example, displaying operations 702b and 702d, and detecting operations 702a and 702c, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Contextual Linking of Content in Notes

Users interact with electronic devices in many different manners, including entering content into notes. In some circumstances, the content that is entered is content that is manually copied and pasted into the notes by a user. The embodiments described below provide ways in which an electronic device facilitates the addition of content displayed with a note to the note, thus enhancing interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
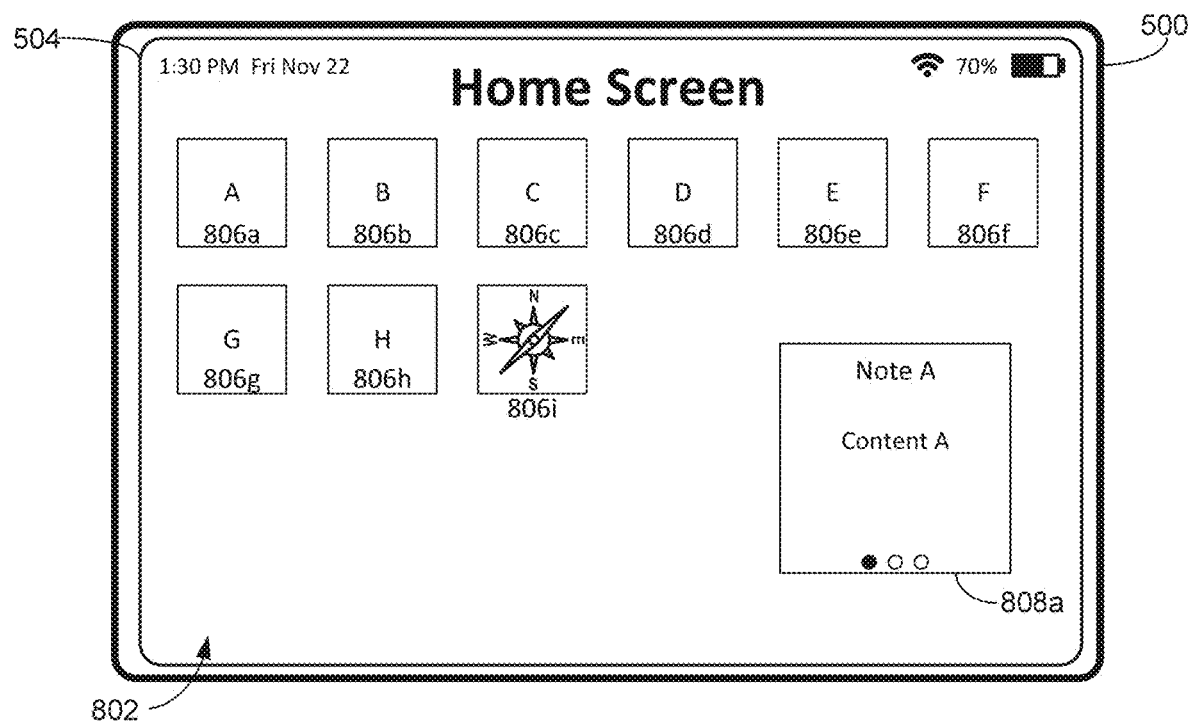
FIGS. 8A-8AR illustrate exemplary ways in which an electronic device facilitates the addition of content displayed with a note to the note in accordance with some embodiments.

FIGS. 8A-8AR illustrate exemplary ways in which an electronic device facilitates the addition of content displayed with a note to the note in accordance with some embodiments. The embodiments in these figures are used to illustrate the processes described below, including the processes described with reference to FIGS. 9A-9N.

FIG. 8A illustrates electronic device 500 displaying user interface 802 (e.g., via a display device, via a display generation component, etc.). In some embodiments, user interface 802 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 802 is a user interface of an operating system of device 500 (e.g., an operating system user interface). For example, in FIG. 8A, user interface 802 is a home screen user interface of device 500 (e.g., such as described with reference to FIG. 4A). Home screen user interface 802 includes a number of options (e.g., icons) 806 corresponding to different applications. For example, option 806i is selectable to display a web browser application via touch screen 504, and option 806b is selectable to display a user interface of Application B via touch screen 504. In FIG. 8A, device 500 is also displaying notes user interface 808a (e.g., corresponding to notes user interface 608a described with reference to FIGS. 6A-6AD and method 700), which is optionally displayed in response to one or more inputs described with reference to FIGS. 6A-6AD and method 700.

In some embodiments, when notes user interface 808a is displayed with content surrounding and/or behind notes user interface 808a that can be entered into notes user interface 808a, device 500 displays an option with (e.g., within) notes user interface 808a that is selectable to cause that content to be entered into notes user interface 808a. However, in some embodiments, device 500 does not display such an option when the user interface with which notes user interface 808a is displayed is an operating system user interface, such as user interface 802. Therefore, in FIG. 8A, device 500 is not displaying such an option with (e.g., within) notes user interface 808a. If the content/user interface with which notes user interface 808a is displayed changes to include content from a non-operating system user interface, device 500 optionally begins displaying an option with (e.g., within) notes user interface 808a that is selectable to cause that content to be entered into notes user interface 808a.

Figure 8B:
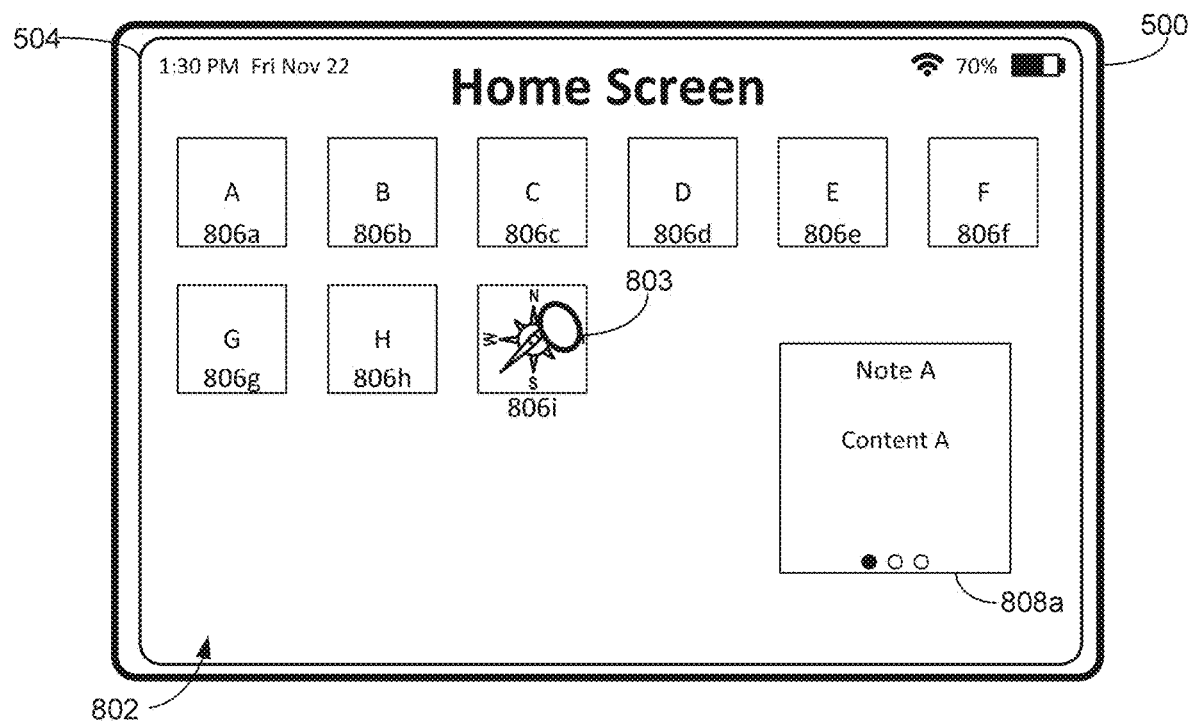
Figure 8C:
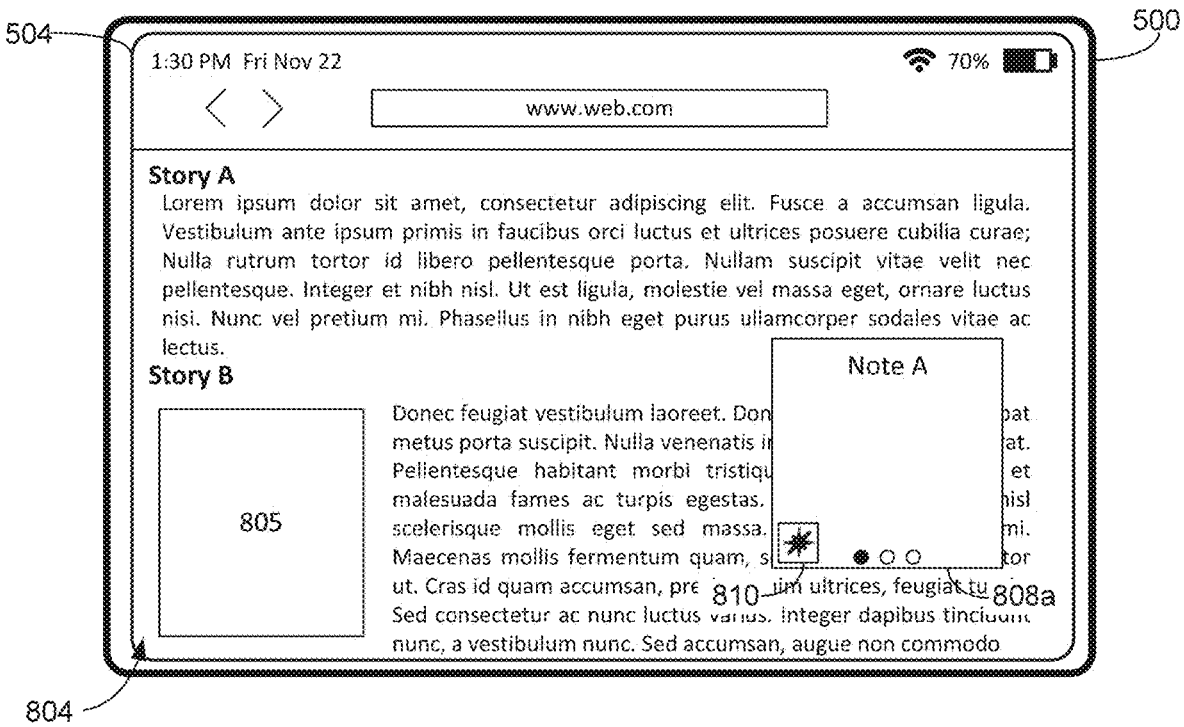

For example, in FIG. 8B, device 500 detects selection of option 806i (e.g., via a tap of contact 803), and in response, ceases display of user interface 802 and displays user interface 804, which is a user interface of a web browser application, as shown in FIG. 8C. As shown in FIG. 8C, device 500 maintains display of notes user interface 808a (e.g., at the same location on touch screen 504) while replacing display of user interface 802 with user interface 804. Also as shown in FIG. 8C, because the user interface surrounding and/or with which notes user interface 808a is displayed is a non-operating system user interface (e.g., a user interface of a web browser application) and/or includes content that is not content included in an operating system user interface, device 500 displays option 810 in notes user interface 808a (e.g., in the lower-left corner of notes user interface 808a). Option 810 is optionally selectable to cause device to copy the content displayed with/surrounding notes user interface 808a, and paste that content into the currently displayed note in notes user interface 808a (e.g., Note A). In some embodiments, option 810 includes a representation of the application to which the user interface surrounding notes user interface 808a corresponds (e.g., the compass image from the application icon 806i for the web browser application) to indicate from which application content will be added to Note A in notes user interface 808a if option 810 is selected.

Figure 8D:
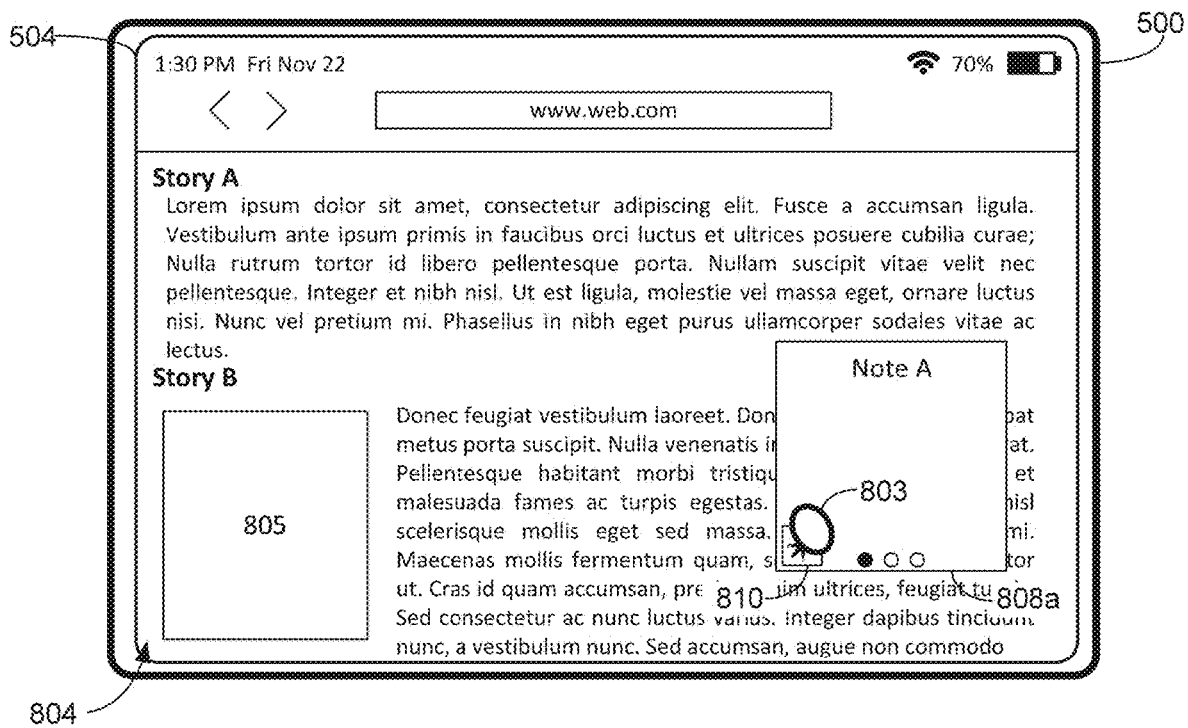
Figure 8E:
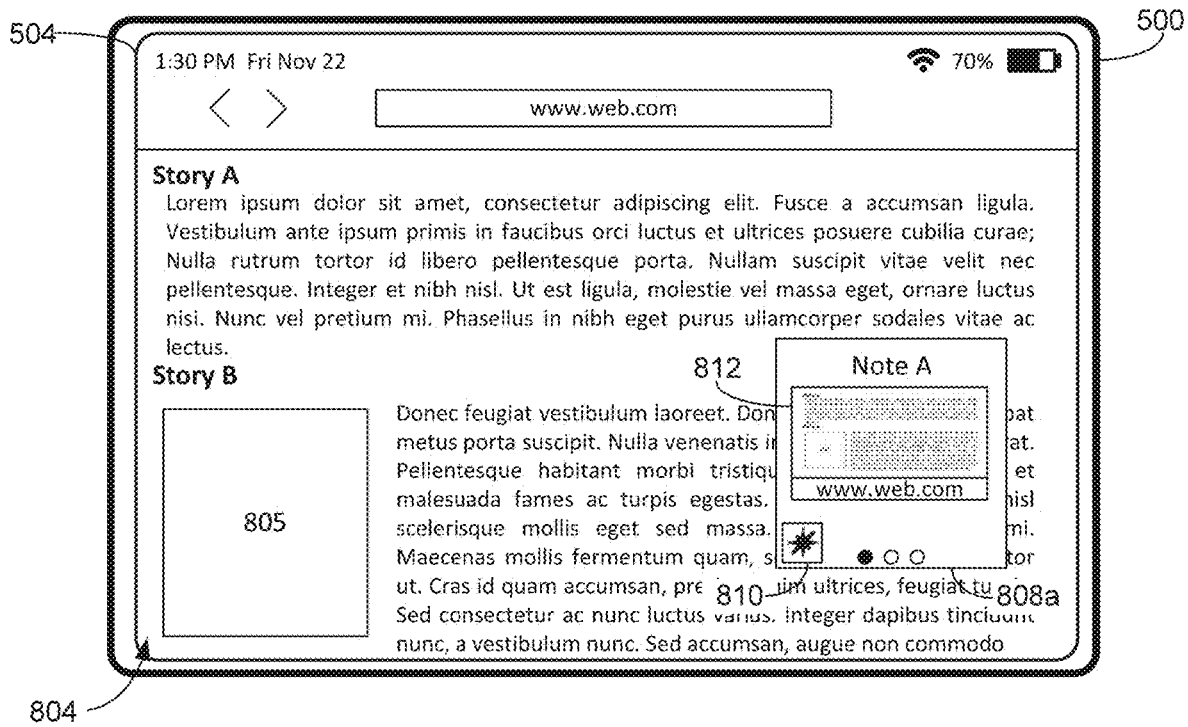

For example, in FIG. 8D, device 500 detects selection of option 810 (e.g., via a tap of contact 803). In response, device 500 inserts a copy or representation 812 of the content of the web browser application into Note A in notes user interface 808a, as shown in FIG. 8E (e.g., the text of Story A, the text and image 805 of Story B). The content optionally includes (e.g., a screenshot of) any type of content that was displayed in user interface 804 when option 810 was selected, such as text, handwritten text, handwritten drawings, images, videos, etc. The copy or representation 812 of the content of the web browser application optionally includes all or at least some of the content that was displayed in the user interface surrounding notes user interface 808a when option 810 was selected (e.g., to provide a preview of the content in Note A); and in some embodiments, the copy or representation 812 of the content of the web browser application does not include content that was not displayed in the user interface surrounding notes user interface 808a when option 810 was selected. In some embodiments, representation 812 is a link or rich link to the content in the web browser application such that subsequent selection of representation 812 will cause device 500 to display the content in the web browser application, as will be described later. In some embodiments, representation 812 additionally or alternatively includes a textual indicator of the content and/or the application (e.g., "www.web.com", indicating that representation 812 corresponds to content from that website and/or that representation 812 corresponds to content that was copied/entered from a web browser user interface).

Figure 8F:
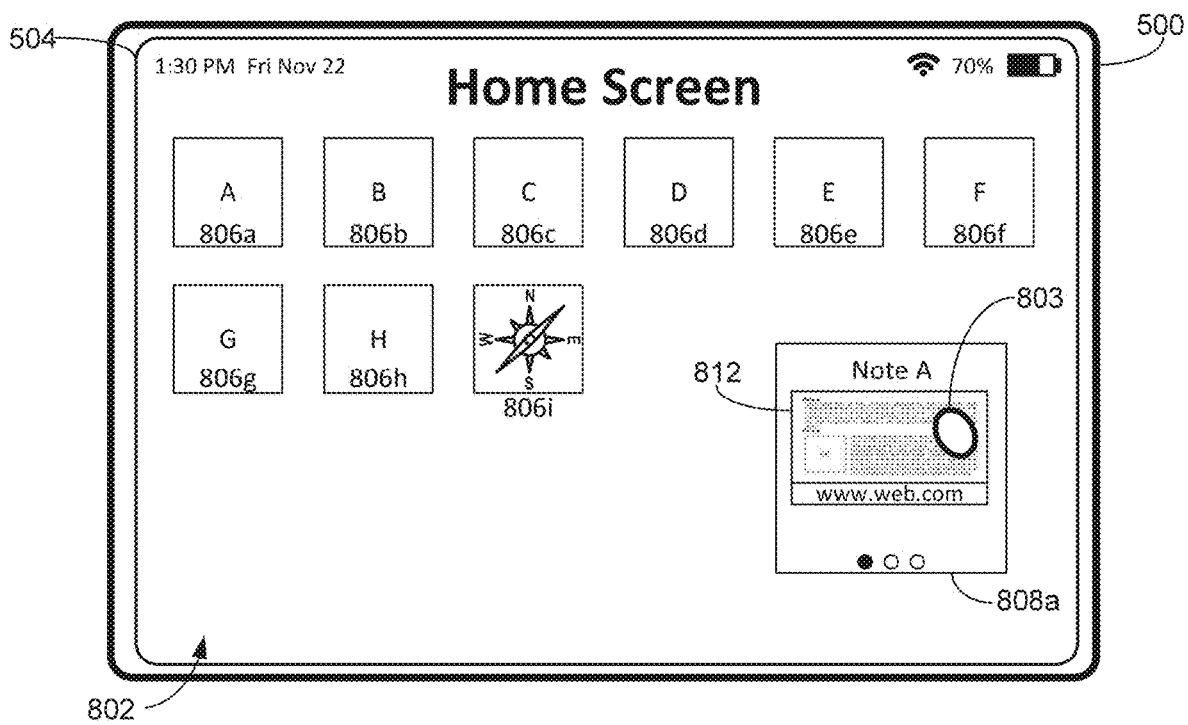

As mentioned previously, in some embodiments, the content added to notes user interface 808a is a link to the content such that subsequent selection of the content will cause device 500 to display the content in the user interface (e.g., of the application) in which it was originally displayed. For example, in FIG. 8F, device 500 is displaying user interface 802 and notes user interface 808a that includes Note A, and representation 812 that was added to Note A in FIG. 8E. In FIG. 8F, device 500 detect selection of representation 812 (e.g., via tap of contact 803), and in response, ceases display of user interface 802 and displays user interface 804, including the content that corresponds to representation 812 in Note A. Thus, representation 812 provides a quick and efficient way of navigating device 500 back to the content that was added to Note A.

As mentioned previously, option 810 optionally has a different visual appearance depending on the user interface with which (e.g., over which) notes user interface 808a is displayed to indicate from which user interface content will be added to notes user interface 808a in response to selection of option 810. For example, in FIG. 8G, notes user interface 808a is being displayed with user interface 804 of the web browser application, and therefore option 810 has an appearance corresponding to the web browser application (e.g., includes the icon graphics for the web browser application). In FIG. 8H, device 500 is displaying user interface 820 of a different application—Application B—and notes user interface 808a, and option 810 has a visual appearance corresponding to Application B (e.g., an indication of "B" and/or including icon graphics for Application B) that is different from the appearance of option 810 in FIG. 8G. Further, in FIG. 8H, device 500 is displaying Note B in notes user interface 808a.

Figure 8G:
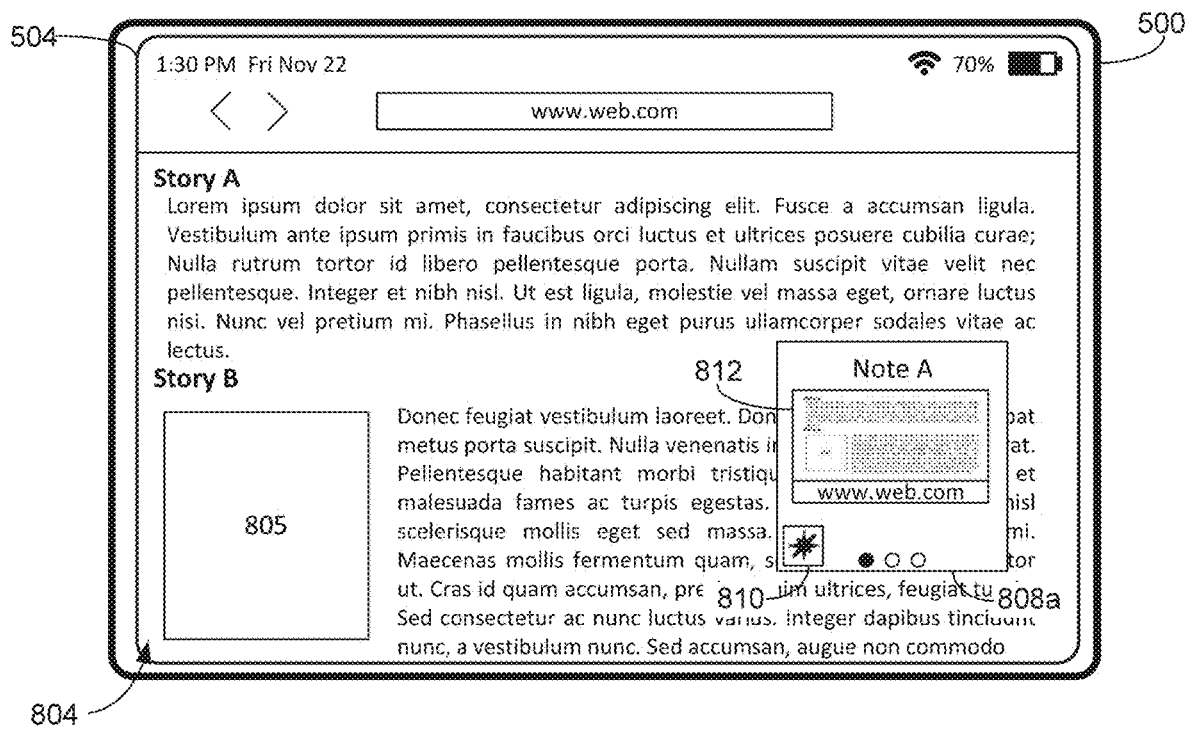
Figure 8H:
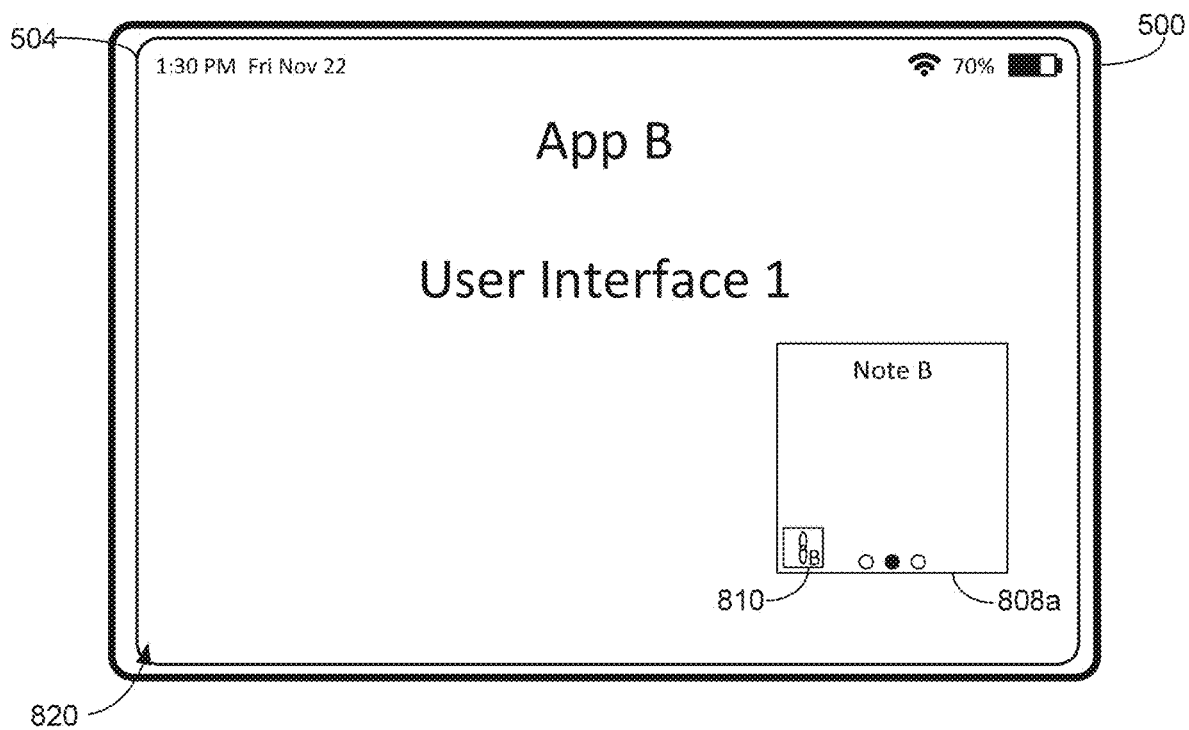
Figure 8I:
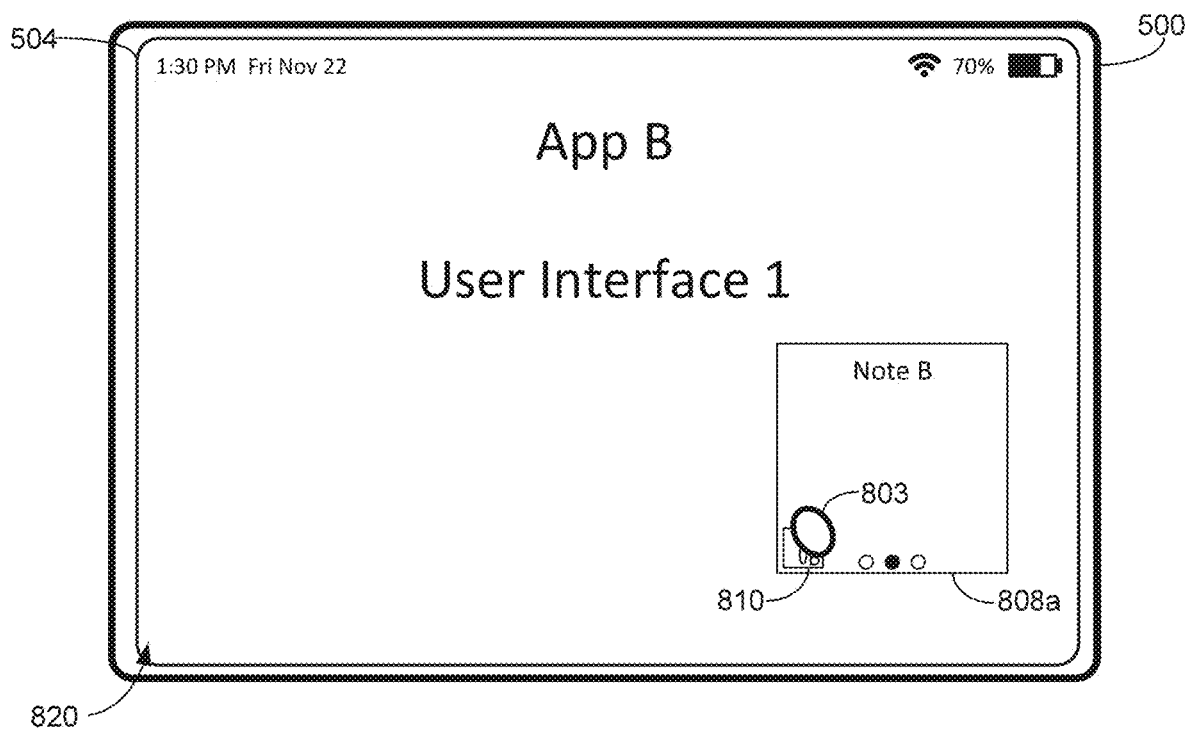
Figure 8J:
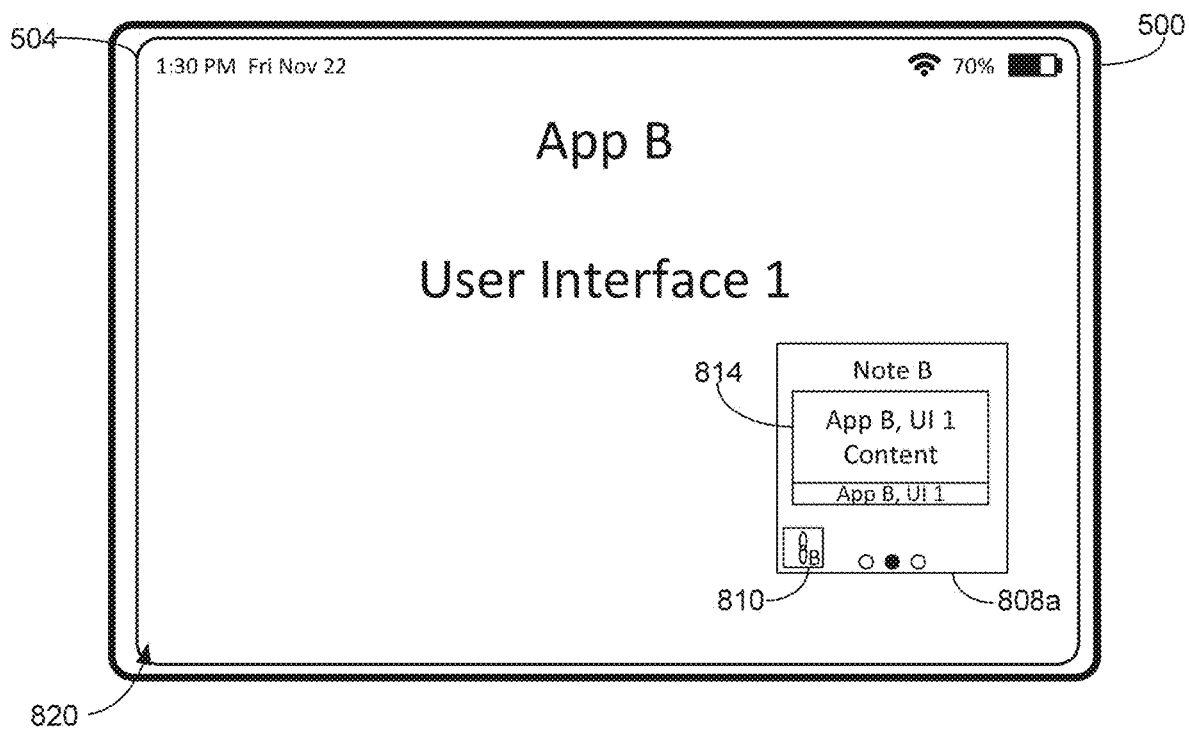

In FIG. 8I, device 500 detects selection of option 810, and in response, device 500 adds representation 814 of the content of the Application B user interface 820 into Note B in notes user interface 808a, as shown in FIG. 8J. The content optionally includes (e.g., a screenshot of) any type of content that was displayed in user interface 820 when option 810 was selected, such as text, handwritten text, handwritten drawings, images, videos, etc. The representation 814 of the content of Application B optionally includes all or at least some of the content that was displayed in user interface 820 surrounding notes user interface 808a when option 810 was selected (e.g., to provide a preview of the content in Note B); and in some embodiments, representation 814 of the content of Application B does not include content that was not displayed in the user interface 820 surrounding notes user interface 808a when option 810 was selected. As mentioned earlier, in some embodiments, representation 814 is a link or rich link to the content in Application B such that subsequent selection of representation 814 will cause device 500 to display the content in Application B. In some embodiments, representation 814 additionally or alternatively includes a textual indicator of the content and/or the application (e.g., "App B, UI 1", indicating that representation 814 corresponds to content that was copied/entered from a first user interface (e.g., and not a second user interface) of Application B).

In some embodiments, if the content surrounding notes user interface 808a changes (e.g., due to user input), the content that gets added to notes user interface 808a in response to selection of option 810 changes—further, in some embodiments, a user is able to designate, highlight or select content (or a subset of the content) surrounding notes user interface 808a to be added to notes user interface 808a in response to selection of option 810. For example, in FIGS. 8K-8L, while device 500 is displaying notes user interface 808a and user interface 804, device 500 detects an upward swipe of contact 803, which causes device 500 to scroll the web page content displayed in user interface 804 upward (e.g., to reveal content further down the web page that was not displayed in FIG. 8K). In particular, in FIG. 8L, image 807 is revealed in user interface 804 in response to the upward swipe of contact 803. In FIG. 8M, device 500 detects an input corresponding to an input to highlight or select a portion of the textual content of Story B (e.g., press and hold of contact 803 on the portion of the textual content of Story B, or a press and hold of contact 803 following by movement of contact 803 across the portion of the textual content of Story B). In response, as shown in FIG. 8N, device 500 highlights (as indicated by highlighting 822) the lower portion of the textual content of Story B (e.g., while the upper portion of the textual content of Story B remains un-highlighted).

Figure 8K:
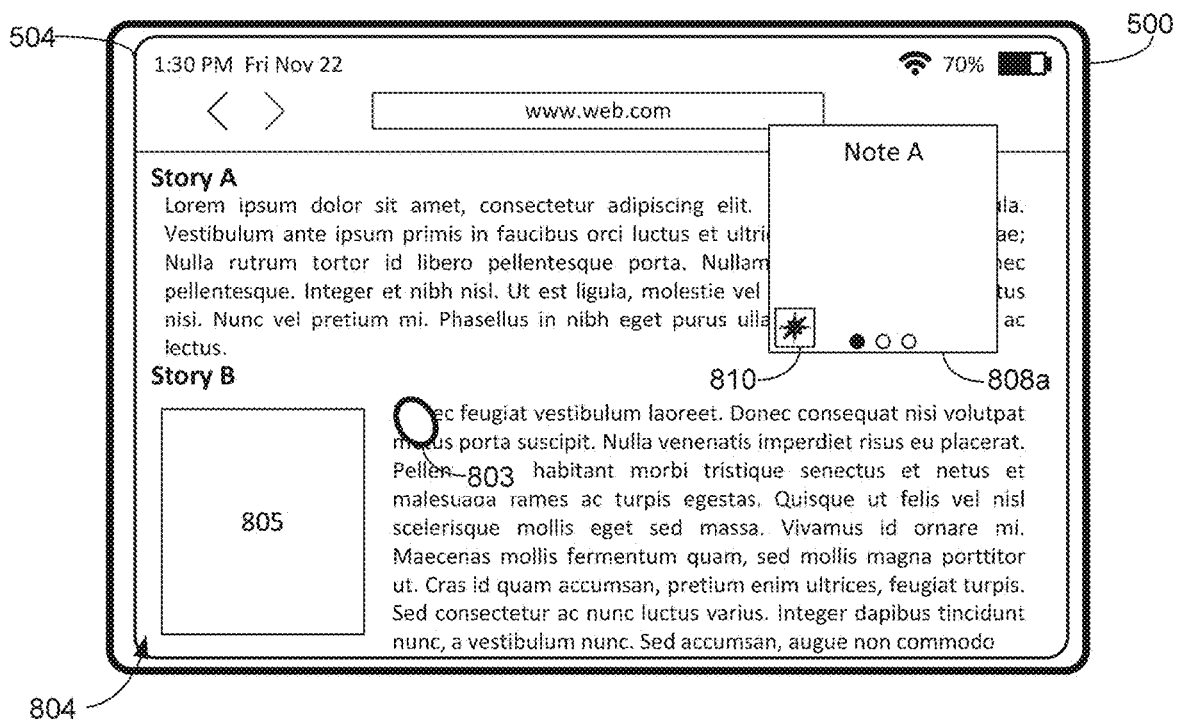
Figure 8L:
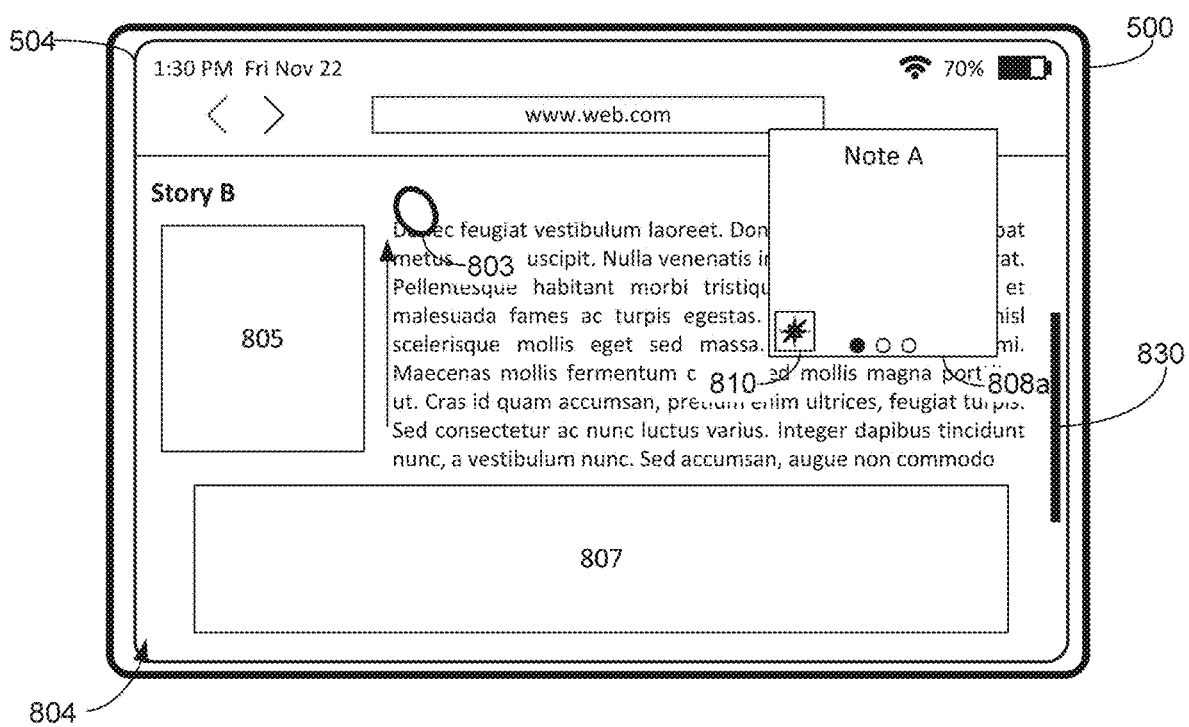
Figure 8M:
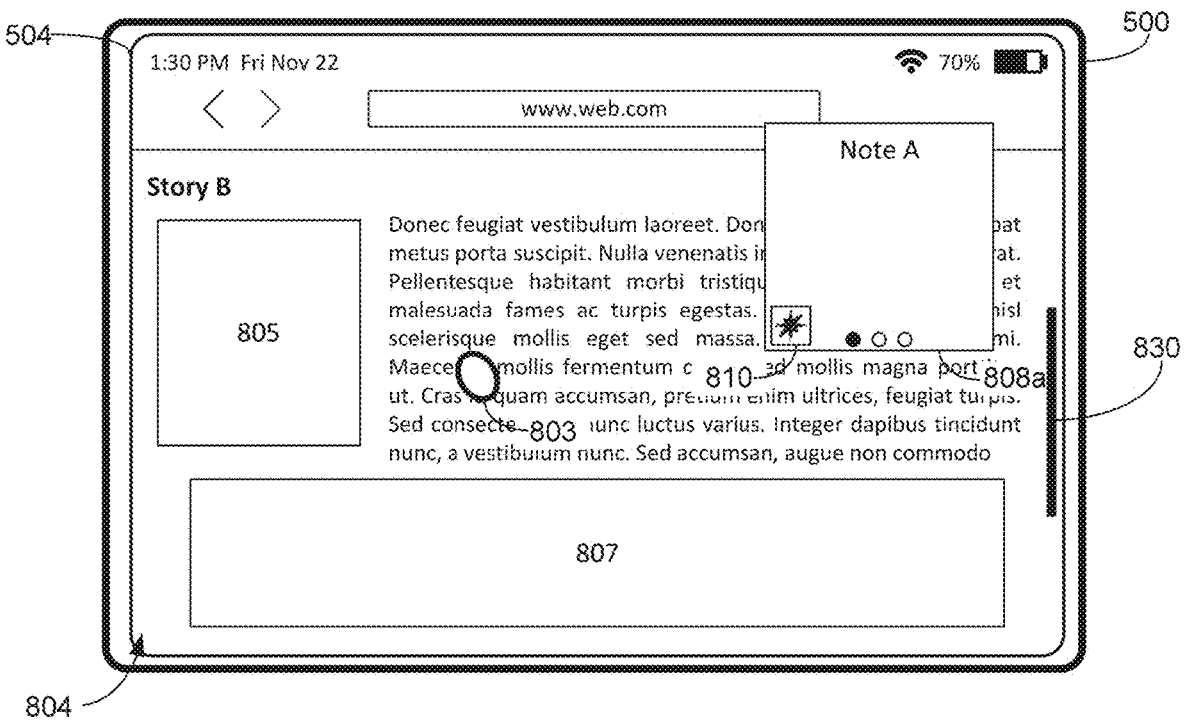
Figure 8N:
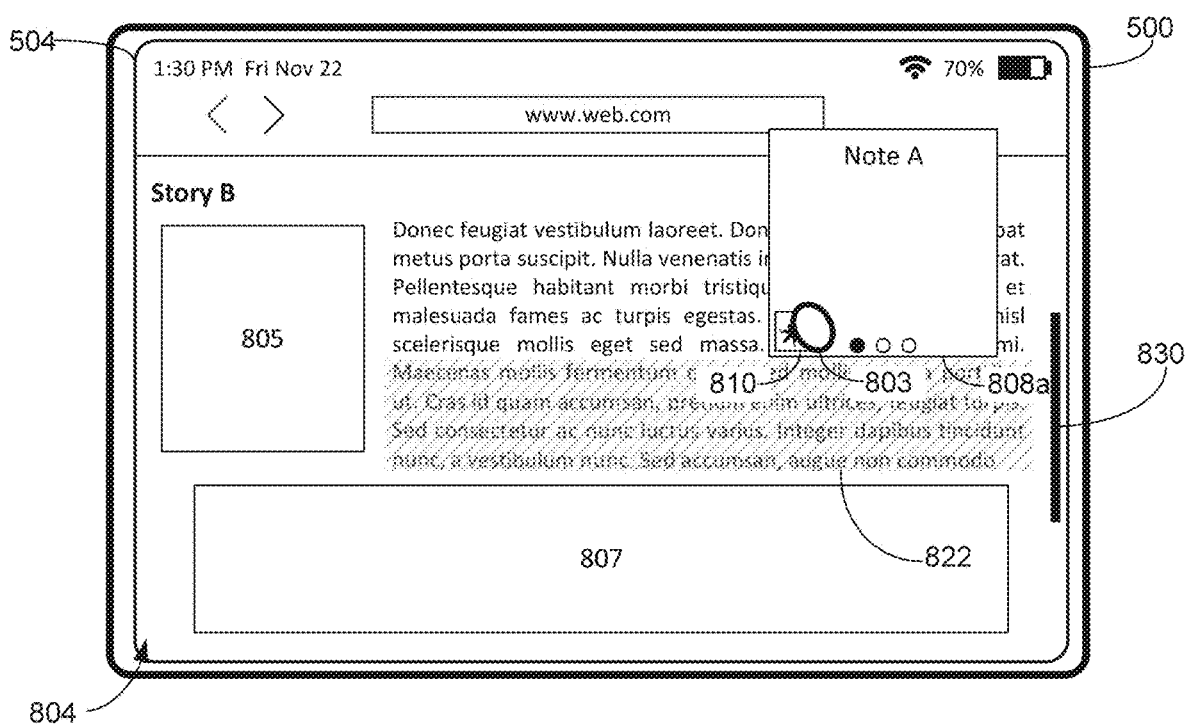
Figure 8O:
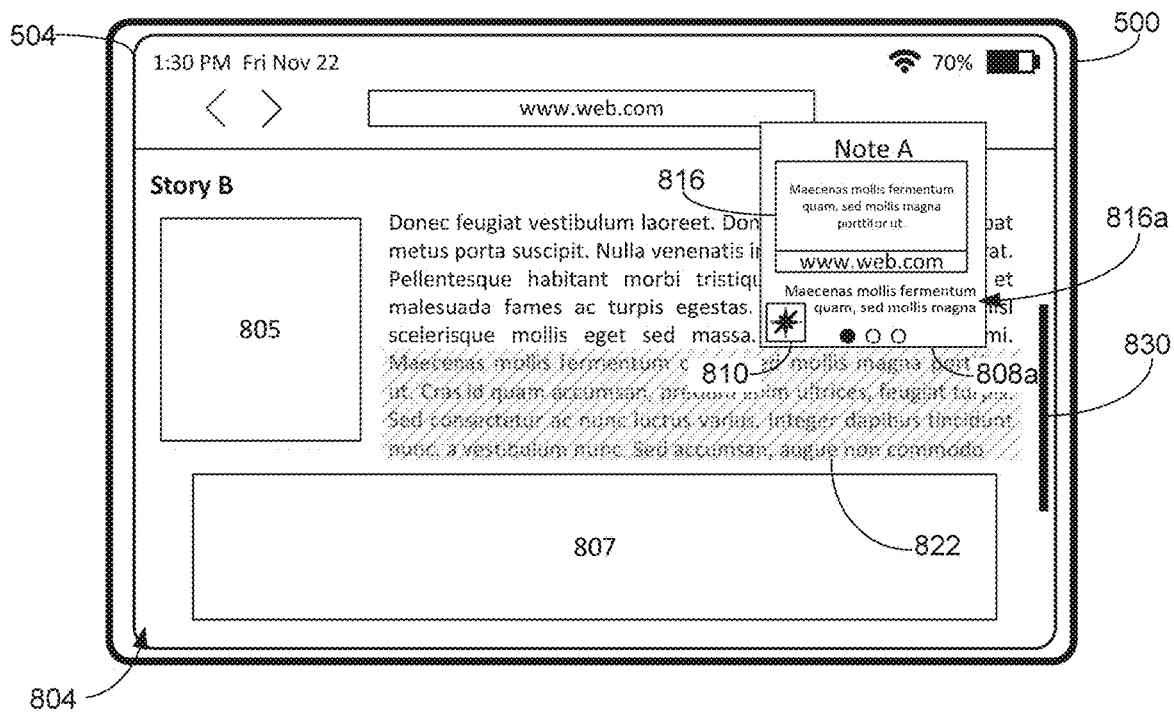

While the portion of the textual content of Story B is highlighted with highlighting 822, device 500 detects selection of option 810 in FIG. 8N. In response, device 500 adds representation 816 of the highlighted content from user interface 804 into Note A in notes user interface 808a, as shown in FIG. 8O. Content that is not highlighted (e.g., images 805 and 807 and the upper portion of the textual content of Story B) is optionally not added to Note A in notes user interface 808a. The content that is added to Note A optionally includes (e.g., a screenshot of) any type of content that was highlighted in user interface 804 when option 810 was selected, such as text, handwritten text, handwritten drawings, images, videos, etc. The representation 816 of the highlighted content of user interface 804 optionally includes all or at least some of the content that was displayed in user interface 804 surrounding notes user interface 808a when option 810 was selected (e.g., to provide a preview of the highlighted content in Note A). As mentioned earlier, in some embodiments, representation 816 is a link or rich link to the content in the web browser application such that subsequent selection of representation 816 will cause device 500 to display the highlighted content in the web browser application. In some embodiments, representation 816 additionally or alternatively includes a textual indicator of the content and/or the application (e.g., "www.web.com", indicating that representation 816 corresponds to content from that website and/or that representation 816 corresponds to content that was copied/entered from a web browser user interface). As shown in FIG. 8O, in some embodiments, the highlighting 822 of the content in user interface 804 remains after representation 816 is added to Note A. In some embodiments, additionally or alternatively to adding representation 816 to Note A, device 500 adds a copy of the content that was highlighted when option 810 was selected to Note A. For example, in FIG. 8O, device 500 optionally adds text 816a (e.g., plain text, that is editable by the user in response to input), which is optionally a copy of the portion of Story B that is highlighted, to Note A—which is optionally vertically scrollable to reveal further portions of the text 816a that are not currently displayed in notes user interface 808a. If other content, such as an image, a video, etc., were highlighted when option 810 is selected, device 500 optionally would similarly add a copy of the highlighted image, video, etc. to Note A (e.g., in addition to adding a (e.g., rich) link to the highlighted image, video, etc. to Note A). Text 816a will not be illustrated in notes user interface 808a in subsequent figures for ease of description, but it is understood that in some embodiments, text 816a is included in notes user interface 808a in the examples described with reference to such subsequent figures.

Figure 8P:
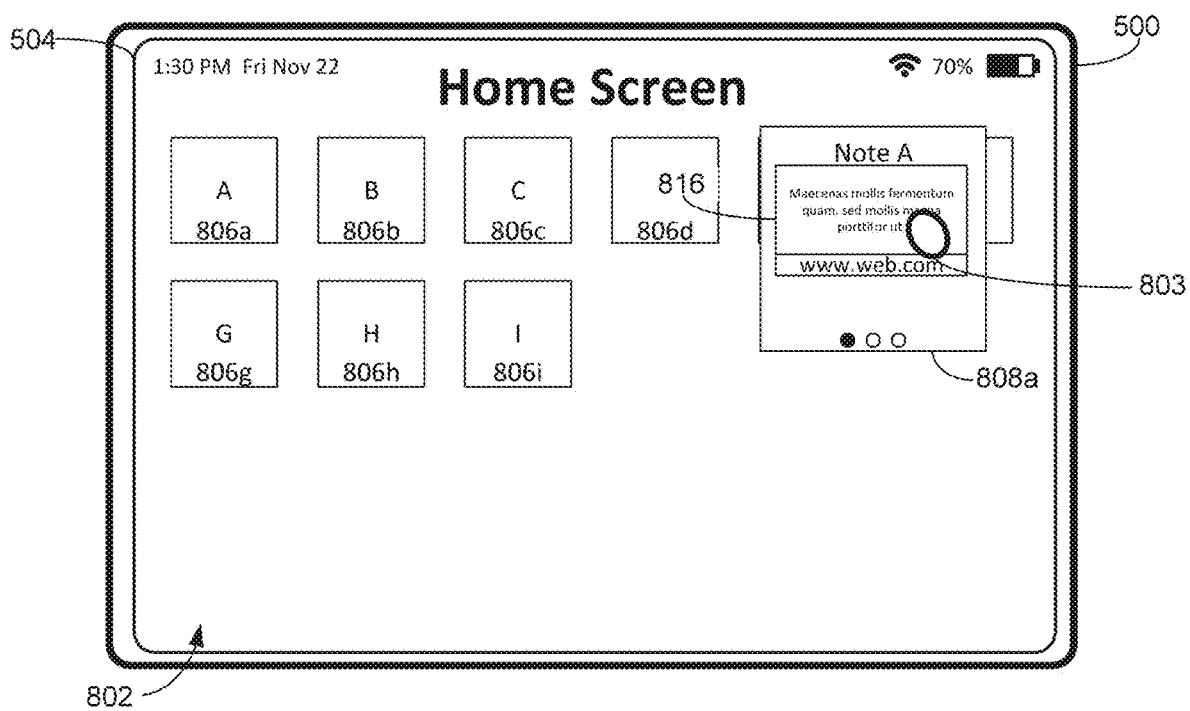
Figure 8Q:
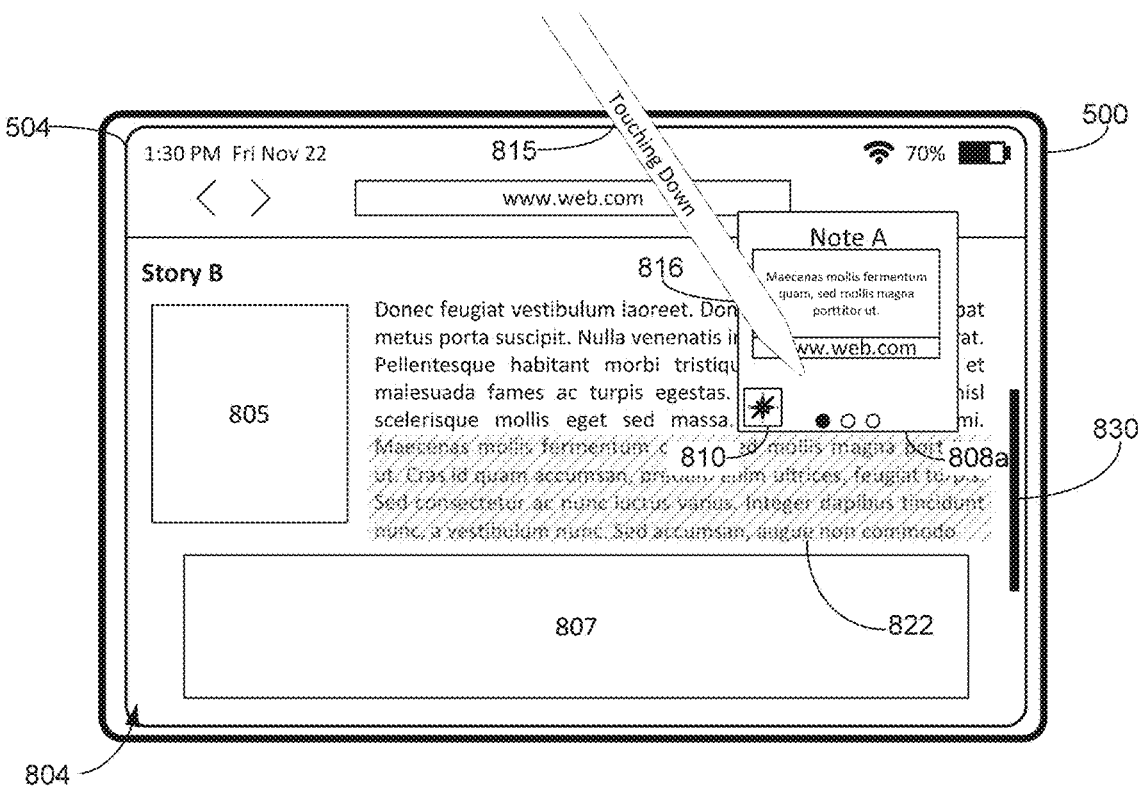

In FIG. 8P, while device 500 is displaying Note A including representation 816 and user interface 802, device 500 detects selection of representation 816. In response, device 500 not only displays user interface 804 of the web browser application (e.g., and ceases display of user interface 802), but also automatically scrolls the web browser application down to the portion of the content in the web browser application that corresponds to representation 816 (e.g., the portion of the textual content of Story B) as shown in FIG. 8Q, without the need for separate user input to scroll down to that content to reveal such content in user interface 804. Further, in some embodiments as shown in FIG. 8Q, the portion of the content that corresponds to representation 816 is still displayed by device 500 with highlighting 822, to indicate to the user which portion of the content corresponds representation 816 that was selected by the user in FIG. 8P. Other portions of the content in user interface 804 that were not highlighted when option 810 was selected in FIG. 8N are displayed without highlighting by device 500.

Figure 8R:
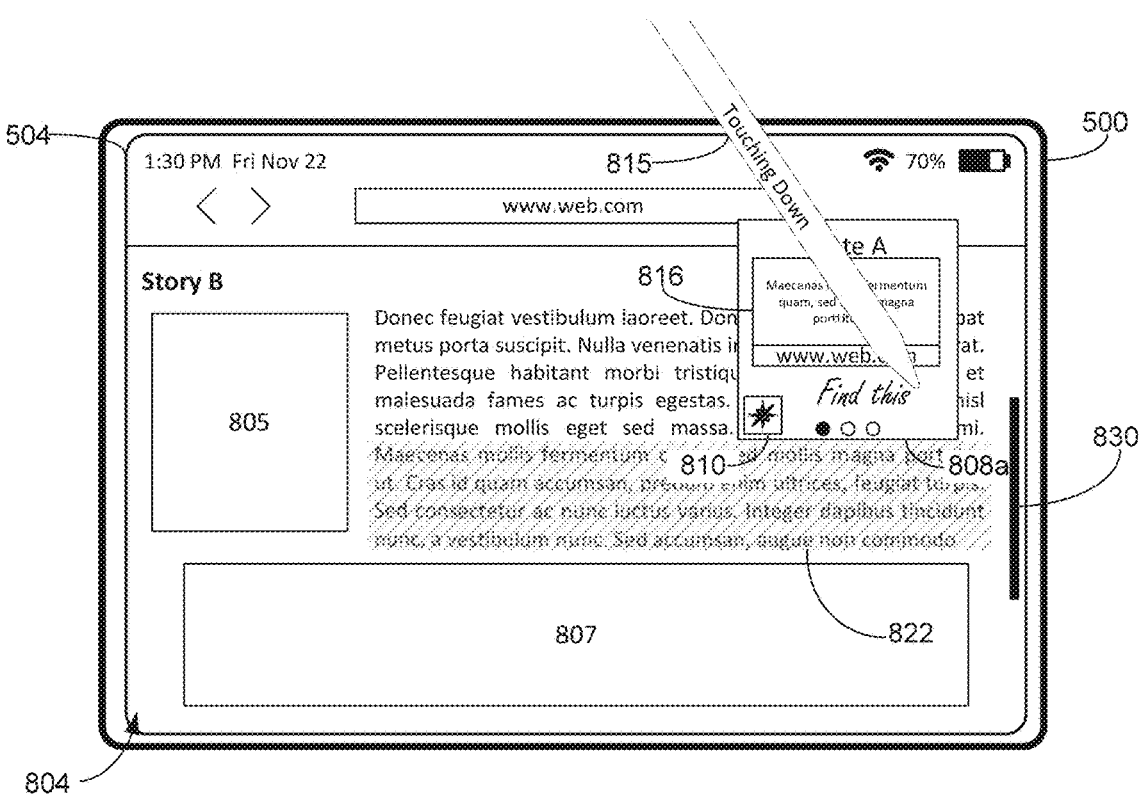

In some embodiments, a user is able to enter additional content (e.g., handwritten content, manually copy/pasted content, etc.) into a note that includes a copy/representation/link of content as previously described. For example, in FIGS. 8Q-8R, while device 500 is displaying Note A that already includes representation 816, device 500 detects handwritten input within Note A using stylus 815, and in response, displays that handwritten input ("Find this") along with representation 816 in Note A, as shown in FIG. 8R. As shown in FIG. 8R, device 500 continues to display the portion of the content corresponding to representation 816 with highlighting 822.

Figure 8S:
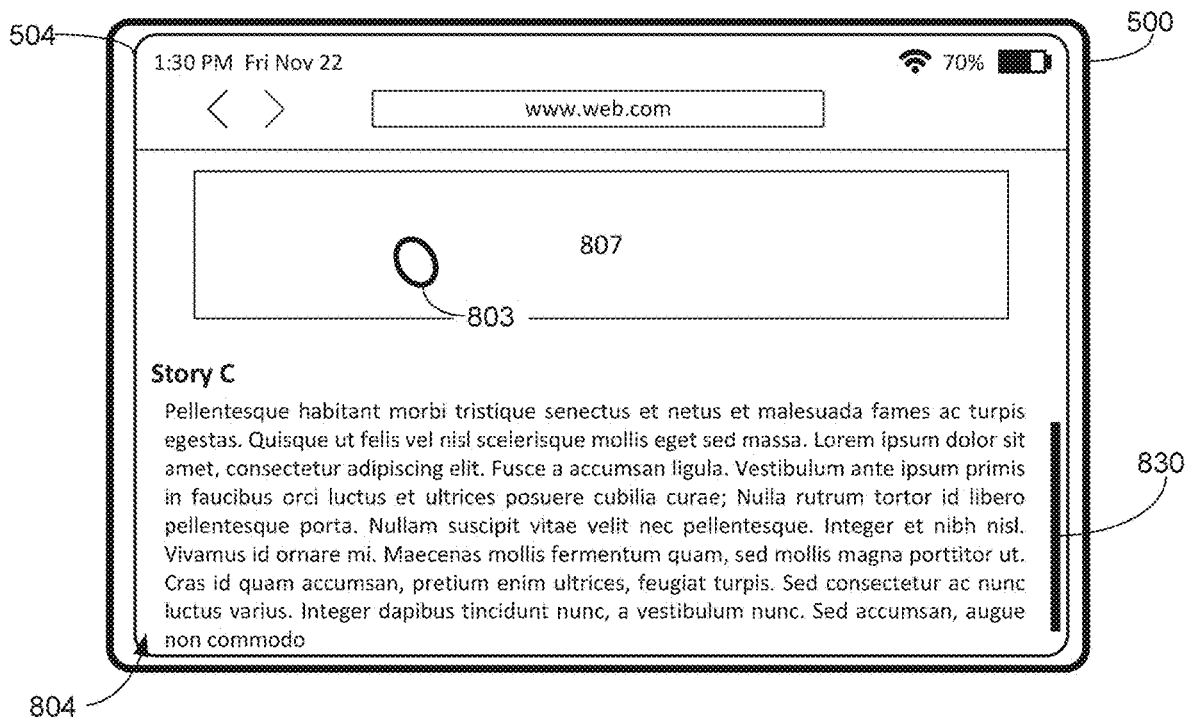
Figure 8T:
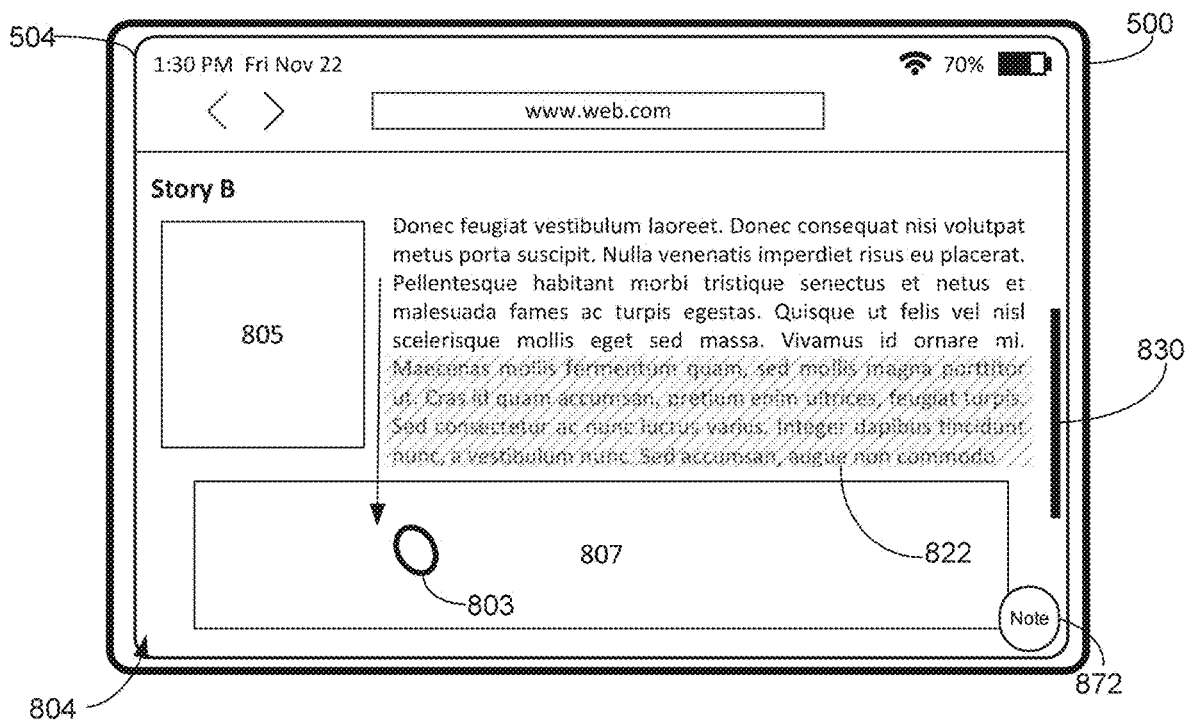

In some embodiments, if a user instead manually navigates to a portion of content that was previously (e.g., and is currently) added to a note in notes user interface 808a using option 810 (e.g., without navigating to that portion of the content via selection of the corresponding representation/link in notes user interface 808a), device 500 similarly displays that portion of content with highlighting. For example, in FIG. 8S, device 500 is displaying user interface 804 of the web browser application that has been scrolled down such that the textual content of Story B is not displayed in user interface 804. In FIGS. 8S-8T, device 500 detects a downward swipe of contact 603 on touch screen 504, which causes device 500 to scroll up in user interface 804 to reveal the textual content of Story B, as shown in FIG. 8T. Further as shown in FIG. 8T, the portion of the textual content in FIG. 8T is highlighted with highlighting 822 to indicate that that content has previously (e.g., and is currently) included in a note in notes user interface 808a.

Additionally, in FIG. 8T, notes user interface 808a is not currently being displayed by device 500.

In some embodiments, while device 500 is displaying content that was previously (e.g., and is currently) added to a note in notes user interface 808a using option 810, and while device 500 is not currently displaying notes user interface 808a, device 500 displays an option 872 that is selectable to display notes user interface 808a. Option 872 is optionally displayed over a predetermined one of one or more locations on touch screen 504 (e.g., overlaid on user interface 804). For example, in FIG. 8T, option 872 is displayed in the lower-right corner of touch screen 804, overlaying the lower-right corner of user interface 804. In FIG. 8S, because the textual content of Story B was not displayed in user interface 804, device 500 was not displaying option 872. In some embodiments, device 500 determines whether to display option 872 based on a canonicalized version of the URL (e.g., removing or disregarding any tracking codes or platform codes that are embedded in the URL, or switching from a mobile URL to a desktop URL) of the webpage displayed in user interface 804 and/or the URL associated with the content that was previously (e.g., and is currently) added to a note in notes user interface 808a (e.g., the URL associated with representation/link 816 in Note A in notes user interface 808a in FIG. 8R). For example, in some embodiments, device 500 determines to display option 872 if the (e.g., canonicalized) URL for the currently displayed webpage in user interface 804 matches the (e.g., canonicalized) URL associated with the content that was previously (e.g., and is currently) added to a note in notes user interface 808a, and determines not to display option 872 if the (e.g., canonicalized) URL for the currently displayed webpage in user interface 804 does not match the (e.g., canonicalized) URL associated with the content that was previously (e.g., and is currently) added to a note in notes user interface 808a. Using a canonicalized URL associated with content to determine whether to display previously generated highlighting or a previously generated note increases the likelihood that the device will be able to match previously generated highlighting or a previously generated note with a currently displayed webpage, even if the previously generated note or highlighting was generated using a different device (e.g., a mobile device instead of a desktop device), generated using a different web browser, and/or generated on a webpage that was reached from a different search engine or other departure page.

Figure 8U:
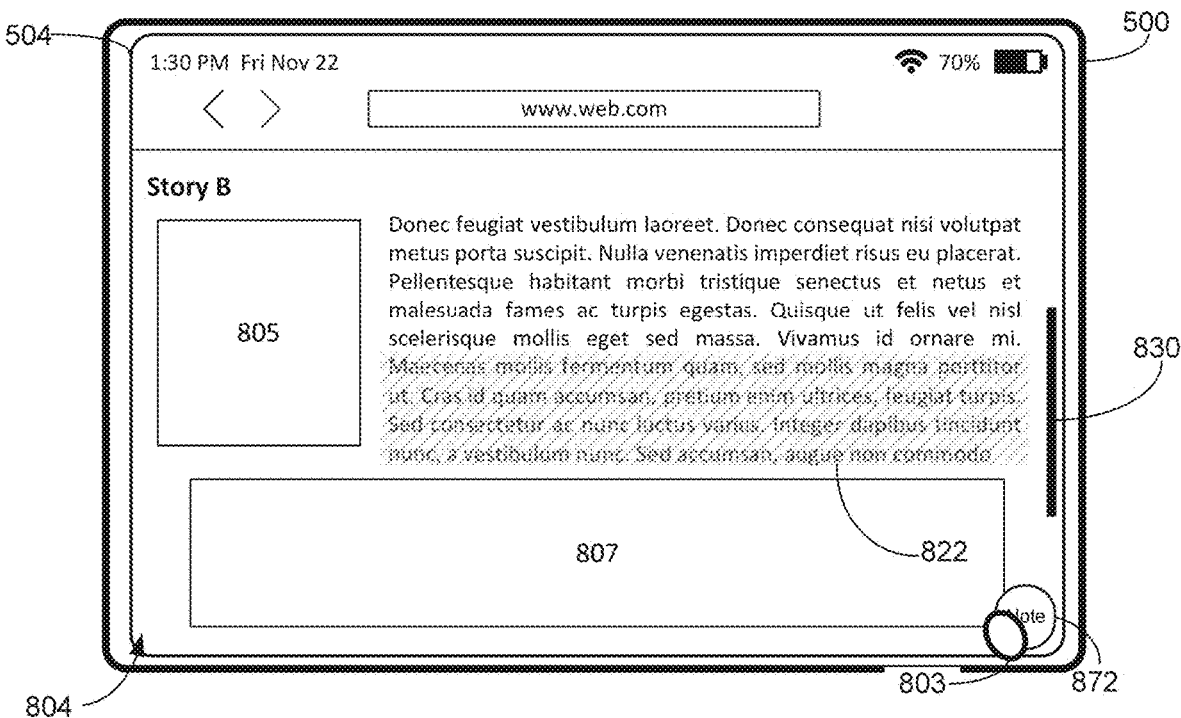
Figure 8V:
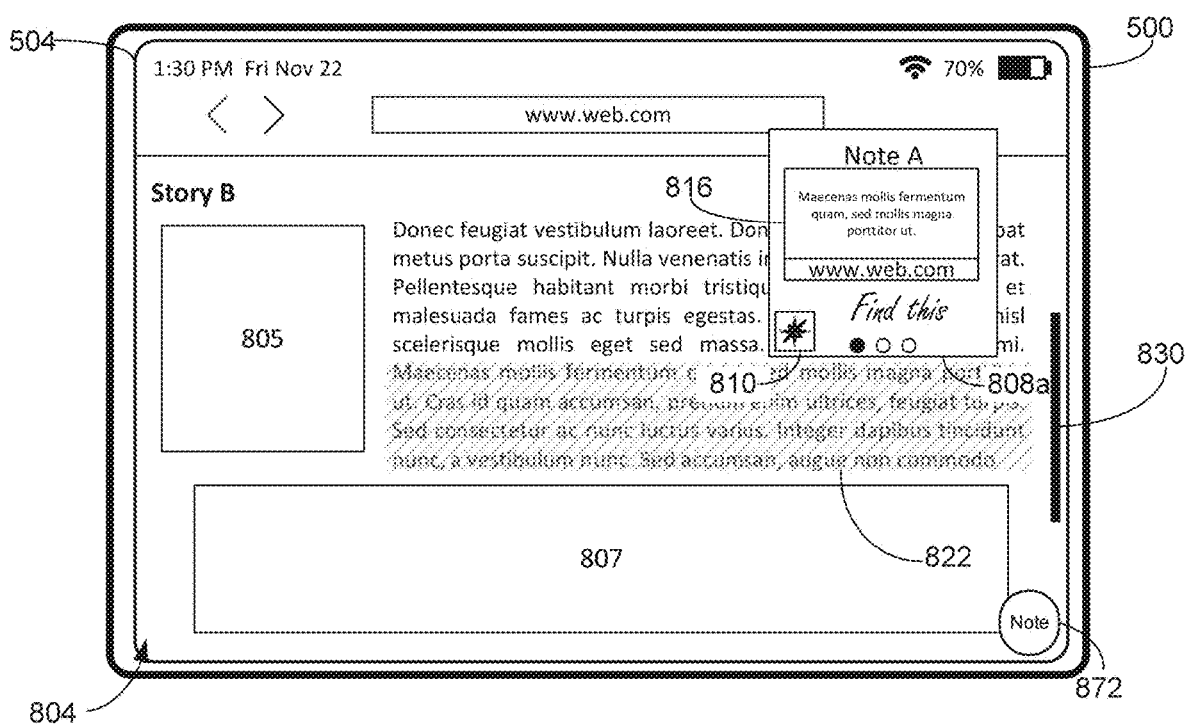

In FIG. 8U, device 500 detects selection of option 872 (e.g., via a tap of contact 803). In response, as shown in FIG. 8V, device 500 displays notes user interface 808a overlaid on user interface 804. Notes user interface 808a optionally includes the last-displayed note (Note A) and the content that was previously added to the last-displayed note. In some embodiments, in FIG. 8V, device 500 would cease displaying option 872 on touch screen 504, because notes user interface 808a is currently displayed. In some embodiments, device 500 continues displaying option 872 on touch screen 504. Further, as shown in FIG. 8V, device 500 continues to display the portion of the textual content of Story B with highlighting 822.

Figure 8W:
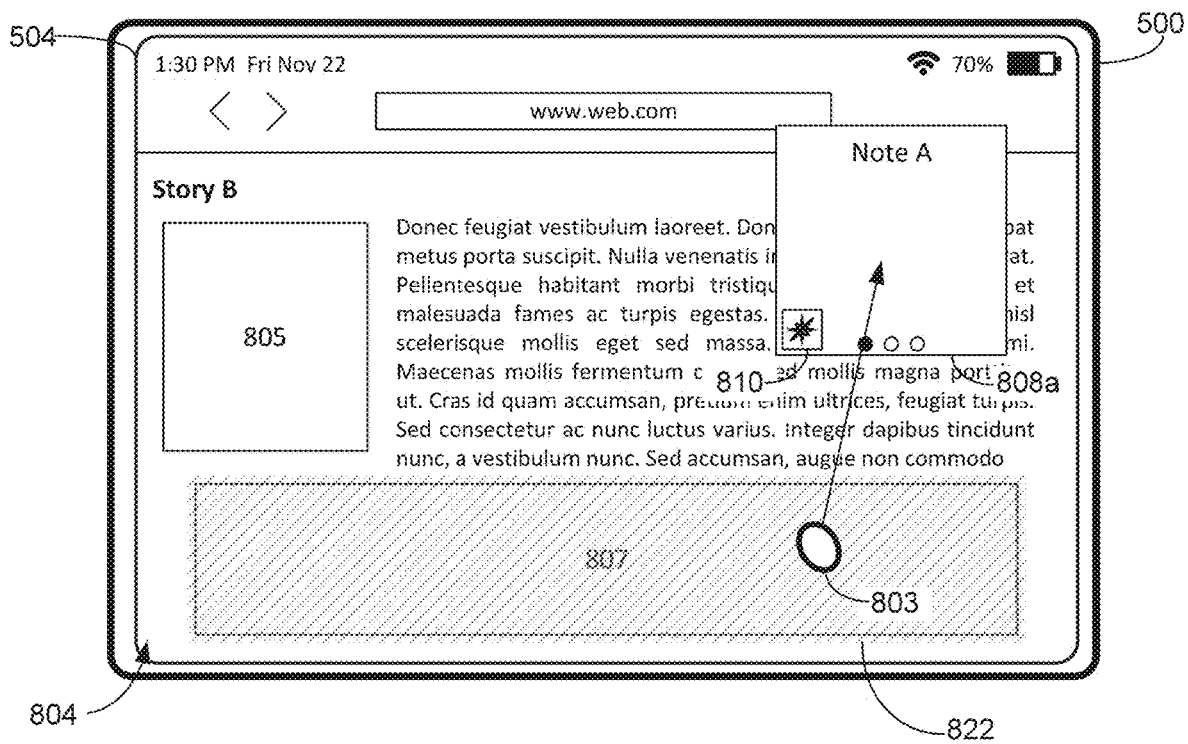
Figure 8X:
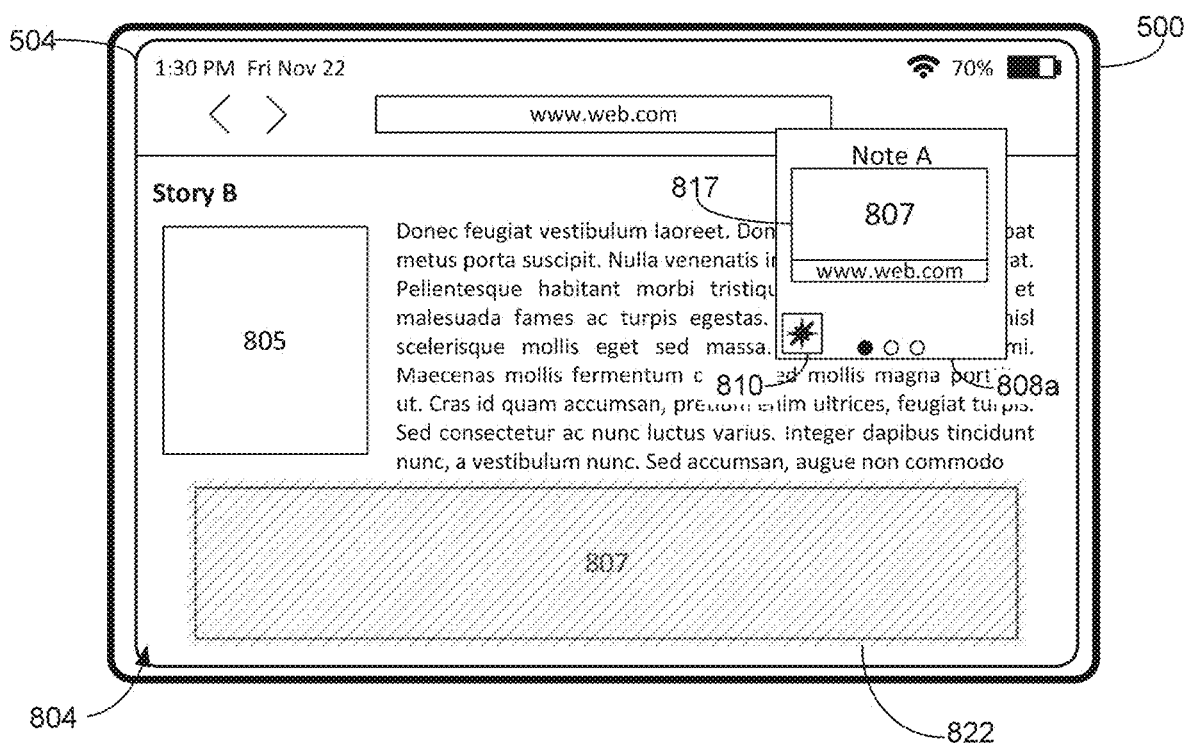

In some embodiments, content (e.g., text, images, videos, etc.) can be dragged from the displayed user interface to notes user interface 808a to add that content/representation/link to notes user interface 808a. In some embodiments, content (e.g., text, images, videos, etc.) can be added to notes user interface 808a in response to a long press detected on the content (e.g., contact 803 detected on the content for longer than a time threshold, such as 0.1, 0.3, 0.5, 1, 2, 3 seconds), followed by selection of an "add to note" option that is displayed in response to the long press (e.g., included in a contextual menu displayed in response to the long press), which optionally results in the content/representation/link being added to notes user interface 808a. In some embodiments, when a cursor is being used to interact with device 500, content (e.g., text, images, videos, etc.) can be added to notes user interface 808a in response to a right click detected on the content, followed by selection (e.g., using a left click) of an "add to note" option that is displayed in response to the right click (e.g., included in a contextual menu displayed in response to the right click), which optionally results in the content/representation/link being added to notes user interface 808a. For example, in FIG. 8W, device 500 is displaying user interface 804, and image 807 is highlighted with highlighting 822 (though it is understood that in some embodiments, content need not be highlighted in user interface 804 for that content to be dragged to notes user interface 808a). Further, device 500 detects dragging of image 807 (e.g., via movement of contact 803) to Note A in notes user interface 808a, as shown in FIG. 8W, and liftoff of contact 803 from touch screen while positioned over Note A. In response to the dragging and lift off of contact 803, device 500 adds representation 817 of the dragged content from user interface 804 into Note A in notes user interface 808a, as shown in FIG. 8X. Content that is not dragged (e.g., image 805 and the textual content of Story B) is optionally not added to Note A in notes user interface 808a. The content that is added to Note A optionally includes (e.g., a screenshot of) any type of content that was dragged from user interface 804, such as text, handwritten text, handwritten drawings, images, videos, etc. The representation 817 of the dragged content of user interface 804 optionally includes all or at least some of the content that was dragged from user interface 804 surrounding notes user interface 808a (e.g., to provide a preview of the dragged content in Note A). As mentioned earlier, in some embodiments, representation 817 is a link or rich link to the content in the web browser application such that subsequent selection of representation 817 will cause device 500 to display the dragged content in the web browser application. In some embodiments, representation 817 additionally or alternatively includes a textual indicator of the content and/or the application (e.g., "www.web.com", indicating that representation 817 corresponds to content from that website and/or that representation 817 corresponds to content that was copied/entered from a web browser user interface). As shown in FIG. 8X, in some embodiments, if content 807 was highlighted before being dragged to Note A, the highlighting 822 of content 807 in user interface 804 remains after representation 817 is added to Note A. In some embodiments, if content 807 was not highlighted before being dragged to Note A, device 500 adds highlighting 822 to content 807 in user interface 804 in response to the dragging of content 807 to Note A and/or after representation 817 is added to Note A. In some embodiments, dragging and dropping content (e.g., image 807) to notes user interface 808a results in a copy of the content being inserted into notes user interface 808a without adding a (e.g., rich) link to that content to notes user interface 808a.

In some embodiments, a corner swipe gesture (e.g., by a stylus or a finger) corresponding to a request to display the notes user interface 808a (e.g., such as described with reference to method 700) detected while content is highlighted in the user interface causes device 500 to create a new note and populate that note with a copy/representation/link to the highlighted content. For example, in FIGS.

Figure 8Y:
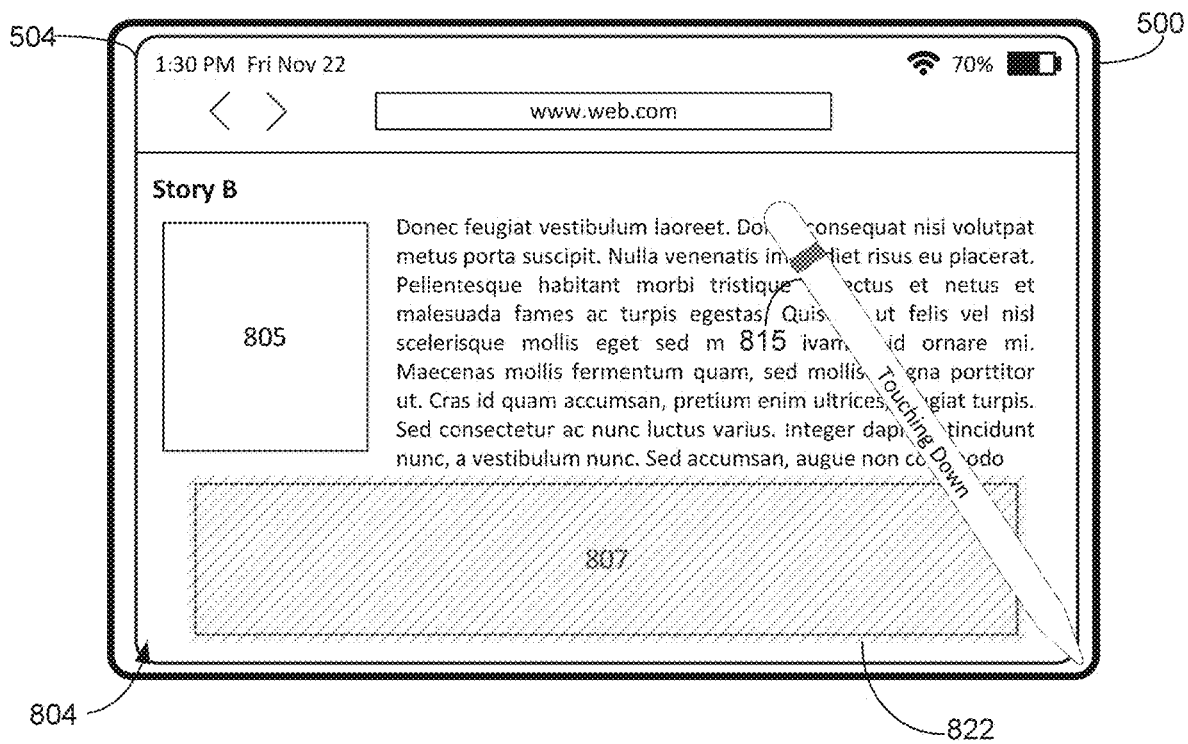
Figure 8Z:
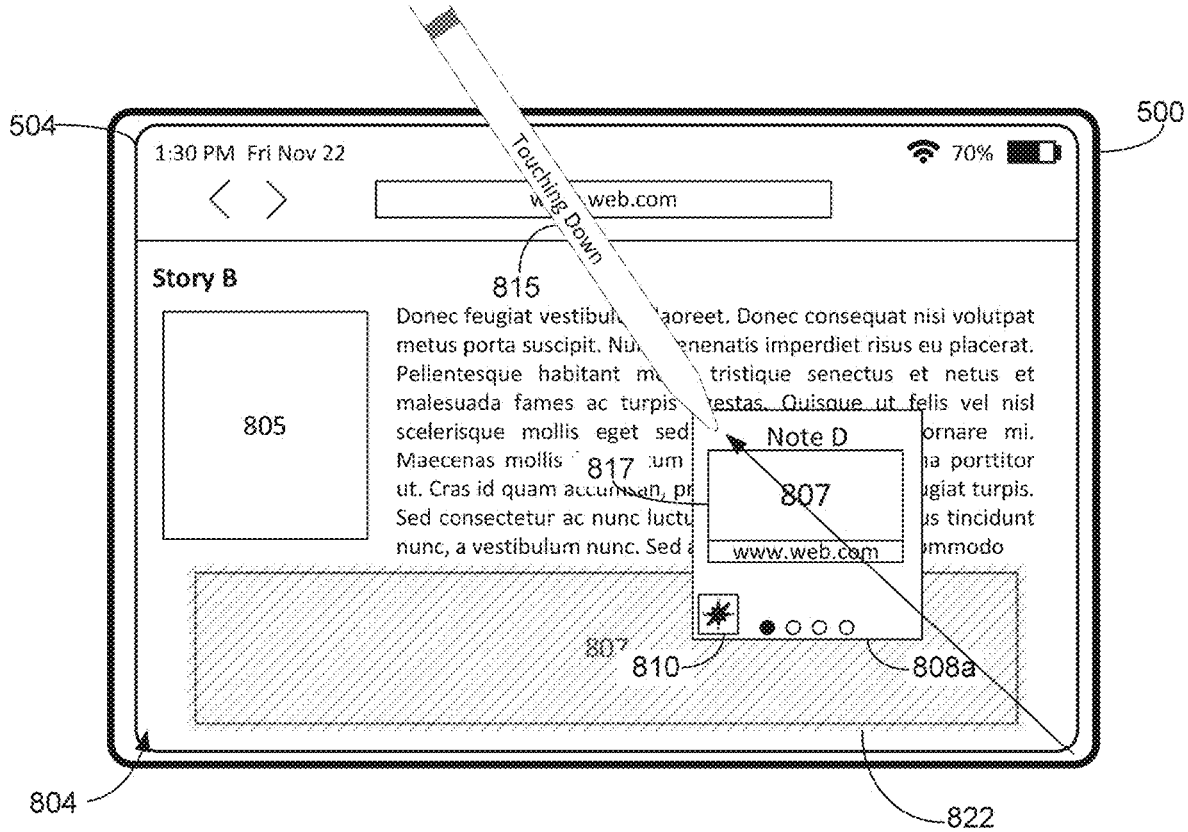
Figure 8A:
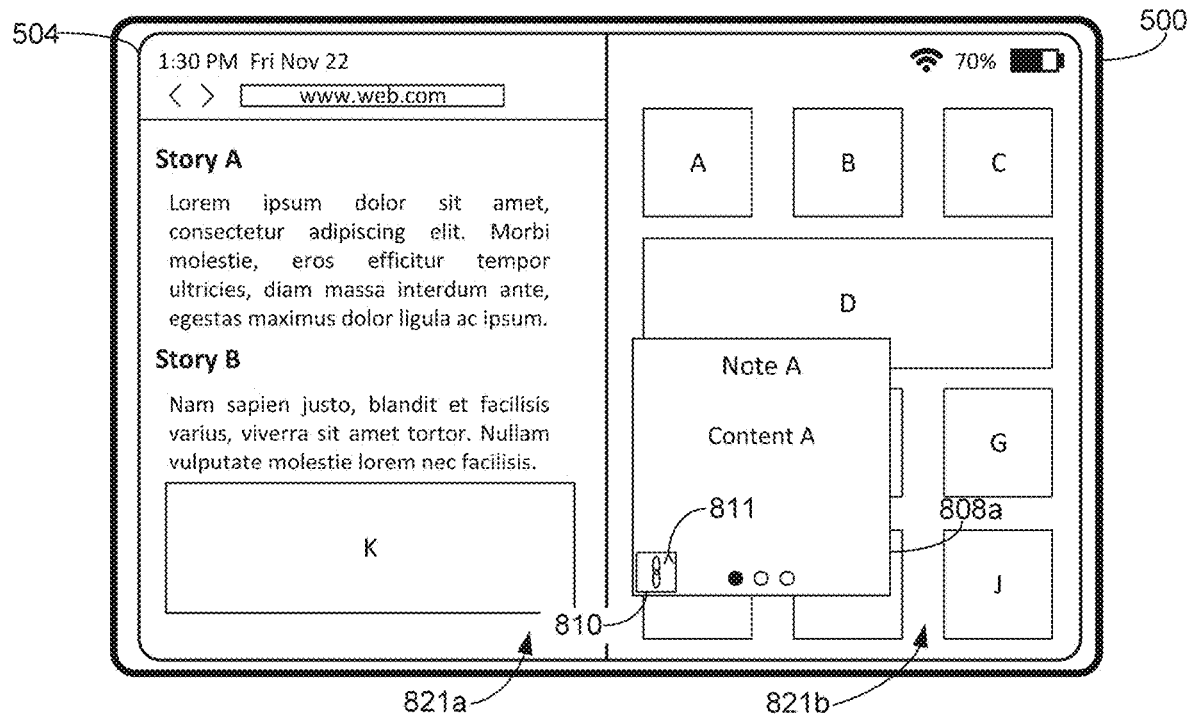
Figure 8A:
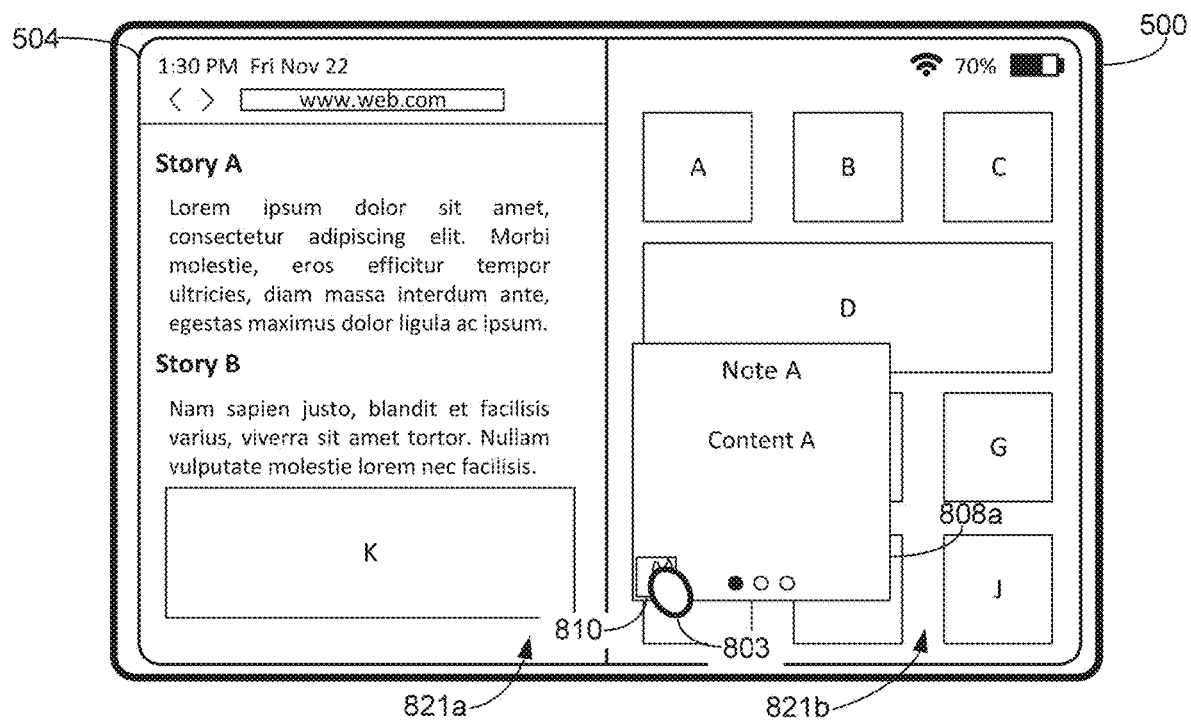
Figure 8A:
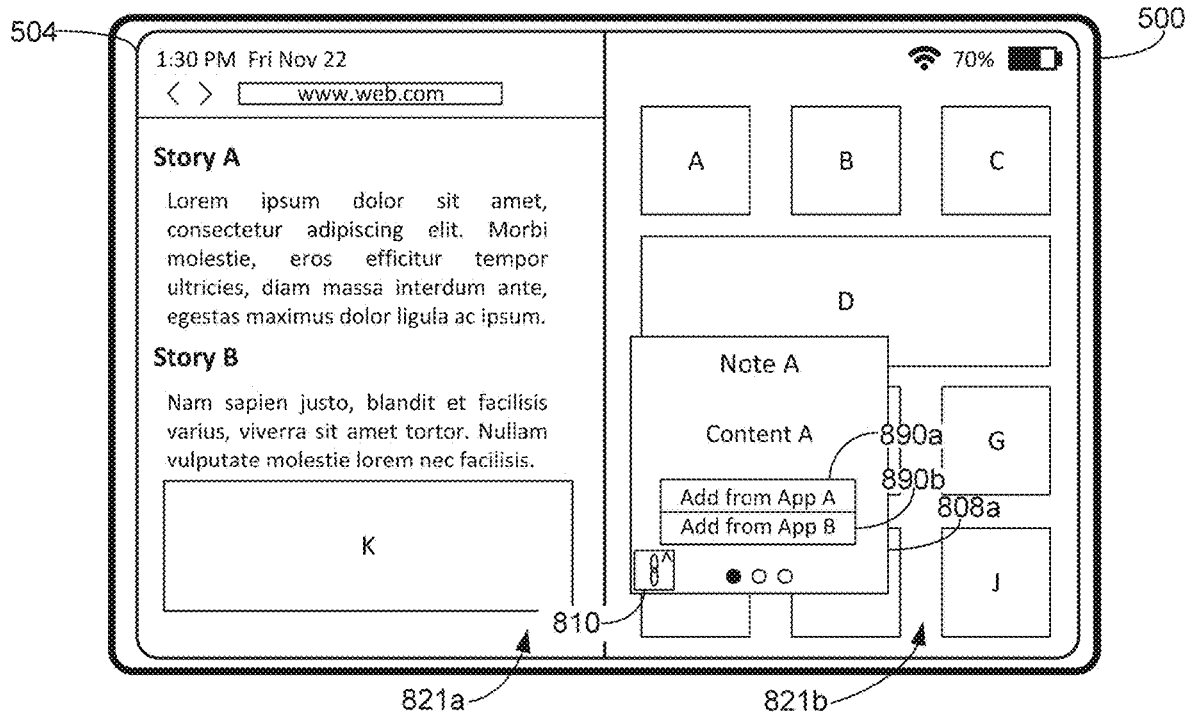
Figure 8A:
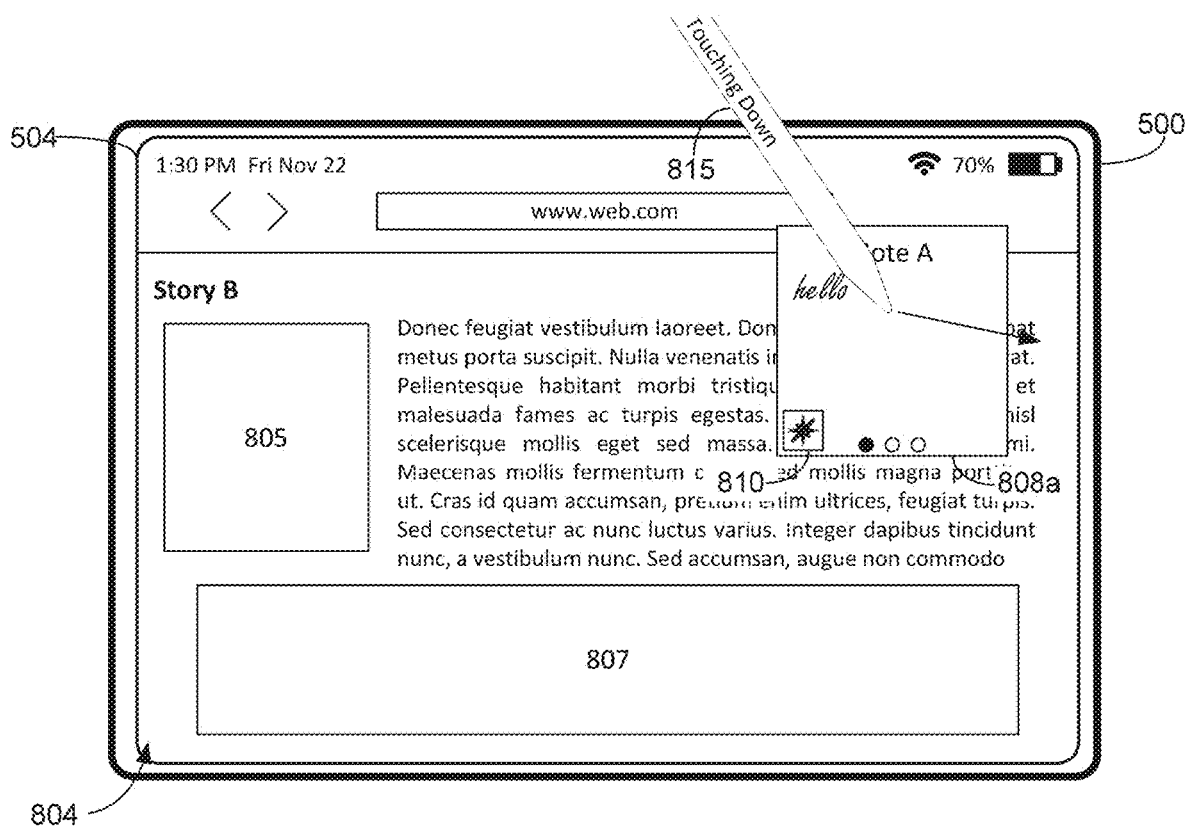
Figure 8A:
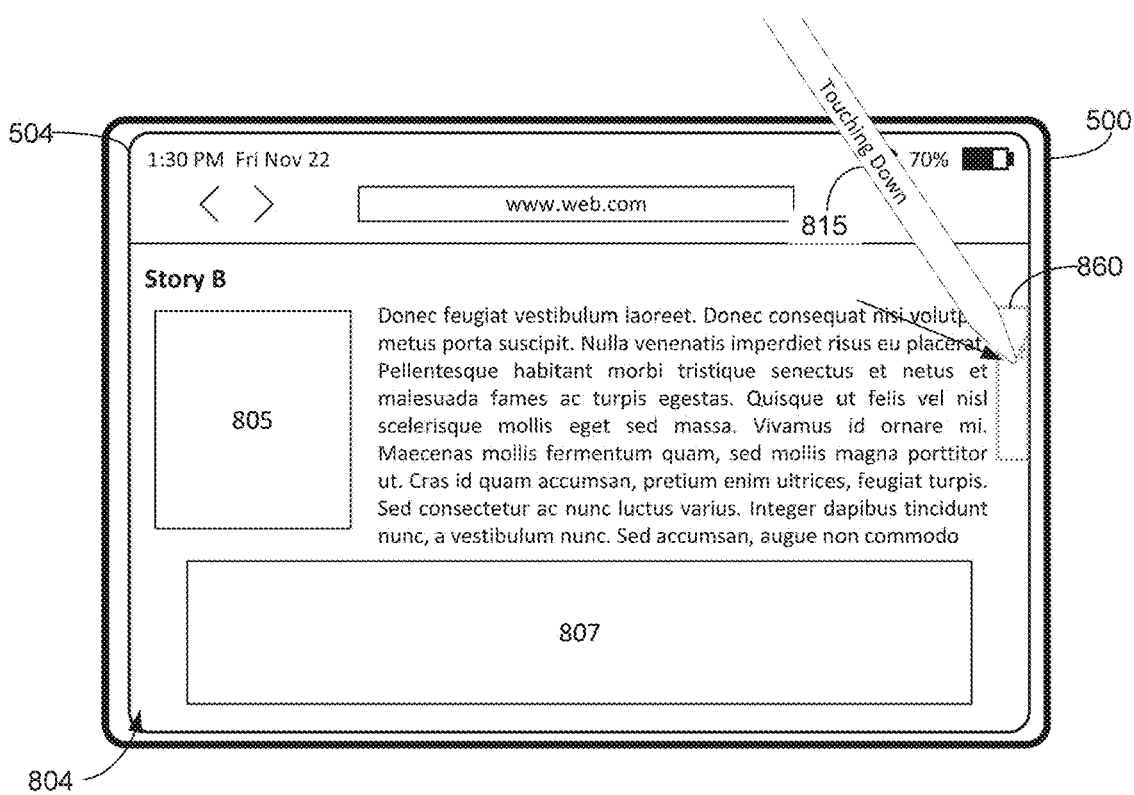
Figure 8A:
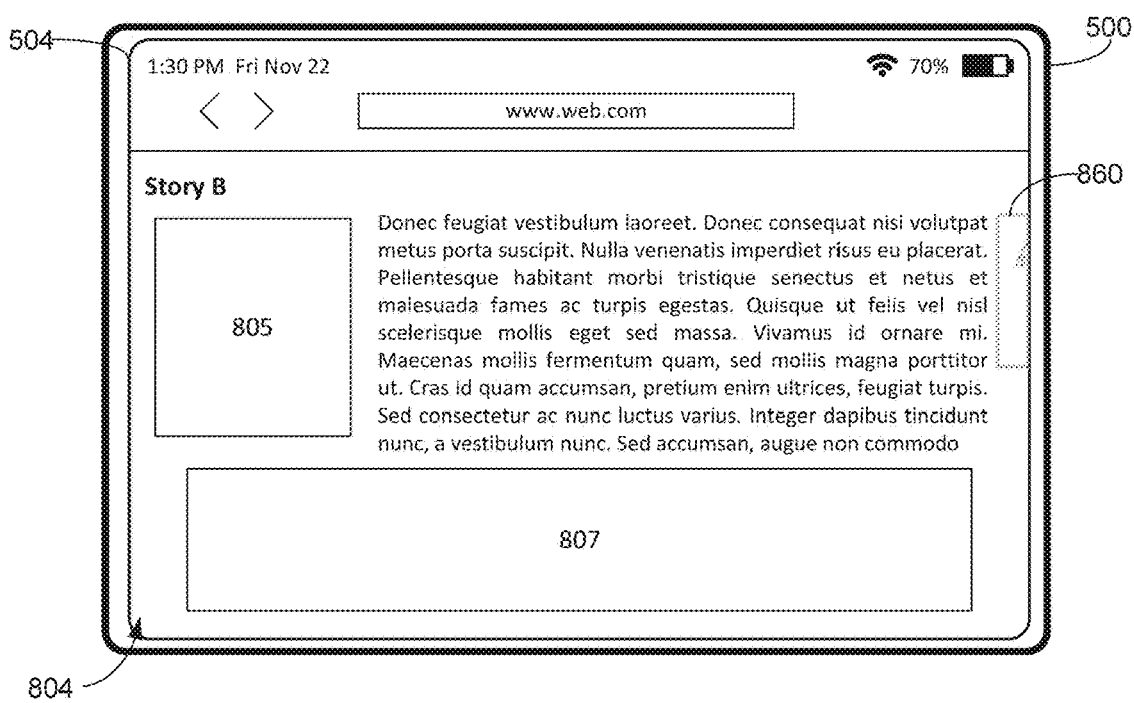
Figure 8A:
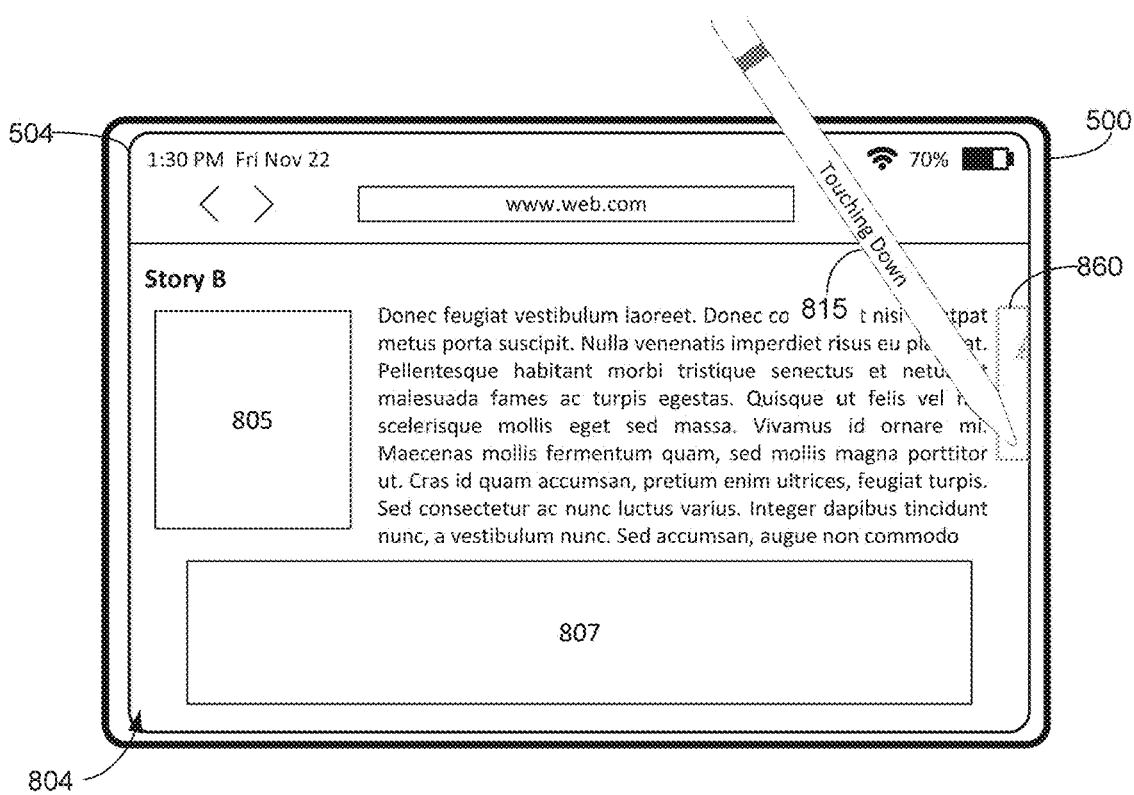
Figure 8A:
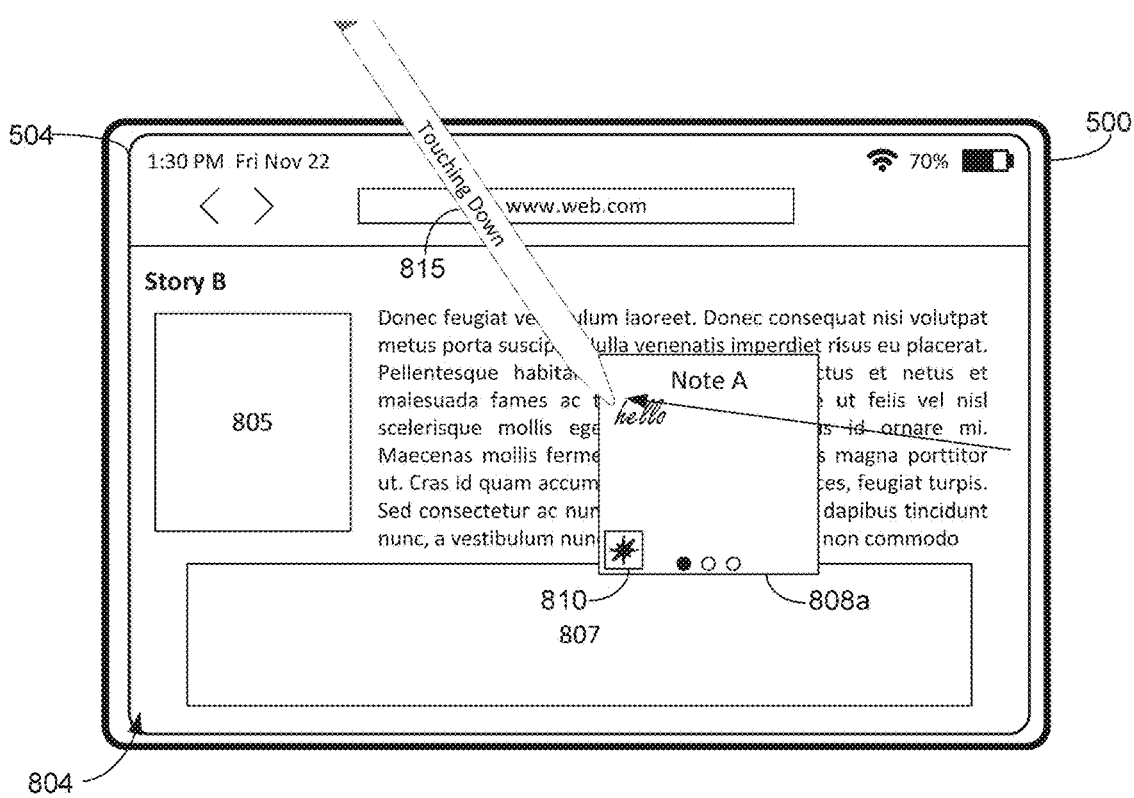
Figure 8A:
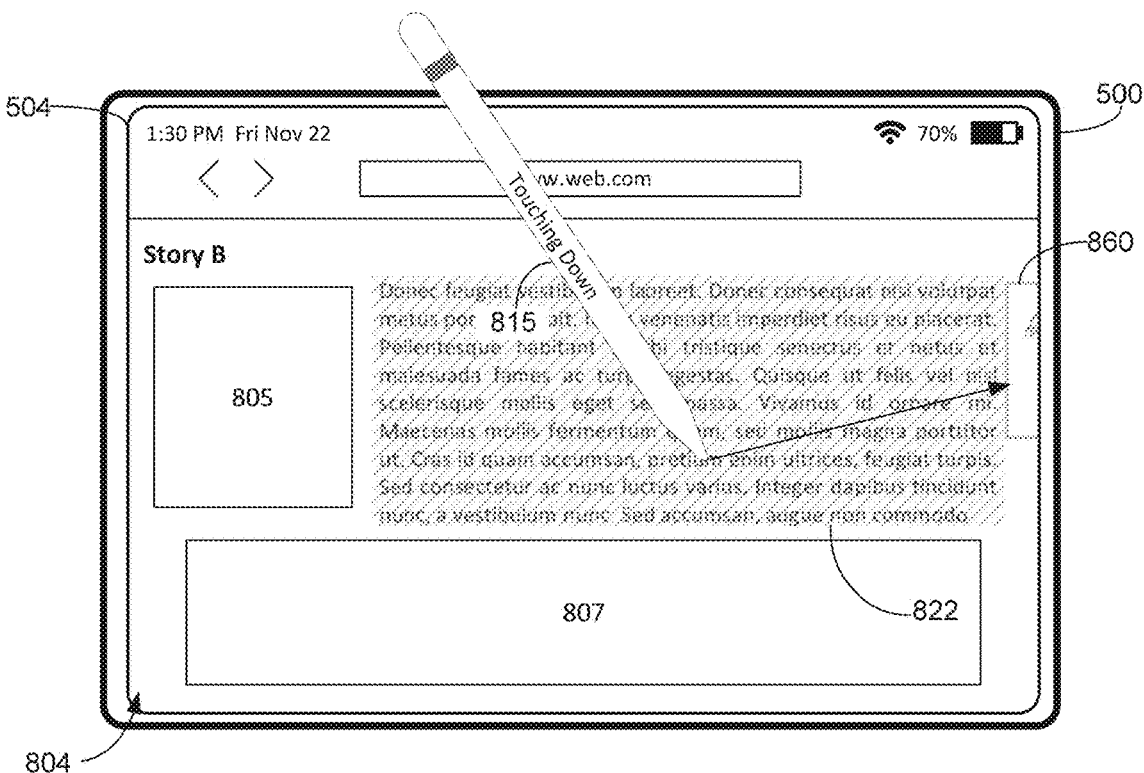
Figure 8A:
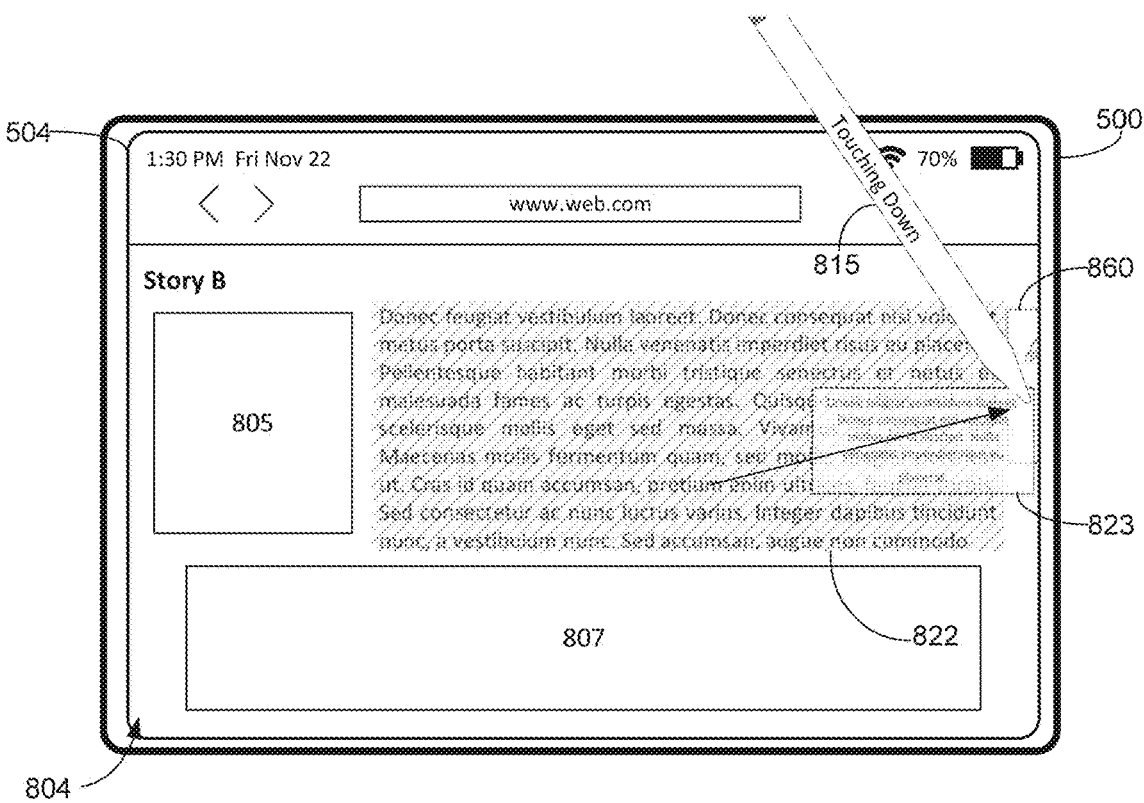
Figure 8A:
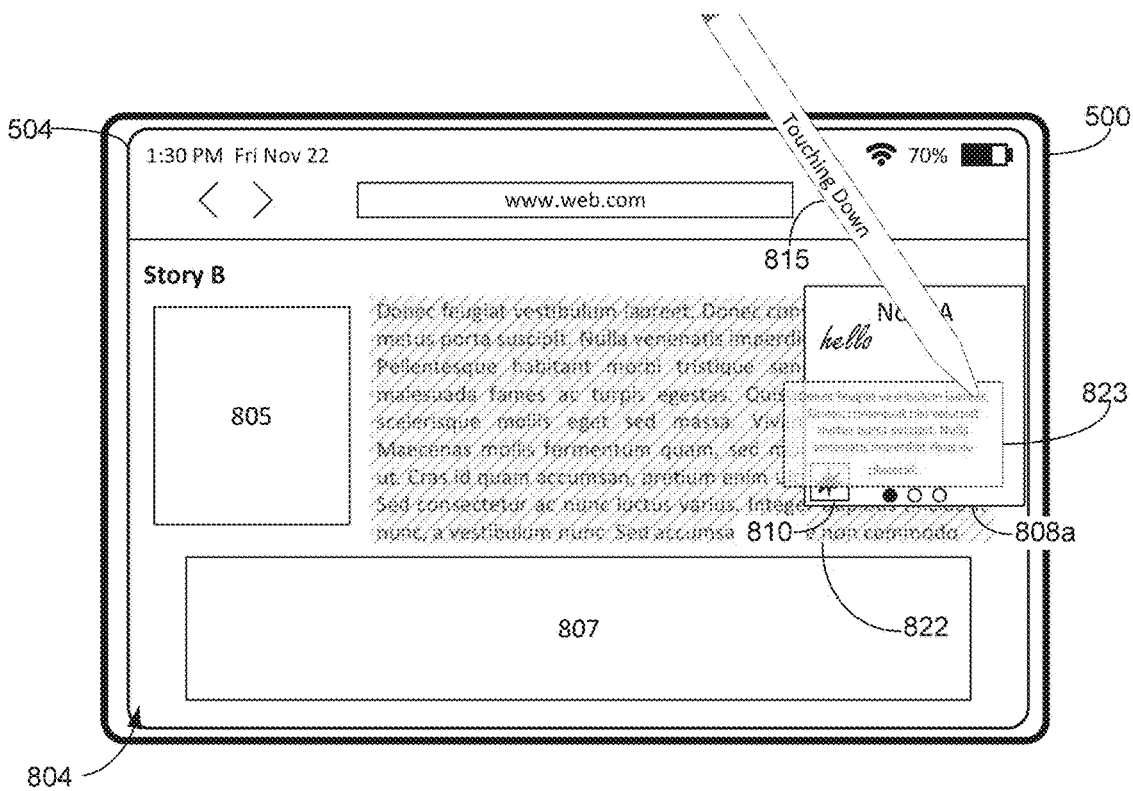
Figure 8A:
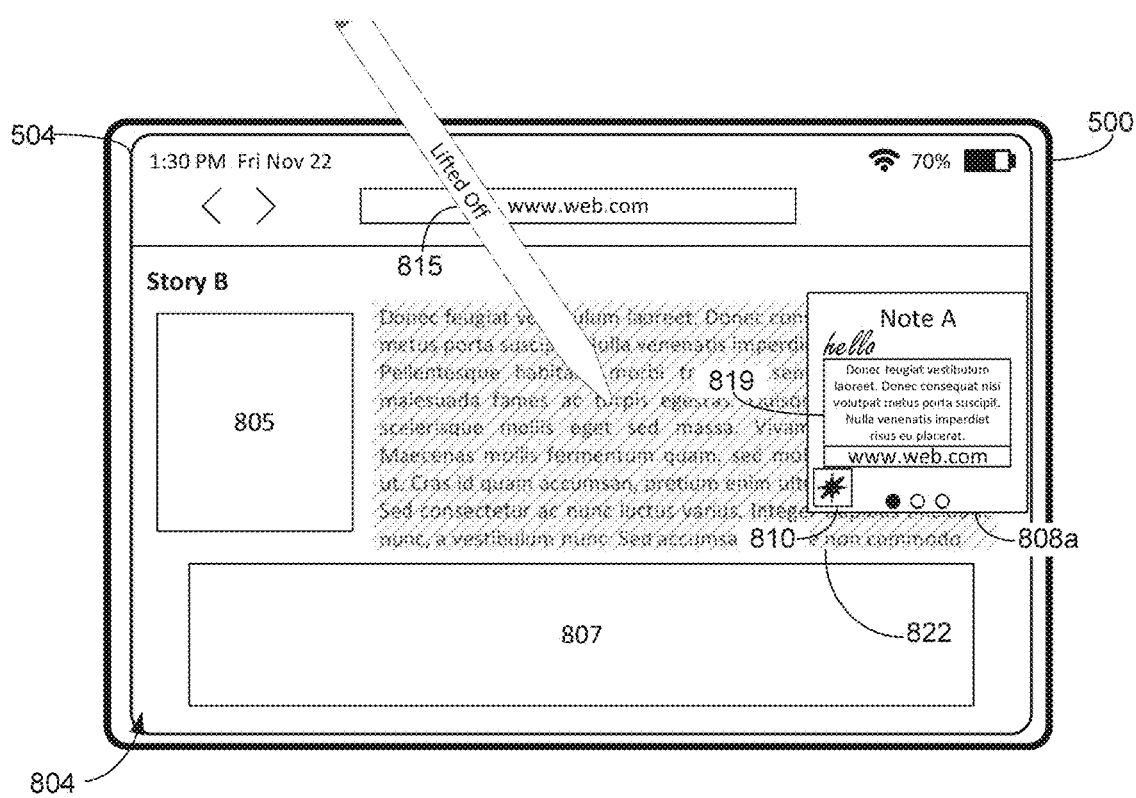
Figure 8A:
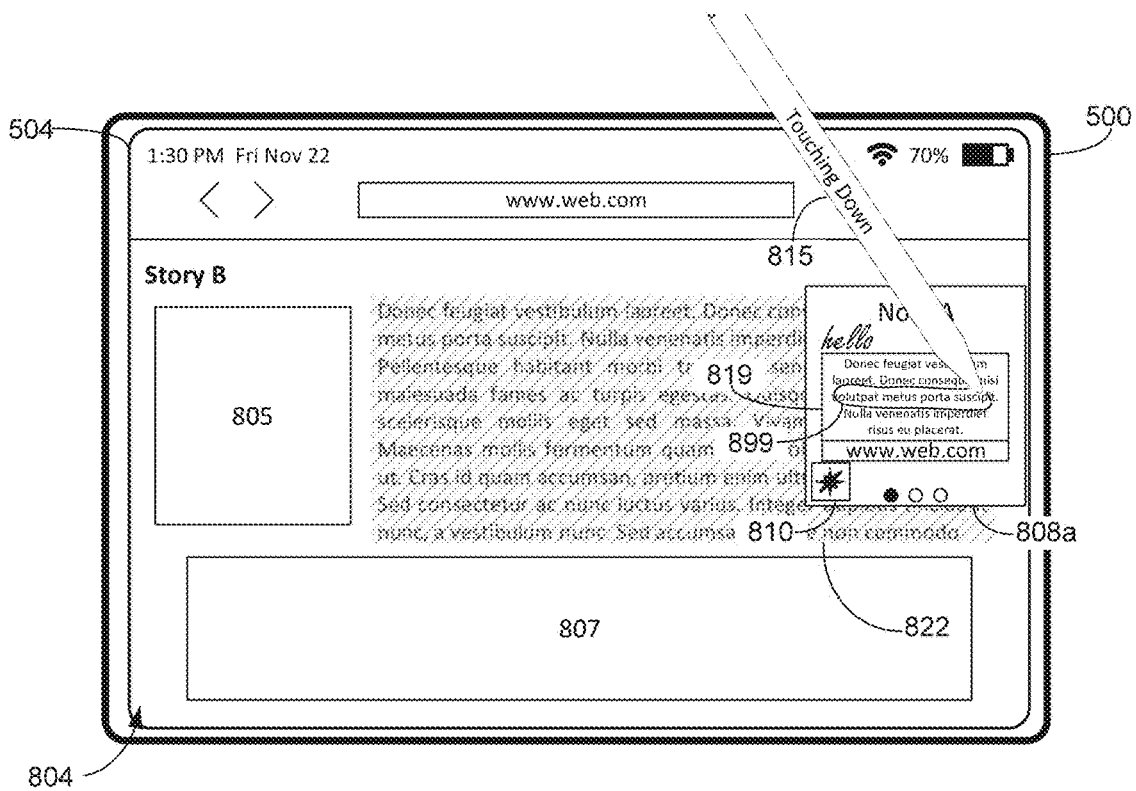
Figure 8A:
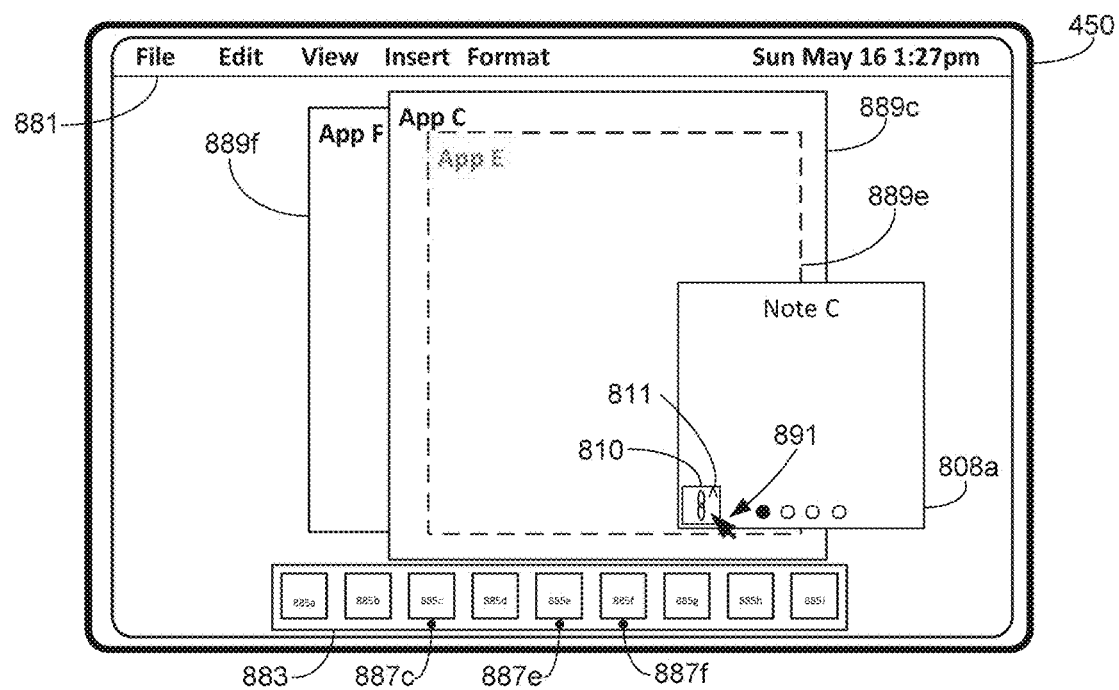
Figure 8A:
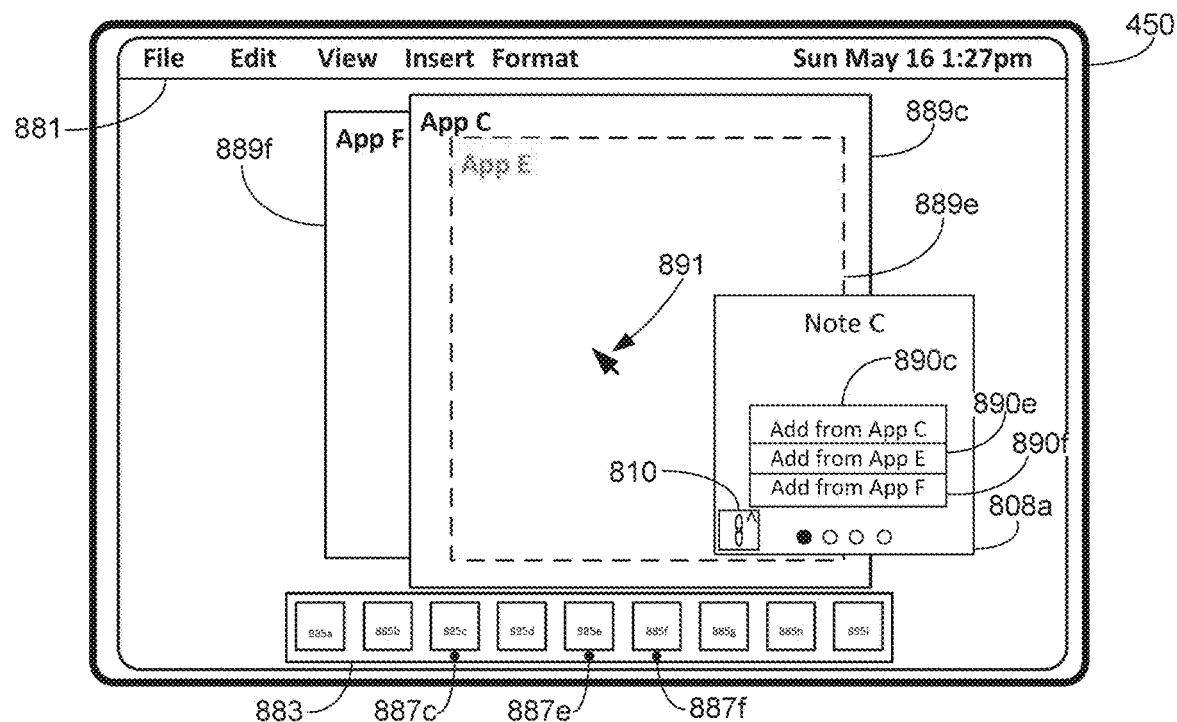
Figure 8A:
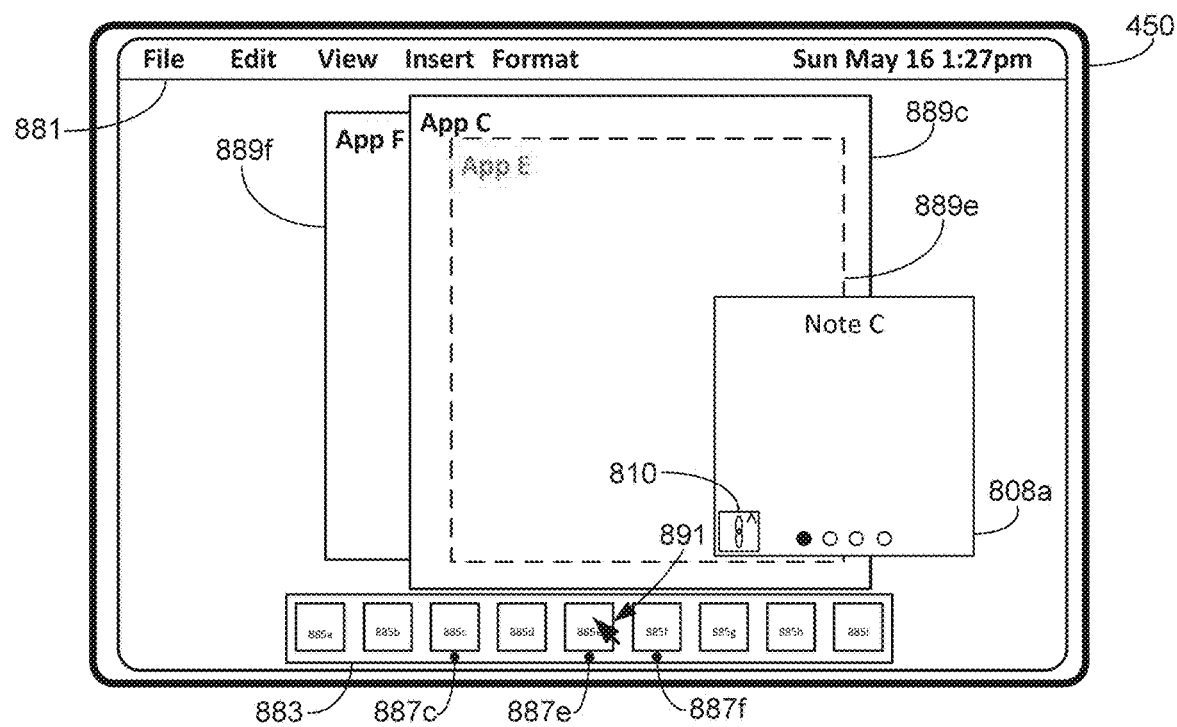
Figure 8A:
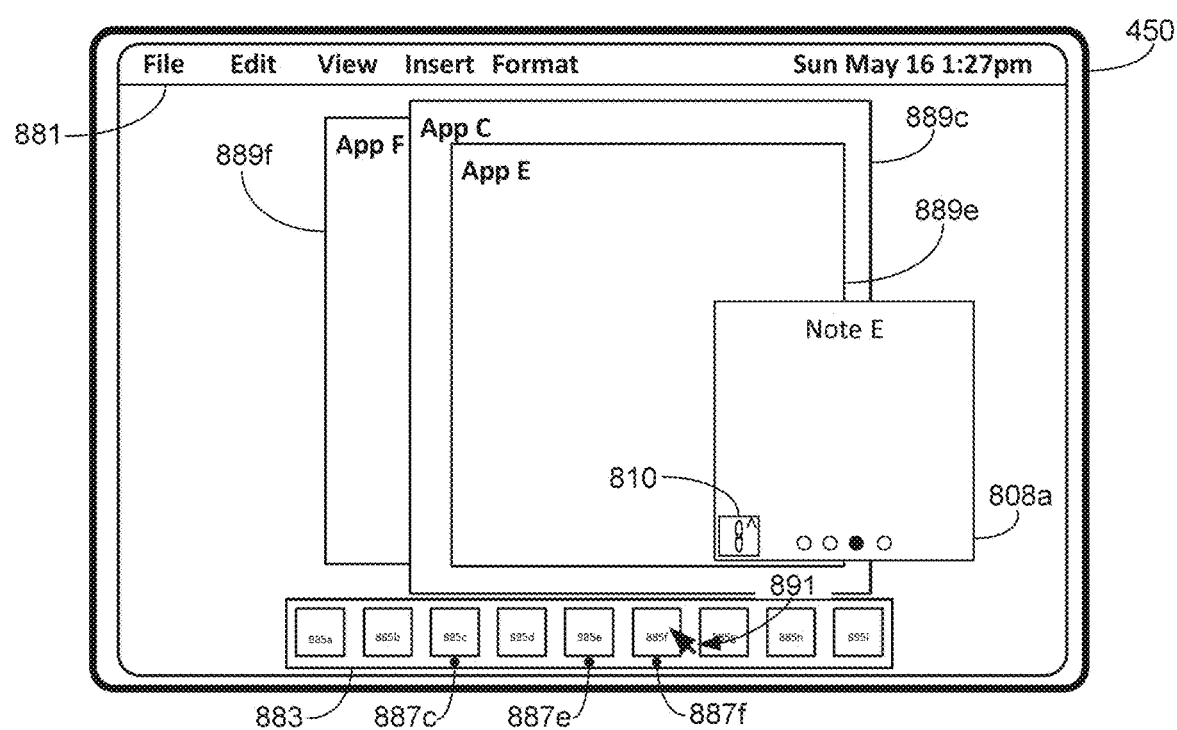
Figure 8A:
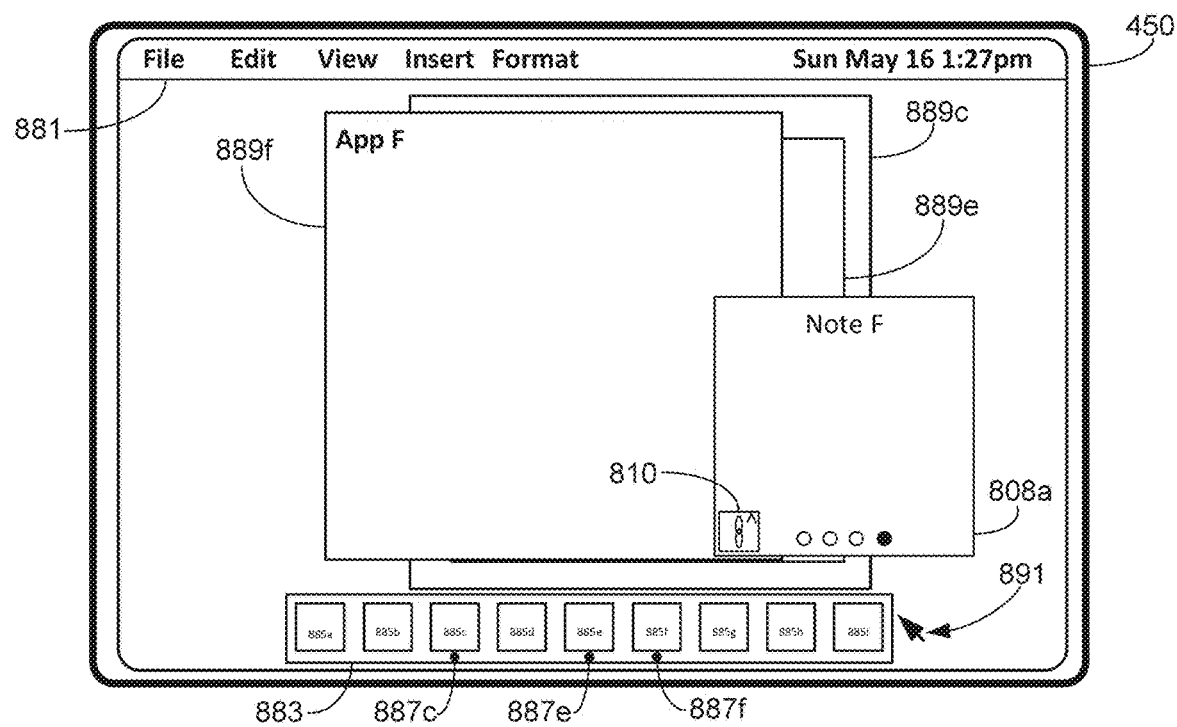

8Y-8Z, device 500 detects a corner swipe gesture with stylus 815 from the bottom-right corner of touch screen 504 while content 807 is highlighted in user interface 804. In response, as shown in FIG. 8Z, device 500 displays notes user interface 808a, and creates new Note D, which is displayed in notes user interface 808a. Further, new Note D includes representation 817, which is optionally a copy/representation/link to content 807 in user interface 804, as previously described. Further, as shown in FIG. 8Z, device 500 continues to display content 807 with highlighting 822.

In some embodiments, when device 500 is displaying more than one user interface with notes user interface 808a (e.g., different user interfaces of the same application, or different user interfaces of different applications) and/or if device 500 is displaying multiple items of content (e.g., multiple images, an image and a block of text, multiple blocks of text, etc.) with notes user interface 808a, in response to detecting selection of option 810, device 500 displays multiple options for designating from which user interface and/or which content is to be added to notes user interface 808a in response to the selection of option 810. For example, in FIG. 8AA, device 500 is concurrently displaying user interfaces 821a and 821b. Device 500 is also displaying notes user interface 808a, including option 810. Because device is displaying more than one user interface with notes user interface 808a, device 500 optionally displays option 810 with indication 811 that indicates that selection of option 810 will cause device 500 to display multiple options corresponding to the different user interfaces (or items of content) being displayed. For example, in FIG. 8AB, device 500 detects selection of option 810 via contact 803. In response, before adding any content to Note A in notes user interface 808a, device 500 displays selectable options 890a and 890b as shown in FIG. 8AC. Selectable option 890a is optionally selectable to add content from user interface 821a to Note A in notes user interface 808a (e.g., in any of the manners described herein), and selectable option 890b is optionally selectable to add content from user interface 821b to Note A in notes user interface 808a (e.g., in any of the manners described herein).

In some embodiments, notes user interface 808a can be moved to an (or any) edge of touch screen 504 to at least partially remove notes user interface 808a from display while maintaining display of an indication that is interactable to subsequently redisplay notes user interface 808a. For example, in FIG. 8AD, device 500 is displaying notes user interface 808a and user interface 804. In FIGS. 8AD-8AF, device 500 detects dragging of notes user interface 808a to (e.g., within a threshold distance such as 0.1, 0.2, 0.5, 1, 2, 5 cm of) the right edge of touch screen 504, and liftoff of stylus 815. In FIGS. 8AD-8AF, notes user interface 808a is dragged by input provided by stylus 815, but it is understood that notes user interface 808a can similarly be dragged to the right (or other) edge of touch screen 504 by input from another object, such as a user's finger.

In response to the input in FIGS. 8AD-8AE, device 500 at least partially hides notes user interface 808a, and displays on touch screen (e.g., at the location to which notes user interface 808a was dragged) an indication 860 corresponding to notes user interface 808a, as shown in FIG. 8AF. In some embodiments, indication 860 includes at least a portion of the content of the note that was displayed in notes user interface 808a when notes user interface 808a was dragged to the edge of touch screen 504 (e.g., Note A), and in some embodiments, indication 860 does not include any portion of the content of the note that was displayed in notes user interface 808a. In some embodiments, indication 860 is a portion of notes user interface 808a that is not hidden from display (e.g., a left portion of Note A if dragged to the right edge, a top portion of Note A if dragged to the bottom edge, a bottom portion of Note A if dragged to the top edge, and a right portion of Note A if dragged to the left edge). In some embodiments, indication 860 is displayed with more translucency or lower brightness than how notes user interface 808a was displayed before being dragged to the edge of touch screen 504. In some embodiments, indication 860 is displayed as attached to the edge of touch screen 504 (e.g., overlaid on the user interface(s) with which it is displayed, such as user interface 804), and can be moved via dragging input provided by the user to different locations along the edge of touch screen 504. In some embodiments, indication 860 is selectable (e.g., via a tap of a finger or stylus) to cause device 500 to re-display notes user interface 808a fully (e.g., and cease display of indication 860).

Indication 860 is optionally interactable in other ways as well. For example, indication 860 can be dragged away from the edge of touch screen 504 (e.g., using a stylus or finger) to cause notes user interface 808a to be fully displayed, such as shown in FIGS. 8AG-8AH. As shown in FIG. 8AH, notes user interface 808a is displaying the note that was displayed in notes user interface 808a (e.g., Note A) when notes user interface 808a was dragged to the right edge of touch screen 504.

As another example, content can be dragged (e.g., with a finger or a stylus) to indication 860 to cause device 500 to redisplay notes user interface 808a, and facilitate dropping of the dragged content into notes user interface 808a. For example, in FIG. 8AI, the textual content of Story B is highlighted with highlighting 822 (though it is understood that in some embodiments, the textual content of Story B need not be highlighted to be able to drag that content to indication 860). In FIGS. 8AI-8AJ, stylus 815 touches down on, and drags the textual content of Story B to indication 860 while remaining touched down on touch screen 504. As shown in FIG. 8AJ, in some embodiments, while the content is being dragged to indication 860, device 500 displays a representation 823 of the dragged content (e.g., a smaller, translucent copy of the content) on touch screen 504.

In response to the content being dragged to indication 860 in FIG. 8AJ, and while stylus 815 remains touched down on touch screen 504, device 500 fully displays notes user interface 808a (e.g., at a location corresponding to, or adjacent to, the location at which indication 860 was displayed at the edge of touch screen 504) and ceases display of indication 860, as shown in FIG. 8AK. As shown in FIG. 8AK, notes user interface 808a is displaying the note that was displayed in notes user interface 808a (e.g., Note A) when notes user interface 808a was dragged to the right edge of touch screen 504. Further, stylus 815 remains touched down on touch screen 504, and therefore, the content being dragged by stylus 815 is not yet dropped into Note A in notes user interface 808a. Additionally, in some embodiments, device 500 displays notes user interface 808a at a location on touch screen 504 such that the location of stylus is within notes user interface 808a, and not outside of notes user interface 808a.

In response to detecting liftoff of stylus 815 while the location of stylus 815 is within notes user interface 808a, device 500 adds a copy/representation/link to the textual content of Story B to Note A in notes user interface 808a, as indicated by representation 819 in FIG. 8AL. Representation 819 optionally one or more of the characteristics of content added to notes user interface 808a described previously and with reference to method 900. Further, device 500 ceases displaying representation 823 that was displayed by device 500 in FIG. 8AK. In some embodiments, dragging and dropping content (e.g., the textual content of Story B) to notes user interface 808a results in a copy of the content being inserted into notes user interface 808a without adding a (e.g., rich) link to that content to notes user interface 808a. As shown in FIG. 8AL, the textual content of Story B in user interface 804 is highlighted with highlighting 822 (e.g., because content corresponding to the textual content of Story B has been (e.g., and is currently) added to Note A in notes user interface 808a). In some embodiments, in response to adding representation 819 to Note A in notes user interface 808a, device 500 automatically (e.g., after a predetermined amount of time after liftoff of stylus 815, such as 0.5, 1, 2, 5, 10 seconds) ceases display of notes user interface 808a and redisplays indication 860 at the location at which it was displayed previously (e.g., the location in FIG. 8AI). In some embodiments, in response to adding representation 819 to Note A in notes user interface 808a, device 500 does not automatically cease display of notes user interface 808a (e.g., continues displaying notes user interface 808a).

Further, in some embodiments, the location in notes user interface 808a at which representation 819 is added is based on the location of stylus 815 when liftoff of stylus 815 is detected by device 500. For example, if stylus 815 is located towards a bottom portion of Note A in notes user interface 808a when device 500 detects liftoff of stylus 815 in FIGS. 8AK-8AL, device 500 adds representation 819 to the bottom portion of Note A. Similarly, if stylus 815 is located towards a top, right, or left portion of Note A in notes user interface 808a when device 500 detects liftoff of stylus 815 in FIGS. 8AK-8AL, device 500 adds representation 819 to the top, right, or left, respectively, portion of Note A. Thus, in some embodiments, the location of the (e.g., rich) link added to Note A is defined by user input (e.g., is arbitrary in accordance with user input).

In some embodiments, after a (e.g., rich) link has been added to notes user interface 808a, user input can be provided to device 500 to mark-up or draw on the link. For example, in FIG. 8AM, device 500 detects input from stylus 815 circling a portion of representation 819, which results in device 500 displaying representation 819 with a representation 899 of the (e.g., handwritten) input provided by stylus 815 overlaid on representation 819. In the example of FIG. 8AM, stylus 815 provided an input circling a portion of the text included in representation 819, however it is understood that other types of inputs directed to representation 819 are also contemplated. For example, if representation 819 includes an image or photo, stylus 815 can provide an input circling or underlining the photo, which would optionally result in device 500 displaying such circling or underlining overlaying representation 819 and/or the photo in representation 819. Further, in some embodiments, inputs for marking up a given (e.g., rich) link in notes user interface 808a can be provided by a cursor or a finger in addition or alternatively to stylus 815.

Characteristics of one or more of the embodiments described with reference to FIGS. 8A-8AM optionally also apply to embodiments in which cursor input is being provided to device 500 to interact with the user interface(s) displayed by device 500. For example, in FIG. 8AN, device 500 is displaying, via display 450, a user interface to which input is provided by cursor 891. The user interface in FIG. 8AN includes a menu bar 881 that includes various selectable options (e.g., File, Edit, View, Insert, Format, etc.) that are selectable to access corresponding functionalities for controlling operation or interacting with the application user interface (e.g., application window) that is currently in focus (e.g., the application user interface that is currently at the top of the stack of application user interfaces). The user interface in FIG. 8AN also includes a dock 883 that includes application icons 885a-885i that are selectable to cause device 500 to display a user interface corresponding to the selected application/application icon via display 450.

In the user interface of FIG. 8AN, application user interfaces 889c, 889e and 889f— corresponding to application icons 885c, 885e and 885f—are currently included in the user interface displayed via display 450. User interface 889c (e.g., corresponding to the application associated with application icon 885c) is currently the application user interface at the top of the application user interface stack, user interface 889e (e.g., corresponding to the application associated with application icon 885e) is currently the next-highest application user interface in the application user interface stack, and user interface 889f (e.g., corresponding to the application associated with application icon 885f) is currently the next-highest application user interface in the application user interface stack. Further, user interface 889e is completely obscured by user interface 889c and is currently not visible via display 450, though it is illustrated with dashed lines in FIG. 8AN to convey its presence and/or location on display 450. Indicators 887c, 887e and 887f displayed in association with application icons 885c, 885e and 885f indicate that user interfaces 889c, 889e and 889f are currently included in the user interface displayed via display 450.

In FIG. 8AN, device 500 is also displaying notes user interface 808a via display 450 (e.g., displayed in response to input such as described with reference to method 700). Notes user interface 808a is displayed above the application user interfaces in the application user interface stack (e.g., higher in the z-hierarchy than all of the application windows displayed in the user interface), and is therefore overlaying user interface 889c, 889e and/or 889f in FIG. 8AN. In some embodiments, similar to as described with reference to FIGS. 8AA-8AC, when device 500 is displaying more than one user interface with notes user interface 808a (e.g., different user interfaces of the same application, or different user interfaces of different applications), in response to detecting selection of option 810, device 500 displays multiple options for designating from which user interface content is to be added to notes user interface 808a in response to the selection of option 810—including user interfaces that are not visible via display 450 due to being obscured by another user interface displayed by device 500.

For example, in FIG. 8AN, device 500 is concurrently displaying user interfaces 889c, 889e (obscured by user interface 889c) and 889f. Device 500 is also displaying notes user interface 808a (including Note C), including option 810. Because device is displaying more than one user interface with notes user interface 808a, device 500 optionally displays option 810 with indication 811 that indicates that selection of option 810 will cause device 500 to display multiple options corresponding to the different user interfaces being displayed. For example, in FIG. 8AN, device 500 detects selection of option 810 via cursor 891. In response, before adding content to Note C in notes user interface 808a, device 500 displays selectable options 890c, 890e and 890f as shown in FIG. 8AO. Selectable option 890c is optionally selectable to add content from user interface 889c to Note C in notes user interface 808a (e.g., in any of the manners described herein), selectable option 890e is optionally selectable to add content from user interface 889e to Note C in notes user interface 808a (e.g., in any of the manners described herein), and selectable option 890f is optionally selectable to add content from user interface 889f to Note C in notes user interface 808a (e.g., in any of the manners described herein). Thus, in some embodiments, the options displayed by device 500 in response to selection of option 810 correspond to the application user interfaces that are displayed below notes user interface 808a (e.g., in the z-hierarchy of the user interface displayed by device 500) when selection of option 810 is detected.

In some embodiments, device 500 automatically switches between the notes displayed in notes user interface 808a in response to different application user interfaces obtaining focus (e.g., moving to the top of the application user interface stack) in the user interface displayed via display 450. For example, in FIG. 8AP, Note C (and its content, if any) is currently displayed in notes user interface 808a, optionally because Note C corresponds to user interface 889c, which is the application user interface that currently has focus (e.g., is displayed at the top of the application user interface stack). In some embodiments, Note C corresponds to user interface 889c, because Note C includes content that has been added to it from user interface 889c and/or from content otherwise displayed by Application C—for which user interface 889c is a user interface.

In FIG. 8AP, device 500 detects selection of application icon 885e via cursor 891. In response, as shown in FIG. 8AQ, device 500 moves user interface 889e—corresponding to application icon 885e—to the top of the application user interface stack (e.g., while remaining below notes user interface 808a in the z-hierarchy of the user interface displayed by device 500). Thus, in the user interface illustrated in FIG. 8AQ, user interface 889e is currently the application user interface at the top of the application user interface stack, user interface 889c is currently the next-highest application user interface in the application user interface stack, and user interface 889f is currently the next-highest application user interface in the application user interface stack. Further, in FIG. 8AQ, in response to the input that gave user interface 889e the focus, device 500 updates notes user interface 808a to display Note E (e.g., including its content, if any, and no longer displays Note C), optionally because Note E corresponds to user interface 889e, which is the application user interface that currently has focus (e.g., is displayed at the top of the application user interface stack). In some embodiments, Note E corresponds to user interface 889e, because Note E includes content that has been added to it from user interface 889e and/or from content otherwise displayed by Application E—for which user interface 889e is a user interface.

In FIG. 8AQ, device 500 detects selection of application icon 885f via cursor 891. In response, as shown in FIG. 8AR, device 500 moves user interface 889f—corresponding to application icon 885f—to the top of the application user interface stack (e.g., while remaining below notes user interface 808a in the z-hierarchy of the user interface displayed by device 500). Thus, in the user interface illustrated in FIG. 8AR, user interface 889f is currently the application user interface at the top of the application user interface stack, user interface 889e is currently the next-highest application user interface in the application user interface stack, and user interface 889c is currently the next-highest application user interface in the application user interface stack. Further, in FIG. 8AR, in response to the input that gave user interface 889f the focus, device 500 updates notes user interface 808a to display Note F (e.g., including its content, if any, and no longer displays Note E), optionally because Note F corresponds to user interface 889f, which is the application user interface that currently has focus (e.g., is displayed at the top of the application user interface stack). In some embodiments, Note F corresponds to user interface 889f, because Note F includes content that has been added to it from user interface 889f and/or from content otherwise displayed by Application F—for which user interface 889f is a user interface.

Figure 9A:
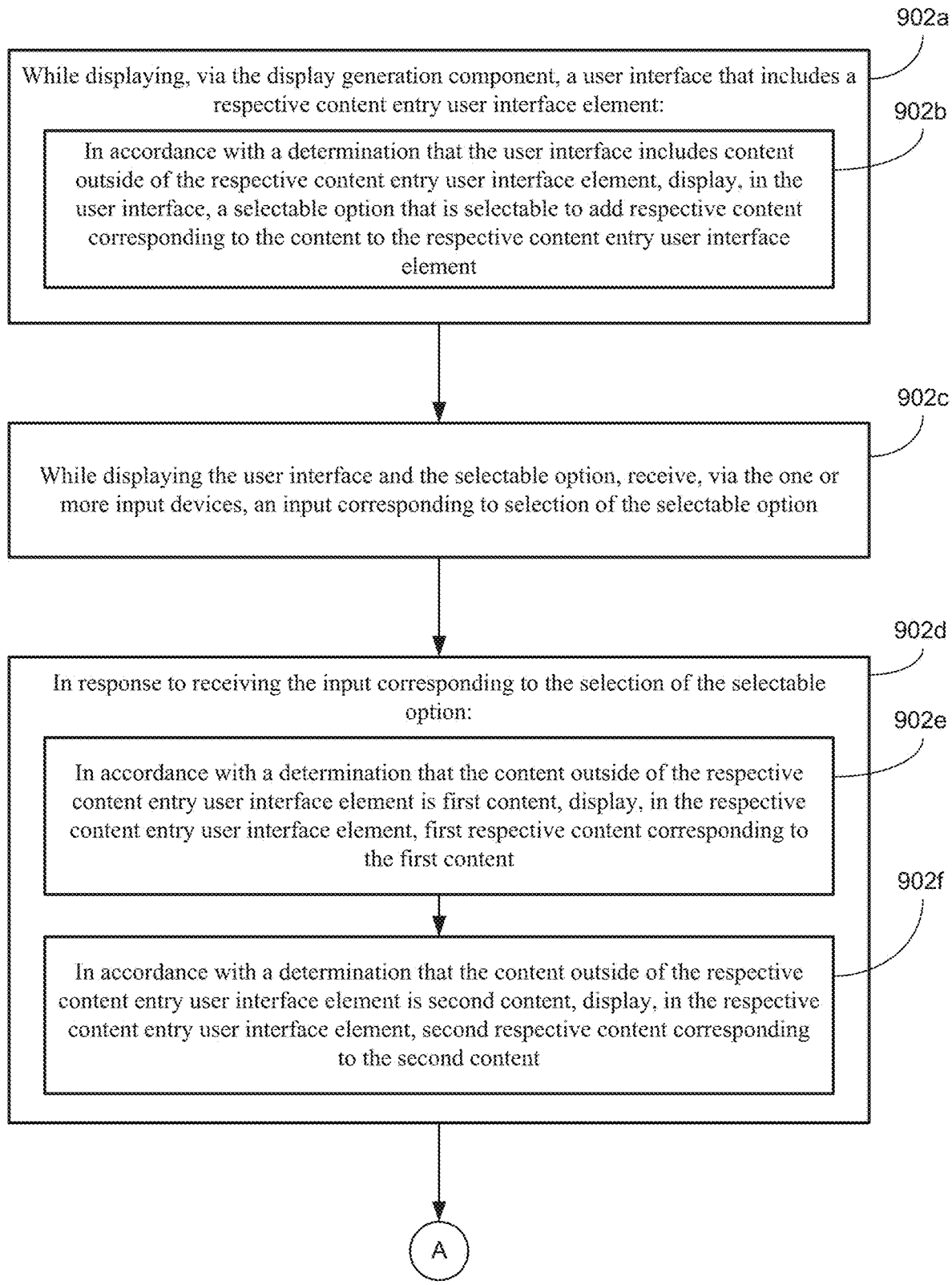
FIGS. 9A-9N are flow diagrams illustrating a method of facilitating the addition of content displayed with a note to the note in accordance with some embodiments.
Figure 9B:
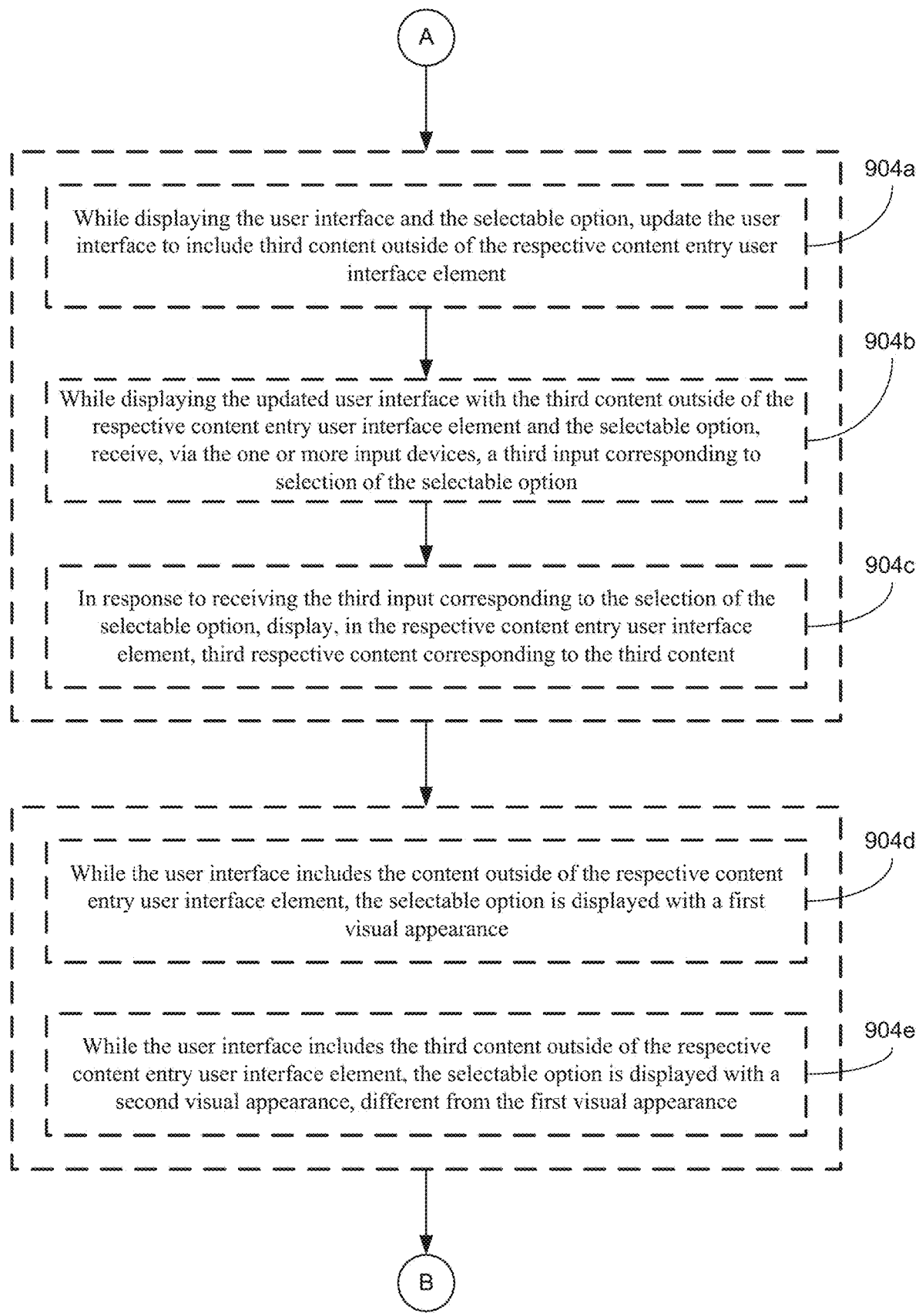
Figure 9C:
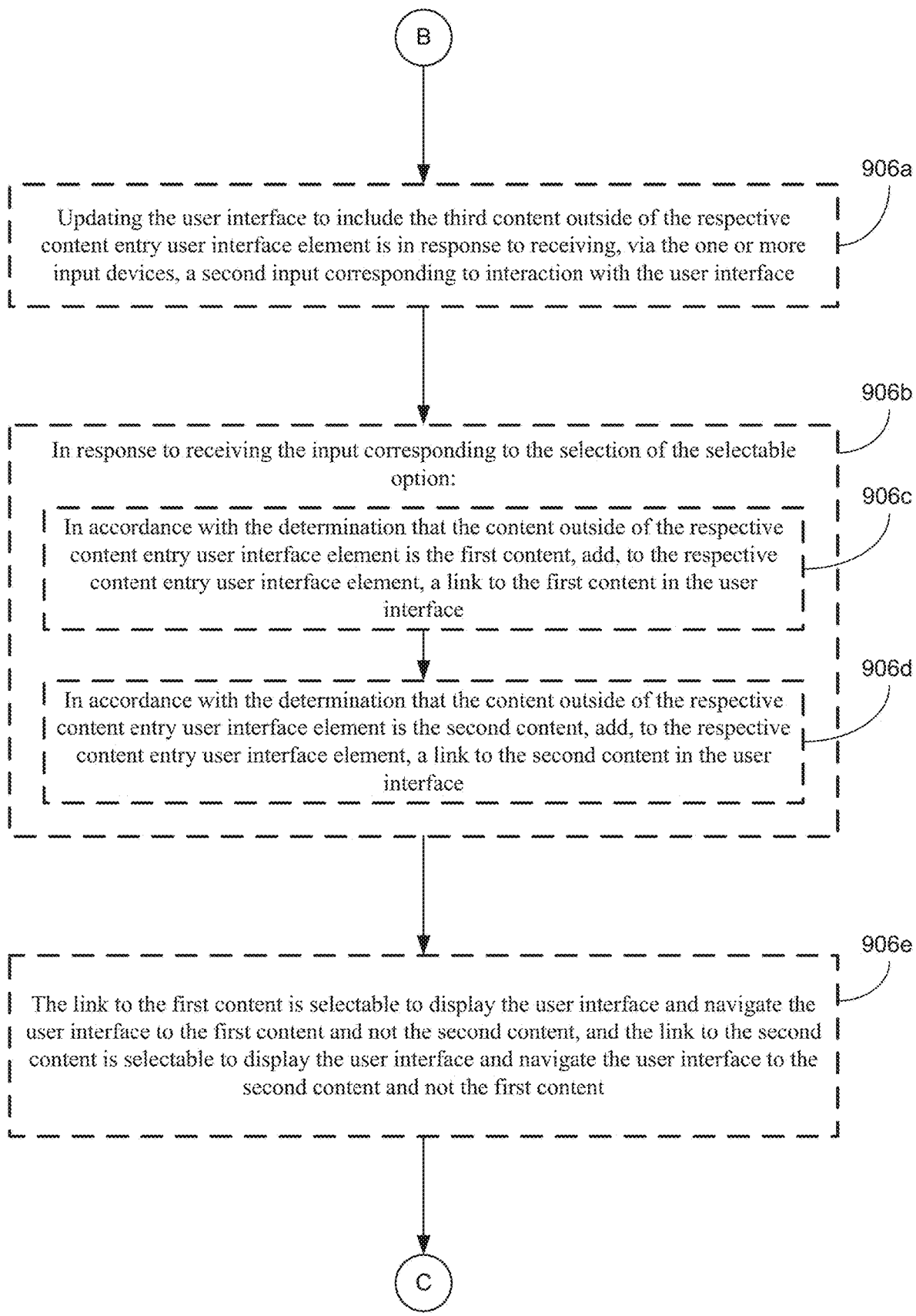
Figure 9D:
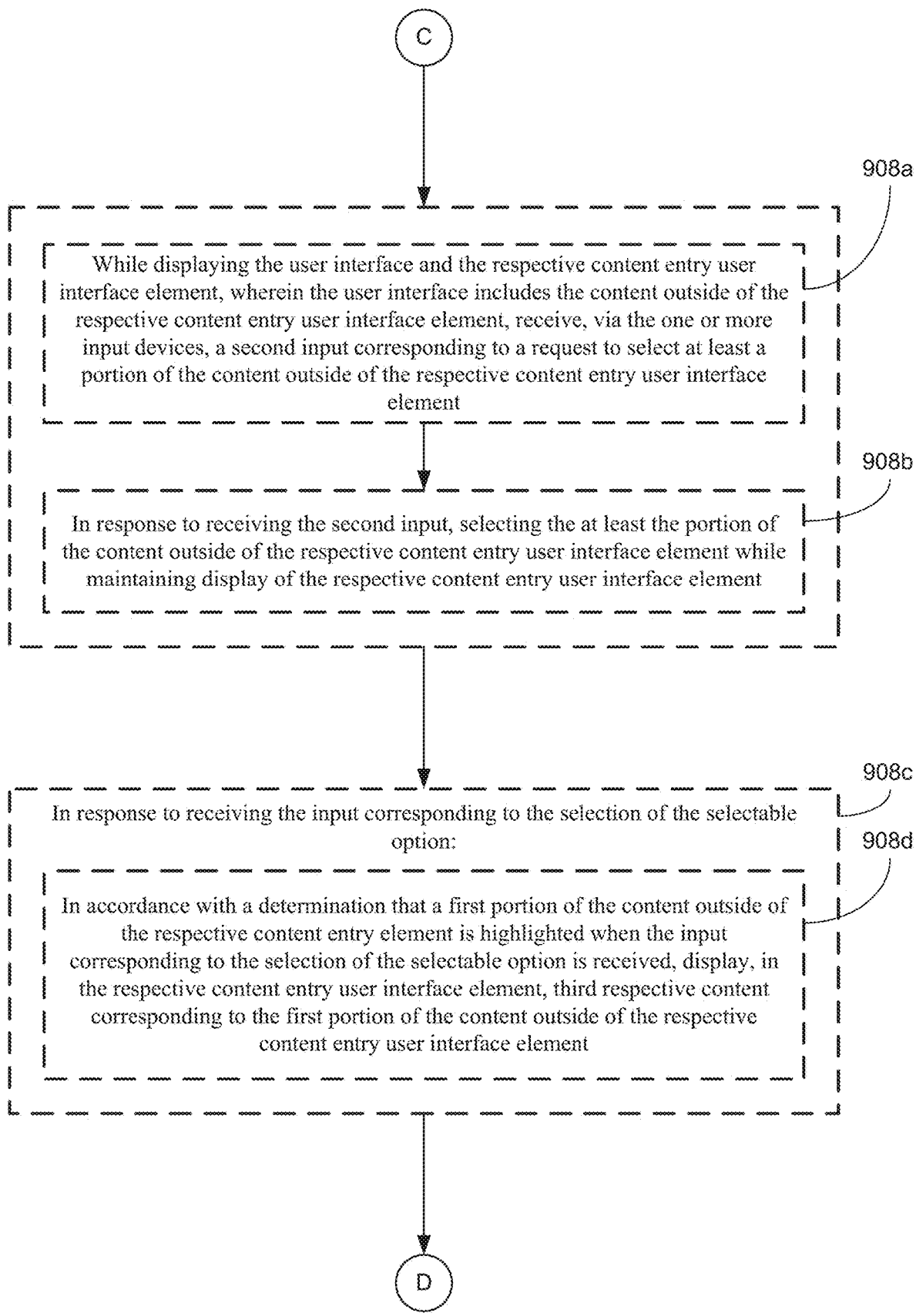
Figure 9E:
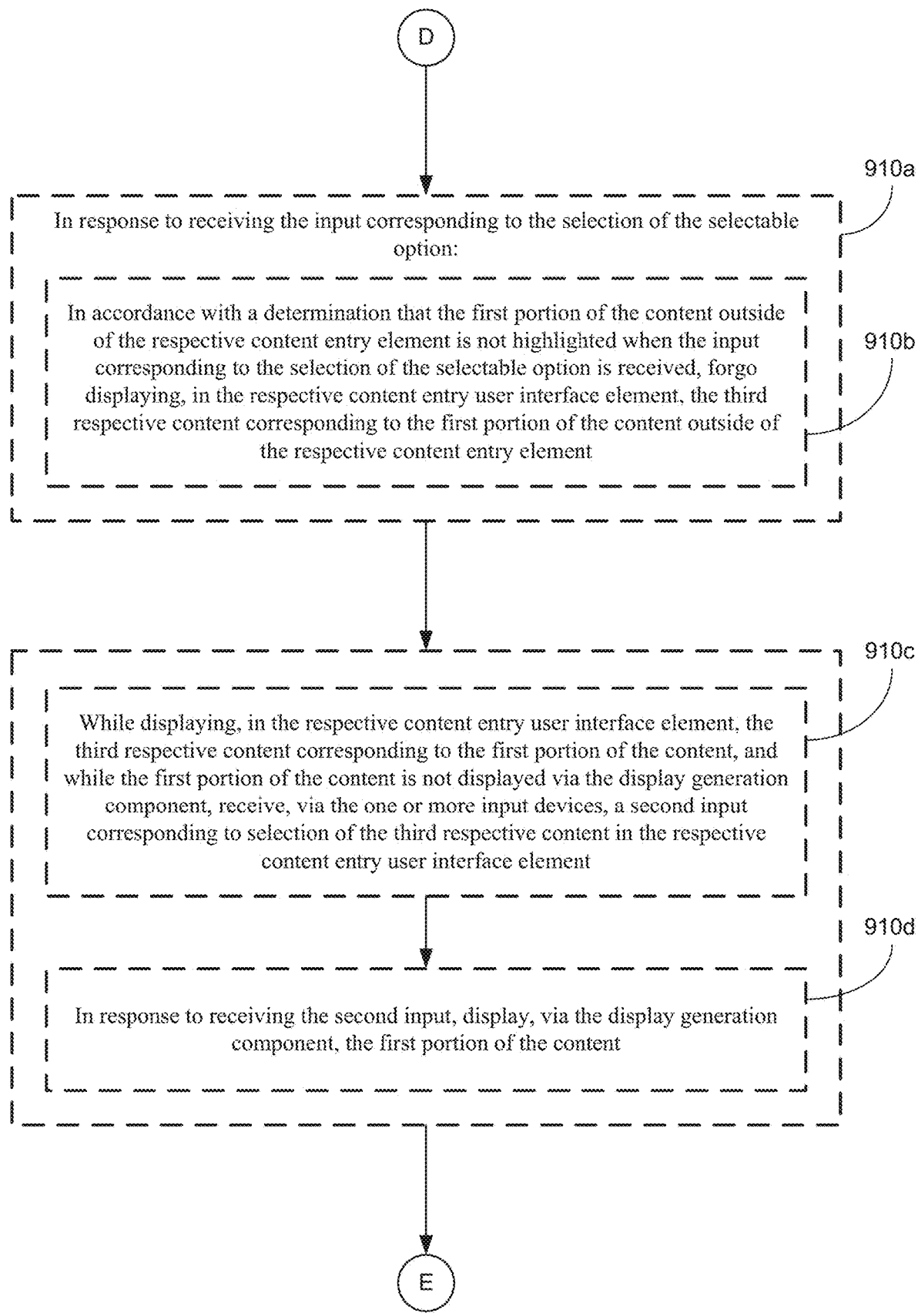
Figure 9F:
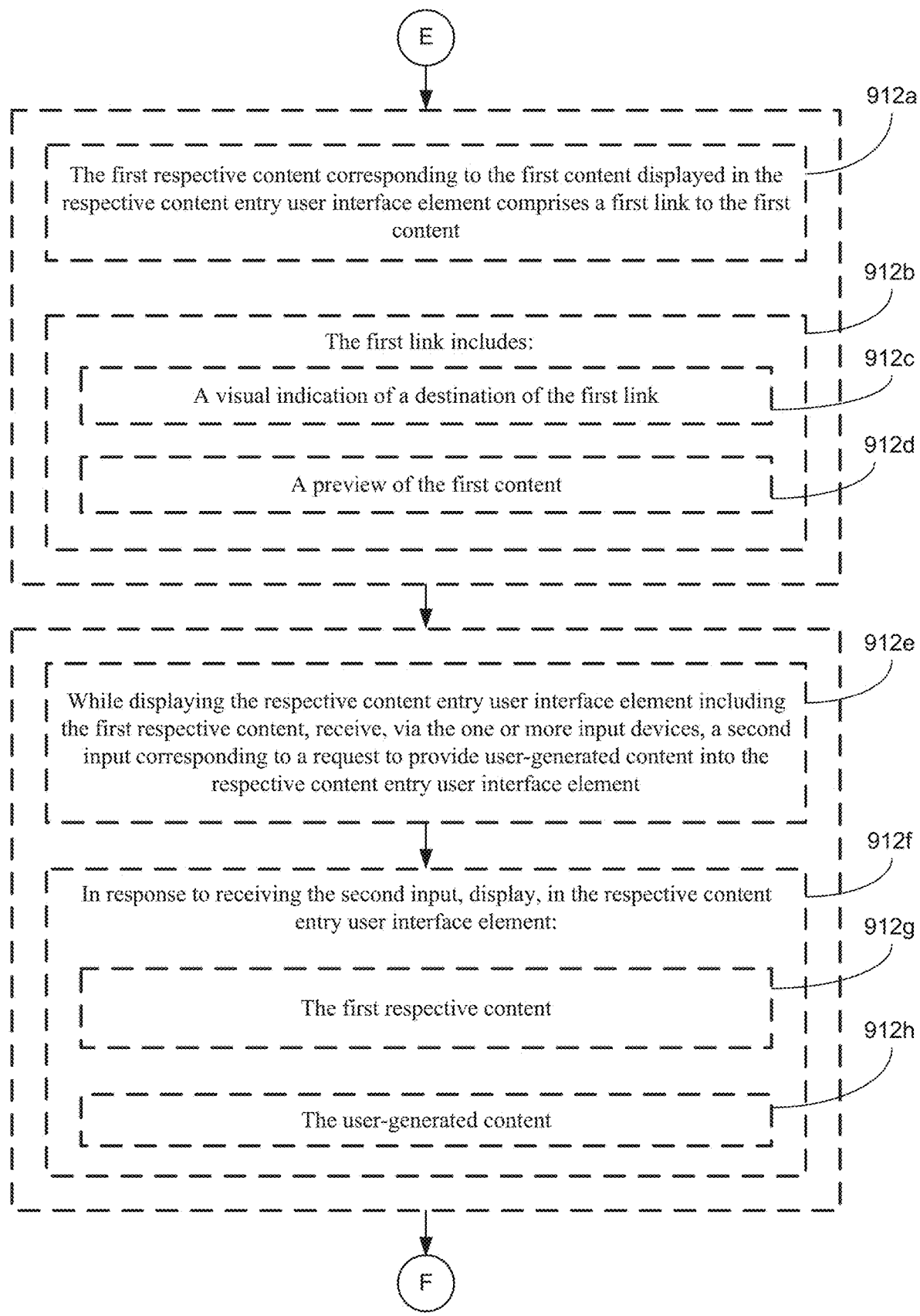
Figure 9G:
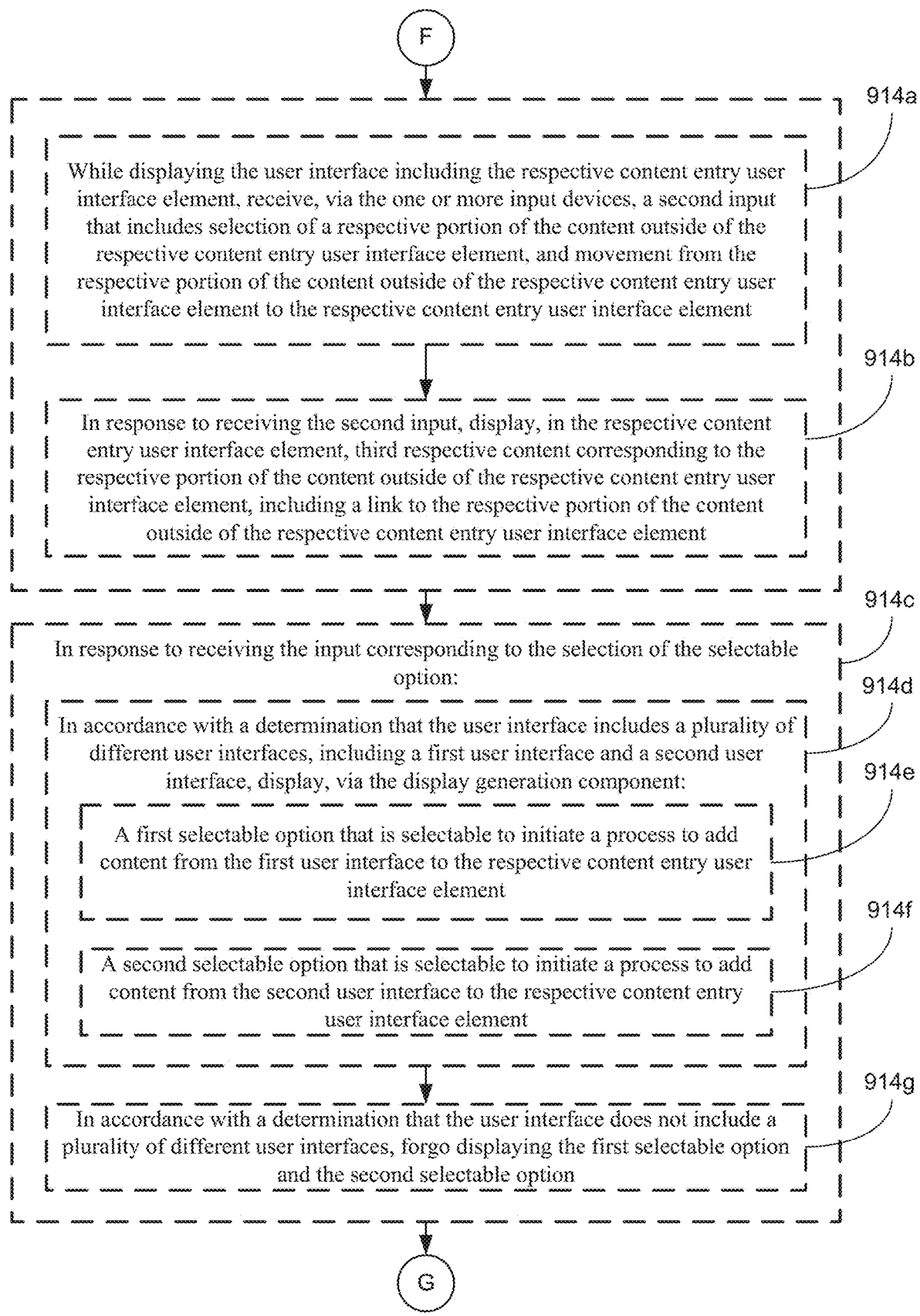
Figure 9H:
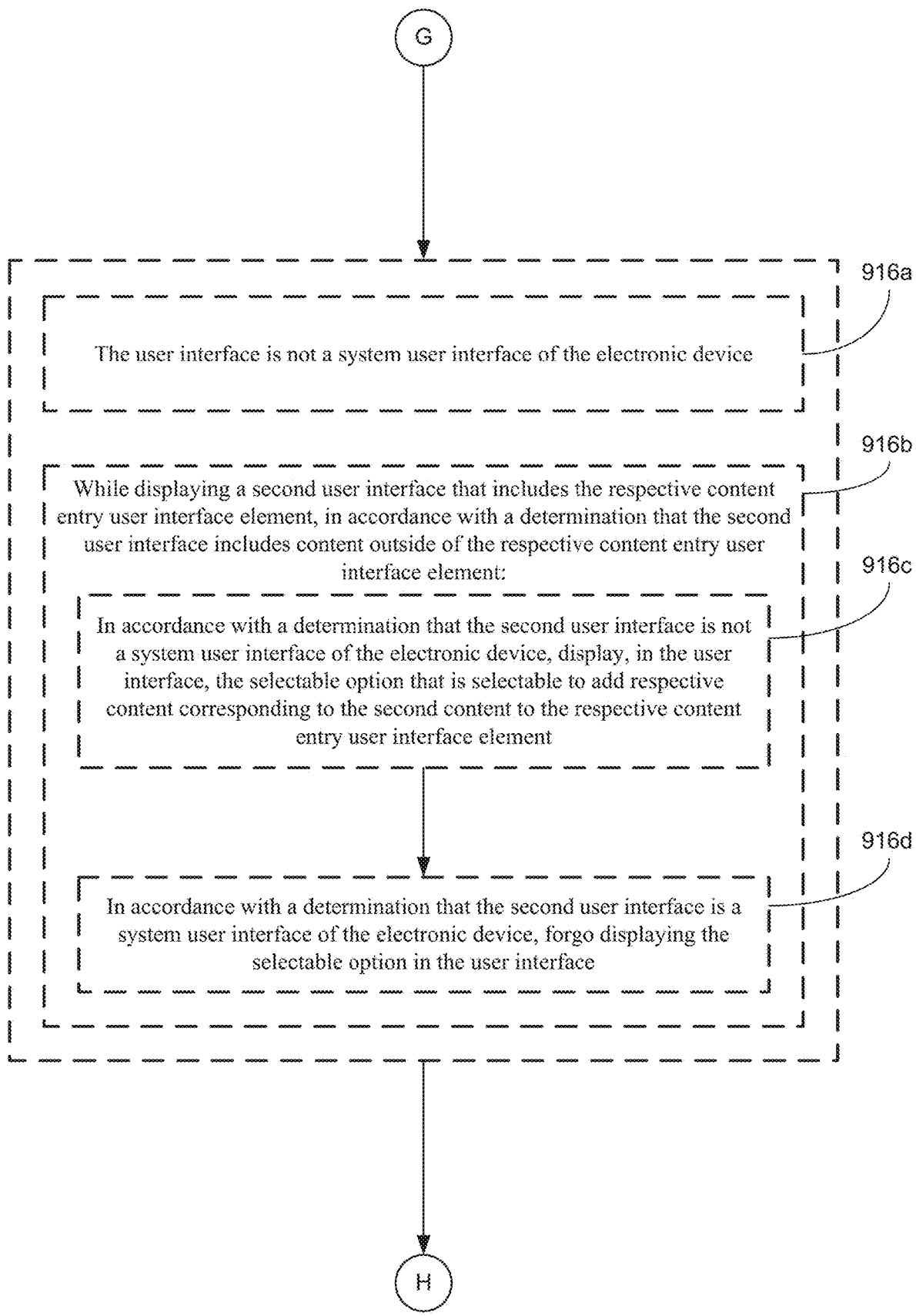
Figure 9I:
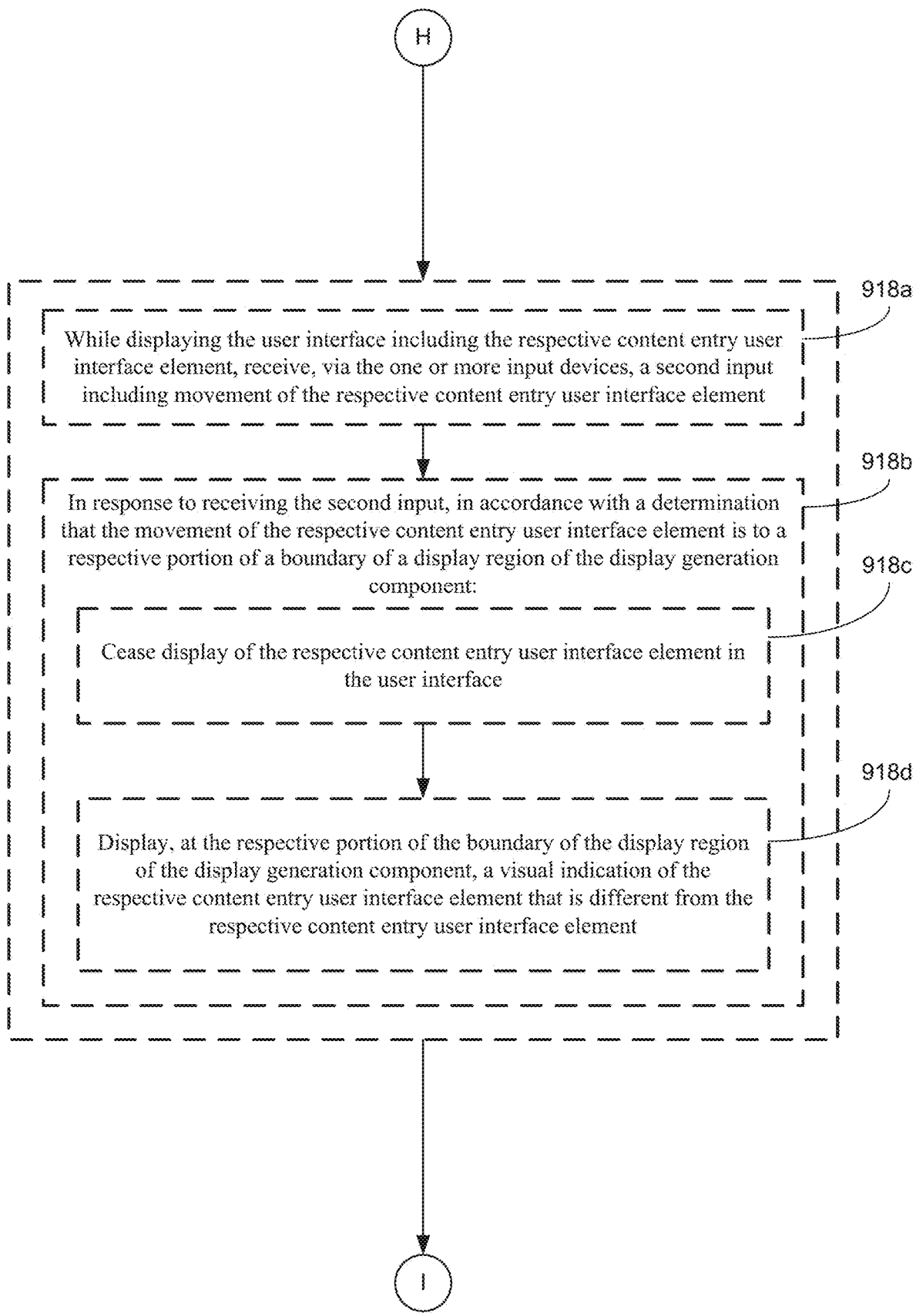
Figure 9J:
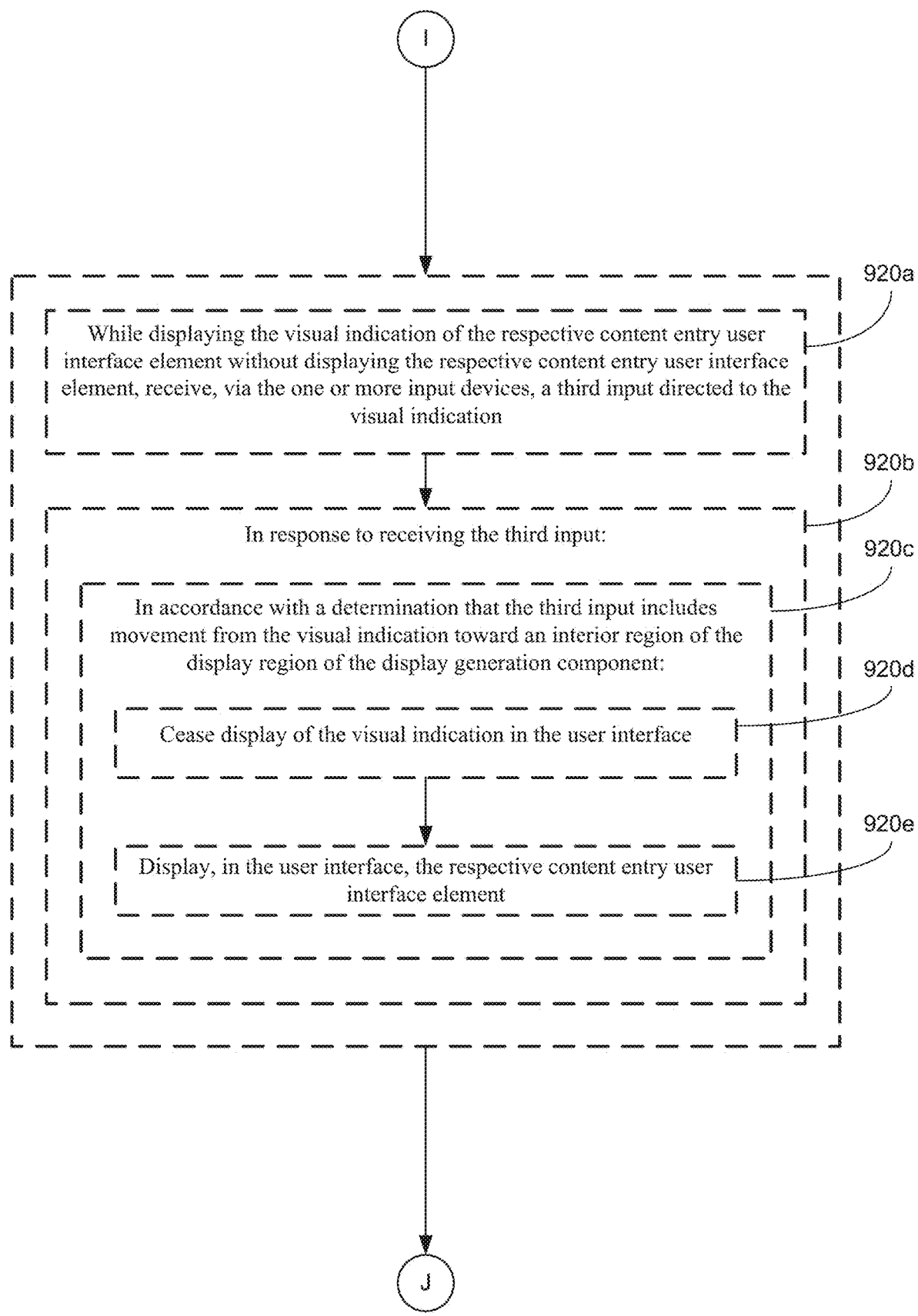
Figure 9K:
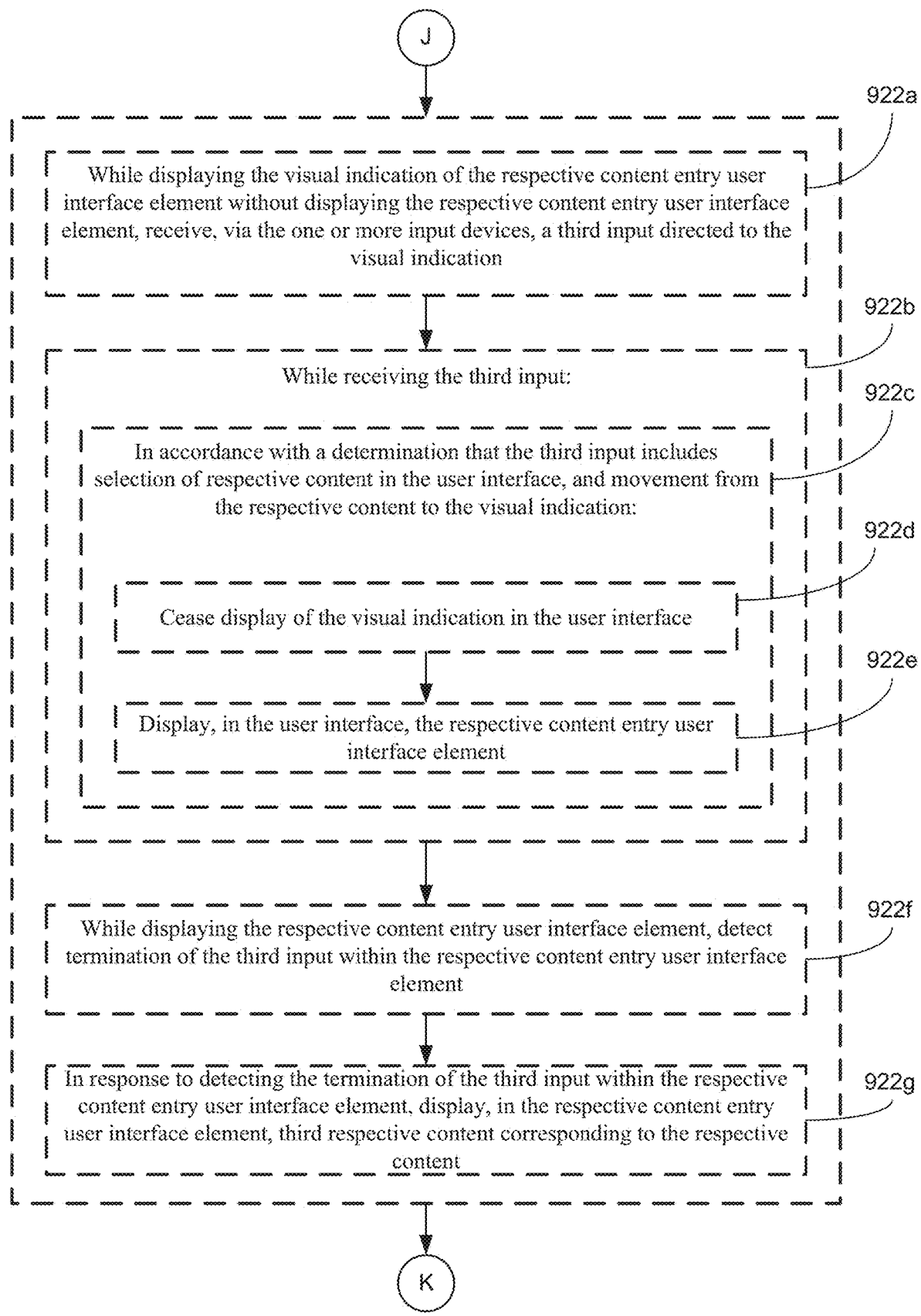
Figure 9L:
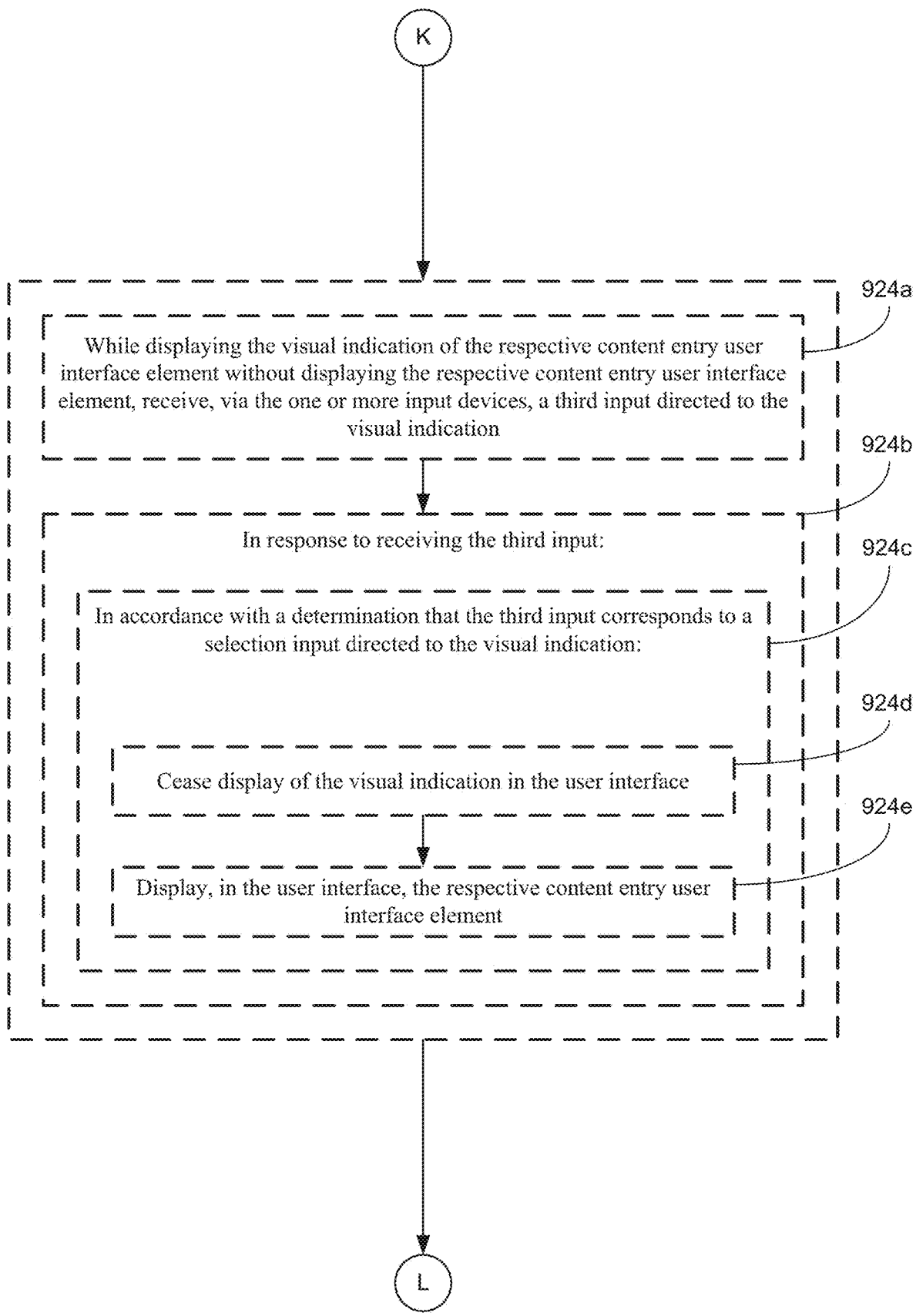
Figure 9M:
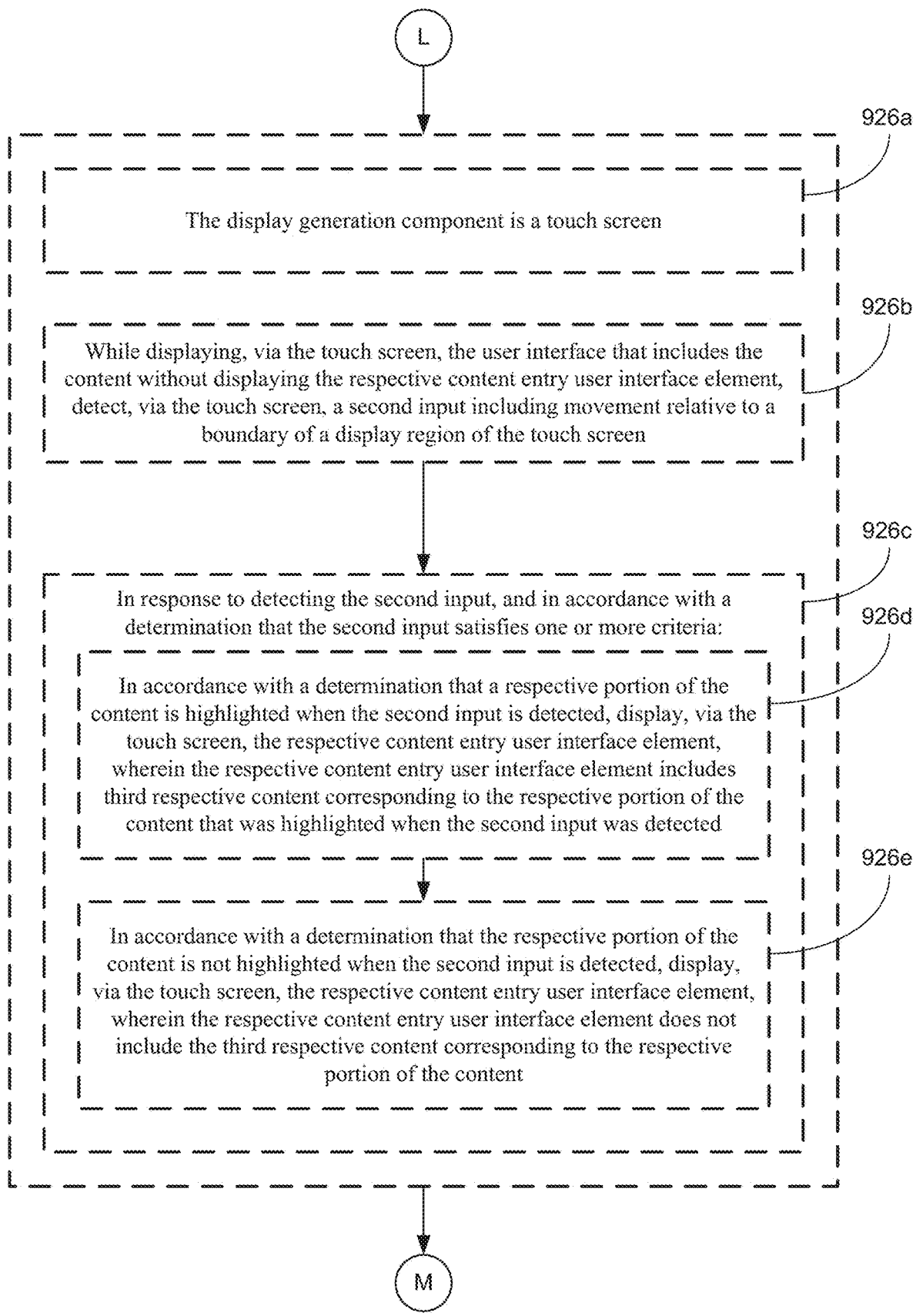
Figure 9N:
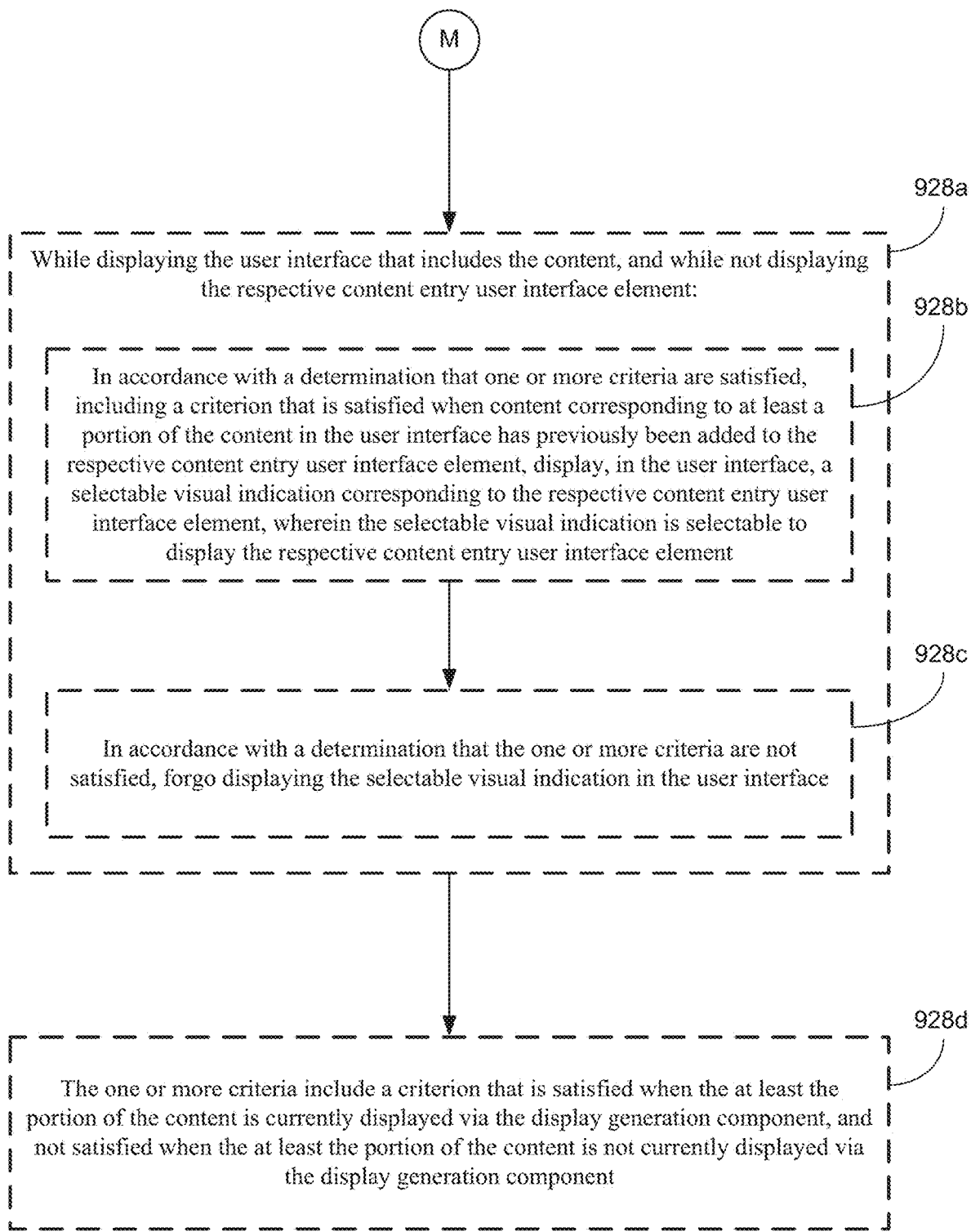

FIGS. 9A-9N are flow diagrams illustrating a method 900 of facilitating the addition of content displayed with a note to the note in accordance with some embodiments. The method 900 is optionally performed at an electronic device such as device 100, device 300, or device 500 as described above with reference to FIGS. 1A-1B, 2-3, 4A-4B and 5A-5H. Some operations in method 900 are, optionally, combined and/or order of some operations is, optionally, changed.

As described below, the method 900 provides ways to facilitate the addition of content displayed with a note to the note. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device (e.g., device 500) in communication with a display generation component and one or more input devices. For example, a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users (e.g., such as in a head-mounted device), etc.

In some embodiments, while displaying, via the display generation component, a user interface that includes a respective content entry user interface element (902a), such as user interface 804 and notes user interface 808a in FIG. 8C (e.g., a user interface that is at least partially overlaid by the respective content user interface element. For example, the user interface optionally includes one or more user interfaces of one or more applications, and the respective content user interface element is displayed overlaid on at least one of those user interfaces. In some embodiments, the respective content user interface element is an element into which a user is able to insert content via user input. For example, the respective content user interface element is optionally, and optionally has one or more of the characteristics of, the content user interface element(s) described with reference to method 700), in accordance with a determination that the user interface includes content outside of the respective content entry user interface element, such as the content of user interface 804 in FIG. 8C (e.g., the respective content user interface element is overlaying content, such as text, images, videos, music, web links, etc. in a user interface (e.g., a web page that is being displayed in a web browser application user interface) under and/or surrounding the respective content user interface element in the user interface. In some embodiments, the respective content user interface element is not overlaying the content, but is being displayed concurrently with the content in the user interface), the electronic device displays (902*b*), in the user interface (e.g., in the respective content user interface element or near the respective content entry user interface element), a selectable option that is selectable to add respective content corresponding to the content to the respective content entry user interface element, such as option 810 in FIG. 8C (e.g., the electronic device displays, somewhere in the user interface, the selectable option when the user interface includes content while the respective content user interface element is being displayed). In some embodiments, the selectable option is displayed in the respective content user interface element. In some embodiments, the selectable option is displayed somewhere else in the user interface, outside of the respective content user interface element. The respective content corresponding to the content in the user interface is optionally a copy of the content in the user interface or a portion of the content in the user interface, a link to the content in the user interface (e.g., a link that is selectable to launch/display the application in which the content was being displayed and/or display the portion of that application's user interface that includes the content, including automatically scrolling to the position in the user interface in which the content was displayed), a rich link to the content in the user interface (e.g., a link, as previously described, but that is displayed as or including a copy of the content), etc. In some embodiments, in accordance with a determination that the user interface does not include content outside of the respective content user interface element, the selectable option is not displayed.

In some embodiments, while displaying the user interface and the selectable option, the electronic device receives (902*c*), via the one or more input devices, an input corresponding to selection of the selectable option, such as contact 803 selecting option 810 in FIG. 8D (e.g., a tap input on the selectable option, a click input while a cursor and/or focus is on the selectable option, a voice input corresponding selection of the selectable option, etc.). In some embodiments, the input is detected on a touch-sensitive surface of the electronic device (e.g., a touch screen). In some embodiments, the input is detected on a touch-sensitive surface of another electronic device, separate from the electronic device, such as a remote control. In some embodiments, in response to receiving the input corresponding to the selection of the selectable option (902*d*), in accordance with a determination that the content outside of the respective content entry user interface element is first content, the electronic device displays (902*e*), in the respective content entry user interface element, first respective content corresponding to the first content, such as representation 812 in FIG. 8E (e.g., without adding second respective content corresponding to second content outside of the respective content entry user interface to the respective content entry user interface element). In some embodiments, in accordance with a determination that the content outside of the respective content entry user interface element is second content, the electronic device displays (902*f*), in the respective content entry user interface element, second respective content corresponding to the second content, such as representation 814 in FIG. 8J (e.g., without adding the first respective content to the respective content entry user interface element). For example, adding, to the respective content entry user interface element, a copy of the first (or second) content in the user interface, a link to the first (or second) content in the user interface (e.g., a link that is selectable to launch/display the application in which the first (or second) content was being displayed and/or display the portion of that application's user interface that includes the first (or second) content, including automatically scrolling to the position in the user interface in which the first (or second) content was displayed), and/or a rich link to the first (or second) content in the user interface (e.g., a link, as previously described, but that is displayed as or including a copy of the first (or second) content), etc. In some embodiments, no user input is required before detecting selection of the selectable option that selects or otherwise designates the first (or second) content (e.g., via a highlighting or equivalent input) for subsequent inclusion in the respective content user interface element (e.g., via selection of the selectable option). In some embodiments, if the content outside of the respective content user interface element is second content, selection of the selectable option causes second respective content corresponding to the second content to be added to and/or displayed in the respective content entry user interface element. The above-described manner of adding content to a content entry user interface element provides a quick and efficient way of collecting and/or designating content in the content user interface element without requiring separate input that first selects that content for inclusion in the content user interface element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the user interface and the selectable option, the electronic device updates (904*a*) the user interface to include third content outside of the respective content entry user interface element, such as the input from contact 803 in FIGS. 8K-8L causing different content of user interface 804 to be displayed with notes user interface 808*a* (e.g., the updating of the user interface is optionally in response to user input, such as navigation input (e.g., swiping or scrolling input) that causes the content displayed in the user interface to change). In some embodiments, the third content was not displayed in the user interface outside of the respective content entry user interface element before the updating of the user interface. In some embodiments, updating the user interface to include the third content also includes causing content that used to be included in the user interface outside of the respective content entry user interface element to cease being displayed (e.g., being scrolled off display). In some embodiments, while displaying the updated user interface with the third content outside of the respective content entry user interface element and the selectable option, the electronic device receives (904*b*), via the one or more input devices, a third input corresponding to selection of the selectable option, such as contact 803 selecting option 810 in FIG. 8N (e.g., a tap input on the selectable option, a click input while a cursor and/or focus is on the selectable option, a voice input corresponding selection of the selectable option, etc.). In some embodiments, the input is detected on a touch-sensitive surface of the electronic device (e.g., a touch screen). In some embodiments, the input is detected on a touch-sensitive surface of another electronic device, separate from the electronic device, such as a remote control. In some embodiments, in response to receiving the third input corresponding to the selection of the selectable option, the electronic device displays (904*c*), in the respective content entry user interface element, third respective content corresponding to the third content, such as representation 816 in FIG. 8O. For example, adding, to the respective content entry user interface element, a copy of the third content in the user interface, a link to the third content in the user interface (e.g., a link that is selectable to launch/display the application in which the third content was being displayed and/or display the portion of that application's user interface that includes the third content, including automatically scrolling to the position in the user interface in which the third content was displayed), and/or a rich link to the third content in the user interface (e.g., a link, as previously described, but that is displayed as or including a copy of the third content), etc. The above-described manner of adding different content to a content entry user interface element when the content outside of the content entry user interface element changes provides a quick and efficient way of collecting and/or designating content in the content user interface element without requiring separate input that changes the content to be included in the content entry user interface element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the user interface includes the content outside of the respective content entry user interface element, the selectable option is displayed with a first visual appearance (904*d*) (e.g., displayed in a first color, at a first size, and/or including a first icon or graphical indication corresponding to the (e.g., type of the) content). In some embodiments, while the user interface includes the third content outside of the respective content entry user interface element, the selectable option is displayed with a second visual appearance, different from the first visual appearance (904*e*), such as the difference in appearance of option 810 in FIGS. 8G and 8H (e.g., displayed in a second color, at a second size, and/or including a second icon or graphical indication corresponding to the (e.g., type of the) third content). For example, if the content outside of the respective content entry user interface element includes user interfaces and/or content displayed by multiple applications, the selection option is displayed with an indication that indicates that selection of the selectable button will cause display of a disambiguation user interface for specifying from which of the applications content should be added to the content entry user interface element. As another example, if the content outside of the respective content entry user interface element is a website, the selection option optionally includes an icon/graphic corresponding to the website and/or an indication of the address (e.g., URL) of the website. The above-described manner of displaying the selectable option with different visual appearances based on the content outside of the content entry user interface element provides a quick and efficient way of conveying information about the content that will be added to the content entry user interface element before it is added, which simplifies the interaction between the user and the electronic device and enhances the operability of the electronic device and makes the user-device interface more efficient (e.g., by reducing occurrences of incorrect content being added to the content entry user interface element, which require additional input to correct), which additionally reduces power usage and improves battery life of the electronic device by enabling the user to use the electronic device more quickly and efficiently.

In some embodiments, updating the user interface to include the third content outside of the respective content entry user interface element is in response to receiving, via the one or more input devices, a second input corresponding to interaction with the user interface (906*a*), such as the interaction of contact 803 in FIGS. 8K-8L. For example, the second input includes a navigation input (e.g., a swipe or scrolling input) to navigate the user interface to include the third content. In some embodiments, the second input includes an input to switch between the display of different applications on the electronic device (e.g., switch from displaying the user interface of a first application to displaying the user interface of a second application) outside of the content entry user interface element. In some embodiments, the second input includes highlighting (e.g., via a selection input, such as a click and drag or a tap and drag) a portion (e.g., but not all) of the content outside of the content entry user interface element. The above-described manner of updating the content outside of the content entry user interface element allows for continued interaction with the user interface outside of the content entry user interface element even when the content entry user interface element is being displayed, which simplifies the interaction between the user and the electronic device and enhances the operability of the electronic device and makes the user-device interface more efficient (e.g., by avoiding the need to first dismiss the content entry user interface element using additional inputs before interaction with the surrounding user interface is possible), which additionally reduces power usage and improves battery life of the electronic device by enabling the user to use the electronic device more quickly and efficiently.

In some embodiments, in response to receiving the input corresponding to the selection of the selectable option (906*b*), in accordance with the determination that the content outside of the respective content entry user interface element is the first content, the electronic device adds (906*c*), to the respective content entry user interface element, a link to the first content in the user interface, such as the link included in representation 812 in FIG. 8G (e.g., a link that is selectable to cause the electronic device to navigate to/display the first content in the user interface, even if the link is selected while the first content and/or user interface are not being displayed. In some embodiments, the link is a rich link that also includes a preview of and/or copy of (e.g., a portion of) the first content in the respective content entry user interface element). In some embodiments, in accordance with the determination that the content outside of the respective content entry user interface element is the second content, the electronic device adds (906*d*), to the respective content entry user interface element, a link to the second content in the user interface, such as the link included in representation 816 in FIG. 8O (e.g., a link that is selectable to cause the electronic device to navigate to/display the second content in the user interface, even if the link is selected while the second content and/or user interface are not being displayed. In some embodiments, the link is a rich link that also includes a preview of and/or copy of (e.g., a portion of) the second content in the respective content entry user interface element). The above-described manner of including links to content in the content entry user interface element provides for a quick and efficient manner of navigating back to the content that was added to the content entry user interface element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the link to the first content is selectable to display the user interface and navigate the user interface to the first content and not the second content, such as shown in response to selection of representation 812 in FIG. 8F (e.g., the link is selectable to display a web page (e.g., that includes the first content and the second content), scrolled to the portion of the webpage that includes the first content (e.g., and not the second content, which is optionally off-display)), and the link to the second content is selectable to display the user interface and navigate the user interface to the second content and not the first content (906e), such as shown in response to selection of representation 816 in FIG. 8P (e.g., the link is selectable to display a web page (e.g., that includes the first content and the second content), scrolled to the portion of the webpage that includes the second content (e.g., and not the first content, which is optionally off-display)). For example, the first content optionally corresponds to a collection of text and/or images midway down a webpage. If the webpage were to be navigated-to without automatic scrolling (e.g., not via the link in the respective content entry user interface element), the first content would optionally not be displayed (e.g., the first content is revealed in the user interface after the web page has been scrolled through halfway). However, when navigated to via the link in the respective content entry user interface element, the electronic device optionally automatically scrolls halfway through the webpage so that the first content is displayed in the user interface. The link optionally operates similarly for the second content. In some embodiments, the electronic device identifies which portion(s) of the content to link to based on what portion(s) of the content best-match the content that was originally added to the content entry user interface element. Thus, in some embodiments, when subsequently displaying the content (e.g., a web page) in response to selection of the link in the content entry user interface element in a case where the content that had previously been added to the content entry user interface element has since changed in the user interface (e.g., has been updated on the web page), the electronic device identifies the updated (e.g., portion(s)) of the content that correspond to the originally-added content in the content entry user interface element, and links to those updated portion(s) of the content (e.g., if they substantially match the originally-added content in the content entry user interface element—such as at least 50%, 60%, 70%, 80%, 90% or 95% of the text matching—even if they do not match exactly). In some embodiments, if the updated portion(s) of the content have changed substantially and/or do not substantially match the originally-added content in the respective content entry user interface element, the electronic device does not link to those updated portion(s) of the content. The above-described manner of providing a link that is specifically anchored to the content that was added to the respective content entry user interface element provides for a quick and efficient manner of navigating back to the content of interest in the user interface in which it was displayed, which simplifies the interaction between the user and the electronic device and enhances the operability of the electronic device and makes the user-device interface more efficient (e.g., by requiring fewer inputs to return to displaying the linked content), which additionally reduces power usage and improves battery life of the electronic device by enabling the user to use the electronic device more quickly and efficiently.

In some embodiments, while displaying the user interface and the respective content entry user interface element, wherein the user interface includes the content outside of the respective content entry user interface element, the electronic device receives (908a), via the one or more input devices, a second input corresponding to a request to select at least a portion of the content outside of the respective content entry user interface element, such as the input from contact 803 in FIG. 8M (e.g., a tap and drag input (e.g., with a finger or stylus) on a portion of text and/or images and/or other content in the user interface that causes the selected portion of text and/or images and/or content to become highlighted (e.g., displayed with highlighting or other visual distinction from the remainder of the content and/or user interface), optionally while other portions of the content and/or user interface are not highlighted). In some embodiments, input detected while the portion of the content is highlighted causes that input to operate on the highlighted portion of the content and/or user interface, and to not operate on the un-highlighted portion of the content and/or user interface (e.g., a copy function, a delete function, etc.). In some embodiments, in response to receiving the second input, the electronic device selects (908b) the at least the portion of the content outside of the respective content entry user interface element while maintaining display of the respective content entry user interface element, such as highlighting the textual content of Story B in FIG. 8N. Thus, in some embodiments, a user is able to select content in the user interface outside of the respective content entry user interface element while the respective content entry user interface element remains displayed, and without ceasing display of the respective content entry user interface element. The above-described manner of selecting content outside of the content entry user interface element allows for continued interaction with the user interface outside of the content entry user interface element even when the content entry user interface element is being displayed, which simplifies the interaction between the user and the electronic device and enhances the operability of the electronic device and makes the user-device interface more efficient (e.g., by avoiding the need to first dismiss the content entry user interface element using additional inputs before interaction with the surrounding user interface is possible), which additionally reduces power usage and improves battery life of the electronic device by enabling the user to use the electronic device more quickly and efficiently.

In some embodiments, in response to receiving the input corresponding to the selection of the selectable option (908c), in accordance with a determination that a first portion of the content outside of the respective content entry element is highlighted when the input corresponding to the selection of the selectable option is received, the electronic device displays (908d), in the respective content entry user interface element, third respective content corresponding to the first portion of the content outside of the respective content entry user interface element, such as representation 816 in FIG. 8O corresponding to the previously-highlighted textual content of Story B in user interface 804. For example, if one or more portions of the content (e.g., text, images, video, etc.) outside of the respective content entry user are highlighted (e.g., in response to earlier user input) when the input selecting the selectable option is received, the electronic device adds that highlighted content to the respective content entry user interface element (e.g., rather than other content that would have been added to the respective content entry user interface element had the selectable option been selected while no content was highlighted outside of the respective content entry user interface element, such as a different portion or more of (e.g., the entirety of) the content outside of the respective content entry user interface element). In some embodiments, if a second portion, different from the first portion, of the content outside of the respective content entry element is highlighted when the input corresponding to the selection of the selectable option is received, the electronic device displays, in the respective content entry user interface element, fourth respective content, different from the third respective content, corresponding to the second portion of the content outside of the respective content entry user interface element. The above-described manner of adding content to the content entry user interface element based on what content is highlighted in the user interface provides for a quick and efficient manner of designating the content of interest, which simplifies the interaction between the user and the electronic device and enhances the operability of the electronic device and makes the user-device interface more efficient (e.g., by avoiding the incorrect content from being added to the respective content entry user interface element, which would then require additional input to correct/change), which additionally reduces power usage and improves battery life of the electronic device by enabling the user to use the electronic device more quickly and efficiently.

In some embodiments, in response to receiving the input corresponding to the selection of the selectable option (910a), in accordance with a determination that the first portion of the content outside of the respective content entry element is not highlighted when the input corresponding to the selection of the selectable option is received, the electronic device forgoes (910b) displaying, in the respective content entry user interface element, the third respective content corresponding to the first portion of the content outside of the respective content entry element, such as representation 816 not including or corresponding to content 805 or 807 in user interface 804 in FIG. 8O, because content 805 and 807 were not highlighted when option 810 was selected. For example, if instead of the first portion, a second portion of the content outside of the respective content entry user interface element was highlighted when the input selecting the selectable option was received, the electronic device instead adds content corresponding to the second portion of the content to the respective content entry user interface element. In some embodiments, the portion(s) of the content and/or user interface that are highlighted when the input selecting the selectable option is received are added to the respective content entry user interface element, and the portion(s) of the content and/or user interface that are not highlighted when the input selecting the selectable option is received are not added to the respective content entry user interface element. The above-described manner of adding content to the content entry user interface element based on what content is highlighted in the user interface provides for a quick and efficient manner of designating the content of interest, which simplifies the interaction between the user and the electronic device and enhances the operability of the electronic device and makes the user-device interface more efficient (e.g., by avoiding the incorrect content from being added to the respective content entry user interface element, which would then require additional input to correct/change), which additionally reduces power usage and improves battery life of the electronic device by enabling the user to use the electronic device more quickly and efficiently.

In some embodiments, while displaying, in the respective content entry user interface element, the third respective content corresponding to the first portion of the content, and while the first portion of the content is not displayed via the display generation component, such as in FIG. 8P when user interface 802 is displayed without displaying the content corresponding to representation 816 in notes user interface 808a (e.g., the user has provided input to the device to navigate away from the first portion of the content since the highlighted first portion of the content was added to the respective content entry user interface element. The first portion of the content was optionally highlighted when the content corresponding to the first portion of the content was added to the respective content entry user interface element (e.g., via selection of the selectable option while the first portion of the content was highlighted)), the electronic device receives (910c), via the one or more input devices, a second input corresponding to selection of the third respective content in the respective content entry user interface element, such as selection of representation 816 in FIG. 8P (e.g., selection of the link and/or rich link in the respective content entry user interface element that corresponds to the first content). In some embodiments, in response to receiving the second input, the electronic device displays (910d), via the display generation component, the first portion of the content, such as shown in FIG. 8Q (e.g., wherein the first portion of the content is highlighted). In some embodiments, navigating back to the first portion of the content in the user interface without using the link in the respective content entry user interface element also results in display of the first content in a highlighted state (e.g., the electronic device saves the highlighting of content that was added to the respective content entry user interface element such that when subsequently displaying such content (e.g., whether or not in response to selection of a link to that content in the respective content entry user interface element), the electronic device displays that content with highlighting. In some embodiments, in response to an input to delete the link and/or content from the respective content entry user interface element, the electronic device no longer displays the corresponding content in the user interface with highlighting. In some embodiments, the respective content user interface element remains displayed as well. In some embodiments, displaying the first portion of the content includes displaying a user interface of the application in which the first portion of the content was displayed when it was added to the respective content entry user interface element (e.g., if the user interface of the application was not displayed when the input selecting the third respective content in the respective content entry user interface element was received).

In some embodiments, displaying the first portion of the content includes automatically navigating to and/or scrolling the user interface to reveal, in the user interface, the first portion of the content (e.g., if the first portion of the content would not be displayed in the user interface without the navigating and/or scrolling when the user interface is first displayed). In some embodiments, displaying the first portion of the content includes displaying the first portion of the content with highlighting (e.g., and not displaying other portion(s) of the content with highlighting), which optionally matches the state of the highlighting of the first portion of the content and the other portion(s) of the content when the selectable option for adding the content to the respective content entry user interface element was selected. For example, the first portion of the content optionally corresponds to a collection of text and/or images midway down a webpage. If the webpage were to be navigated to without automatic scrolling (e.g., not via the link in the respective content entry user interface element), the first portion of the content would optionally not be displayed (e.g., the first portion of the content is revealed in the user interface after the web page has been scrolled through halfway). However, when navigated to via the link in the respective content entry user interface element, the electronic device optionally automatically scrolls halfway through the webpage so that the first portion of the content is displayed in the user interface. In some embodiments, the electronic device identifies which portion(s) of the content to highlight based on what portion(s) of the content best-match the content that was originally added to the respective content entry user interface element. Thus, in some embodiments, when subsequently displaying the content (e.g., a web page) in which the portion(s) of the content that had previously been added to the respective content entry user interface element have since changed in the user interface (e.g., have been updated on the web page), the electronic device identifies the updated portion(s) of the content that correspond to the originally-added content in the respective content entry user interface element, and highlights those updated portion(s) of the content (e.g., if they substantially match the originally-added content in the respective content entry user interface element—such as at least 50%, 60%, 70%, 80%, 90% or 95% of the text matching—even if they do not match exactly). In some embodiments, if the updated portion(s) of the content have changed substantially and/or do not substantially match the originally-added content in the respective content entry user interface element, the electronic device does not highlight those updated portion(s) of the content. The above-described manner of displaying the first portion of the content provides for a quick and efficient manner of navigating back to the first portion of the content in the user interface in which it was displayed, which simplifies the interaction between the user and the electronic device and enhances the operability of the electronic device and makes the user-device interface more efficient (e.g., by requiring fewer inputs to return to displaying the first portion of the content), which additionally reduces power usage and improves battery life of the electronic device by enabling the user to use the electronic device more quickly and efficiently.

In some embodiments, the first respective content corresponding to the first content displayed in the respective content entry user interface element comprises a first link to the first content (912a), such as described with reference to representations 812, 814 and 816 (e.g., a link that is selectable to cause the electronic device to navigate to/display the first content in the user interface, even if the link is selected while the first content and/or user interface are not being displayed). In some embodiments, the first link includes (912b), a visual indication of a destination of the first link (912c) (e.g., an indication of the application for which the user interface is a user interface, such as the name and/or icon of the application; an indication of the URL associated with the user interface when the user interface is a web browser user interface and the first content is content within a webpage displayed by the web browser; etc.), and a preview of the first content (912d), such as shown in representations 812, 814 and 816 (e.g., if the first content includes an image, the first link optionally includes a (e.g., smaller) copy of the image; if the first content includes text, the first link optionally includes a (e.g., smaller) copy of the text; if the first content is included in a webpage, the first link optionally includes the title of the webpage; etc.). The above-described manner of including an indication of the destination of the link and/or a preview of the content to which the link points in the link included in the respective content entry user interface element provides for a quick and efficient manner of indicating the target of the link, which simplifies the interaction between the user and the electronic device and enhances the operability of the electronic device and makes the user-device interface more efficient (e.g., by avoiding the selection of incorrect links), which additionally reduces power usage and improves battery life of the electronic device by enabling the user to use the electronic device more quickly and efficiently.

In some embodiments, while displaying the respective content entry user interface element including the first respective content, the electronic device receives (912e), via the one or more input devices, a second input corresponding to a request to provide user-generated content into the respective content entry user interface element, such as input provided by stylus 815 in FIGS. 8Q-8R (e.g., a handwriting input provided by the stylus on/in the respective content entry user interface element, a (e.g., freestyle) drawing input provided by the stylus and/or a finger on/in the respective content entry user interface element, a (e.g., soft) keyboard text input provided to the respective content entry user interface element, a paste input provided to the respective content entry user interface element, etc.). In some embodiments, in response to receiving the second input, the electronic device displays (912f), in the respective content entry user interface element, the first respective content (912g), such as representation 816 in FIG. 8R (e.g., the user input to provide additional content to the respective content entry user interface element does not cause the first respective content to cease being included in the respective content entry user interface element), and the user-generated content (912h), such as the handwritten "Find this" in notes user interface 808a in FIG. 8R (e.g., the handwritten content, the drawing, the text, the pasted content, etc., provided by the second input is also included in the respective content entry user interface element). The above-described manner of cumulatively adding additional content to the content entry user interface element allows for continued collection of content of interest to a user without replacing previous content or ceasing display of the content entry user interface element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the user interface including the respective content entry user interface element, the electronic device receives (914a), via the one or more input devices, a second input that includes selection of a respective portion of the content outside of the respective content entry user interface element, and movement from the respective portion of the content outside of the respective content entry user interface element to the respective content entry user interface element, such as selection/highlighting of content 807 in FIG. 8W, and movement of contact 803 from content 807 to notes user interface 808a in FIG. 8W (e.g., a drag and drop input provided from outside of the respective content entry user interface element, and ending (e.g., via liftoff) within the respective content entry user interface element). In some embodiments, the drag and drop input is provided by a finger of the user of the electronic device. In some embodiments, the drag and drop input is provided by a stylus. In some embodiments, the second input includes an initial highlighting and/or selection of a portion of the content outside of the respective content entry user interface element (e.g., and not another portion of the content), and then a dragging and dropping of that selected portion of the content to the respective content entry user interface element. In some embodiments, in response to receiving the second input, the electronic device displays (914b), in the respective content entry user interface element, third respective content corresponding to the respective portion of the content outside of the respective content entry user interface element, including a link to the respective portion of the content outside of the respective content entry user interface element, such as representation 817 shown in notes user interface 808a in FIG. 8X (e.g., a link that is selectable to cause the electronic device to navigate to/display the respective portion of the content in the user interface, even if the link is selected while the respective portion of the content and/or user interface are not being displayed. In some embodiments, the link is a rich link that also includes a preview of and/or copy of the respective portion of the content in the respective content entry user interface element). In some embodiments, portions of the content that are not selected, highlighted and/or dragged and dropped on the respective content entry user interface element are not added to the respective content entry user interface element. The above-described manner of adding content to a content entry user interface element using a drag and drop input provides a quick and efficient way of adding content to the content entry user interface element without requiring separate input elements for doing so, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to receiving the input corresponding to the selection of the selectable option (914c), such as the selection of option 810 in FIG. 8AB, in accordance with a determination that the user interface includes a plurality of different user interfaces, including a first user interface (e.g., of a first application) and a second user interface, such as the case in FIG. 8AA where device 500 is concurrently displaying user interfaces 821a and 821b (e.g., of a second application, different from the first application. For example, the electronic device is displaying multiple applications concurrently via the display generation component), the electronic device displays (914d), via the display generation component, a first selectable option that is selectable to initiate a process to add content from the first user interface to the respective content entry user interface element (914e), such as option 890a in FIG. 8AC, and a second selectable option that is selectable to initiate a process to add content from the second user interface to the respective content entry user interface element (9140, such as option 890b in FIG. 8AC (e.g., when the respective content entry user interface element is displayed concurrently with multiple user interfaces, selection of the selectable option causes a disambiguation user interface element to be displayed via the display generation component before any content is added to the respective content entry user interface element in response to selection of the selectable option). In some embodiments, the disambiguation user interface element includes one or more selectable options that correspond to the different user interfaces, and selection of one of those selectable options causes content from the corresponding user interface (and not the other(s) user interface(s)) to be added to the respective content entry user interface element. In some embodiments, in accordance with a determination that the user interface does not include a plurality of different user interfaces (e.g., the user interface includes only one user interface from one application), the electronic device forgoes (914g) displaying the first selectable option and the second selectable option (e.g., and adding content from the one displayed user interface to the respective content entry user interface element). The above-described manner of facilitating disambiguation between user interfaces provides a quick and efficient way of indicating which user interface of multiple is the correct source of the content to be added to the respective content entry user interface element, which simplifies the interaction between the user and the electronic device and enhances the operability of the electronic device and makes the user-device interface more efficient (e.g., by avoiding the addition of incorrect content to the respective content entry user interface element), which additionally reduces power usage and improves battery life of the electronic device by enabling the user to use the electronic device more quickly and efficiently.

In some embodiments, the user interface is not a system user interface of the electronic device (916a), such as being a web browser user interface 804 in FIG. 8C, and not being a home screen user interface 802 in FIG. 8A (e.g., the user interface is a user interface of an application (e.g., a game, a web browser, a news application, etc.) that is installed on the electronic device, rather than a user interface of the operating system of the electronic device, such as the home screen of the electronic device (e.g., as described with reference to FIG. 4A) or the lock and/or wake screen of the electronic device (e.g., the first user interface displayed by the electronic device upon waking from an off or low power state). In some embodiments, while displaying a second user interface that includes the respective content entry user interface element, in accordance with a determination that the second user interface includes content outside of the respective content entry user interface element (916b), in accordance with a determination that the second user interface is not a system user interface of the electronic device, such as being a web browser user interface 804 in FIG. 8C (e.g., the second user interface is a user interface of an application (e.g., a game, a web browser, a news application, etc.) that is installed on the electronic device), the electronic device displays (916c), in the user interface, the selectable option that is selectable to add respective content corresponding to the second content to the respective content entry user interface element, such as notes user interface 808a including option 810 in FIG. 8C (e.g., the selectable option is displayed by the electronic device when the respective content entry user interface element is displayed with (and/or overlaid on) a user interface that is not a user interface of the operating system of the electronic device). In some embodiments, in accordance with a determination that the second user interface is a system user interface of the electronic device, such as home screen user interface 802 in FIG. 8B (e.g., a user interface of the operating system of the electronic device, such as the home screen of the electronic device (e.g., as described with reference to FIG. 4A) or the lock and/or wake screen of the electronic device (e.g., the first user interface displayed by the electronic device upon waking from an off or low power state)), the electronic device forgoes (916d) displaying the selectable option in the user interface, such as notes user interface 808*a* not including option 810 in FIG. 8B. For example, the selectable option is not displayed by the electronic device when the respective content entry user interface element is displayed with (and/or overlaid on) a user interface that is a user interface of the operating system of the electronic device. The above-described manner of forgoing displaying the selectable option for adding content to the respective content entry user interface element avoids the accidental addition of content that is likely not of interest to the respective content entry user interface element, which simplifies the interaction between the user and the electronic device and enhances the operability of the electronic device and makes the user-device interface more efficient (e.g., by avoiding the need for further inputs to delete the system content from the content entry user interface element), which additionally reduces power usage and improves battery life of the electronic device by enabling the user to use the electronic device more quickly and efficiently.

In some embodiments, while displaying the user interface including the respective content entry user interface element, the electronic device receives (918*a*), via the one or more input devices, a second input including movement of the respective content entry user interface element, such as the input from stylus 815 moving notes user interface 808*a* in FIGS. 8AD-8AE (e.g., a touchdown or selection input directed to within (e.g., a predefined region of) the respective content entry user interface element (e.g., using a finger or stylus), followed by movement of the input (e.g., while the finger or stylus remains touched down and/or while the selection input remains active)). In some embodiments, the second input does not include the termination of the selection/movement input (e.g., before/without detecting liftoff of the finger/stylus from the touch screen). In some embodiments, in response to receiving the second input, in accordance with a determination that the movement of the respective content entry user interface element is to a respective portion of a boundary of a display region of the display generation component (918*b*), such as to the right side of the edge of touch screen 504 in FIG. 8AE (e.g., the finger/stylus movement is to within a threshold distance, such as 0.1, 0.2, 0.5, 1, 2, 5, 10 cm, of the boundary of the display region of the display generation component), the electronic device ceases (918*c*) display of the respective content entry user interface element in the user interface, such as shown in FIG. 8AE, and the electronic device displays (918*d*), at the respective portion of the boundary of the display region of the display generation component, a visual indication of the respective content entry user interface element that is different from the respective content entry user interface element, such as indication 860 in FIG. 8AE. For example, the electronic device displays a "tab" or other user interface element (e.g., different from the respective content entry user interface element) at the location along the boundary of the display generation component to which the respective content entry user interface element was moved, and ceases display of the respective content entry user interface element, as if the respective content entry user interface element has been placed in an off-display drawer that can be accessed via the displayed "tab". In some embodiments, the "tab" is a blurred out (and/or otherwise visually altered) portion (e.g., edge) of the respective content entry user interface element. In some embodiments, an input dragging the respective content entry user interface element to a different location along the boundary of the display generation component causes the electronic device to display that "tab" at that different location along the boundary of the display generation component. In some embodiments, the "tab" does not include the content of the respective content entry user interface element. In some embodiments, the "tab" includes at least some of the content of the respective content entry user interface element. In some embodiments, dragging the respective content entry user interface element within the display region of the display generation component without dragging the respective content entry user interface element to the boundary of the display region causes the electronic device to move the respective content entry user interface element in accordance with the dragging, without displaying the "tab" and without ceasing display of the respective content entry user interface element. In some embodiments, the "tab" occupies a smaller area of the display region than does the respective content entry user interface element. The above-described manner of allowing for the respective content entry user interface element to be hidden and replaced with another user interface element provides a quick and efficient way of ceasing display of the respective content entry user interface element (e.g., to enhance privacy) while maintaining the ability to quickly and easily re-display the respective content entry user interface element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the visual indication of the respective content entry user interface element without displaying the respective content entry user interface element (e.g., while displaying the "tab" corresponding to the respective content entry user interface element), the electronic device receives (920*a*), via the one or more input devices, a third input directed to the visual indication. In some embodiments, in response to receiving the third input (920*b*), in accordance with a determination that the third input includes movement from the visual indication toward an interior region of the display region of the display generation component (920*c*), such as the input from stylus 815 in FIGS. 8AG-8AH (e.g., a touchdown of a finger/stylus within the "tab", and while remaining touched down, movement of the finger/stylus away from the boundary of the display region and towards an inner/center region of the display region), the electronic device ceases (920*d*) display of the visual indication in the user interface, and the electronic device displays (920*e*), in the user interface, the respective content entry user interface element, such as shown in FIG. 8AH. In some embodiments, the respective content entry user interface element is first redisplayed at (e.g., adjacent to) the portion of the border of the display region of the display generation component at which the "tab" was displayed. In some embodiments, the respective content entry user interface element moves within the display region of the display generation component in accordance with the movement of the third input (e.g., after the "tab" is ceased to be displayed) until termination of the third input (e.g., via liftoff of the finger/stylus) is detected, at which point the respective content entry user interface element stops moving within the display region of the display generation component. Thus, the "tab" is replaced by the respective content entry user interface element in the display region of the display generation component. The above-described manner of displaying the respective content entry user interface element provides a quick and efficient way of redisplaying the respective content entry user interface element without the need for dedicated user interface elements or buttons for doing so, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the visual indication of the respective content entry user interface element without displaying the respective content entry user interface element (e.g., while displaying the "tab" corresponding to the respective content entry user interface element), the electronic device receives (922a), via the one or more input devices, a third input directed to the visual indication. In some embodiments, while receiving the third input (922b), in accordance with a determination that the third input includes selection of respective content in the user interface, and movement from the respective content to the visual indication (922c), such as selection of the textual content of Story B in FIG. 8AI, and movement of that selected content to indication 860 by stylus 815 in FIG. 8AI-8AJ (e.g., a drag and drop input provided from outside of the "tab", and moving within the "tab". In some embodiments, the drag and drop input is provided by a finger of the user of the electronic device. In some embodiments, the drag and drop input is provided by a stylus. In some embodiments, the third input includes an initial highlighting and/or selection of a portion of the content outside of the "tab" (e.g., and not another portion of the content), and then a dragging of that selected portion of the content to the "tab". In some embodiments, the third input does not include termination (e.g., via liftoff of the finger/stylus) of the drag and drop input), the electronic device ceases (922d) display of the visual indication in the user interface, and the electronic device displays (922e), in the user interface, the respective content entry user interface element, such as shown in FIG. 8AK (e.g., dragging selected content to the "tab" causes the electronic device to redisplay the respective content entry user interface element, and cease display of the "tab". In some embodiments, the respective content entry user interface element is displayed at (e.g., adjacent to) the portion of the border of the display region of the display generation component at which the "tab" was displayed).

In some embodiments, while displaying the respective content entry user interface element, the electronic device detects (922f) termination of the third input within the respective content entry user interface element, such as liftoff of stylus 815 in FIG. 8AL (e.g., after the electronic device redisplays the respective content entry user interface element, detecting liftoff of the finger/stylus while the finger, stylus and/or selected content is within the respective content entry user interface element). In some embodiments, in response to detecting the termination of the third input within the respective content entry user interface element, the electronic device displays (922g), in the respective content entry user interface element, third respective content corresponding to the respective content, such displaying representation 816 corresponding to the dragged content in FIG. 8AL (e.g., adding (e.g., a link to) the selected content to the respective content entry user interface element). The above-described manner of adding content to a content entry user interface element that is hidden using a drag and drop input provides a quick and efficient way of adding such content without the need for inputs of different types (e.g., using simply a drag and drop input to both redisplay the content entry user interface element and add the content to the content entry user interface element), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the visual indication of the respective content entry user interface element without displaying the respective content entry user interface element (e.g., while displaying the "tab" corresponding to the respective content entry user interface element), the electronic device receives (924a), via the one or more input devices, a third input directed to the visual indication. In some embodiments, in response to receiving the third input (924b), in accordance with a determination that the third input corresponds to a selection input directed to the visual indication (924c), such as selection of indication 860 in FIG. 8AF with a contact 803 (e.g., a touchdown followed by a liftoff of a finger or stylus on the "tab"), the electronic device ceases (924d) display of the visual indication in the user interface, and the electronic device displays (924e), in the user interface, the respective content entry user interface element similar to display of notes user interface 808a in FIG. 8AH (e.g., tapping the "tab" causes the electronic device to redisplay the respective content entry user interface element, and cease display of the "tab"). In some embodiments, the respective content entry user interface element is displayed at (e.g., adjacent to) the portion of the border of the display region of the display generation component at which the "tab" was displayed. The above-described manner of displaying the respective content entry user interface element provides a quick and efficient way of redisplaying the respective content entry user interface element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the display generation component is a touch screen (926a). In some embodiments, while displaying, via the touch screen, the user interface that includes the content without displaying the respective content entry user interface element, such as user interface 804 in FIG. 8Y (e.g., before the respective content entry user interface element is displayed, or after the respective content entry user interface element has been dismissed), the electronic device detects (926b), via the touch screen, a second input including movement relative to a boundary of a display region of the touch screen, such as the input provided by stylus 815 in FIGS. 8Y-8Z (e.g., an edge swipe input such as described with reference to method 700). For example, movement of a finger or stylus from outside of the edge of the touch screen towards the center/display area of the touch screen (e.g., an edge or corner swipe gesture). In some embodiments, the first user input includes detection of a contact at or within (e.g., inside or outside) a threshold distance (e.g., 0.1, 0.2, 0.5, 1, 2, 5, 10 cm) of the edge or boundary of the touch screen (e.g., the boundary of the area of the touch screen that includes a displayed image), followed by movement of the contact towards the center of the touch screen (e.g., including a component of movement towards the center of the touch screen). In some embodiments, the contact is provided by a finger of a user. In some embodiments, the contact is provided by a stylus that is in (e.g., wireless) communication with the electronic device. In some embodiments, the touch screen includes multiple portions of the boundary of the touch screen, and the first user input includes movement that starts at and/or crosses a first respective portion of the boundary of the touch screen (e.g., and not a second respective portion of the boundary of the touch screen). For example, the first respective portion of the boundary of the touch screen is the lower-right corner of the touch screen, and is not the upper-right corner of the touch screen (e.g., the second respective portion of the boundary of the touch screen).

In some embodiments, in response to detecting the second input, and in accordance with a determination that the second input satisfies one or more criteria (926c) (e.g., including a criterion that is satisfied when the movement corresponds to the first respective portion of the boundary of the display region of the touch screen, and not satisfied when the movement corresponds to the second respective portion of the boundary. The one or more criteria optionally include one or more of the criteria for causing a respective content entry user interface element to be displayed that are described with reference to method 700), in accordance with a determination that a respective portion of the content is highlighted when the second input is detected, such as content 807 being highlighted when the input from stylus 815 is detected in FIGS. 8Y-8Z, the electronic device displays (926d), via the touch screen, the respective content entry user interface element, wherein the respective content entry user interface element includes third respective content corresponding to the respective portion of the content that was highlighted when the second input was detected, such as notes user interface 808a including representation 817 in FIG. 8Z (e.g., an input for displaying the respective content entry user interface element (e.g., using an edge swipe gesture) that is detected while content is highlighted in the user interface also causes the electronic device to add the highlighted content (and/or a link or rich link to the highlighted content) to the respective content entry user interface element, without requiring separate input for doing so, other than the input for displaying the respective content entry user interface element. In some embodiments, the respective content entry user interface element does not include fourth respective content corresponding to a second respective portion of the content that was not highlighted when the second input was detected). In some embodiments, in accordance with a determination that the respective portion of the content is not highlighted when the second input is detected, the electronic device displays (926e), via the touch screen, the respective content entry user interface element, wherein the respective content entry user interface element does not include the third respective content corresponding to the respective portion of the content, such as notes user interface 808a not including content corresponding to content 805 or the textual content of Story B in FIG. 8Z (e.g., if the respective portion of the content is not highlighted when the input for displaying the respective content entry user interface element is received, content corresponding to the respective portion of the content (e.g., a link to the respective portion of the content) is not included in the respective content entry user interface element in response to the input for displaying the respective content entry user interface element). In some embodiments, if a second respective portion, different from the respective portion, of the content is highlighted when the second input is detected, the respective content entry user interface element is displayed by the electronic device, wherein the respective content entry user interface element includes fourth respective content corresponding to the second respective portion of the content that was highlighted when the second input was detected (e.g., and does not include the third respective content corresponding to the respective portion of the content). The above-described manner of adding content to the content entry user interface element provides a quick and efficient way of both displaying the content entry user interface element and adding content to the content entry user interface element, which simplifies the interaction between the user and the electronic device and enhances the operability of the electronic device and makes the user-device interface more efficient (e.g., by allowing for the addition of content to the content entry user interface element without the need for a dedicated input for doing so), which additionally reduces power usage and improves battery life of the electronic device by enabling the user to use the electronic device more quickly and efficiently while reducing errors in the usage of the device.

In some embodiments, while displaying the user interface that includes the content (e.g., while displaying a web browser user interface that includes the content, such as text, images and/or videos. In some embodiments, the entirety of the content is currently displayed via the display generation component. In some embodiments, one or more portions of the content are not currently displayed via the display generation component (e.g., are scrolled off-display), and while not displaying the respective content entry user interface element (928a), in accordance with a determination that one or more criteria are satisfied, including a criterion that is satisfied when content corresponding to at least a portion of the content in the user interface has previously been added to the respective content entry user interface element, such as in FIG. 8T when the textual content of Story B has previously been added to notes user interface 808a (e.g., the user has previously provided input to add at least a portion of the content in the user interface to the respective content entry user interface element. For example, the user has previously provided input to add at least a portion of the text and/or images in a web page to the respective content entry user interface element in one or more of the ways described herein. In some embodiments, the one or more criteria include a criterion that is satisfied when the content that was added to the respective content entry user interface element included a link to the content, and not satisfied when it did not include a link to the content (e.g., and was merely a copy of the content)), the electronic device displays (928b), in the user interface (e.g., overlaid on an upper-right portion of the user interface), a selectable visual indication corresponding to the respective content entry user interface element, wherein the selectable visual indication is selectable to display the respective content entry user interface element, such as indication 872 in FIG. 8T (e.g., a note icon that can be selected (e.g., via a finger or stylus tap) to cause the respective content entry user interface element to be displayed, such as described with reference to method 700). In some embodiments, if at least a portion of the content in the user interface has previously been added to a different content entry user interface element, the note icon would be selectable to display the other content entry user interface element rather than the respective content entry user interface element.

In some embodiments, in accordance with a determination that the one or more criteria are not satisfied (e.g., because content corresponding to at least a portion of the content in the user interface has not previously been added to the respective content entry user interface element), the electronic device forgoes (928c) displaying the selectable visual indication in the user interface. The above-described manner of displaying (or not) a selectable visual indication of a content entry user interface element provides a quick and efficient way of accessing the content entry user interface element in situations where content associated with the content entry user interface element is being, or will likely be, displayed, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently while reducing errors in the usage of the device.

In some embodiments, the one or more criteria include a criterion that is satisfied when the at least the portion of the content is currently displayed via the display generation component, and not satisfied when the at least the portion of the content is not currently displayed via the display generation component (928d), such as shown in FIG. 8S when indication 872 is not displayed and in FIG. 8T when indication 872 is displayed. For example, if the portion of the content that was previously added to the respective content entry user interface element is currently off-display (e.g., scrolled off display in a webpage, or included in another user interface of the currently displayed application that is not yet displayed), the selectable visual indication for displaying the respective content entry user interface element is not displayed, but if the portion of the content that was previously added to the respective content entry user interface element is currently displayed (or becomes displayed, such as via a scrolling input or an input to display another user interface of the currently displayed application that includes/displays the portion of the content or an input to cease display of a user interface element that is obscuring display of the portion of the content), the selectable visual indication for displaying the respective content entry user interface element is displayed. In some embodiments, an input for displaying additional details about the portion of the content (e.g., displaying a detail view card for the portion of the content, different from the portion of the content itself) also causes the device to display the selectable visual indication for displaying the respective content entry user interface. In some embodiments, when displayed, the portion of the content is highlighted, as previously described, because a link to the portion of the content is currently included in the respective content entry user interface element (whether or not the respective content entry user interface element is currently displayed). The above-described manner of displaying (or not) a selectable visual indication of a content entry user interface element provides a quick and efficient way of accessing the content entry user interface element in situations where content associated with the content entry user interface element is currently being displayed, which simplifies the interaction between the user and the electronic device and enhances the operability of the electronic device and makes the user-device interface more efficient (e.g., by avoiding display of the selectable visual indication when content associated with the respective content entry user interface element is not currently being displayed), which additionally reduces power usage and improves battery life of the electronic device by enabling the user to use the electronic device more quickly and efficiently while reducing errors in the usage of the device.

It should be understood that the particular order in which the operations in FIGS. 9A-9N have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIGS. 9A-9N. For example, addition of content to the content entry user interface elements described above with reference to method 900 optionally has one or more of the characteristics of displaying and/or adding content to the content entry user interface elements, etc., described herein with reference to other methods described herein (e.g., method 700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 9A-9N are, optionally, implemented by components depicted in FIGS. 1A-1B. For example, displaying operations 902a, 902e and 902f, and receiving operation 902c are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to facilitate the addition of content to a content entry user interface element. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, handwriting styles, etc.

The present disclosure recognizes that the use of such personal information data in the present technology can be used to the benefit of users. For example, the personal information data can be used to automatically perform operations with respect to interacting with the electronic device using a stylus (e.g., recognition of handwriting as text or automatically adding content to a content entry user interface element). Accordingly, use of such personal information data enables users to enter fewer inputs to perform an action with respect to content entry user interface elements. Further, other uses for personal information data that benefit the user are also contemplated by the present disclosure. For instance, handwriting styles may be used to identify valid characters within handwritten content.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's handwriting or content entry history when displaying or creating content entry user interface elements.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, handwriting or content entry can be recognized based on aggregated non-personal information data or a bare minimum amount of personal information, such as the handwriting or content entry being handled only on the user's device or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display generation component and one or more input devices:
detecting, via the one or more input devices, a first user input provided by an object including movement relative to a boundary of a display region of the display generation component, wherein the first user input is detected concurrently with displaying, via the display generation component, a user interface;
in response to detecting the first user input, initiating a respective user interface operation, the respective user interface operation including:
in accordance with a determination that the first user input satisfies one or more first criteria, including a criterion that is satisfied when the first user input is provided at a first respective portion of the boundary of the display region of the display generation component, displaying, in a portion of the display region that was previously occupied by the user interface, a first content entry user interface element, wherein displaying the first content entry user interface element includes:
in response to detecting a first portion of the movement of the first user input, increasing a visual emphasis of the first content entry user interface element from a first level of visual emphasis to a second level of visual emphasis concurrently with detecting the first user input; and
in response to detecting a second portion of the movement of the first user input after the first portion of the movement of the first user input, moving the first content entry user interface element from a first portion of the user interface to a second portion, different from the first portion, of the user interface concurrently with displaying the first content entry user interface element with the second level of visual emphasis and concurrently with detecting the first user input; and
performing the respective user interface operation one or more times including at least one time where the first user input satisfies the one or more first criteria; and
detecting, via the one or more input devices, liftoff of the object, wherein liftoff of the object is detected concurrently with displaying, via the display generation component, the first content entry user interface element with at least a portion of the user interface;
after detecting liftoff of the object, maintaining display of the first content entry user interface element;
detecting, via the one or more input devices, a second user input corresponding to a request to enter content into the first content entry user interface element, wherein the second user input is detected concurrently with displaying, via the display generation component, the first content entry user interface element; and in response to detecting the second user input, displaying respective content in the first content entry user interface element that corresponds to the second user input.

2. The method of claim 1, wherein the respective user interface operation further includes:

in accordance with a determination that the first user input satisfies one or more second criteria, including a criterion that is satisfied when the object is a finger of a user of the electronic device, performing an operation corresponding to the first user input without displaying the first content entry user interface element, the method further comprising:

performing the respective user interface operation one or more times including at least one time where the first user input satisfies the one or more second criteria.

3. The method of claim 1, further comprising:

detecting, via the one or more input devices, a third user input including movement relative to the boundary of the display region of the display generation component, wherein the third user input is detected concurrently with displaying the user interface and wherein the movement corresponds to a second respective portion of the boundary, different from the first respective portion of the boundary, of the display region of the display generation component; and in response to detecting the third user input, displaying, via the display generation component, a screenshot of the user interface when the third user input was received, without displaying the first content entry user interface element.

4. The method of claim 1, wherein:

the first content entry user interface element includes second respective content when the first user input is detected, in response to detecting the first portion of the movement of the first user input, the second respective content is displayed in the first content entry user interface element at the first level of visual emphasis, and in response to detecting the second portion of the movement of the first user input, the second respective content is displayed in the first content entry user interface element at the second level of visual emphasis.

5. The method of claim 1, wherein displaying the first content entry user interface element includes:

in accordance with a determination that the movement of the first user input is a first movement, displaying the first content entry user interface element in a first respective portion of the display region of the display generation component; and in accordance with a determination that the movement of the first user input is a second movement, different from the first movement, displaying the first content entry user interface element in a second respective portion, different from the first respective portion, of the display region of the display generation component, the method further comprising:

repeating the respective user interface operation one or more times including at least one time where the first user input is the first movement and at least one time where the first user input is the second movement.

6. The method of claim 1, further comprising:

detecting, via the one or more input devices, a third user input corresponding to the portion of the display region of the display generation component in which the first content entry user interface element is displayed, wherein the third user input is detected concurrently with displaying the first content entry user interface element; and in response to detecting the third user input, initiating a second respective user interface operation, the second respective user interface operation including:

in accordance with a determination that the third user input corresponds to a swipe input:

ceasing display of the first content entry user interface element in the portion of the display region of the display generation component; and displaying, in the portion of the display region of the display generation component, a second content entry user interface element; and performing the second respective user interface operation one or more times including at least one time where the third user input corresponds to the swipe input.

7. The method of claim 1, further comprising:

detecting, via the one or more input devices, a third user input corresponding to the portion of the display region of the display generation component in which the first content entry user interface element is displayed, wherein the third user input is detected concurrently with displaying the first content entry user interface element; and in response to detecting the third user input, initiating a second respective user interface operation, the second respective user interface operation including:

in accordance with a determination that the third user input corresponds to movement of contacts relative to each other, modifying a size of the first content entry user interface element in accordance with the third user input; and performing the second respective user interface operation for the third user input that corresponds to movement of contacts relative to each other.

8. The method of claim 1, further comprising:

detecting, via the one or more input devices, a third user input including movement from the first content entry user interface element to the first respective portion of the boundary of the display region of the display generation component, wherein the third user input is detected concurrently with displaying the first content entry user interface element; and in response to detecting the third user input, ceasing display of the first content entry user interface element.

9. The method of claim 1, further comprising:

detecting a third user input corresponding to a request to display a system user interface, wherein the third user input is detected concurrently with displaying, via the display generation component, the user interface without displaying the first content entry user interface element;

in response to detecting the third user input, displaying, via the display generation component, the system user interface, wherein the system user interface includes a selectable option that is selectable to display the first content entry user interface element;

detecting, via the one or more input devices, a fourth user input corresponding to selection of the selectable option, wherein the fourth user input is detected concurrently with displaying the system user interface; and in response to detecting the fourth user input, displaying, via the display generation component, the first content entry user interface element.

10. The method of claim 1, further comprising: detecting, via the one or more input devices, a third user input that includes selection of a selectable option in a content entry user interface, wherein the third user input is detected concurrently with displaying, via the display generation component, a content entry user interface element without displaying the first content entry user interface element; and
  in response to detecting the third user input, displaying, via the display generation component, the first content entry user interface element.

11. The method of claim 1, further comprising:
  displaying, via the display generation component, a text entry user interface element that includes one or more selectable options that are selectable to enter predicted text into the user interface without displaying the first content entry user interface element;
  detecting, via the one or more input devices, a third user input that includes selection of a selectable option of the one or more selectable options in the text entry user interface element, wherein the third user input is detected concurrently with displaying, via the display generation component, the text entry user interface element that includes the one or more selectable options; and
  in response to detecting the third user input, displaying, via the display generation component, the first content entry user interface element.

12. The method of claim 1, further comprising:
  displaying, via the display generation component, a user interface of an application that includes one or more selectable options that are selectable to perform corresponding operations associated with the application without displaying the first content entry user interface element;
  detecting, via the one or more input devices, a third user input that includes selection of a selectable option of the one or more selectable options in the user interface of the application, wherein the third user input is detected concurrently with displaying, via the display generation component, the user interface of the application that includes the one or more selectable options; and
  in response to detecting the third user input, displaying, via the display generation component, the first content entry user interface element.

13. The method of claim 1, further comprising:
  after detecting the second user input, detecting a third user input corresponding to a request to display a respective user interface of a notes application that is associated with the first content entry user interface element; and
  in response to detecting the third user input, displaying, via the display generation component, the respective user interface, wherein the respective user interface includes:
    one or more representations of first one or more content entry user interface elements that were created in response to input detected within the respective user interface; and
    one or more representations of second one or more content entry user interface elements, including the first content entry user interface element, that were created, outside of the respective user interface, in response to inputs that include movement relative to the boundary of the display region of the display generation component, including the first user input.

14. The method of claim 13, wherein:
  the one or more representations of the first one or more content entry user interface elements are displayed in the respective user interface in a first arrangement,
  the one or more representations of the first one or more content entry user interface elements do not include a preview of content of the first one or more content entry user interface elements,
  the one or more representations of the second one or more content entry user interface elements are displayed in the respective user interface in a second arrangement, different from the first arrangement, and
  the one or more representations of the second one or more content entry user interface elements include previews of the content of the second one or more content entry user interface elements.

15. The method of claim 1, wherein the first content entry user interface element is associated with a notes application and the respective user interface operation further includes:
  in accordance with a determination that the first user input is detected concurrently with a content entry user interface element of the notes application not being displayed via the display generation component, the first content entry user interface element is a most recently edited content entry user interface element of the notes application, the method further comprising:
  performing the respective user interface operation one or more times including at least one time where the first user input is detected concurrently with the content entry user interface element of the notes application not being displayed via the display generation component.

16. The method of claim 15, wherein the respective user interface operation further includes:
  in accordance with a determination that the first user input is detected concurrently with displaying, via the display generation component, a content entry user interface element of the notes application, the first content entry user interface element corresponds to a new note associated with the notes application, the method further comprising:
  performing the respective user interface operation one or more times including at least one time where the first user input is detected while the content entry user interface element of the notes application is being displayed via the display generation component.

17. The method of claim 16, wherein the content entry user interface element of the notes application that is displayed when the first user input is detected is displayed within a respective user interface of the notes application, and the first content entry user interface element is displayed within the respective user interface of the notes application in response to the first user input.

18. The method of claim 17, further comprising:
  displaying an animation of the content entry user interface element moving out of the respective user interface, and displaying an animation of the first content entry user interface element moving into the respective user interface, wherein the animation of the content entry user interface element moving out of the respective user interface and the animation of the first content entry user interface element moving into the respective user interface are displayed concurrently with detecting the first user input.

19. The method of claim 1, further comprising:
  displaying, via the display generation component, a user interface that includes a cursor without displaying the first content entry user interface element;

detecting, via the one or more input devices, a third user input that includes moving the cursor to a predefined portion of the display region of the display generation component, wherein the third user input is detected concurrently with displaying, via the display generation component, the user interface that includes the cursor without displaying the first content entry user interface element; and in response to detecting the third user input, displaying, via the display generation component, the first content entry user interface element.

20. The method of claim 1, further comprising:

displaying, via the display generation component, a user interface without displaying the first content entry user interface element;

detecting, via the one or more input devices, a third user input that includes a keyboard input, wherein the third user input is detected concurrently with displaying, via the display generation component, the user interface without displaying the first content entry user interface element; and in response to detecting the third user input, initiating a second respective user interface operation, the second respective user interface operation including:

in accordance with a determination that the keyboard input corresponds to a predefined keyboard input associated with the first content entry user interface element, displaying, via the display generation component, the first content entry user interface element; and performing the second respective user interface operation one or more times including at least one time where the keyboard input corresponds to the predefined keyboard input associated with the first content entry user interface element.

21. An electronic device, comprising:

one or more processors;

memory; and one or more programs, wherein the one or more programs are stored in the memory and configured to be executed by the one or more processors, the one or more programs including instructions for:

detecting, via one or more input devices, a first user input provided by an object including movement relative to a boundary of a display region of a display generation component, wherein the first user input is detected concurrently with displaying, via the display generation component, a user interface;

in response to detecting the first user input:

in accordance with a determination that the first user input satisfies one or more first criteria, including a criterion that is satisfied when the first user input is provided at a first respective portion of the boundary of the display region of the display generation component, displaying, in a portion of the display region that was previously occupied by the user interface, a first content entry user interface element, wherein displaying the first content entry user interface element includes:

in response to detecting a first portion of the movement of the first user input, increasing a visual emphasis of the first content entry user interface element from a first level of visual emphasis to a second level of visual emphasis concurrently with detecting the first user input; and in response to detecting a second portion of the movement of the first user input after the first portion of the movement of the first user input, moving the first content entry user interface element from a first portion of the user interface to a second portion, different from the first portion, of the user interface concurrently with displaying the first content entry user interface element with the second level of visual emphasis and concurrently with detecting the first user input; and detecting, via the one or more input devices, liftoff of the object, wherein liftoff of the object is detected concurrently with displaying, via the display generation component, the first content entry user interface element with at least a portion of the user interface;

after detecting liftoff of the object, maintaining display of the first content entry user interface element;

detecting, via the one or more input devices, a second user input corresponding to a request to enter content into the first content entry user interface element, wherein the second user input is detected concurrently with displaying, via the display generation component, the first content entry user interface element; and in response to detecting the second user input, displaying respective content in the first content entry user interface element that corresponds to the second user input.

22. A non-transitory computer readable storage medium storing one or more programs, the one or more programs comprising instructions, which when executed by one or more processors of an electronic device, cause the electronic device to perform a method comprising:

detecting, via one or more input devices, a first user input provided by an object including movement relative to a boundary of a display region of a display generation component, wherein the first user input is detected concurrently with displaying, via the display generation component, a user interface;

in response to detecting the first user input:

in accordance with a determination that the first user input satisfies one or more first criteria, including a criterion that is satisfied when the first user input is provided at a first respective portion of the boundary of the display region of the display generation component, displaying, in a portion of the display region that was previously occupied by the user interface, a first content entry user interface element, wherein displaying the first content entry user interface element includes:

in response to detecting a first portion of the movement of the first user input, increasing a visual emphasis of the first content entry user interface element from a first level of visual emphasis to a second level of visual emphasis concurrently with detecting the first user input; and in response to detecting a second portion of the movement of the first user input after the first portion of the movement of the first user input, moving the first content entry user interface element from a first portion of the user interface to a second portion, different from the first portion, of the user interface concurrently with displaying the first content entry user interface element with the second level of visual emphasis and concurrently with detecting the first user input; and detecting, via the one or more input devices, liftoff of the object, wherein liftoff of the object is detected concurrently with displaying, via the display generation component, the first content entry user interface element with at least a portion of the user interface;

after detecting liftoff of the object, maintaining display of the first content entry user interface element;

detecting, via the one or more input devices, a second user input corresponding to a request to enter content into the first content entry user interface element, wherein the second user input is detected concurrently with displaying, via the display generation component, the first content entry user interface element; and in response to detecting the second user input, displaying respective content in the first content entry user interface element that corresponds to the second user input.

23. The method of claim 1, wherein:

increasing the visual emphasis of the first content entry user interface element from the first level of visual emphasis to the second level of visual emphasis includes increasing a size of the first content entry user interface element from a first size to a second size, and the first content entry user interface element is moved from the first portion of the user interface to the second portion of the user interface concurrently with displaying the first content entry user interface element with the second size.

24. The electronic device of claim 21, wherein the one or more programs further include instructions for:

in response to detecting the first user input:

in accordance with a determination that the first user input satisfies one or more second criteria, including a criterion that is satisfied when the object is a finger of a user of the electronic device, performing an operation corresponding to the first user input without displaying the first content entry user interface element.

25. The electronic device of claim 21, wherein the one or more programs further include instructions for:

detecting, via the one or more input devices, a third user input including movement relative to the boundary of the display region of the display generation component, wherein the third user input is detected concurrently with displaying the user interface and wherein the movement corresponds to a second respective portion of the boundary, different from the first respective portion of the boundary, of the display region of the display generation component; and in response to detecting the third user input, displaying, via the display generation component, a screenshot of the user interface when the third user input was received, without displaying the first content entry user interface element.

26. The electronic device of claim 21, wherein:

the first content entry user interface element includes second respective content when the first user input is detected, in response to detecting the first portion of the movement of the first user input, the second respective content is displayed in the first content entry user interface element at the first level of visual emphasis, and in response to detecting the second portion of the movement of the first user input, the second respective content is displayed in the first content entry user interface element at the second level of visual emphasis.

27. The electronic device of claim 21, wherein displaying the first content entry user interface element includes:

in accordance with a determination that the movement of the first user input is a first movement, displaying the first content entry user interface element in a first respective portion of the display region of the display generation component; and in accordance with a determination that the movement of the first user input is a second movement, different from the first movement, displaying the first content entry user interface element in a second respective portion, different from the first respective portion, of the display region of the display generation component.

28. The electronic device of claim 21, wherein the one or more programs further include instructions for:

detecting, via the one or more input devices, a third user input corresponding to the portion of the display region of the display generation component in which the first content entry user interface element is displayed, wherein the third user input is detected concurrently with displaying the first content entry user interface element; and in response to detecting the third user input:

in accordance with a determination that the third user input corresponds to a swipe input:

ceasing display of the first content entry user interface element in the portion of the display region of the display generation component; and displaying, in the portion of the display region of the display generation component, a second content entry user interface element.

29. The electronic device of claim 21, wherein the one or more programs further include instructions for:

detecting, via the one or more input devices, a third user input corresponding to the portion of the display region of the display generation component in which the first content entry user interface element is displayed, wherein the third user input is detected concurrently with displaying the first content entry user interface element; and in response to detecting the third user input:

in accordance with a determination that the third user input corresponds to movement of contacts relative to each other, modifying a size of the first content entry user interface element in accordance with the third user input.

30. The electronic device of claim 21, wherein the one or more programs further include instructions for:

detecting, via the one or more input devices, a third user input including movement from the first content entry user interface element to the first respective portion of the boundary of the display region of the display generation component, wherein the third user input is detected concurrently with displaying the first content entry user interface element; and in response to detecting the third user input, ceasing display of the first content entry user interface element.

31. The electronic device of claim 21, wherein the one or more programs further include instructions for:

detecting a third user input corresponding to a request to display a system user interface, wherein the third user input is detected concurrently with displaying, via the display generation component, the user interface without displaying the first content entry user interface element;

in response to detecting the third user input, displaying, via the display generation component, the system user interface, wherein the system user interface includes a selectable option that is selectable to display the first content entry user interface element;

detecting, via the one or more input devices, a fourth user input corresponding to selection of the selectable option, wherein the fourth user input is detected concurrently with displaying the system user interface; and
in response to detecting the fourth user input, displaying, via the display generation component, the first content entry user interface element.

32. The electronic device of claim 21, wherein the one or more programs further include instructions for:
detecting, via the one or more input devices, a third user input that includes selection of a selectable option in a content entry user interface, wherein the third user input is detected concurrently with displaying, via the display generation component, a content entry user interface element without displaying the first content entry user interface element; and
in response to detecting the third user input, displaying, via the display generation component, the first content entry user interface element.

33. The electronic device of claim 21, wherein the one or more programs further include instructions for:
displaying, via the display generation component, a text entry user interface element that includes one or more selectable options that are selectable to enter predicted text into the user interface without displaying the first content entry user interface element;
detecting, via the one or more input devices, a third user input that includes selection of a selectable option of the one or more selectable options in the text entry user interface element, wherein the third user input is detected concurrently with displaying, via the display generation component, the text entry user interface element that includes the one or more selectable options; and
in response to detecting the third user input, displaying, via the display generation component, the first content entry user interface element.

34. The electronic device of claim 21, wherein the one or more programs further include instructions for:
displaying, via the display generation component, a user interface of an application that includes one or more selectable options that are selectable to perform corresponding operations associated with the application without displaying the first content entry user interface element;
detecting, via the one or more input devices, a third user input that includes selection of a selectable option of the one or more selectable options in the user interface of the application, wherein the third user input is detected concurrently with displaying, via the display generation component, the user interface of the application that includes the one or more selectable options; and
in response to detecting the third user input, displaying, via the display generation component, the first content entry user interface element.

35. The electronic device of claim 21, wherein the one or more programs further include instructions for:
after detecting the second user input, detecting a third user input corresponding to a request to display a respective user interface of a notes application that is associated with the first content entry user interface element; and
in response to detecting the third user input, displaying, via the display generation component, the respective user interface, wherein the respective user interface includes:
one or more representations of first one or more content entry user interface elements that were created in response to input detected within the respective user interface; and
one or more representations of second one or more content entry user interface elements, including the first content entry user interface element, that were created, outside of the respective user interface, in response to inputs that include movement relative to the boundary of the display region of the display generation component, including the first user input.

36. The electronic device of claim 35, wherein:
the one or more representations of the first one or more content entry user interface elements are displayed in the respective user interface in a first arrangement,
the one or more representations of the first one or more content entry user interface elements do not include a preview of content of the first one or more content entry user interface elements,
the one or more representations of the second one or more content entry user interface elements are displayed in the respective user interface in a second arrangement, different from the first arrangement, and
the one or more representations of the second one or more content entry user interface elements include previews of the content of the second one or more content entry user interface elements.

37. The electronic device of claim 21, wherein the first content entry user interface element is associated with a notes application, and in response to detecting the first user input:
in accordance with a determination that the first user input is detected concurrently with a content entry user interface element of the notes application not being displayed via the display generation component, the first content entry user interface element is a most recently edited content entry user interface element of the notes application.

38. The electronic device of claim 37, wherein in response to detecting the first user input:
in accordance with a determination that the first user input is detected concurrently with displaying, via the display generation component, a content entry user interface element of the notes application, the first content entry user interface element corresponds to a new note associated with the notes application.

39. The electronic device of claim 38, wherein the content entry user interface element of the notes application that is displayed when the first user input is detected is displayed within a respective user interface of the notes application, and the first content entry user interface element is displayed within the respective user interface of the notes application in response to the first user input.

40. The electronic device of claim 39, wherein the one or more programs further include instructions for:
displaying an animation of the content entry user interface element moving out of the respective user interface, and displaying an animation of the first content entry user interface element moving into the respective user interface, wherein the animation of the content entry user interface element moving out of the respective user interface and the animation of the first content entry user interface element moving into the respective user interface are displayed concurrently with detecting the first user input.

41. The electronic device of claim 21, wherein the one or more programs further include instructions for:
displaying, via the display generation component, a user interface that includes a cursor without displaying the first content entry user interface element;
detecting, via the one or more input devices, a third user input that includes moving the cursor to a predefined portion of the display region of the display generation component, wherein the third user input is detected concurrently with displaying, via the display generation component, the user interface that includes the cursor without displaying the first content entry user interface element; and
in response to detecting the third user input, displaying, via the display generation component, the first content entry user interface element.

42. The electronic device of claim 21, wherein the one or more programs further include instructions for:
displaying, via the display generation component, a user interface without displaying the first content entry user interface element;
detecting, via the one or more input devices, a third user input that includes a keyboard input, wherein the third user input is detected concurrently with displaying, via the display generation component, the user interface without displaying the first content entry user interface element; and
in response to detecting the third user input:
in accordance with a determination that the keyboard input corresponds to a predefined keyboard input associated with the first content entry user interface element, displaying, via the display generation component, the first content entry user interface element.

43. The electronic device of claim 21, wherein:
increasing the visual emphasis of the first content entry user interface element from the first level of visual emphasis to the second level of visual emphasis includes increasing a size of the first content entry user interface element from a first size to a second size, and
the first content entry user interface element is moved from the first portion of the user interface to the second portion of the user interface concurrently with displaying the first content entry user interface element with the second size.

44. The non-transitory computer readable storage medium of claim 22, wherein the method further comprises:
in response to detecting the first user input:
in accordance with a determination that the first user input satisfies one or more second criteria, including a criterion that is satisfied when the object is a finger of a user of the electronic device, performing an operation corresponding to the first user input without displaying the first content entry user interface element.

45. The non-transitory computer readable storage medium of claim 22, wherein the method further comprises:
detecting, via the one or more input devices, a third user input including movement relative to the boundary of the display region of the display generation component, wherein the third user input is detected concurrently with displaying the user interface and wherein the movement corresponds to a second respective portion of the boundary, different from the first respective portion of the boundary, of the display region of the display generation component; and
in response to detecting the third user input, displaying, via the display generation component, a screenshot of the user interface when the third user input was received, without displaying the first content entry user interface element.

46. The non-transitory computer readable storage medium of claim 22, wherein:
the first content entry user interface element includes second respective content when the first user input is detected,
in response to detecting the first portion of the movement of the first user input, the second respective content is displayed in the first content entry user interface element at the first level of visual emphasis, and
in response to detecting the second portion of the movement of the first user input, the second respective content is displayed in the first content entry user interface element at the second level of visual emphasis.

47. The non-transitory computer readable storage medium of claim 22, wherein displaying the first content entry user interface element includes:
in accordance with a determination that the movement of the first user input is a first movement, displaying the first content entry user interface element in a first respective portion of the display region of the display generation component; and
in accordance with a determination that the movement of the first user input is a second movement, different from the first movement, displaying the first content entry user interface element in a second respective portion, different from the first respective portion, of the display region of the display generation component.

48. The non-transitory computer readable storage medium of claim 22, wherein the method further comprises:
detecting, via the one or more input devices, a third user input corresponding to the portion of the display region of the display generation component in which the first content entry user interface element is displayed, wherein the third user input is detected concurrently with displaying the first content entry user interface element; and
in response to detecting the third user input:
in accordance with a determination that the third user input corresponds to a swipe input:
ceasing display of the first content entry user interface element in the portion of the display region of the display generation component; and
displaying, in the portion of the display region of the display generation component, a second content entry user interface element.

49. The non-transitory computer readable storage medium of claim 22, wherein the method further comprises:
detecting, via the one or more input devices, a third user input corresponding to the portion of the display region of the display generation component in which the first content entry user interface element is displayed, wherein the third user input is detected concurrently with displaying the first content entry user interface element; and
in response to detecting the third user input:
in accordance with a determination that the third user input corresponds to movement of contacts relative to each other, modifying a size of the first content entry user interface element in accordance with the third user input.

50. The non-transitory computer readable storage medium of claim 22, wherein the method further comprises:

detecting, via the one or more input devices, a third user input including movement from the first content entry user interface element to the first respective portion of the boundary of the display region of the display generation component, wherein the third user input is detected concurrently with displaying the first content entry user interface element; and in response to detecting the third user input, ceasing display of the first content entry user interface element.

51. The non-transitory computer readable storage medium of claim 22, wherein the method further comprises:

detecting a third user input corresponding to a request to display a system user interface, wherein the third user input is detected concurrently with displaying, via the display generation component, the user interface without displaying the first content entry user interface element;

in response to detecting the third user input, displaying, via the display generation component, the system user interface, wherein the system user interface includes a selectable option that is selectable to display the first content entry user interface element;

detecting, via the one or more input devices, a fourth user input corresponding to selection of the selectable option, wherein the fourth user input is detected concurrently with displaying the system user interface; and in response to detecting the fourth user input, displaying, via the display generation component, the first content entry user interface element.

52. The non-transitory computer readable storage medium of claim 22, wherein the method further comprises:

detecting, via the one or more input devices, a third user input that includes selection of a selectable option in a content entry user interface, wherein the third user input is detected concurrently with displaying, via the display generation component, a content entry user interface element without displaying the first content entry user interface element; and in response to detecting the third user input, displaying, via the display generation component, the first content entry user interface element.

53. The non-transitory computer readable storage medium of claim 22, wherein the method further comprises:

displaying, via the display generation component, a text entry user interface element that includes one or more selectable options that are selectable to enter predicted text into the user interface without displaying the first content entry user interface element;

detecting, via the one or more input devices, a third user input that includes selection of a selectable option of the one or more selectable options in the text entry user interface element, wherein the third user input is detected concurrently with displaying, via the display generation component, the text entry user interface element that includes the one or more selectable options; and in response to detecting the third user input, displaying, via the display generation component, the first content entry user interface element.

54. The non-transitory computer readable storage medium of claim 22, wherein the method further comprises:

displaying, via the display generation component, a user interface of an application that includes one or more selectable options that are selectable to perform corresponding operations associated with the application without displaying the first content entry user interface element;

detecting, via the one or more input devices, a third user input that includes selection of a selectable option of the one or more selectable options in the user interface of the application, wherein the third user input is detected concurrently with displaying, via the display generation component, the user interface of the application that includes the one or more selectable options; and in response to detecting the third user input, displaying, via the display generation component, the first content entry user interface element.

55. The non-transitory computer readable storage medium of claim 22, wherein the method further comprises:

after detecting the second user input, detecting a third user input corresponding to a request to display a respective user interface of a notes application that is associated with the first content entry user interface element; and in response to detecting the third user input, displaying, via the display generation component, the respective user interface, wherein the respective user interface includes:

one or more representations of first one or more content entry user interface elements that were created in response to input detected within the respective user interface; and one or more representations of second one or more content entry user interface elements, including the first content entry user interface element, that were created, outside of the respective user interface, in response to inputs that include movement relative to the boundary of the display region of the display generation component, including the first user input.

56. The non-transitory computer readable storage medium of claim 55, wherein:

the one or more representations of the first one or more content entry user interface elements are displayed in the respective user interface in a first arrangement, the one or more representations of the first one or more content entry user interface elements do not include a preview of content of the first one or more content entry user interface elements, the one or more representations of the second one or more content entry user interface elements are displayed in the respective user interface in a second arrangement, different from the first arrangement, and the one or more representations of the second one or more content entry user interface elements include previews of the content of the second one or more content entry user interface elements.

57. The non-transitory computer readable storage medium of claim 22, wherein the first content entry user interface element is associated with a notes application, and in response to detecting the first user input:

in accordance with a determination that the first user input is detected concurrently with a content entry user interface element of the notes application not being displayed via the display generation component, the first content entry user interface element is a most recently edited content entry user interface element of the notes application.

58. The non-transitory computer readable storage medium of claim 57, wherein in response to detecting the first user input:
in accordance with a determination that the first user input is detected concurrently with displaying, via the display generation component, a content entry user interface element of the notes application, the first content entry user interface element corresponds to a new note associated with the notes application.

59. The non-transitory computer readable storage medium of claim 58, wherein the content entry user interface element of the notes application that is displayed when the first user input is detected is displayed within a respective user interface of the notes application, and the first content entry user interface element is displayed within the respective user interface of the notes application in response to the first user input.

60. The non-transitory computer readable storage medium of claim 59, wherein the method further comprises:
displaying an animation of the content entry user interface element moving out of the respective user interface, and displaying an animation of the first content entry user interface element moving into the respective user interface, wherein the animation of the content entry user interface element moving out of the respective user interface and the animation of the first content entry user interface element moving into the respective user interface are displayed concurrently with detecting the first user input.

61. The non-transitory computer readable storage medium of claim 23, wherein the method further comprises:
displaying, via the display generation component, a user interface that includes a cursor without displaying the first content entry user interface element;
detecting, via the one or more input devices, a third user input that includes moving the cursor to a predefined portion of the display region of the display generation component, wherein the third user input is detected concurrently with displaying, via the display generation component, the user interface that includes the cursor without displaying the first content entry user interface element; and
in response to detecting the third user input, displaying, via the display generation component, the first content entry user interface element.

62. The non-transitory computer readable storage medium of claim 22, wherein the method further comprises:
displaying, via the display generation component, a user interface without displaying the first content entry user interface element;
detecting, via the one or more input devices, a third user input that includes a keyboard input, wherein the third user input is detected concurrently with displaying, via the display generation component, the user interface without displaying the first content entry user interface element; and
in response to detecting the third user input:
in accordance with a determination that the keyboard input corresponds to a predefined keyboard input associated with the first content entry user interface element, displaying, via the display generation component, the first content entry user interface element.

63. The non-transitory computer readable storage medium of claim 22, wherein:
increasing the visual emphasis of the first content entry user interface element from the first level of visual emphasis to the second level of visual emphasis includes increasing a size of the first content entry user interface element from a first size to a second size, and
the first content entry user interface element is moved from the first portion of the user interface to the second portion of the user interface concurrently with displaying the first content entry user interface element with the second size.

\* \* \* \* \*